US010486330B2

(12) United States Patent
Giles

(10) Patent No.: US 10,486,330 B2
(45) Date of Patent: Nov. 26, 2019

(54) METHOD OF REINFORCED CEMENTITIOUS CONSTRUCTION BY HIGH SPEED EXTRUSION PRINTING AND APPARATUS FOR USING SAME

(71) Applicant: Brian C. Giles, Scottsdale, AZ (US)

(72) Inventor: Brian C. Giles, Scottsdale, AZ (US)

(73) Assignee: Armatron Systems, LLC, Scottsdale, AZ (US)

( * ) Notice: Subject to any disclaimer, the term of this patent is extended or adjusted under 35 U.S.C. 154(b) by 49 days.

(21) Appl. No.: 15/732,072

(22) Filed: Sep. 13, 2017

(65) Prior Publication Data
US 2018/0071949 A1   Mar. 15, 2018

Related U.S. Application Data

(60) Provisional application No. 62/495,514, filed on Sep. 14, 2016.

(51) Int. Cl.
| | |
|---|---|
| *B33Y 10/00* | (2015.01) |
| *B28B 1/00* | (2006.01) |
| *B33Y 30/00* | (2015.01) |
| *B33Y 50/02* | (2015.01) |
| *B28B 17/00* | (2006.01) |
| *E04B 1/16* | (2006.01) |
| *E04B 1/35* | (2006.01) |
| *E04B 1/32* | (2006.01) |
| *E04G 21/04* | (2006.01) |

(52) U.S. Cl.
CPC .......... *B28B 1/001* (2013.01); *B28B 17/0081* (2013.01); *B33Y 10/00* (2014.12); *B33Y 30/00* (2014.12); *B33Y 50/02* (2014.12); *E04B 1/16* (2013.01); *E04B 1/3505* (2013.01); *E04B 1/166* (2013.01); *E04B 1/32* (2013.01); *E04B 2103/02* (2013.01); *E04G 21/04* (2013.01)

(58) Field of Classification Search
None
See application file for complete search history.

(56) References Cited

U.S. PATENT DOCUMENTS

| | | | |
|---|---|---|---|
| 3,616,589 | A | 11/1971 | Sherard |
| 5,350,256 | A | 9/1994 | Hammer |
| 7,641,461 | B2 | 1/2010 | Khoshnevis |
| (Continued) | | | |

FOREIGN PATENT DOCUMENTS

GB     2267110 A     11/1993

*Primary Examiner* — Jacob T Minskey
(74) *Attorney, Agent, or Firm* — Invention To Patent Services; Alex Hobson

(57) ABSTRACT

The present invention relates to methods and apparatuses for an automated reinforced concrete construction system for onsite slip-form molding and casting a variety of cementitious mixes in a cast in place leave in place externally moldable flexible reinforced containment sleeve providing a wide variety of interchangeable full-scale molding configurations simultaneously optimizing a wide variety of cementitious mix curing characteristics, further having optional internal reinforcement net(s), for layer wise interlocking additive printed brick deposition providing improved slip-form mold casting of a wide variety of reinforced concrete structures; the present invention further includes a variety of operating platforms suitable for on and offsite construction as disclosed herein.

17 Claims, 53 Drawing Sheets

(56) References Cited

U.S. PATENT DOCUMENTS

| | | |
|---|---|---|
| 8,166,727 B2 | 5/2012 | Pivac et al. |
| 2007/0001432 A1* | 1/2007 | Thurm ...................... B60P 3/07 |
| | | 280/656 |
| 2007/0193048 A1* | 8/2007 | Molitorisz ............... G01C 9/04 |
| | | 33/366.16 |
| 2008/0083190 A1 | 4/2008 | Fearn |
| 2008/0154451 A1 | 6/2008 | Dibble et al. |

* cited by examiner

A

B

METHOD OF REINFORCED CEMENTITIOUS CONSTRUCTION BY HIGH SPEED EXTRUSION PRINTING AND APPARATUS FOR USING SAME

FIELD OF THE INVENTION

The present invention relates to methods and apparatuses for an automated reinforced concrete construction system for onsite slip-form molding and casting a variety of cementitious mixes in a cast in place leave in place externally moldable flexible reinforced containment sleeve providing a wide variety of interchangeable full-scale molding configurations simultaneously optimizing a wide variety of cementitious mix curing characteristics, further having optional internal reinforcement net(s), for layer wise interlocking additive printed brick deposition providing improved slip-form mold casting of a wide variety of reinforced concrete structures; the present invention further includes a variety of operating platforms suitable for on and offsite construction as disclosed herein.

BACKGROUND OF THE INVENTION

This section provides background information related to the present disclosure, but which is not necessarily prior art.

This invention generally pertains to full architectural scale 3D printing, and more particularly to producing high speed building methods and apparatuses for the construction industry.

Currently there remain several fundamental and significant limitations within the art leading to current construction being slow, expensive, complex, labor intensive, especially considering the aging skilled labor force, and is hazardous, leading all other industries in worker deaths in 2015 according to the Bureau of Labor Statistics.

One major limitation of prior art concrete structures and construction is the common use of iron rebar, which suffers from corrosion, availability, and the ever-constant price fluctuations of "supply and demand". These iron-reinforced concrete structures generally require maintenance, and or significant repair after about 50 to 100 years, due to iron oxidization, which significantly limits the lifespan of the structures. Note in the USA alone, the estimated cost to repair these and other associated problems in concrete structures is approaching 300-billion US Dollars annually.

Furthermore, employing conventional construction technology, even a modest-sized structure usually requires the time and efforts of numerous specialized trades and individuals, presenting the added challenge of organizing numerous specialized individuals to cooperate in an efficient manner. Despite the availability of modern construction machinery such as cranes, pumps, concrete mixers, and form works, the construction industry is currently dependent primarily on manual labor of professional contractors that operate the machinery and tools. Thus, current concrete construction is very costly and time consuming.

These skilled laborers construct structures using expensive methods and materials, such as reinforced concrete and masonry forms, that are generally rectilinear, thus significantly restricting architectural designs. Thus, these costs increase significantly when constructing complex concave-convex surfaces, for example, that conventionally require the pre-construction of expensive formworks and iron reinforcement cages, further including their transport, assembly, and then casting. Additionally, virtually all conventional construction systems require skilled workers to constantly refer to site plans (blue-prints), and this practice is slow and expensive, often producing inconsistent results. The appearance and quality of one structure can vary from another built from the same site plans and materials.

Within the prior art, using manual labor for construction is often very time-consuming, often requiring several months and, in some instances years, to complete. This can be due to differences in the laborers' skills, tolerances, sites, supervision, and techniques employed by those that work on the structures. Another important consideration is that conventional concrete construction systems typically result in significant amounts of wasted materials and time. For example, when concrete forms are used, they are commonly purchased in standardized off-the-shelf sizes, and often must be cut to meet site design requirements, resulting in waste of materials, labor, and time. Further, the materials require purchasing, inventorying, storage, and transportation, including their cleaning and discarding, or storage for subsequent re-use.

Full-scale 3D architectural printing of the current invention eliminates need for scaffolding and concrete form-works, and further significantly improves onsite safety and security.

A further limitation of prior art is the extensive and expensive site preparation required to accommodate the linear rigidities imposed by current methods. The concrete construction industry has a need for more sustainable automated onsite constructions systems that provides improved efficiencies, including use of building sites, and further providing significant improvements in sustainability durability, such as from seismic, wind, and snow load stability.

Note nearly $8 trillion dollars is spent annually on construction today around the world, and that figure is projected to increase to about $25 trillion by 2025 (PriceWaterhouseCooper "Global Construction 2030 Report"), furthermore the United Nations calculates that over the next 15 years there will be an average of 100,000 new housing units per day needed to meet the demand for the 4 billion people who live in poverty primarily in third world countries. Note, conventional construction costs increase about 8 to 9% per year.

At present, the construction industry relies heavily on the use of on-site manual labor. These processes are highly inefficient, as it wastes time and human resources and materials, frequently resulting in cost overruns, late delivery, and construction reworking. The advent of 3D full architectural scale onsite and offsite printing technology may seem promising, but current full-scale 3D printing technology suffers from a variety of limitations of scale and quality of fabrication, as it employs additive printing processes through sequential layering of materials.

Thus, overcoming these and many other limitations within the concrete construction industry will enable architects to more efficiently construct their designs using semi-robotic or fully automated construction systems that incorporate additive manufacturing, Computer Assisted Design (CAD) technology, and systems integration models (Build Information Modeling—BIM), reducing required human intervention, and further improving speed safety, sustainability, and energy efficiencies, and furthermore providing design and construction diversity and flexibility without excessive construction costs.

The full architectural scale 3D Printing system of the current invention provides the construction industry with more sustainable, and more ecological construction technology that constructs superior reinforced structures at lower time and costs, producing significantly less onsite waste and employing more environmentally friendly materials, and requiring very low levels of energy. Employing concrete, the world's most ubiquitous material of our modern civilization, full architectural scale 3D concrete printing could herald an expansion to the $3^{rd}$ industrial revolution: The Era of Mass Customization Construction.

Concrete Forms/Foundations

Historically, casting concrete foundations has necessitated the erection of two structures (forms): first; wooden, plastic, or foam forms are purchased, transported, assembled, and secondly; the concrete mix is poured or sprayed and is temporarily held in place by such forms. Following this, the forms are removed, and discarded or recycled, or cleaned, reshipped, stored and inventoried (Reference FIGS. 1 A and B, FIGS. 2 A and B, and FIGS. 3 A, B, C, and D). Restraining posts are additionally often custom fabricated and assembled on site to shape, size, and define the walls. After the concrete mix has been poured into the assembled fixed form and has sufficiently cured, the form(s) are disassembled and other forms are then constructed for any adjacent wall sections. This process often requires the bottom edge of the form being positioned in place with stakes (Reference FIG. 1 A), and tilting them towards the vertical side of the fixed forms, further using wood spacers to separate the tops of the fixed forms at the desired distance (Reference FIG. 2 B), and often hold the fixed forms against the spacers with tie wire (Reference FIGS. 1 A and B, FIGS. 2 A and B), further having the conventional challenges of constructing a rebar reinforcing cage inside such forms.

In addition to adding significant manual labor and time to the construction process, conventional concrete forms' cost is about $26 per square foot (2013), and conventional concrete forms alone account for about 40% of the total construction cost.

Additionally, these forms are usually flat, thus significantly limiting design and construction diversity. Furthermore, conventional concrete forms have undesirable insulative characteristics that produce uneven heat dissipation during curing that can degrade the potential quality of the mixes' performance, and further limiting the critical factors required for obtaining the highest performance potential of concrete mixes. Furthermore, these conventional forms do not allow for visual inspection of the concrete mix casting state and quality, such as not revealing air pockets, voids, "bug holes", etc., nor do they sufficiently protect the mix cast from the exterior environment (such as rain, driven wind, snow, debris, etc.).

Please note the prior art concrete foundations and other form techniques have about a 3% failure rate (blow out) (Reference FIG. 4), usually during the process of pouring or pumping concrete into such conventional fixed forms.

The current invention's construction system eliminates many of the prior art's limitations such as using large, heavy rectilinear disposable or reusable fixed concrete forms.

Prior Art Slip-Forming

The application of a technique known as slip-forming is commonly employed in the concrete construction industry. Instead of constructing a fixed form(s) onsite, a mobile slip-form may be used. Conventional concrete slip-form systems are typically large and supported on the finished or "set" portion of the wall to be constructed, and are moved upwardly therewith as the wall progresses. Typically, the two sides of the slip-form are tied together across the wall close to the mix pouring level and, with walls, the respective sides are trussed into the desired arc by means of very large, heavy longitudinally adjustable trusses.

In the prior art, certain mechanized systems have been used for slip-forming concrete construction techniques, e.g., those in which curable cementitious mixes are applied in layers for the layout/structure.

As an example, a mobile slip-form is mounted to the frame of a motorized vehicle. A guide-line is laid out defining one edge of the wall to be constructed. The frame of the vehicle includes fore and aft alignment rods, maintained in contingent relation with the guide-line by the operator. These large forms are slow, heavy, and bulky, and, as they are of a fixed shape, they often store (trap) heat, and thus generally have poor heat dissipation. These prior art systems do not encompass or employ a more uniform heat dissipating system nor employ external reinforcing containment "sleeves", nor do they employ, nor disclose an external nor internal reinforcing mesh or net, thus limiting the range of mixes to be slipform printed, and furthermore limit the shapes and sizes of foundations and walls, etc. As the motorized vehicle (not shown) progresses forwardly down the guide line, the semi-liquid concrete mix is continuously poured into the slip-form. The slump and constituent materials of the concrete mix are such that they often require multiple vibrators, commonly immersed within the slip-form for consolidation of the settling mix when the formed concrete emerges from the output, or trailing edge of the slip-form.

These prior art large slip-formers are also primarily limited to horizontal, or near horizontal, casting.

Furthermore, with traditional slip-forming systems, the casts have rigid, straight line contour limitations, particularly regarding the adjustment of the height and diameter of the slip-form surfaces to cast the desired diameter of a cast wall, and usually leave a surface having a rough generic blandness of appearance and other esthetic limitations. Once the slip-formed wall reaches a minimum height, a reinforcement bar cage is typically used in combination with a larger and slip-formed foundation or footer. Note conventionally the reinforcement cage (armature) must be constructed beforehand.

Conventionally when slip-forming walls using known prior art machines, the sidewalls and the top wall emerge from the form uniformly smooth. The cured mix, having a smooth appearance, is usually recognized as visually unappealing for most applications, so additional surface amendments, such as cladding, are often added to the surface. Often the walls are colored with stain or paint, or decorative plates may be applied to the walls after the concrete has cured. These surface amendments consume additional time and materials, and thus increase the overall cost of construction.

This is particularly true in the case of curved concrete structures, such as silos or stacks, in which accuracy of slip-form placement requires the bulky, heavy, expensive equipment, and considerable time and labor required in continuously adjusting, checking and readjusting the slip-former. All of this is further compounded if the silos or stack is to be formed (cast) with an upward taper or requires more than a single type of concrete mix.

Thus, virtually all prior art slip-forms are unsuitable for constructing structures which are to taper and thus increase, or decrease, in cross-section or shape as the height increases.

Therefore, conventional slip-form systems are heavy, slow, unreliable, have limited casting shapes, are not easily adjusted, and are inaccurate and costly and thus are generally unsatisfactory, particularly when constructing any structures other than simple shapes.

Additionally, the need, exists within the art for a high speed quickly interchangeable printed brick molding system, which are easily and quickly interchangeable onsite with another die or mold, for customizing a wide variety of different printed brick configurations and sizes, for use when constructing a slip-formed layer-wise interlocking printed cementitious or concrete brick structures, such as but not limited to foundations, footings, window and door frames, walls and roofs, and the need further exists for creating substantially continuous patterns or various impressions which may change or repeat along the extent of the printed brick sections.

The need also exists within the art for reinforced concrete construction methods and apparatus which slip-form prints a wall, and concurrently creates desirable patterns or suitable impressions both in the surface of a vertical sidewall portion and in the surface of an angled stem portion of the wall(s), or roof, foundation, footing, etc.

The full architectural scale 3D concrete slip-former printing system of the current invention overcomes these and many other prior art limitations by employing synchronized and or non-synchronized automated brick slip-form printing (having flexible externally reinforced three-dimensional layer-wise interlocking brick printing) in two or more planes. The prior art full-scale 3D construction printing is generally limited to horizontal layer-wise deposition, and furthermore is limited to straight compression walls (straight vertical). The current invention encompasses the ability to accurately automatically print bricks in a vertical, horizontal, or any other angle derivative therein.

The inventive full-scale 3-dimensional slip-form (onsite printing) system provides faster and more accurate reinforced concrete construction and significantly expands architectural design possibilities and simplifies previously complex reinforced structural concrete construction systems, such as from rotating slip-form extrusion printing head(s), allowing slip-forming (three-dimensional concrete printing) such as onsite printing of interlocking flowing tapering walls horizontally and vertically or as needed.

Additionally, almost all prior art 3D printing systems are limited to multi-pass construction, which looks like corrugated cardboard and has several significant structural, aesthetic, and time and labor limitations. The current invention encompasses employing single-pass and or multi-pass construction as needed or desired.

The current invention's Full architectural Scale onsite or offsite 3D structurally reinforced concrete Printing significantly improves the concrete construction industry by employing a wider variety of cementitious mixes ranging from generic to ultra-high performance reinforced concrete mixes, including other specialty mixes, including non-cementitious mixes, furthermore producing structurally reinforced printed bricks for quickly constructing superior, stronger, and more sustainable structures at or below the costs of conventional construction, while simultaneously optimizing the curing environment of a wide variety of mixes, and thus its potential properties, by controlling the curing environment in real time.

Curvilinear Structures

Additionally, within the prior art, constructing structures having complex multi-curved walls, particularly constructing with multiple temporary curved concrete forms for casting concrete walls, particularly those with small radiuses, is problematic and is cost prohibitive.

Materials such as reinforced concrete can be molded into curved structures, however conventional systems require costly individualized concrete forms to shape and support such materials in their initial fluid or plastic state. Since concrete forms have been generally constructed of lumber, it has been simpler and more economical to maintain the inherent rectilinear shape in the fabrication of such concrete forms and hence rectilinear concrete structures. Assembly of wooden forms in complex curved shapes requires a great expenditure of materials, cost, time, and effort.

Traditionally, buildings have been erected in generally rectangular configurations with the use of lumber, bricks, blocks and the like. These are rigid materials and may be most easily produced with straight sides and square corners, which requires that structures built with such materials also have the same straight sides and square corners of rectangular configurations. Structures built from conventional wood frame materials generally have relatively low energy efficiency and require a high level of maintenance. And tend to be fragile, and are susceptible to damage from storms, floods, earthquakes, and fire than are other reinforced concrete structures with curvilinear geometries.

In the art, it is known that curvilinear structures having 3-dimensional slipform printed structures such as having arches, domes, and vaults provides stress displacements and other numerous engineering benefits in structural integrity, air circulation, and aesthetics and design flexibility. 3-dimensional printed structures constructed with curved walls generally have higher potential resistance from earthquakes, high winds, snow loads, and the like, and additionally may be more energy efficient. However, the construction of such full 3-dimensional full architectural scale printed curvilinear structures has previously been unwanted or problematic and cost prohibitive.

Many prior art curvilinear construction system traditionally used such as Binishells, geodesic domes, air form structures, etc. have significant design limitations, and often have a critical phase of construction, and often requires large, expensive, specialized equipment. Furthermore, the system often requires a narrow and specific cementitious mix and costly specialty made molding systems.

The prior art includes free-form 3D printing of custom formworks, such as Branch Technology, Freefab, AI Build, and Mesh-Mould, which have significant limitations of time and post processing requirements, such as not disclosing nor teaching single-pass construction.

WO2015065936A2 and PCT/US2014/062514 of Branch Technology discloses employing a movable extruder places extrudate that solidifies in open space to create "scaffolding" or "skeletons" of structures and other products, such as custom concrete formworks, however is limited to printing in multiple sections of 3D walls off site, that further require onsite post filling with filler material such as polymeric insulating foam, and requires shipping and manual installation onsite, with additional post processing such as being coated with traditional materials and employing conventional prior art techniques for completion. These skeletonized construction systems do not disclose or teach onsite slip-form printing of reinforced cementitious materials, nor do they disclose optimizing the curing/casting environment to optimize the mix properties and characteristics nor use of an external reinforcement sleeve, nor do they disclose nor teach compatibility with conventional reinforcement.

3-Dimensional Printing

Within the automated construction of reinforced concrete structures, one rapid automated construction technology is additive layer manufacturing (ALM), that is also referred to as 3D printing. Unlike milling that removes material to produce an object, ALM builds a solid object from a series of layers of material with each layer printed and deposited on top of the previous layer. However, despite some new developments, accordingly, there is a need for innovative construction systems and materials that are stronger, more durable, easier and faster to implement and easily assembled and re-configurable onsite.

Additive manufacturing processes such as full scale 3D printing have been proposed and extensively used for the manufacture of many small-scale items (generally limited to about 1 mm to 500 mm), though difficulties have been encountered in using such processes for the manufacture of larger scale items (BAAM—Big Area Additive Manufacturing and Large Scale Additive Manufacturing), such as complete buildings, panels, and other full architectural scale 3D printing, which presently can be time consuming and labor intensive to form. Also, some items previously formed with 3D printing processes have lacked sufficient structural strength for use in applications having minimum strength requirements or in applications having the requirement to satisfy the relevant Building Code of Construction that is applicable to a construction project.

Furthermore, prior art 3D printing processes are generally not suitable for onsite manufacturing of large full architectural scale structures or for creating cladding components on any architectural scale. While Computer Numerical Control (CNC) machines can operate on large objects, CNC machines impose severe limitations on the geometries and materials of the work pieces. Increasingly, customers are demanding more complex and difficult to construct full architectural scale structures, for example, large scale structures with highly complex curvilinear designs or are made of composite materials. Thus, the fundamental limitations of automated digital construction technologies and mass construction systems currently known in the prior art limit the extent to which these systems can provide solutions as per the limitations outlined above.

Modern development and research have been publicly under way in the area of 3-dimensional full architectural scale house (structure) printing since 2004 to construct buildings for commercial and private habitation. Currently most printing systems represent using large 3-dimensional printers (gantry system) represent they can complete the building in approximately 20 hours of "printer" time.

The 3-dimensional full-scale house (structure) printing technology links science, design, construction, and community. Full architectural scale 3-dimensional printing could revolutionize the construction industry by significantly increasing speed, accuracy, and safety, further reducing construction waste, and offering culturally and climactic customized mass housing solutions worldwide. Full architectural scale 3D printing will also play a significant role in the quick build of low-cost sustainable, energy efficient housing globally, particularly in impoverished areas and those affected by disasters, thus having far reaching societal impact at a time where construction is currently not meeting the rapidly expanding housing demands.

With costly, labor-intensive, dangerous work significantly reduced, custom-designed homes and structures will become more economically accessible. Furthermore, disposal of construction waste materials is a significant cost in the construction industry, however, with 3D printing only the necessary construction materials for each project are produced. An added advantage is that 3D printer 'ink' can be made from a variety of substances such as but not limited to recycled plastic waste, other cementitious materials, indigenous clays, and a wide variety of other construction materials. If slip-form printing onsite, material transport costs and CO2 emissions are greatly reduced, as are dust and noise levels. More importantly, the way that these structures are designed has significant benefits on esthetic materials usage and building sustainability, energy efficiency, and strength.

Additive manufacturing frees architectural designers to explore intricate and complex architectural geometries in CAD before full scale printing them into the physical world. The current invention allows architects and engineers to replace many complex assemblies with single structures. Providing previously unavailable Diverse Additive Manufacturing construction systems and materials that will enable faster build times, complex organic shapes, and stronger, more sustainable structures.

Another key factor driving the development of this new technology within the construction industry is the exploding global demand for rapidly-produced housing, the trend towards 'smart cities', and the government contracting community is quickly embracing full architectural scale 3D printing. In this respect, 3D printing has the potential to globally re-define the way in which skyscrapers and Mega-cities are constructed. Additive manufacturing could revolutionize automated construction manufacturing and change many government contracts and other industries.

The general idea or concept of attempting to automate the construction of a reinforced concrete structures by use of automated or semi-automated construction systems such as extremely large programmable gantries is known and is the subject of numerous prior art patents.

Three-dimensional (3-D) printing (also known as additive manufacturing or rapid prototyping) allows for the production of three-dimensional objects by building up a material on a layer-by-layer basis. One common 3-D printer employs a printhead extruding material and movable in three Cartesian axes (x, y, z) with respect to a print surface. Under the control of a computer, the printhead (nozzle) moves through a series of positions over the printing surface and at each location deposits a small volume of material to define a portion of the printed object at that location. After a base layer is printed directly on the printing surface, the printhead is successively elevated (z-axis) to print additional layers on top of the base layer and then each succeeding layer until the entire object is printed.

WO 2011021080 A2 by Enrico Dini discloses a large 3-dimensional printer that uses, a layer by layer binder jetting printing system, to bind sand with seawater and magnesium-based binder to create stone-like objects.

The D-Shape 3-D printer currently sits in a 6 m by 6 m square aluminum frame consists of a base that moves upwards along four vertical beams during the printing process, is a printer head with 300 nozzles.

A 3-D model of the object to be printed is created on CAD. The printing process begins when a layer of sand from 5 to 10 mm thick, mixed with solid magnesium oxide (MgO), is evenly distributed by the printer head in the area enclosed by the frame. The head moves across the base and deposits a binding liquid includes magnesium hexahydrate, react to form a sandstone material. It takes about 24 hours for the material to completely harden. D-Shape multi-pass system takes four forward and backward strokes to finish printing a single layer. The final structure must be extruded from the sand. Manual labor use shovels to remove the excess sand to reveal the final product. D-Shape's structures have relatively high-tension resistance and require no iron reinforcement. The entire construction process is reported to take a quarter of the time and a third to a half of the cost it would take to build the same structure with traditional means using Portland Cement. The patent does not disclose nor teach employing an external moldable reinforcement sleeve. This patent does not disclose nor teach how to print full architectural scale reinforced standardized nor large bricks, nor using a slip-form printer employing a variety of different scalable, quickly interchangeable or custom dyes or molds to print a variety of customized interlocking brick shapes and configurations such as but not limited to having external reinforced interlocking layer-wise keyway(s). Furthermore, this patent does not disclose nor teach how to construct foundations nor roofs nor compatibly install major elements of construction process of a regular building, such as electrical services, piping and plumbing, conduits, doors, windows, joinery and finishes within the structure, nor the ability to make last minute on site construction changes.

Application CN 103,786,235 A by Liao Xuan Mao et al. discloses a tower-type 3D printer employing a tower crane, a material adding system, a control system, a maneuvering system, a material guide pipe, and a printing system. The disclosed invention relies on a catheter, laser, and temperature control head. The disclosed, invention is limited to making small parts that can be organized into large entities. The use of a concrete-based chemical solution is not disclosed. The patent does not disclose nor teach employing an external reinforcement sleeve. This patent does not disclose nor teach how to print full architectural scale reinforced standardized nor large bricks, nor using a slip-form brick printer system employing a variety of different scalable, quickly interchangeable or custom dies or molds to print a variety of customized interlocking brick shapes and configurations such as but not limited to having external reinforced interlocking layer-wise keyway(s). Furthermore this patent does not disclose nor teach how to construct roofs nor compatibly install major elements of construction process of a conventional building, such as electrical services, piping and plumbing, conduits, doors, windows, joinery and finishes within the structure, nor the ability to make last minute on site construction changes.

Application US 2014/0,252,668 by Austin et al. discloses an apparatus for performing a multi-layer construction method using cementitious material has a reservoir for containing cementitious material; the reservoir is coupled to a print head with a delivery nozzle; the delivery nozzle can be moved by a robotic arm assembly to index the nozzle along, a predetermined path; flow of the cementitious material from the reservoir to the nozzle and to extrude the material out of the nozzle is controlled in conjunction with indexing of the nozzle; a support material, an accelerating agent and a cartilage material deposited from the print head. The patent does not disclose nor teach employing an external reinforcement sleeve nor how to print full architectural scale reinforced standardized large bricks, nor using a slip-form printer employing a variety of different scalable, quickly interchangeable or custom dies or molds to print a variety of customized interlocking brick shapes and configurations such as but not limited to having external reinforced interlocking layer-wise keyway(s). Furthermore, this patent does not disclose nor teach how to construct roofs nor compatibly install major elements of construction process of a standard building, such as electrical services, piping and plumbing, conduits, doors, windows, joinery and finishes within the structure, nor the ability to make last minute on site construction changes, nor having additional operating and or transportable platforms.

Patent CN 204136193 by Zhang Yuan Ming, et al. discloses a print-based concrete plaster mold ceramic slurry of solid freeform fabrication machine. The printer system includes a printing apparatus line of the mold, filling, the slurry feed printing apparatus and multi-degree of freedom robot arm movement mechanism. Line printing means for printing the mold body and the mold support portion. Slurry feed filling apparatus comprises an ultrasonic slurry nozzle rapping, vacuum filter the slurry, the slurry bypass device, the slurry pressure pump and agitator. Printer without mold, low cost, production speed, can be used to customize various sculptures statues, ceramic structural pans, as well as art complex structures. The patent does not disclose nor teach employing an external reinforced sleeve. This patent does not disclose nor teach how to print full architectural scale reinforced bricks, nor using a slip-form printer employing a variety of different scalable, quickly interchangeable or custom dies or molds to print a variety of reinforced interlocking brick shapes and configurations such as but not limited to having external reinforced layer-wise interlocking keyway(s). Furthermore, this patent does not disclose nor teach how to construct roofs nor compatibly install major elements of construction process of a standard building, such as electrical services, piping and plumbing, conduits, doors, windows, joinery and finishes within the structure, nor the ability to make last minute on site construction changes.

Patent CN 204054670 by Wang Meihua et al. discloses a utility model providing a 3D printing device capable of realizing polar coordinate positioning for a building. A circular track beam is horizontally built on stilts by virtue of a plurality of supports, employing a printing head cross beam passes through the center of a circle of the circular track beam, both ends of the printing head cross beam are respectively in sliding connection with the circular track beam, the printing head cross beam rotates in a plane on which the circular track beam is positioned around the center of the circle of the circular track beam, a printing head rod is mutually perpendicular to the circular track beam, one end of the printing head rod is in sliding connection with the printing head cross beam, a priming head is arranged on the other end of the printing head rod which can extend to drive the priming head to move up and down, and the printing head can move linearly along the printing head cross beam along with the printing head rod. By using the 3D printing device, the printing head can be positioned in a form of a polar coordinate system, and compared with a 3D printing device based on a rectangular coordinate system for a building, the 3D printing device. The patent does not disclose nor teach using, the arm moves in one plane parallel to the ground using a cylindrical coordinate system. The patent does not disclose nor teach employing an external reinforcement sleeve. This patent does not disclose nor teach how to print full architectural scale reinforced standardized nor large bricks, nor using a slip-form printer employing a variety of different scalable, quickly interchangeable or custom dies or molds to print a variety of customized interlocking brick shapes and configurations such as but not limited to having external reinforced interlocking layer-wise keyway(s). Furthermore, this patent does not disclose nor teach how to construct roofs nor compatibly install major elements of construction process of a standard building, such as electrical services, piping and plumbing, conduits, doors, windows, joinery and finishes within the structure, nor disclose the ability to make last minute on site construction changes. The patent furthermore does not disclose printing in additional angles employing a 6 degree of freedom automated robotic arms.

As an example, U.S. Pat. No. 8,644,964 describes an excavator that includes an upper frame pivotally mounted to an undercarriage. The excavator also includes a large boom that extends from an upper frame adjacent to a cab. The boom is rotatable about a vertical arc by actuation of a pair of boom cylinders. A dipper stick or arm is rotatably mounted at one end of the boom and its position is controlled by a cylinder. The dipper stick or arm is mounted to an end effector in the form of a printhead that is pivotable relative to the arm by means of a cylinder. This method limits the height of any structure constructed, to the reach of the combined boom and dipper stick. Additionally, every time the print head is to be moved, the boom angle must be adjusted in conjunction with the dipper stick angle being adjusted, as well as the rotation of the machine being adjusted. The patent does not disclose nor teach employing an external reinforcement sleeve. This patent does not disclose nor teach how to print full architectural scale reinforced standardized nor large bricks, nor using a slip-form printer employing a variety of different scalable, quickly interchangeable or custom dies or molds to quickly print a variety of customized interlocking brick shapes and configurations such as but not limited to having external reinforced layer-wise interlocking keyway(s). Furthermore, this patent does not disclose nor teach how to construct roofs nor compatibly install major elements of construction process of a conventional building, such as electrical services, piping and plumbing, conduits, doors, windows, joinery and finishes within the structure, nor the ability to easily make last minute on site construction changes.

DE20 2004 006 662 U1 shows a three-dimensional moulded wire fabric comprising loops with different sizes knitted together by at least the two previous loops. Individual wires are mechanically fixed together on the crossing points or contact points on pre-determined sites.

WO 2003029573 A1 discloses a hollow formwork for a reinforcing concrete structure, such as a concrete floor. The formwork comprises a hollow tube having a circular, square, trapezoid, or other shape. A transversely stiffening rib is fixed to the inside of the hollow tube in a direction perpendicular to the axis thereof. A reinforcing bar, which is formed on the two sides of the transversely stiffening rib, may be extended beyond the hollow tube. The reinforcing bar is extended outside the tube to form a reinforcing bar.

EP 1321602 A1 discloses a formwork apparatus for forming a concrete structure. The formwork apparatus comprises at least one formwork shuttering-panel and a forming element, such as a boot movably mounted relative to the shuttering panel. A forming element is supported by an arm, which in turn is supported by a clamp that is removably attached to upper edge of the shuttering panel.

US 20160207220 A1 discloses a method of fabricating a 3-dimensional structure comprises providing a mesh formwork element such that a cavity bound by at least two opposing portions of the mesh formwork is formed followed by depositing a material in the mesh defined cavity; and allowing the material to harden; wherein spacing in the at least two opposing mesh defined portions of the mesh formwork element are adapted to the hydro-static pressure of the depositing material or vice versa such that at least two surfaces of the hardened material substantially take on the respective shapes defined by the two opposing portions of the mesh defined formwork elements. The method comprises providing a mesh formwork defining structure comprising a plurality of the mesh formwork elements and depositing the concrete material in the respective cavities of the mesh defining formwork elements and allowing the concrete material to harden. This patent does not disclose nor teach how to print reinforced standardized nor large bricks, nor does it disclose using a slip-form printer nor employing a wide variety of different interchangeable or custom dies or molds to print a variety of customized bricks shapes and configurations such as but not limited to having external reinforced interlocking layer-wise keyway(s). Furthermore, this patent does not disclose nor teach how to compatibly install major elements of the construction process of a regular building, such as electrical services, piping and plumbing, conduits, doors, windows, joinery and finishes within the structure, nor does it disclose the ability to make last minute on site construction changes.

WO 2015065936 A2 discloses a method of freeform, additive manufacturing equipment, processes and products, including residential, commercial and other buildings. A movable extruder places extrudate that solidifies in open space to create "scaffolding" or "skeletons" of buildings and other products. Elongated extrudate elements are fused to each other or connected by other means to form a cellular structure. Filler material such as polymeric insulating foam may simultaneously or thereafter be placed within the cellular structure to contribute desired strength, rigidity, insulative, barrier or other properties. Finish materials may also be applied. This patent does not disclose nor teach how to print full architectural scale reinforced standardized nor large bricks, nor using a slip-form printer employing a variety of different scalable, quickly interchangeable or custom dies or molds to print a variety of customized interlocking brick shapes and configurations such as but not limited to having external reinforced interlocking layer-wise keyway(s). Furthermore, this patent does not disclose nor teach how to construct roofs nor compatibly install major elements of construction process of a regular building, such as electrical services, piping and plumbing, conduits, doors, windows, joinery and finishes within the structure, nor the ability to make last minute on site construction changes.

WO 2015065936 A2 provides off site 3D printing and assembling the matrices for a building's walls. These off site printed 3D lattices would then be outfitted with conventional construction materials on the portion of the structure that act as an interior wall, insulating foam is sprayed, as commonly occurs in standard prior art construction practices, and typically coated with drywall. On the side of the exterior of the building, concrete is applied, before the external elements, such as brick, stucco, or any other traditional materials, are added. Furthermore, including constructing mass customized "pieces" that require transportation and assembly onsite into the structure and requires production in an off-site construction facility and transport, with further manual labor required for assembling of each individual wall panel then manually coating with concrete and insulation into the larger building's form.

US 20140252668 A1 discloses an apparatus for performing a multi-layer construction method using cementitious material has a reservoir for containing cementitious material. The reservoir is coupled to a print head with a delivery nozzle. The delivery nozzle can be moved by a robotic arm assembly to index the nozzle along a predetermined path. Flow of the cementitious material from the reservoir to the nozzle and to extrude the material out of the nozzle is controlled in conjunction with indexing of the nozzle. A support material, an accelerating agent and a cartilage material may also be deposited from the print head. This patent does not disclose nor teach how to print reinforced standardized nor large bricks, nor does it disclose using a slip-form printer nor employing a variety of the same or a wide variety of different interchangeable or custom dies or molds to create a variety of customized brick shapes and configurations such as but not limited to having external reinforced layer-wise interlocking keyway(s). Furthermore, this patent does not disclose nor teach how to compatibly install major elements of the construction process of a regular building, such as electrical services, piping and plumbing, conduits, doors, windows, joinery and finishes within the structure, nor does it disclose the ability to make last minute on site construction changes.

The present invention seeks to provide improved systems for constructing onsite and off-site a full architectural scale 3-dimensional printed structures, including a previously unavailable shape defining mesh formwork element for constructing a 3-dimensional structure.

Additional the prior art patent documents show various aspects of known automated or robotic pre-fabricated brick positioning and laying systems. Some documents concentrate on the specific structure of a nozzle extrusion mechanisms. Other documents relate to extruding structures on constructing a layer wise wall deposition basis offsite in a factory environment requiring to be transported to a location where a structure is to be manually assembled.

The concept of 3D house printing technology development has a history of about 20 years; such as Behrokh Khoshnevis's contour crafting system.

Contour Crafting

Application EP 2610,417 by Khoshnevis discloses an apparatus for automated construction employing an extrusion nozzle and a robotic arm. The apparatus has a nozzle assembly configured to extrude material through an outlet; and a controllable robotic arm coupled to the nozzle assembly, the robotic arm having at one end a gripper configured to pick up an element and deposit the element at a desired position relative to the extruded material.

As an example, Behrokh Khoshnevis' 2007 contour crafting system (U.S. Pat. No. 7,641,461, USC Center for Rapid Automated Fabrication Technologies (CRAFT), reference FIG. 6) is one example of the prior art robotic 3-D House Printing concrete construction approach that employs an overhead construction operation from a very large robotic gantry system. The current invention's methods and apparatuses is separate and distinct from the prior art's Khoshnevis U.S. Pat. No. 7,641,461 that employs a large, heavy overhead rectilinear gantry system having guide rails, and is thus unable to compensate for existing onsite obstacles.

While the prototype 3D house printer claims the ability to build an entire house, layer by layer, in a single day, it is important to note this representation does not include the time it takes to transport and assemble nor disassemble the large multi-ton robotic gantry system (reference FIG. 6). This gantry, which must be assembled onsite with the aid of a crane, and having two crane-like arms and a large crossbeam which carries the large and bulky cement printing head having a generally round extrusion nozzle, with the entire printing machine sliding along a set of large tracks, and is estimated to take about a week to assemble onsite, and significant time and complexity (requires a crane) to disassemble, thus having an extremely high initial purchase cost and having a highly inefficient economy of scale. Once assembled, onsite estimates indicate the system can produce one square foot of wall in about 20 seconds, translating to constructing about 2,500 square feet within 18 or 19 hours, requiring a workforce of about 4 people.

Due to Khoshnevis large size gantry's, expensive cost, difficulty of transport, time consuming assembly and disassembly on the construction site, note the spans and scaling of the gantry system that is larger than the structure to be constructed and further requires the use of aluminum, steel, composites materials, etc. that is sufficient to prevent the flexing of its structural members, and thus results in added weight of the guiding members.

Furthermore, maintaining the rigidity of the long external gantry bridge is crucial especially during acceleration and decelerations in the X-axis direction (such as at the beginning and ending of printing walls) and this method currently produces a rough non-esthetic desirable finish and is not easily adjusted on the construction site.

Additionally, the extensive site-preparation, such as requiring the site to be almost completely level, and the transport and setup of the large, heavy equipment required by the Khoshnevis system would make constructing in remote areas difficult or even impossible.

Also, material delivery to such large gantry systems, which move in a large volume in the three-dimensional space, have proven to be difficult to implement. Furthermore, delivery of cementitious materials to the round dispensing nozzle, given the localized motions of the nozzle (rotation and deflections), can also present significant challenges such as but not limited to cable slippage, additionally requiring a very narrow and specific concrete mix and very narrow casting (printing) temperature and humidity range to overcome highly undesirable cold joint interfaces, and does not allow for generic nor high other performance nor specialty cementitious mixes.

Onsite, this also makes the Contour Crafting system unsuitable for constructing temporary or emergency structures. As a comparison, one of the current invention reinforced concrete construction system weighs about 300 pounds and takes about 30 minutes to assemble onsite instead of several days as in the Khoshnevis large and multi-ton gantry system.

It is an object of the current invention is to eliminate the onsite construction limitations of the prior art including significantly reducing the overall dimensions, including weight, of the construction components.

Additionally, the prior art gantry system from Khoshnevis provides only three directions of motion for the cement mix casting materials transport and having a generally round delivery nozzle. However, for the cement mix delivery nozzle to print various geometrical features (such as small radiuses such as corners, stairs, curves, etc.) is highly problematic or even impossible.

There is a need within the art for additional directions of motion and 'printing'. Contour crafting, and many other prior art systems, is limited to straight compression (straight vertical) wall(s) layerwise construction, and does not disclose nor teach employing an external reinforced slipform molded printed brick having an interlocking keyway.

Additionally, Khoshnevis' system is currently only capable of cold joint casting without slippage (drool) even in a factory environment.

Furthermore, Khoshnevis' Contour Crafting is prone to excess motions, limited deployment and is prone to torquing, particularly in windy conditions, also requiring long cement feeding hoses and only prints from overhead or from the outside in (extremely inefficient), and can only print (construct) on flat lots or sites (locations) that do not have trees, power lines, or any other commonly encountered onsite obstacles. In addition to these and other significant limitations, the Khoshnevis construction system does not disclose or teach construction of foundations nor roofs, and can only construct limited geometries (generic structures) having simple flat walls and cannot print complex shaped structures. A further limitation is that Khoshnevis system does not allow for a variety of standard nor progressive reinforcements, and their disclosed concrete mix does not disclose employing structurally reinforced concrete, nor conventional reinforcement bars, rods, or cables, or micro-reinforcements, particularly when a printing with generally round nozzle having small radii and/or complex curves.

Furthermore, this prior art apparatus (Reference FIG. 6) does not sufficiently compensate for the inconsistencies encountered from the differences in cementitious mixes and actual pumping rates, and is unable to easily compensate for any last minute onsite printing changes during the construction process, particularly when construction in windy or in inclement weather, and is further limited to a narrow range of wall shapes, thicknesses and heights, and is further limited to 'printing' rough wall surfaces with rough joints, and is generally impractical for remodeling or retrofitting pre-existing structures. Contour Crafting does not disclose nor teach employing a flexible, moldable external nor internal reinforcing containment sleeve having pre-engineered curing controlling methods nor apparatuses on one or more sides.

This prior art technology may only be cost effective on a mass commercial basis, such as very level (flat) open desert terrain, or may only be practical when repeatedly constructing virtually the same design as this printing system requires accurate onsite grading, and does not teach nor disclose automatically compensating for any onsite ground irregularities, such as when constructing a foundation, and can only print straight compression structures, (vertical flat walls) and requires specialized cementitious mixes.

In contrast to the current invention, prior art external overhead gantry technologies, such as Contour Crafting, D-Shape, Specavia, IAAC, Winsun, BetAbram, Wasp, Qingdao, do not disclose nor teach printing with an external structurally reinforced moldable containment sleeve, having interlocking keyways, having different scales of "brick" dies or molds, specifically interlocking "brick" nor having interchangeable print molds and or an external reinforced containment sleeves having pre-engineered apertures for regulating the specific mixes printed material mixes curing characteristics, as need in the art.

As Khoshnevis is unaware of or ignores the necessary and required control of the cementitious curing environment particularly to eliminate cold joints and is limited to a narrow and specific range of printing environments, such as onsite temperature, humidity, the mixes viscosity/slump, and is prone to clogging. (Reference FIG. 6)

Khoshnevis does not disclose nor teach a method or an apparatus that encompasses nor employs interchangeable slip-forming molds (printing) with the current invention's external nor an optional internal reinforcing mesh that overcomes a wide variety of speed and structural limitations such as commonly encountered inconsistencies in the concrete slump and pumping cycles. Nor does any of the prior art disclose nor teach printing internal reinforcement cables nor internal reinforcing nets.

As Khoshnevis does not employ an external containment sleeve, the patent is not able to sufficiently compensate for cementitious mixes slump inconsistencies such as the extruded bricks edge collapsing, ripples, and other distortions, even in a factory having controlled environmental conditions, thus printing a highly undesirable rough aesthetic appearance.

Several flow measurement techniques have been proposed or implemented to address this aforementioned printing limitations. However, for certain cementitious printing mixes and or cementitious pastes and other printing materials, these prior art 3D printing systems are unworkable on actual onsite construction conditions, as they are too slow in providing accurate automated printing and placement further do not provide a tunable dynamic response, which to remediate would add significantly to the prior art machine's complexity and cost.

Khoshnevis additionally teaches use of complex post-actuated and computer controlled trowels, however this system has significant limitations in their surface finishes and lack of molding and shaping means, and furthermore requires post-processing steps.

The current invention eliminates the prior arts step of contouring or shaping the bricks after the extrusion step in that it simultaneously molds and shapes the scalable layer-wise interlocking printed bricks with or without an external or internal leave in place cast in place reinforcement.

The current invention overcomes these and many other prior art limitations particularly from gantry and other large 3D Printing systems, such as those employing a industrial robot style arm, with the current inventions method(s) and apparatuses of employing external moldable reinforcing containment "sleeves" that solves many of these prior art limitations such as automatically compensating for the cement mix and commonly encountered pumping inconsistencies, that commonly occur in onsite concrete 'printing' process such as varying mixes slump ranges, and automatically compensates for different pumping system characteristics, further automatically compensating for a variety of mix additives, aggregates, etc. The external containment sleeves, having pre-engineered apertures, also provides previously unavailable uniform heat dissipation having pre-engineered evaporation control characteristics, and thus optimizes a wide variety of printable cement mixes' curing environments, and other performance characteristics as needed in the art, particularly for optimizing the onsite moldable slip-form printing mixes curing characteristics for high performance and ultra-high performance mixes, and other specialty cement mixes as needed in the art.

The current invention also prints/extrudes (places) onsite smaller and larger reinforced bricks than other 3D Printing systems, including a significantly wider range of brick sizes and configurations. Furthermore, the prior art construction technology falls far behind current Computer Design Technology that allows architects to conceive and design highly complex such as biomorphic structures. Unfortunately, currently existing concrete full scale 3D printing systems, including the prior art 3D printing systems disclosed herein, do not allow the full potential of these new designs to be achieved.

U.S. Pat. No. 8,518,308 B2 by Khoshnevis discloses an apparatus may include a nozzle assembly configured to extrude mix material through an outlet; and a controllable robotic arm coupled to the nozzle assembly, the robotic arm having at one end a gripper configured to pick up an element and deposit the element at a desired position relative to the extruded material. The element may be one of: a reinforcement member for a structure being constructed; a segment of a plumbing pipe; an electric network component; and a tile. The patent does not disclose nor teach employing a molded external reinforcement sleeve. This patent does not disclose nor teach how to print full architectural scale reinforced standardized nor large bricks, nor using a slip-form printer employing a variety of different scalable, quickly interchangeable or custom dies or molds to print a variety of customized interlocking brick shapes and configurations such as but not limited to having external reinforced interlocking layer-wise keyway(s). Furthermore this patent does not disclose nor teach how to construct foundations, roofs, door frames, window frames, joinery, and other finishes within the structure, nor the ability to make last minute on site construction changes.

Wasp House Printer

Another known gantry style 3D House Printer system is made by WASP. Big Delta WASP 3D Printer is about 20 feet high, and shares many limitations with the aforementioned Khoshnevis and other 3D printer system. Doesn't disclose nor teach employing an external reinforcement sleeve. This patent does not disclose nor teach how to print full architectural scale reinforced standardized nor large bricks, nor using a slip-form printer employing a variety of different scalable, quickly interchangeable or custom dies or molds to print a wide variety of customized interlocking printed brick shapes and having configurations such as but not limited to external reinforced layer-wise interlocking keyway(s). Furthermore this patent does not disclose nor teach how to construct roofs nor compatibly install major elements of construction process of a standard building, such as electrical services, piping and plumbing, conduits, doors, windows, joinery and finishes within the structure, nor the ability to make last minute on site construction changes. This patent further does not disclose nor teach employing a wide variety of industrial robot arms, and or a variety of transportable and or operating platforms.

WO 2010078710 A1 by Hong Wang discloses a printer. It includes a base (1), on which are provided guide rails (2) and a supporting plate (3) which moves along the guide rails lengthwise relative to the base. A printing unit (4) is provided over the supporting plate. The base is also provided with a detachable converter frame (6), on which are provided at least two pairs of rolling wheels (7) or at least one pair of rollers parallel with each other, the rolling wheels or rollers being rotated by the rolling friction force caused by their contact with the surface of the supporting plate during the longitudinal movement of the supporting plate. When the converter frame is not mounted, a planar object can be placed on the supporting plate to be printed. When the converter frame is mounted, a cylindrical object can be placed on the rolling wheels or rollers. Depending on the friction force caused by the contact between the rolling wheels or rollers and the moving supporting plate, the cylindrical object is further actuated to rotate, thus images and characters can be printed line by line on its surface. Compared to the prior art, the operation stability of the components on which is placed the planar or cylindrical object can be improved, and the printing quality can be better controlled.

The Qingdao Unique Products Develop Co. printer is represented as "mobile", however it requires the use of a crane to move and install the system on the construction site. While claiming one of the largest 3d printers in the world, Qingdao has an X and Y axis of 12 meters (almost 40 feet) each, and weighs about 120 tons and requires cranes for assembly and other costly machines, and does not disclose nor teach how to print foundations nor roofs. This technology shares many of the limitations of the Khoshnevis prior art discussed herein, and furthermore does not disclose nor teach employing an external reinforcement sleeve. This patent does not disclose nor teach how to print full architectural scale reinforced standardized nor large bricks, nor using a slip-form printer employing a variety of different scalable, quickly interchangeable or custom dies or molds to print a wide variety of customized interlocking printed brick shapes and configurations such as but not limited to having external reinforced interlocking layer-wise keyway(s). Furthermore, this patent does not disclose nor teach how to construct roofs nor compatibly install major elements of construction process of a standard building, such as electrical services, piping and plumbing, conduits, doors frames, window frames, joinery and finishes within the structure, nor the ability to make last minute on site construction changes. This patent further does not disclose nor teach employing a wide variety of industrial robot arms, and or employing a variety of transportable and or operating platforms.

WinSun

CN 201611085705, CN204081129U, CN203654462U by Ma Yihe has developed a number of 3D printing patents, including 3D construction printing and wall formation.

WinSun of WinSun Decoration Design Engineering Co., Shanghai, China estimates that their 3D printing technology can someday reduce building materials between 30 and 60 percent and shorten production times by 50 to even 70 percent, while simultaneously decreasing labor costs by 50 up to even 80 percent, including applications such as 3D printed bridges and tall office buildings built on site. WinSun represents that they can construct ten homes in a single day, almost entirely 3D-printed with recycled concrete material. WinSun represents it has built several houses using large 3D printers casting a mixture of quick drying cement and recycled raw materials. Ten demo houses were built in 24 hours, each supposedly costing about US$5000. However, many sources have shared that no technology has been disclosed and that the structures were pre-fabricated off-site in a factory in environment in Suzhu China, and then transported and assembled in Shanghai in one day.

While WinSun requires transport and onsite assembly, it also suffers the same limitations of having a very large, heavy gantry 3D house printer. As 3D House printing grows in popularity there has been a steady stream of other gantry style 3D House printers such as D Shape in US, and Specavia in Russia, having a variety of similar limitations. Such as having heavy, large, bulky heavy components, being expensive to purchase, transport, and install while having narrow and specific range of usable cementitious mixes, and requiring more precise construction site preparation and inability to deal with common construction site restrictions such as sloped lots, power lines, trees, boulders, and other commonly encountered onsite obstacles. Therefore, what is needed in the full architectural scale 3D printing construction industry is smaller automated mechanized and/or robotic construction systems that are lighter weight, collapsible, and easily assembled while at the same time offering pronounced rigidity or stiffness for accurate reinforced cementitious construction printing onsite and having improved material delivery systems that provide faster, more accurate, on site construction, and resolve the current full scale 3D printing limitation.

The patents do not disclose nor teach employing an external reinforcement sleeve. This patent does not disclose nor teach how to print full architectural scale reinforced standardized nor large bricks, nor using a slip-form printer employing a variety of different scalable, quickly interchangeable or custom dies or molds to print a variety of customized interlocking brick shapes and configurations such as but not limited to having external reinforced interlocking layer-wise keyway(s). Furthermore, the patents do not disclose nor teach how to construct roofs nor compatibly install major elements of construction process of a standard building, such as electrical services, piping and plumbing, conduits, doors frames, windows frames, joinery and other finishes within the structure, nor the ability to make last minute on site construction changes. This patent further does not disclose nor teach employing a wide variety of industrial robot arms, and or a variety of transportable and or operating platforms.

Apis Cor

US 20160361834 A1 by Nikita Chen-Iun-Tai of Apis Cor (email: apiscor3d@gmail.com tel: +1 (650) 741-1277; Skype: fizpaket) discloses an invention in the field of automated 3D printing of buildings or structures and method of its operation. Employing a 3D printer having an extendable boom arm with an extruder for extruding a proprietary concrete-based mix that moves with translational and rotational motion in an XOY plane. The extendable boom arm is mounted such that it is capable of height adjustment in a XOZ plane. The invention also regards a method for automated 3D printing of a building or structure using the 3D printer, and has overcome one of the prior art 3D printing limitations of large, external gantry system 3D House Printers, by developing one of the first semi-mobile 3D printers, reference FIG. 7, which has presented as having the ability to print a whole house (347 square feet) in 24 hours of print time. The key difference in Apis Cor is they print houses having very small dimensions, and are printing from the inside out.

Apis Cor states to save up to 70% of standard frame construction costs in comparison with traditional methods. Their 3D printing system currently represented as using standard construction machinery for construction, assembles on most surfaces (requires a crane), and is represented as being able to be assembled and print in less than half an hour. This system produces little or no construction waste.

In comparison with other prior art 3D printers, the US 20160361834 A1 by Nikita Chen-Iun-Tai system is centralized inside the room or structure being printed, and the printing process is carried out from the inside, reference FIG. 7. Apis Cor's system mobility gives it an advantage over WinSun system, and other large gantry systems that may cost as much to assemble onsite as construction of the structure itself. Currently, all disclosed prior art 3D house printers are very large, expensive, and hard to use.

Some limitations are that the Apis Cor printer systems requires proprietary software, and is limited to a narrow and proprietary concrete and fiber mix compound, and has a small, slow, small volume printed layer of about 1×1 inch from a generally round nozzle, producing a cold joint bond having a rough unsightly finish requiring additional manual labor, such as troweling. Furthermore, Chen-Iun-Tai is limited to continuous printing and does not disclose nor teach intermittent printing.

Additionally, Apis Cor has a relatively small printing zone of about 132 square meters, further limiting sizes of constructing (printing) structures; between about 12 ft. by 12 ft, and is unable to print small radiuses, nor are they able to print foundations, roofs, floors, and small rooms onsite. Apis Cor furthermore requires the use of an expensive onsite crane to move its supporting operating platform within the printed structure or house (each room), and also to remove following printing, and is heavy (about 2.4 tons), making it unsuitable for small scale worksites.

US 20160361834 A1 by Nikita Chen-Iun-Tai is also limited to straight compression printing (vertical walls), and does not disclose nor teach printing a foundation nor roofs, and are further unable to 3D print small separate closets, shelves, benches, storage areas, or hampers, etc.

Note the current invention has a lower weight of about 350 to 750 pounds versus 2.4 tons, and does not require the use of expensive cumbersome cranes, nor does the current invention require precise site preparation, i.e. very level, and is not limited by common onsite obstacles such as trees, boulders, power lines, etc. as compared to the current invention that can be scaled as needed and simply and easily assembled, onsite and disassembled and moved. Apis Cor also requires significant additional construction steps, including a separate process to construct a foundation and requiring significant manual labor onsite prior to printing the structure.

US 20160361834 A1 by Nikita Chen-Iun-Tai additionally does not disclose nor teach employing an external molded fabric reinforcing containment sleeve, having interlocking keyway characteristics, and or an external reinforced fabric sleeve having pre-engineered apertures to accurately regulate the cementitious mix's required curing environment characteristics including providing previously unavailable uniformity of the printed mix heat dissipation and pre-engineered mix evaporation control characteristics, improving the performance characteristic s a wide variety of cementitious mixes, as needed in the art, particularly for optimizing the onsite slip-form printing mixes' casting environment to obtain a high percentage of the specific mixes performance characteristics potential. The Chen-Iun-Tai patent is further limited to one operating platform, and multi-pass construction with cold joint interface challenges and wall shapes and size limitations. The current invention encompasses 5 different operating platforms and overcomes the limitation of cold joint interface while being able to construct (print) using single pass and or multipass slipform printing as needed.

US 20160361834 A1 by Nikita Chen-Iun-Tai does not employ an external fabric reinforcing nor containment sleeves, and is limited to a very narrow and proprietary concrete mix and limited printing range in terms of concrete mixes and having a narrow printing temperature and humidity range, and furthermore their disclosed concrete mix does not disclose employing structural concrete, reinforcement bars, rods, cables, nor micro-reinforcement.

It would be appreciated from comparisons to the above description that in embodiments of the present invention, the construction system provides automated and accurate positioning and laying of interlocking slipformed printed bricks by measuring and taking account of deflection in the robotic arm(s)/operating supporting structures due to gravity, wind, pulsation, extrusion rate providing a previously unavailable tunable dynamic response (i.e. the motions of the entire automated robotic construction system minimizing human intervention).

Furthermore, the current invention provides slip form casting/printing from the inside of the arc or structure; and furthermore as a variation of the invention encompasses slipform casting/printing from the outside of the structure or simultaneously constructing in tandem from an inside curve and interlocking on to outside curve.

It is an object of the current invention to reduce these and other limitations of prior art for reinforced concrete construction, particularly 3D full architectural scale House printing, including the overall dimensions including weight, height, width, and footprint of the automated construction machine.

US 20170021527 A1 by Tazio S. Grivetti, Christopher M. Sketch, Peter Lauterslager, and Edward van Amelsfoort Caterpillar discloses machines and system for 3D printing. One machine includes a machine frame having a plurality of ground engaging elements to facilitate movement of the machine frame, a telescoping boom pivotably coupled to the machine's frame and configured to pivot along at least a horizontal plane, a material line coupled to the boom and configured to convey a material therethrough, a printhead coupled to the boom and in fluid communication with the material line to receive the material and to dispense the material, and a controller configured to receive 3D printing information and to convert the 3D printing information into positional coordinates of the printhead, wherein the controller is to cause movement of the boom to position the printhead based at least on the position coordinates.

It would be appreciated from comparisons to the above description that in embodiments of the present invention, the construction system provides automated and accurate positioning and laying of interlocking slipformed printed bricks by measuring and taking account of deflection in the robotic arm(s)/operating supporting structures due to gravity, wind, pulsation, extrusion rate providing a previously unavailable tunable dynamic response (i.e. the motions of the entire automated robotic construction system minimizing human intervention).

US 20170021527 A1 further does not disclose nor teach how to print full architectural scale reinforced standardized nor large bricks, nor using a slip-form printer employing a variety of different scalable, quickly interchangeable or custom dies or molds to print a variety of customized interlocking brick shapes and configurations such as but not limited to having external reinforced interlocking layer-wise keyway(s). Furthermore, this patent does not disclose nor teach how to construct roofs nor compatibly install major elements of construction process of a standard building, such as electrical services, piping and plumbing, conduits, doors, windows, joinery and finishes within the structure, nor the ability to make last minute on site construction changes. This patent further does not disclose nor teach employing a wide variety of industrial robot arms, and or a variety of transportable and or operating platforms.

Current 3D House Printing Limitations

Even some of the more promising directions and technologies among the prior art full architectural scale automated 3D House printing construction systems still have a wide variety of significant limitations.

Currently, almost all 3D printers have massive beams and rods moving a massive overhead top-down print head to and fro in full scale building volumes, and there is a significant cost to all that massive hardware (many tons). The current invention full scale three-dimensional reinforced concrete printer eliminates these and many other prior art limitations, not stated herein and can quickly move about and accurately mold and extrude and place a wide variety of reinforced interlocking concrete "long brick" from a wide range of mix materials onsite in real time at high speeds, having a wide variety of scalable molded "brick" shapes and sizes.

The current invention overcomes the prior art full architectural scale limitations such as but not limited to printing brick(s) (sizes) that are non-interlocking. This allows for reinforcing shaping dies or molding of the bricks that allow for previously unavailable interlocking layer wise printing that is scaled as needed, and further eliminates the prior arts steps of contouring or shaping the bricks after they are 'printed', such as that of Khoshnevis computer controlled trowels.

The current invention may optionally employ multiple robotic construction systems cooperating and operating in tandem to simultaneously construct multiple interlocking rooms and or interlocking walls within the same structure onsite in real time, such as for constructing large multi-room complex structures Currently none of these prior art 3D House Printing systems disclose nor teach how to compatibly install major elements of the construction process of a regular building, such as electrical services, piping and plumbing, conduits, door frames, window frames, jointery and other finishes within the structure (excepting Kamermaker and Contour Crafting), nor do they employ any attachment tool(s) such as spray nozzles, sand blasters, grinders, drills, laser and acoustic leveling, etc.

In summary, virtually all referenced full architectural scale 3D house printing systems are currently very large, expensive, and difficult to operate, offer little or no construction scaling, versatility, particularly in the onsite construction of individual homes, and are unsuitable for small scale worksites such as when constructing hallways, pantries, shelves, closets, bathrooms, etc.

Most of the prior art 3D printing technologies are currently limited to a single scale of building system, and furthermore most are currently limited to pre-fab construction in a factory environment. One example of pre-fab construction in the prior art is DFAB mesh-mould, or Branch Technology that 3D construct a formwork and then post in fill w/fiber reinforced concrete and or foam composites.

This prior art limitation of the 3D construction systems not being scalable is a significant limitation in the implementation of 3D construction printing within the global construction industry.

Additionally, these systems do not disclose nor teach how to construct freeform structures onsite nor slip-form casting (printing) of temporary components such as constructing temporary supporting arches and (3D-printing) temporary wall sections onsite. Furthermore, none of these prior art 3D printing systems can construct in inclement weather such as rain driven snow or high winds nor do they disclose or teach 3D printing roofs.

Other significant limitations of the prior art 3D printing is that almost all require a narrow and specific concrete mix and only extrudes through a slow, low-volume, multi-pass generally round nozzle that extrudes materials producing an undesirable cold bond interface, and furthermore generally extrudes materials with a rough and uneven surface. The common prior art practice of extruding from an overhead extrusion coming out of a generally circular nozzle additionally may create voids in the mix, commonly referred to as honey comb or bug holes, particularly when depositing in a layer-wise manner, thus significantly reducing the bonding and potential structural integrity of the printing, and is further unable to produce a smooth, or other aesthetically desirable finishes. In addition, none of the prior art full architectural scale 3D printing systems disclose nor teach onsite nor offsite printing with specialty mixes such as High Performance, or Ultra-High Performance reinforced concrete mixes, further including memory return concrete mixes, smog absorbing (capturing) concrete mixes, humidity regulating concrete mixes, memory return concrete and EMF and EMP shielding concrete mixes etc.

None of the prior art 3D Printers disclose nor teach printing reinforced standardized nor large bricks, nor using a die or molding slip-former employing a wide variety of different interchangeable or custom scalable dies or molds as needed in the art to print a wide variety of customized brick shapes and sizes such as having the same or different configurations such as but not limited to having external reinforced layer-wise interlocking keyway(s).

Virtually none of the prior art printing systems are able to 3D print contour angles nor printing from a vertical approach and are generally limited to horizontal multi-pass printing of walls that are thus limited to straight compression (vertical walls).

Overhead gantry, and other 3D House Printing applications, are limited to one, generally horizontal, direction of printing. Thus, these prior art 3D printing apparatuses do not have the sufficient diversity nor scalability to serve as a full scale onsite architectural construction tool.

Virtually none of the prior art concrete construction printing systems that disclose or teach the onsite printing of monolithic or near monolithic structures (one piece), nor do any of the above disclose nor teach the 3D printing of roofs, nor do any of the above disclose nor teach the construction of reinforced foundations, footings onsite.

Currently there are no prior art full architectural scale 3D printing systems that disclose or teach slip-forming construction from a backhoe, a truck, a transportable and operating trailer, nor employing a temporary auger support, nor a permanent cast in place leave in place operating pedestal, nor a light weight transportable operating pedestal(s), nor a light weight reusable operating pedestals, nor any other operating pedestal (except for limited heavy bulky types such as Apis Cor), and virtually no prior art 3D House printing system teaches or discloses employing onsite guide rails that are light weight and transportable.

Note the current invention has overcome these supporting and operating platform limitations and discloses and teaches having 5 different supporting and operating platforms for a variety of full architectural scale printing in real time.

Prior art construction systems are unable to slip-form concrete mixes on a grade (up to about a 22-degree grade, up or down), such as when printing foundations or walls. Note currently most prior art 3D House Printing systems are only able to print wall sections in a factory environment requiring a controlled temperature and humidity environment.

One significant overlooked prior art limitation is that virtually none of the 3D full architectural scale house (structure) printing systems have the ability to make last minute construction changes on site. Some 3D printing systems, such as but not limited to WinSun, manufacture and construct wall sections in an offsite factory environment, and then transport and assemble the components onsite.

In summary, the prior art 3D printing technologies are significantly limited in their construction flexibility and, furthermore, most are not compatible with other conventional construction systems.

The current invention has overcome these and other significant limitations in the prior art field of automated full-scale onsite 3D House (Structure) Printing, in that the current invention teaches and discloses brick dies or molding and quickly printing long externally reinforced interlocking scalable bricks that allow for a previously unavailable wide variety of printing brick sizes and shapes, and mix compositions, further encompassing for single pass and or multi-pass additive layer-wise printing having keyway interlocking interfaces between successive printed brick layers and further providing for a wide variety of surface and finishes characteristics over the prior art construction system. The current invention's full architectural scale 3D printing technology can construct more sustainable including multi-story structures that meet or exceed current building codes. The current invention, may be implemented for retrofitting and refurbishing a wide variety of structures, and is compatible with a wide variety of conventional constructions, further including the previously unavailable advantages of having a tunable dynamic response between the supporting and operating pedestals, mechanized arm(s) slip-former, and or the slipformer support guiding system. Additionally, the current invention eliminates the prior art's step for the preparation of printing cold joint bonding surfaces such as scratching, abrasion, chipping, and sand blasting, etc.

The prior art 3D printing technologies are also generally limited to continuous printing and do not teach nor disclose intermittent printing, and furthermore the inventor was unable to find any prior art 3D printing system that was able to print a structure without human intervention.

Sleeve Advantages

The current invention provides a previously unavailable system of controllably regulating the preferred mix curing degree or rate by employing external reinforcing containment sleeves providing pre-engineered apertures to solve these significant limitations of the prior art construction technologies.

The current invention invention provides previously unavailable improvements including production preparations, delivery, placement, finishing, by regulating the bleed-water evaporation rate; thus optimizing each specific mixes' accurate pre-engineered curing characteristics; further producing external protection of the printed bricks onsite; having reinforcing external containment sleeves that improves the performance characteristics related to designing workable and printable concrete mixes.

The current invention improves quality assurance for concrete mix designs, improving quality control and improved performance specifications over the prior art systems, while improving placement accuracy of a wide variety embedded items.

This new technology innovatively incorporates external reinforcement containment "sleeves" ensuring that the mixes' test specimens are properly cured, simplifying and verifying the printing quality, simultaneously improving the accuracy of the inspection process. Note low concrete test strength results in hot weather are often caused by poor evaporation protection and improper initial curing environment of test specimens.

The current invention innovations better adapts its construction methods and apparatuses to the realities of actual onsite in-field full architectural scale 3D construction printing.

The prior art full-scale architectural 3D printing systems usually employ a simple extrusion or injection of a pass-through material without employing a specific interchangeable die or mold as needed or desired. The current invention encompasses an external containment sleeve and a wide variety of interchangeable 'brick' molds and dies to optimize the strength of both the individual interlocking layer wise deposition and the complete structural strengths simultaneously, such as mimicking interlocking box beams.

The inventive external sleeve reinforcement mesh eliminates the conventional or prior art step of employing a single sided mesh between the printed brick layers. As an example, employing the inventive external sleeve eliminates the prior art challenges of cold joint interface steps including bond preparation, such as sand blasting, adhesives, etc.

Furthermore, the innovative containment sleeves overcome the prior art limitations such as but not limited to multi-pass horizontal extrusion by allowing horizontal, vertical, and any derivative or angle therein, automated full architectural scale 3D slipform printing construction.

The external containment sleeve of the current invention further resolves many of the prior art limitations, and further reduces frictional wearing of the slip-form "feeding mechanisms", providing a smoother sleeve feeding system that reduces or eliminates potential binding and tearing of the containment sleeve during the slip-forming molding process, particularly when slip-form casting/printing small accurate curves (radiuses). The external containment sleeve of the current invention additionally provides previously unavailable rapid rigidity of the printed layer to withstand load of subsequent layers, providing a previously unavailable accurate shape and stability after being positioned and deposited.

This slipforming molding system improves flowability, extrudability, buildability, and flow-through of cementitious materials having improved structural performance of layer wise deposition.

Note, printing cementitious mixes, particularly onsite during hot and humid weather, often causes plastic-shrinkage, surface and interior cracking, accelerated curing (setting), increased slump loss (shrinkage), and decreased mechanical properties, and reduces the structural strength characteristics of the cured mix. The external containment sleeve of the current invention overcomes these limitations and may be designed and manufactured to suit a wide variety of slip-form printing uses, including encompassing sleeves having regulating apertures to optimize and accurately regulate the mixes' water, air or gas (voids) and improve air and gas entrainments characteristics, having micro-bubbles (ranging from about 2 to 8 billion bubbles per cubic meter). The external containment sleeve may optionally incorporate having color changing dyes embedded in that containment sleeves, thus indicating the cementitious mix critical curing, state and casting temperature onsite in real time as for example the external containment sleeve providing color changing characteristics to indicate the mixes temperature in real time, as for example changing the color from a red (hot) temperature color ranging to a green color indicating a cooler temperature (cured) of the mixes in real time depending upon the specific mix, for regulating (controlling) the critical evaporation rate and improving the mix's curing uniformity (having more uniform heat dissipation), over the prior art systems by significantly improving the mix's casting environment over the prior art systems, thus improving the mixes performance specifications, particularly for onsite cold and hot weather reinforced concrete construction environments, as needed in the art.

Note that the current invention's external moldable containment sleeves may be tailored (customized) with a wide variety of fabrics and weaves (such as, but not limited to, plain, twill, basket, satin, leno, mock leno, etc.) for complex cementitious 3D printing (casting) thus reliably obtaining a higher percentage of the concrete mix performance potentials over the prior art systems: including improving the mixes' potential strength, protection, proportions, production, accuracy, and higher speed of delivery on the construction site, particularly when printing ultra-high performance and specialty concrete mixes.

The prior art does not disclose nor teach employing slip-formed printing external molded containment sleeves that resolve the challenge of the cement 'ink' rapidly setting with high adhesive resistance, and further optimizes the mix phase change control, further optimizing and providing pre-engineered water vapor diffusion resistance.

Furthermore, the prior art does not disclose nor teach employing slip-form printing external molded containment sleeves that reduce or eliminate long-term leaching (such as slip-form printing mixes containing fly ash), and shortens the curing rate and thus the time between the printing of each interlocking printed brick layers, thus optimizing the onsite construction speeds. Additionally, the molded brick external reinforcing containment sleeves improves the accuracy of placement of reinforcement bars, cables, and includes the placement accuracy of plumbing piping, conduits, electrical, fiber optics, etc. over the prior art full scale 3D House printing technologies.

The prior art 3D House Printing systems are currently unaware of or ignore an external reinforced moldable containment sleeve that employs a wide variety of micro-fibers and/or conventional and non-conventional reinforcements thus, providing a reduced price in corrosion protection of the reinforcement; and is compatible with virtually any non-cementitious or cementitious admixtures, aggregates, additives, and improves the printed mixes' permeability resistance, surface and internal mix shrinking, surface scaling, etc.; and provides previously unavailable improvements in the printed brick(s) surface bonding and eliminating the prior art common limitation of cold joint bonding strength of the previously unavailable molded printed reinforcement slip-form pass through interlocking brick(s); and simultaneously improves the printed brick(s)' surface bonding characteristics, as for example by increasing the mechanical bonding properties and increasing the cold joint surface bonding strengths of the interlocking brick(s), further improving the external containment sleeve bonding interface (the mixes' grain boundary interface); provides a previously unavailable improved bonding (adhesive) that eliminates the prior art cold joint limitations.

Please note, the flexible, light-weight moldable external reinforcement containment sleeves and the optional internal reinforcing net eliminate the need for cold joints bonding material(s), are not disclosed nor taught in any of the previously mentioned prior art full-scale 3D printing systems.

The prior art does not disclose nor teach employing innovative external reinforcement sleeves, disclosed herein of the current invention that additionally repel bulk water penetration on contact, including wind driven rain, snow etc., while providing accurate pre-engineered regulation and control of grout and/or mortar seepage in-between the external pre-engineered sleeve's apertures (filament spacing) for accurately regulating the cementitious mix overflow (bonding) between the filaments (apertures).

Additionally the current invention significantly improves the predictable placement, speed, and location of each full-scale slip-form printed interlocking brick layers or sections over that of the prior art, that significantly increases the mechanical bonding properties of the brick surface producing a cementitious interlocking key-way interface, providing the ability to print a wider range of wall angles, a wider range of roof geometries, including a wide variety of pitch angles that is able to be slipform printed using the method and apparatus of the current invention onsite and is needed in the prior art.

Furthermore the flexible external reinforcing containment sleeves and optional internal reinforcement net provide previously unavailable advantages over the prior art, having one or more interlocking layers of a wide variety of brick printing, including composite materials, fiber bundles, a variety of filament materials and various windings, including regulating the apertures, sizes, shapes and spacing to provide other improvements not stated herein including many mechanical properties (if necessary or required), such as but not limited to reduces or eliminates random cracking in the printed brick edge curling caused by the mix's volume change, and significantly limits the range of crack occurrence within the external sleeves set area and, depending upon application, improves the surface appearance characteristics of the slip-form printed concrete "bricks", thus produces a wide variety of aesthetically appealing texture(s)

and finish(es) such as mimicking mud brick, slump block, chipped stone, including traditional bricks and blocks, stuccos, plasters, etc.

The current invention additionally provides for more/accurate printing calculations in real time of the mix delivery volumes improving full-scale printing over the prior art, further improving conformational tolerances over the prior art, and significantly simplifying inventory, furthermore permitting improved onsite printing characteristics of a wide variety of highly complex mixes, and easily accepts a variety of in depth cementitious pigments (color dyes).

The current invention furthermore improves the cement extrusion process over the prior art providing faster, simpler, and more accurate 3D printing system methods and apparatuses than the prior art, and is more adaptable onsite during the construction process. The external containment sleeve, consisting of a light-gage fabric reinforced "material", is readily molded, folded, cut, sewn, stapled, heat sealed, tie-wired, zip-tied, and or glued as needed, and may be permanent (leave in place cast in place) or optionally used as a temporary mix containment sleeve, and the sleeve may be optionally dissolved from sunlight exposure in a few days or may be dissolved by any suitable method such as exposure from ultra violet light.

The prior art overlooks or is unaware of the external reinforcing containment sleeve system of the current invention that is compatible with a wide variety of micro-reinforcements that further provide significant structural improvements such as incorporating fiber-reinforced concrete (FRC) mixes enhancing a wide variety of 3D concrete mix slipform 3D printing characteristics, including improved stiffness and reducing deflection with FRC (fiber reinforced concrete). The slip-form printed interlocking walls and other structural members, including with and without FRC reinforcement, may be optionally used in combination with a variety of conventional, and or polypropylene and or basalt reinforcement(s) scaled as needed. Note FRC increases structural stiffness and reduces deflection of cracked concrete members as well as decreasing the stress in the reinforcement(s). This is particularly significant in thin interlocking keyway reinforced printed concrete brick sections, where the printed bricks geometry and profile significantly contribute to controlling complex deflection characteristics.

Together the external containment sleeves and the slip-form printed bricks provide the simultaneous and sequential full architectural scale printing of multiple mixes, or different grades of mixes, such as simultaneously or sequentially slipform die or mold and printing structurally reinforced concrete mixes, as improved over the prior art.

The current invention encompasses employing the fabric reinforced external containment "sleeves" that, as an apparatus, reduces the prior art's step of wetting and shading the printed concrete, and virtually eliminates cold joint scabbing as known in the art.

It is to be understood that, if any prior art publication is referred to herein, such reference does not constitute an admission that the publication forms a part of the common general knowledge in the art, in America or any other country.

In the background, description of the invention, and in the claims of this application, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

There is thus a need for automated construction technology that is cost-effective and deployable in factories and/or directly at construction sites that is not limited by an architect's choice of design, geometry, or materials, and that allows for easy and rapid implementation from initial design to final full architectural scale construction.

The current invention will probably be one of the very few feasible approaches for building structures on the moon, earth and other planets, which are being targeted for colonization, due to the full scale 3-D printer system of the current invention having significant advantages over the prior art such as diversity and scalability of tooling, and furthermore can construct the base onsite with minimum human intervention. This is advantageous because only the machine would have to be taken to the moon, thus reducing the cost of bringing building materials to the lunar surface to construct the bases.

Furthermore the previously unavailable external containment sleeve ability to optimize a wide variety of mixes makes possible the utilization of a wide variety of in-situ materials, and furthermore once solar power is available, it should be possible to adapt the current technology to the lunar and other environments to use this power and in-situ resources to build various forms of infrastructures such as buildings, as an option using extruded material composed of in-situ materials for constructing habitats and infrastructure for long term occupancy by humans, with the ultimate goal of in-situ resource utilization for automated construction printing of habitats in non-terrestrial environments. We believe that the technology is a very promising system for such construction.

Examples of the invention seek to solve, or at least ameliorate, one or more disadvantages of previously proposed additive manufacturing processes.

SUMMARY OF THE INVENTION

We are headed towards a housing crisis globally, and unless a cost, time, and resource-efficient system for constructing sustainable safe shelters is found, billions will be without homes.

Considering that by about 2030 international estimates foresee a rapid growth of adequate housing requirements for over 4 billion people living with yearly income below $3,000, the current invention is especially timely. Furthermore, the United Nations calculated that over the next 15 years, there will be an average daily requirement of 100,000 new housing units to meet this demand. According to PRNewswire's Feb. 17, 2015 article, 'Global Construction Market Worth $10.3 Trillion in 2020', "the global construction industry is projected to grow from US$7.4 trillion in 2010 to US$8.5 trillion in 2015 and to US$10.3 trillion in 2020.

With every year the population of earth is growing, more people move closer to big cities where the quality of life is higher whom will be in need of accommodation. Considering the rapid growth of city agglomerations, there is a need within the construction art to build sustainable, fast, and save natural resources, which is impossible without using new and significantly improved technologies. To minimize time and costs of construction, the construction art needs to incorporate mechanized labor, that automates the hard and dangerous tasks, which are performed by human labor. To significantly reduce or eliminate this global housing problem.

Automated construction technologies will revolutionize the way structures are designed and built, in dense urban environments, in difficult-to-build and difficult-to-service sites, or in remote and hostile regions of the world. The current invention will have a significant global impact by efficiently, quickly constructing cost-effective, sustainable low maintenance and energy-efficient designs (including developing countries' low-income housing) with sustainable energy efficiency (to cost-effectively fulfill many state and federal housing requirements (laws)), reference FIG. 9, further enabling contractors to quickly construct sustainable, low-income housing cost effectively The current invention provides versatile previously unavailable cost effective sustainable construction systems that improves cementitious resource productivity through obtaining higher strength, durability, and other improvements by simplifying previously complex steps. without the limitations of straight lines imposed by traditional construction methods and materials.

There are several previously unavailable benefits. The first is that the inventive three-dimensional reinforced concrete slip-form printing system apparatus is less expensive especially when construction becomes more complex, the cost of the inventive three-dimensional concrete slip-form printing system drops substantially relative to traditional building methods, particularly when considering providing new freedom of design, or to add energy efficient and aesthetic considerations without significant added cost.

The use of reinforced concrete slip-form technology that allows one to rapidly construct versatile 3D printed structures, including the foundation onsite (note as most prior art 3D Printing systems cannot print a foundation nor roof onsite), reference FIGS. 9, 10, and 11, as it's an "additive process." By using longer "bricks" of reinforced cementitious materials and interlocking them on to themselves, additive construction can create highly customized and extremely complex 3-dimensional reinforced concrete slip-form printed structures, reference FIG. 12, on a global scale, leading to increased demand and local supply of Rapid 3D concrete construction capability using full-scale interchangeable 3D concrete slip-formers.

The current invention encompasses a full architectural scale onsite slip-form "bricks" having interlocking layer-by-layer (additive) printing process capable of producing full sized structures and components in real time that gives architects a significant degree of design freedom because the components that maybe manufactured directly from the architects' digital model.

The inventive tools and apparatuses is separate and distinct from the prior art and is quickly assembled and deployed on the construction site that provides previously unavailable reinforced concrete construction diversity.

The 3D House Printing system of the current invention is safer than the prior art and has no critical phase of construction and promotes early occupancy and encompasses a faster, more accurate, and quieter onsite construction process as compared to the prior art.

Furthermore, these printed structures, materials, and architectural designs may greatly reduce the need for expensive HVAC (heating, ventilation and air conditioning) (about 85% to 95%), reducing the size and energy uses for heating, ventilation & air conditioning, and their associated costs (depending on the design).

The current invention significantly improves efficiency, reducing waste, reference FIG. 13.

The current invention produces significantly less onsite construction waste than the prior art. FIG. 13 illustrates this significantly reduced onsite construction waste. The innovative system constructs structures that require extremely low maintenance.

The current invention provides simplified construction logistics, reducing the need for virtually all hard physical labor by assigning humans to a more supervisory role, significantly reducing of eliminating issues relating to human safety and constructing, aesthetically refined designs at reduced time and cost and provide new aesthetic and functional concepts for architects. As an example, FIGS. 14, 15, 16, 17, 18, 19, 20, and 21 depicts some of many possible onsite brick slip-forming design configurations such as but not limited to mimicking or replicating squinching (mud brick) structures.

The current invention discloses methods and apparatus that reverses/inverts the prior art's construction time and cost equation (per square foot) such as when constructing large free-span curved or curvilinear reinforced concrete rooms and/or structures cost effectively, reference FIG. 10 as depicted in an exemplary illustrative embodiment. As an example, the invention's construction of an open free span room; the larger the room, the lower the time and costs (of construction per square foot) to construct the room (up to about 45 ft. in diameter or 1,590 square feet).

The current invention multi-purpose automated robotic construction system has a wide variety of advantages when compared to U.S. Pat. No. 7,641,561 external gantry system over the invention, reference FIG. 22. The inventor theorizes that the current invention full-architectural scale 3D printing system can save between 30 and 60 percent of building materials and shortens production times by 70 to even 90 percent, while decreasing labor costs by 70 up to 90 percent.

The current invention's 3D printer system FIG. 8 and FIG. 22, and the printed systems can be built entirely on-site. The current invention automated construction system provides, convenient transportation (lightweight and smaller size), and ease of onsite assembly less than half an hour and may also be easily moved from location to location.

From a single or multiple operating platform with almost no limitations in height, with the following technical specifications, reference FIG. 9 and FIG. 22, as an example of one of many possible configurations.

Automated Construction System's Technical Specifications (as an Example of One 3D Printing System or Model)

Total Weight—650 lbs./295.45 kg (not including supporting base).

Max. operation area (no supporting wheel)—about 1,600 sq. ft./148.6 sq. meters.

Max. operation area (with supporting wheel)—about 9,500 sq. ft./882.6 sq. meters.

Working movement speed—(about 10-60 ft. per min./3.05-18.3 meters per min).

Positioning precision (±0.02 in./±0.5 mm).

Repeated positioning precision—(0.004-0.008 in./0.1-0.2 mm).

Positioning mechanism—3 to 4 telescopic hydraulic cylinders with individual servo controls.

Additionally, the current inventions have a very low energy consumption of about 4 to 8 kW, onsite assembly takes about 30 minutes instead of several days as in the prior art.

Contour Crafting Gantry. The inventor theorizes that a 2,000 to 2,500 square foot reinforced concrete structure can be constructed onsite in real time by two people in about 8 hours. As an option the current invention may employ an optional removably secured supporting and guide wheel to expand the operation area up to about 4 times from a single point from the operating platforms.

It is also safer for the workers constructing the structure. Numerous jobs that might even normally have safety and environmental hazards can be performed by the current invention and fewer construction workers means fewer human errors and potential injuries and deaths.

The current invention provides simpler and more compact job site storage (less inventory) and greatly reduces the amount of shipping and receiving of construction equipment materials (significantly simplifies inventory). The current invention optionally provides the ability to 3D print full architectural scale structures using indigenous materials.

The current invention's methods and apparatus may be scaled as needed for constructing large or small internal and external architectural structures such as but not limited to stairs, closets, windows and door frames, fireplaces, benches, shelves, etc. reference FIGS. 17, 18, and 23. The current inventions may be incorporated with conventional construction methods and materials (such as retro-fitting, increasing the seismic strength, improving weatherproofing, durability, sustainability and insulation, etc.).

Furthermore, the current invention encompasses using the disclosed automated robotic construction technologies to quickly and cost effectively "mimic" "duplicate" traditional architectural structures and to augment other prior art concrete construction systems already in place, reference FIGS. 10, 11, 14, 15, 16, 17, 18, 19, 20, 21, and 24. The current invention may also quickly construct a wide variety of commercial structures such as but not limited to silos, cooling towers and ice houses.

In a specified embodiment encompasses that the current invention's methods and apparatuses may have numerous applications outside the concrete construction domain, including but limited to the model making industry and material mixing and delivery systems. In several specified embodiments encompasses construction systems with interchangeable components can be quickly constructed with greater complexity, less waste, and are more environmentally friendly. Having parts that cost less and require significantly less human labor to print reinforced cementitious curvilinear structures on site preferably in which the construction system provides an initial high strength interlocking external reinforced printed brick, then remains in place as an integral part of the finished structure. Thus, the reinforced concrete construction components can be made with greater speed and complexity.

The inventive reinforced concrete construction process may take place in a continuous and/or intermittent construction method, such as starting with constructing the foundation and ending at the top of the roof, including slipform extruding stairs, external and internal flat and or concave and convex partition walls, bas-reliefs, columns, installing, plumbing, wiring, cabling and piping cavities. During the slip-form casting of each "brick" layer, the reinforced cementitious the reinforced cementitious "structural ink" is deposited by slip-forming a long brick on top of the previous long brick layer, reference FIG. 25. The solidification (curing) process takes about 24 hours. Depending upon the application, the layer-wise depositing or slip-form printing process starts from the bottom (foundation) of the construction and prints and places "cast interlocking brick sections" generally about 4 to 12 inches (6 in. being average) high. Upon placement extrusion, the solidification process starts and a new printed brick layer is interlocking added onto the previous brick layer, reference FIG. 25, as the PSI of the previously printed brick layer reaches about 500 PSI in 3 to 5 minutes.

This innovative miniaturized slip-form printed system significantly improves a wide variety of concrete mixes casts over the prior art and enables the construction of stone-like structures from a wider variety of conventional and newer printing materials (i.e. minerals with microcrystalline characteristics), in some applications eliminates the structural requirement for conventional reinforcement (rebar) to reinforce said structures. This innovation allows for artificially created "stone" that is more sustainable (several hundred years or even longer) and is more environmentally friendly.

The method and apparatus of the invention incorporates constructing with a wide variety of printed bricks having the same or different configurations preferably having interlocking keyways such as having with pre-engineered grooves or slots providing increased precision and securement over the prior art. Reference FIG. 26. FIG. 26 represents 24 of many possible externally reinforced brick configurations that are slip-form, molded and printed onsite in real time. The slip-form apparatus (moving mold) may print a interlocking reinforced key-way having grooves or slots for increasing installation securement and accuracy. Reference FIGS. 25 and 26.

In other specified embodiments, the invention's slip-forming apparatus (moving mold) extrudes a long interlocking "brick" preferably having receiving grooves or channels such as for receiving and positioning reinforcement (rebar) rods, bars, cable, and or electric, plumbing, etc., Reference FIGS. 25, 26, and 27. FIG. 27 A-1 in an exemplary embodiment depicts one of many possible embedded items such as but not limited to reinforcement (rebar) rods, bars, cable, and or electric, plumbing, fiber optics, etc.

The current invention is separate and distinct from the prior art slip-formers that do not encompass a wide variety of interchangeable "brick" molds, Ref. FIG. 26, and encompasses encapsulating with an external fabric reinforced containment sleeves, Ref. FIG. 28 that automatically regulates and optimizes the specific mixes curing environment as needed, and does not require special formulations of cementitious mixes and will easily optimize customized formulations and high performance cementitious additives, admixtures, and aggregates, as needed.

Another significant improvement over the prior art is that the current invention provides two or three planes "printing" due to rotating extruder that prints (slip-forms) horizontally and vertically including curved sloping walls, thus expanding more architectural and construction possibilities. Over the prior art, rather than being limited to a traditional three-axis setup, the slip-form "printer" system has a removably attached rotating base and mechanized modular arms can rotate and swivel in all directions, for slip-form "printing" entire structures preferably from the inside out rather than off site manufacturing individual walls that require additional transport and manual assembly on the construction site, reference FIG. 22.

By doing rotational (1) and translational (2) movements in XOY plane, the mechanized robot's removably secured interchangeable slip-form extrusion head (A; B) travels along the preset trajectory (3) having technical solutions that make possible the printing of large houses by a compact and mobile printer. The pre-slip-former in (A) horizontal and (B) vertical position or may be adjusted and positioned, angled to slip-form, place, and print at any angle or derivative therein on the structure for accurate printing of edges and positioning means as needed and automatically compensate for inconsistencies in the printed cementitious mix(es).

The current invention improves tolerances (accuracy) for reinforced concrete construction and improves quality, safety, and economy in all types of concrete placement and further improves the structural integrity that meets or exceeds applicable structural codes. The multi-purpose robotic system involves slip-form extrusion printing reinforced cast structural "brick" materials preferably having cementitious mixes molded and extruded in a semi plastic high viscosity "paste" that upon extrusion is over about 200 p. Dkt No. BG-003.02s.i. within about 3 minutes, and generally solidifies (cures) in seven to twenty days to 5,000 to 30,000 p.s.i. or more, depending upon the mix.

In a specified embodiment encompasses that the current invention methods and apparatus may optionally slip-form print reinforced concrete structural "bricks" without the use of the current invention's leave-in-place cast-in-place external containment sleeve as disclosed herein. The multi-purpose robotic system slip-forming reinforced concrete construction method and apparatus is preferably slip-form printed (operated) onsite in real time preferably from inside and within the structure that is to be print constructed. Also known as reverse construction printing, reference FIG. 22.

The current invention's method and apparatus quickly and accurately locates and helps to locate and install (position) a wide variety of architectural and structural components such as but not limited to optionally incorporate installing conventional pre-cast concrete components such as arches, windows and door frames etc. As an option the current invention encompasses incorporating LEDs (light emitting diodes) and other safety and or positioning sensors as needed.

In an exemplary embodiment encompasses methods and apparatuses for slip-form "casting" a wider variety of cementitious mix materials onto conventional fixed concrete forms, depending upon the application, rigid horizontal reinforcement support members (rebar) may be used to facilitate the slip-form extrusion printing (construction) of a wide variety of openings such as windows and door frame openings, reference FIG. 17 and FIG. 18. As an example, the slip-form "extrusion printing" apparatus is traversing an area that has been designated as the window opening. After the top of the printed walls section surrounding the proposed window frame has been slip-formed (extruded), optionally horizontal reinforcement member(s) may be placed across the top of these frames and walls to create the reinforcing header of the window frame. One or more interlocking layers of printed "bricks" are extruded, as required. Basalt, polypropylene reinforcements are preferred.

The current invention improves construction space utilization and reduces storage yard space about 75%.

Gantry Robot

The current invention reverse gantry apparatus is separate and distinct from a conventional Gantry Robot System, that in the prior art traditionally are larger than the structure to be built and generally only operate from overhead, such as employed in the Contour Crafting, Wasp, Qingdao, Winsun, and other overhead gantry systems, Reference FIG. 6. The current invention encompasses having many advantages of employing automated reverse construction systems having smaller, lighter, shorter modular mechanized arms, further encompassing simpler, lighter, shorter mix pumping and delivery systems.

The current invention preferably encompasses previously unavailable internally positioned and operated reverse gantry construction apparatus (constructing from the inside out), reference FIG. 22, for reinforced concrete requiring minimum training time having mechanized and or automated robotic systems. The current invention's method(s) and apparatus preferably employs reinforced concrete construction techniques for onsite construction preferably operated from the inside of the proposed structure; this allows for a smaller, lighter, much more diverse printing tool when printing extremely complex angles providing previously unavailable reinforced concrete construction.

As an option or as a variation or the current invention may be operated to pass through interchangeable molds and slip-form print externally (outside the structure), or any printing combinations as needed. Reference FIG. 8. Most preferred is automated printing internally onsite (from inside the structure or room). The current invention encompasses as an option or variation of attaching and operating the disclosed automated construction system removably secured on to movable robotic operating platforms having an removably attached slip-form extrusion head and preferably having a sleeve feeding system etc.

The current invention encompasses a wide variety of mechanized and multi-purpose robotic configurations, designs, variations, and several systems having different scales are encompassed by the current invention and may be employed within the scope of the invention not specifically stated herein, reference FIGS. 29 and 30. FIG. 29 depicts in an illustrative embodiment, a side view of a mechanized and automated multi-purpose robotic construction system and apparatus. FIG. 30 illustrates 4 of the many possible and automated construction robotic configurations.

Thus, the automated construction arm(s) has been provided, which has both a smaller, simplified and lighter-weight operating structure and is rotatably supported by a variety of quickly positionable supporting and operating base(s) FIG. 38, 47, 48, 49, 50) as disclosed herein, providing the capability of slip-form molding and printing with reduced weight, size, and accurate positioning.

The preferred robotic supporting and operating platforms configuration simplifies previously complex cementitious casting environments such as concrete casting in mud/water/sand/etc. and eliminates the conventional constraints of many construction components such as employing concrete forms and is suitable for mass construction potentially with each structure having unique features without having added time or costs and further reduces prior art onsite construction waste from several tons to less than a few pounds significantly reducing onsite cleanup during and after the construction process, reference FIG. 13, and significantly reducing the prior art's previously complex steps for onsite grading and preparation.

In addition to the smaller, more diverse construction systems the current invention provides additional significant advantages over the prior art structural reinforced concrete construction systems such as but not limited to 1) the elimination of concrete form work, 2) ease of mix(es) molding apparatus having external containment and providing accurate reinforcement placement method, 3) less mix shrinkage during curing 4) having unrestricted curvilinear construction possibilities 5) stronger and lighter reinforced structural shell practicalities, 6) use of rawer material, hence savings through local economies, 7) combined molded and interlocking reinforced encapsulated "brick" structure and finish process in one single pass (flowing) step.

Curvilinear Bubble Structures

The new technology uses significantly less components and steps to cost-effectively construct aesthetically and functionally desired reinforced concrete curvilinear structures producing significant advantages over traditional prior art rectilinear structures, and allows for current architectural trends toward constructing structures having curved walls and ceilings, reference FIGS. 8, 9, 10, 11, 12, 22, and 24, enabling the builder to produce virtually any conceivable custom reinforced concrete design imaginable, easily adapted to nearly any cultural, style and climate, as needed in the art.

The current invention provides previously unavailable printed reinforced cementitious structures replicating highly complex designs that may be more organic, such as emerging from mathematical algorithms that encompasses stress factors and complex geometries to quickly slipform print unique and more functional and sustainable designs, such as employing computer algorithms such as mimicking structures similar to human bone growth, due to the common requirement for stress relief with this new technology of full architectural scale onsite 3D reinforced concrete slip-form printing.

In a method aspect, semi-liquid concrete (paste) and air pressure-extruded from the 3D concrete slip-form printing in an additive brick process are used. As it is an "additive process", by using slipform molded reinforced bricks of cementitious materials and adding them on to themselves, additive manufacturing can construct custom and complex three-dimensional reinforced concrete structures on a global scale and provides previously unavailable cost effective 1) architectural personalization, 2) increased architectural flexibility and functionality, and 3) high-volume/high speed accurate high value, onsite automated manufacturing, reducing costs through improved economies of scale.

The current invention quickly and cost effectively constructs highly complex curvilinear structural system (such as architectural bubble geometries, reference FIG. 12) having highly complex multi-curvature walls, such as outward curving exterior walls and roofs, reference FIG. 31, expanding the use of interior space without the prior arts previous complex steps of purchasing, transporting, assembling, casting, removing, cleaning, and inventorying of such concrete forms, reference FIGS. 1, 2, and 3. The current invention provides inexpensive, fast, accurate concrete construction of simple to highly complex wall geometries, ceilings, floors, or roofs particularly for designs having optimized ventilation and/or drainage systems, further including buttresses, flying arches, flying buttresses, reference FIG. 10. In several specified embodiment encompasses that automated structural concrete forming system having dispensed components to construct highly complex structurally reinforced curvilinear structures onsite in which the construction method and apparatus provides a printed brick having a high initial strength remains in place as an integral part of the finished printed structure.

Additionally, engineering concrete structures having curves increases the concrete's structure's integrity, examples include modified soap-bubble architecture, Reference FIG. 12.

As a further example, the externally reinforced concrete "brick" wall(s) may be designed and printed to extend past the foundations equator, such as when constructing barrel vaults, domes, and ellipsed rooms and other structures. Reference FIG. 24.

Objects and Advantages of the Invention

An object of the current invention is to provide a high rate of printing having repeatable accuracy and positioning precision having a precision of about (±0.5 mm) and having repeatable positioning precision of about (0.1-0.2 mm). It is an object of the invention to provide technical solutions that make it possible to accurately slip-form print large structures on site from several automated compact and mobile slip-form 3D printer systems, reference FIGS. 8 and 22, and 32.

By combining some or all of the features described herein into a variety of scalable reinforced concrete construction systems, the vast majority of durable, sustainable, and economical reinforced concrete structures may be cost effectively constructed according to a wide variety of construction grades or standards including highly customized specifications quickly, efficiently, accurately and with few personnel. This is an object of the invention.

The current invention may open some new architectural horizons, and stands to revolutionize the sustainable and "green" building sector, and which could change the way the architectural industry thinks about construction process having a wide variety of unique applications particularly in remote areas.

The inventor theorizes that the inventive methods and apparatuses can cost effectively construct sustainable (long term) highly durable reinforced structures, theoretically lasting from several hundred to several thousand years (life cycles) and is suitable for constructing unique energy efficient structures on a mass global scale. particularly in complex applications. This is an object of the invention. It is a further object of the invention when compared with other full-scale 3D house printing systems, preferably the onsite reinforced concrete construction apparatus is most preferably centered and operated inside the proposed structure that is being slip-form/printed, reference FIG. 22.

It is an object of the invention to repeatedly, quickly and accurately, adjustably move between manual or pre-programmed positions or be continuously or intermittently, or controlled in orientations and velocities to accurately follow a predetermined full architectural scale slip-form printing path in three-dimensional space. In other specified embodiment encompasses that the method and apparatus of the current invention may be employed in conjunction with a wide variety of prior art construction methods, materials, and apparatuses as needed (not shown).

The current invention simplifies previously complex construction steps including printing onsite in hot weather, including production preparations, delivery, placement, finishing, for improved pre-engineered regulation of bleed-water evaporation, mix curing, and provides onsite environmental protection for a wide variety of concrete mixes and facilities easier handling of concrete mix at the construction site; by employing inventive batching, molding, printing, placing, and having improved curing techniques. Note, during hot-weather conventional concreting can cause plastic-shrinkage (cracking), bug holes, reference FIG. 4, accelerated setting rates, increased slump loss, and decreased strength. Note in hot weather low concrete strength test results are often caused by unregulated concrete curing and protection of the initial curing characteristics of test specimens. The current invention incorporates previously unavailable innovations for ensuring that the mix test specimens and the actual printed structures are properly cured, as needed. The inventive methods and apparatuses are better adapted to the realities of actual onsite construction improving the reinforced concrete construction quality assurance and reliably to obtain accurate designs, strengths and serviceability. This is an object of the invention.

It is an objective of improving quality, safety, and economy in all types of reinforced concrete placement. The invention's method and apparatus quickly and easily integrates with a wide variety of conventional (prior art) reinforced concrete construction systems. This is an object of the invention. Other objects and advantages will become apparent in the course of the following specification.

The current invention discloses innovative methods and apparatuses to provide improved Quality Controls for a wide variety of reinforced concrete construction, and simultaneously simplifying prior art reinforced concrete construction systems. The actual structures will correspond to the CAD design within the planned tolerances of between about ±0.5 mm. Generally, the type and complexity of the architectural styles will not significantly impact the printed structure's cost, as the inventive system does not require conventional molds for concrete casting, thus virtually any engineered feature conceived by the designer can be quickly, inexpensively, accurately, and easily constructed on site, as needed.

Furthermore, having very little or no human intervention substantially reduces risk of accidents. Severe and expensive safety measures must be constantly applied on conventional concrete construction sites. Numerous jobs that might even normally have safety and environmental hazards can be performed by the inventive automated slip-form printing systems as well as eliminating many common onsite construction errors.

Employing the current invention's advantages and cost advantages may potentially reduce these and other costs including insurance and performance bonds. Further including, but not limited to, a lower purchase cost, higher perceived value, lower insurance rates, potential cost savings, longer mortgages, increased energy efficiencies, increased diversity in material choices, and enables onsite construction in inclement weather conditions, having no critical phase of construction, etc.

The current invention further encompasses constructing reinforced concrete bridge portions, road portions, column sections, pillars portions, pilings, harbor sections, marina furnishing, having reinforced variable beam sections further including constructing underwater columns, water and wine tanks, reference FIG. 33, complex industrial plant parks, statuary, movie sets, amusement parks, museums and structures that need to replicate monuments and temples, further including restoring missing parts (archeology), etc. and may quickly construct multi-storied structures, and may be scaled as needed depending upon application.

It is a further object of the current invention to provide a concrete slip-form printing system having apparatus which are quickly and accurately adjustable for construction of a wide variety of concrete structures onsite in real time such as but not limited to a wide variety of reinforced foundations, footing, walls (reference FIG. 31) which may be closed against itself and which changes in diameter and/or thickness (non-uniform in cross-section) along its height and length having at least one non-vertical surface as needed or to print a multi-curved wall which is closed in on itself and which is uniform or non-uniform in cross-section.

The current invention encompasses that reinforced concrete structures may be constructed of virtually any desired geometric configuration, including a non-closed or open structures, reference FIGS. 8, 9, 10, 11, 12, 22, and 24. As ideal geometries allows for quick finishing of buildings such as arches, vaults, domes or any combination such as spiraled and free form reinforced structures (not shown) from slip-form encapsulated printed "bricks" (cast) horizontally, and or vertically or any angle or derivative therein according to the present invention.

The inventor theorizes that the current invention's high-speed printing system is estimated to average about 10 to 20 times faster venting apertures than traditional reinforced concrete construction systems. Additionally, the required operating (construction) time may be calculated in advance and provides more accurate planning. The general brick production printing capacity will be about 60 ft. per minute (one foot per second) of an external reinforced (encapsulated) extruded and positioned bricks which is equivalent to constructing about a 2500 square foot structure by a pair of workers about every 6 to 10 hours.

The inventor theorizes that the inventions fully automated versions (not shown) may construct significantly faster if necessary. Due to the lower cost of the construction system as compared to prior art conventional concrete structures, the realization costs of comparable structures are about 70%-80% less than conventional prior art construction methods.

Containment Sleeves

The current invention resolves many of the prior art construction limitations by employing the innovative use of a external reinforced containment sleeve as disclosed herein, Reference FIG. 28, printing external structurally reinforced bricks, reference FIG. 34, having quickly interchangeable moldable forms, reference FIG. 26, that is preferably deposited in a layer wise motion, reference FIG. 25.

The versatile moldable, flexible sleeve(s) encompasses printing structurally reinforced bricks having an external aperture regulating system composed of spaced apart interlocking strands of woven warp and woven weft, Reference FIG. 35, venting to the ambient environment and providing means for controllably increasing or decreasing the desired degree of venting to specifically suite the mix. The current invention solves these and other prior art reinforced concrete limitations.

In an exemplary illustrative embodiment, FIG. 35 depicts two of many possible fabric reinforced configurations having pre-engineered apertures having different sizes and configurations for regulating and optimizing a wide variety of printed cementitious mixes casting characteristics onsite. FIG. 35 A depicts a combination of small generally square pre-engineered venting apertures and generally elongated rectangular pre-engineered apertures (not to scale). FIG. 35 B depicts generally square venting apertures.

The current invention significantly expands the quality and variety of printable mixes of cementitious materials further including their associated admixtures and aggregates etc. over the prior art. In several specified embodiments encompasses that the current invention external containment "sleeve" promotes faster printing rates and thus shorter construction schedules thus reducing construction timelines at a reduced cost. The extruded slip-form printed sleeves, containment form(s) preferably having external reinforcement fabric serves as a versatile reinforcing moldable leave-in-place cast-in-place cementitious structural printed brick containment form(s), significantly improving a wide variety of onsite reinforced concrete slip-form extrusion processes such as printing speed, accuracy, expands the structural "brick" size ranges, and diversity, reference FIGS. 26 and 34.

During the onsite cementitious mix or mixes critical curing phase the external reinforcement containment form(s) structural mesh having pre-engineered venting apertures for settable (curable) material, reference FIGS. 35 A and B, to optimize the encapsulated containment form(s) mix curing environment for optimized bricks molding and casting speed and characteristics from a wide variety of cementitious (concrete) mixes such as but not limited to obtain the potential compressive strength, durability, wall effect, grain boundary, impermeability, sheer strength, porosity control, oxidation resistance, erosion control, weight or mass, insulation regulation, air and or gas entrainment, tension resistance, over the prior art and provides fast printing on the construction site further includes complex mixes such as having improved ductility, freeze thaw resistance, stress displacement, alkali range, reducing porosity, oxidation and erosion resistance. The external regulating sleeve(s) improves the printing outcomes of highly complex cement mixes, such as humidity regulating and memory return, air purifying cementitious mixes that previously required complex casting steps only previously obtainable in a factory controlled environment.

Employing the inventive vent regulating and reinforcing sleeve(s) as an apparatus encourages and promotes for realizing the potential strength and other significant characteristics by controlling the mix's water percolation directions optimizing the mix's water curing rate (to control autogenously shrinking) and simultaneously improves the printed bricks' dimensional stability, i.e. "drying shrinkage". This is particularly beneficial and advantageous in specialty pre-engineered (cementitious mix proportions), such as to obtain a high early shear strength, and to obtain high toughness and high durability to onsite exposure conditions for faster printing schedules, reducing construction timelines.

In an exemplary embodiment encompasses that the current invention system having a significant external fabric reinforced containment sleeve preferably having a danier ranging between about 50 to 1200 danier, more preferably ranging between about 100 to 800 danier, most preferably ranging between about 350 to 700 danier preferably for slip-form printing bricks having sizes up to about 10 inches high by 14 inches wide or as needed depending upon the application, reference FIG. 35. Polypropylene and basalt fabric reinforcement materials are most preferred.

The current invention further encompasses printing a fabric reinforced external containment sleeve having sizes larger than about 10 inches high by 14 inches wide up to about 30 inches high by 30 inches wide or as needed depending upon the application, preferably having a danier ranging between about 1,100 to 4,000 danier, more preferably ranging between about 1,200 to 2,500 danier, most preferably ranging between about 1,500 to 2,000 danier for onsite printing slip-form beams and foundations, reference FIG. 36, reference FIG. 35. Polypropylene and basalt fabric reinforcement materials are most preferred.

The thickness of the reinforcement mesh venting apertures for settable (curing) material "brick" is basically the resolution (speed of wall construction) by printing with preferably structural "bricks" having higher heights. Thus, when a thicker brick layer is printed, the speed of construction is increased." The current invention provides a faster printing schedules enabling the construction of reinforced structures preferably from the inside to the outside and is particularly useful and advantageous when constructing in inclement weather conditions and reducing the risk of damaging or destroying construction tools, onsite materials, and discourages theft. This potentially saves on the cost of work interruptions and performance bonds, reduces down time, and virtually eliminates any storm damaged tools and materials, thus extending the construction season and climates.

Venting Apertures

The current invention encompasses that by using the inventions printing sleeve that can quickly print a wide variety of highly complex mixes on site having narrower tolerance that conventionally would previously only be able to be cast in a factory environment requiring specific temperature and humidity control. As an option, the current invention may encompass slip-form printing with a variety of containment sleeve in an atmospherically controlled factory environment then transporting and assembling onsite. As an option or a variation of the current invention encompasses slip-form printing without employing the current invention's external reinforced containment sleeve such as on a construction site or in a factory environment, as needed.

Practicing this invention with all possible combinations of the described classes and variations of external containment sleeves by regulating the fibers preferred sizes and venting spacing enables the printed brick's edge and faces providing key way interlocking characteristics having a very economical production of a series in various external containment sleeves bringing new possibilities in a wide variety of molded and extruded printed forms, Reference FIGS. 26 and 34 having a wide capability of brick, encapsulating and molded and (shaping) as needed.

The containment "sleeve's" materials and characteristics may vary at any section as needed such as having means for receiving settable mix materials, external containment sleeves having memory return retaining means, the containment sleeve optionally having engaging folded sections or strips or other facings, with optional waterproofing means; e.g., coverings, coating, or foils, thus providing a wider range of the mixes pH printing range, reference 37.

The current inventions encompass a wide variety of external reinforced containment sleeve providing a wide variety of improved ductile characteristics reference FIG. 37. The external containment sleeves may optionally provide customized thermal regulation characteristics, including controlling thermal and water venting dissipation (curing rate) that maximizes the service life of the completed structure increasing the tensile range or capacity of the containment sleeves providing external reinforced containment for a wide variety of cementitious mixes having a variety of commonly encountered inconsistencies such as from irregular pumping rates that create intermittent thin or thick mixes thus helps consolidates the mix as needed.

The present invention relates to improved slip-form printing methods and apparatuses employing a wide variety of flexible fabric reinforcing containment sleeves' having material that lowers manufacturing and shipping cost and improves diversity, accuracy, reliability, and speed over the prior art for improved control for onsite in real time casting of a wide variety of long reinforced structurally improved printed "bricks" containing cementitious materials such as but not limited to; foundations, footing, walls and roofs is concerned, more particularly, with slip-forms for printing interlocking reinforced structural "brick" onsite in real time from multi-purpose mechanized and or automated robotic construction systems that is smaller, lightweight while at the same time offering pronounced rigidity or stiffness for implementation in fast, automated accurate slip-form extrusion printing and material delivery techniques.

The inventive technology combines the use of reinforced concrete and prefabricated external containment sleeves, allow for the quick change of concrete mixes at any printing point casting long bricks (in place). The containment sleeves of the current invention further significantly improve the quality, speed, and size of each slip-form printed structural reinforced bricks layers or sections over the prior art.

In other specific embodiments, the slip-forming containment "sleeves" materials and surface bonding textures for cementitious onsite encapsulating prevents the cementitious material from sticking onto any of the slip-form molding surfaces, and simultaneously eliminates concrete or other cementitious and non-cementitious materials leakage, and simultaneously improves conformational tolerances. The external containment sleeves improve related issues to designing workable concrete mixes and may be used for both new construction and rehabilitation.

The slip-form containment sleeve increases the reinforcement mechanical properties of the structural reinforced brick surfaces preferably having an interlocking key-way interface. The light-weight containment sleeves are easily transported in a small truck. The containment sleeves provide accurate pre-engineered regulation and control of grout and/or mortar venting in between the containment sleeve's pre-engineered venting apertures (filament spacing) for accurately regulating the cementitious mixes overflow between the venting filaments (apertures). The slip-form containment "sleeve" provides a pre-engineered grout shield that regulates and controls grout and or mortar venting in between the spaced filaments (apertures) by regulating the amount of mix venting in between the "sleeve's" (apertures) venting voids or spacing of the reinforcing filaments as needed, reference FIG. 35.

In several specified embodiments encompasses that the method and apparatus of the current invention, incorporates engineering and manufacturing of a wide variety of external containment sleeves for reducing wall distortion during high speed slip-form concrete printing construction process by promoting improved (shorter) curing rates for a wide variety of cementitious mixes having admixtures or other additives and materials and increases the short term and long term tensile and shear performance range. Various slip-formed masses serve various functions.

The external "sleeve" mesh reduces friction during slip-form molding and keyway interlocking and increases the slip-form printing and feeding rates and or placement accuracy, and the cast-in-place leave-in-place containment "sleeve" mesh or flexible filaments, provides characteristics that minimizes brick distortions and improves speed of printed reinforced concrete construction. Thus, since the molded and shaped slip-form printed bricks having fabric reinforced encapsulated containment sleeve is traveling at optimized speeds, providing safe, fast, predictable onsite mass structural reinforced concrete production as needed.

The purpose of the present invention is to provide a previously unavailable high-speed onsite reinforced concrete brick manufacturing and placement system operating in real time such that the fabric reinforced containment sleeve and molded structurally reinforced bricks can maintain an onsite high speed slip-form molding pass rate, and can be mass-produced onsite in real time, having fabric reinforced brick products having improved structurally reinforcing concrete containment sleeve packaging methods.

The external containment sleeve significantly shortens the prior art cement mix curing rate or time between each casting layer; thus optimizing the printing rate or speed having an average slip-forming casting rate of about 60 feet per minute or slip-form printing about 1 foot per second or significantly faster depending upon the application. Additionally, the external containment sleeves significantly improve horizontal and vertical slip-forming construction (casting) over the prior art from virtually any angle up to about 22 degrees as printed from the inventions rail guide system (Reference FIGS. 8 and 38). The reinforced external sleeve of the current invention provides the ability to employ a wide variety of construction materials, such as cementitious materials, concretes, foams, plasters, insulations, stuccos, may be delivered that was previously unavailable to be cost effectively constructed onsite in real time.

The external containment sleeve of the current invention encompasses a clearly defined cementitious curing environment such that the printed bricks external and internal environment being pre-regulated by the specific reinforced fabric and the venting apertures characteristics within the external containment sleeve to serve as a pre-engineered curing membrane for accurately regulating the encapsulated cementitious mix to predictably obtain the optimized characteristics of the specific mix's electrochemical and electrophysical curing actions onsite or as desired, further providing temperature regulation from the venting apertures being specifically scaled and configured as needed to predictably obtain an optimized mix curing environment.

Thus, this new technology incorporates containment "sleeves" ensuring that their corresponding test specimens are properly cured. This innovation better adapts their designs to the realities of actual onsite construction. Note that low concrete strength test results common in casting in hot weather are often caused by poor mix protection and fast initial curing of test specimens. The inventive containment sleeves mesh filaments spacings provide a pre-engineered venting apertures apparatus and method that provide a pre-engineered optimal curing environment(s) (rates) specifically tailored to general mix(es) or a variety of specialized and custom mixes, as for example, for obtaining a high initial shear strength suitable for high speed slip-form extrusion "brick" printing providing the pre-engineered minimal curing time between each "brick" printing layer, depending upon application. The containment "sleeve" may employ multiple layers from a wide variety of materials or textiles as disclosed herein.

In several embodiments, the current invention encompasses that it is often desirable for such containment "sleeves" to control the degree of casting porosity, i.e., (Reference 35) including communication between the interior of the printed cementitious containment "sleeve(s)" having pre-engineered corresponding pre-engineered venting apertures to the external atmosphere, for controlling the specific mix or mixes' optimized curing characteristics as disclosed herein.

The current invention's reinforced external containment "sleeve" accommodates a wider range of cementitious and non-cementitious mixes' and slump ranges in a single slip-form printed brick and optionally improves moist curing water (fogger) (not shown) applications without producing the brick surface erosion and the "sleeve" may be designed and manufactured to promote improved more uniform water venting (percolation) not limited to the top of the form as in the prior art, to predictably produce early structural loading and eliminates the necessity to over-design having improved cost economy due to faster onsite construction speeds.

The containment "sleeve" having previously unavailable advantages such as but not limited to being capable of enduring high pressure and repels moisture on contact by directing it away from the exterior of the brick(s) surfaces such as from wind driven rain, and repels bulk water penetration (wicking of moisture), reference FIG. 35. In other exemplary embodiments encompasses employing a "sleeve" as an apparatus that significantly expands the slip-form printing mass and volume, as for example when slip-form molding, and printing note that within the prior art is currently limited to casting high performance mixes up to about 50 cm thick (about 20 inches) and requires the immediate covering of the cast component such as with plastic sheeting material to prevent the rapid water loss to obtain or realize the potential casting characteristics for long term durability and to maximize potential strengths.

Additionally, some cementitious casting materials specifications may not be realized or obtained, such as without employing the current invention's methods and apparatuses including specifically pre-engineering the external containment "sleeve" curing characteristics may quickly and inexpensively printed onsite having highly efficient insulative walls and ceilings having an obtainable R-value ranging between about R40 to R100, or higher if needed (optimally about an R10 per inch), such as but not limited to for reliably slip-form printing to obtain the highest potential of printing high performance concrete mixes.

The inventive containment sleeve provides a controllable curing environment to realize a high percent of the potential R value (R-10 per inch). Note, the reinforced concrete structures materials optionally may print a high R-value (such as R-40 to R-100) thus potentially reducing the size for heating, ventilating and cooling systems.

The method and apparatus preferably employs molding and printing (low slump) slip-form rapid drying, high viscosity external mesh reinforced cementitious "brick" materials for automated efficient reinforced concrete construction. (Note the preferred timing and/or minimum timing between each positioned extruded printed "brick" layer) A wide variety of concrete or other cementitious materials i.e. such as but not limited to slip-form printing (casting) with a high R-value (high insulation materials) in one "brick" layer or section, and having a low R-value mix materials in another printed "brick" section (Reference FIGS. 25 and 39), that is pumped into the slip-form inside the same extruded sleeve. Reference FIGS. 40 and 41.

Note, as an option the R-value may vary as needed such as ranging between high or low R-value or as needed. The current invention encompasses simultaneously printing two or more mixes having different R-values and characteristics as needed.

In several specified embodiments the method and apparatus encompasses a wide variety of customized specifications as disclosed herein for the containment "sleeves" to meet specific conformational tolerances strengths, sizes, and molded shapes having pre-engineered venting apertures having different mix permeability characteristics, as needed, such as the sleeves materials can be specifically tailored to correspond to and suit a specific grade or mix of concrete(s) to obtain previously unavailable onsite construction of reinforced concrete that previously was only obtainable when manufactured in a factory or laboratory environment.

In an exemplary embodiment encompasses such that the containment sleeve serves as a molded space defining cast in place, leave in place permanent structurally reinforced containment form having customized pre-engineered curing characteristics.

The external fabric reinforced containment sleeves improves the mixes hardening characteristics and structural performances such as but not limited to: 1) mixture proportioning; 2) mechanical properties; 3) time-dependent deformations; 4) flexural and shear behavior; 5) bonding behavior; 6) prestress losses; 7) the structural behavior of full architectural scale elements; 8) Improves grain boundary; 9) Improves electrophysical bonding characteristics; 10) Improves electrochemical bonding characteristics. Furthermore, the external containment sleeves methods and apparatuses encompasses pre-engineered venting apertures' to accurately regulate water, air or gas (voids) and improves air and or gas I.E. nitrogen, argon entrainments characteristics having micro-bubbles (ranging between about 2 to 8 billion bubbles per cubic meter). The external containment sleeve reduces or eliminates random surface cracking and edge curling cause by the concrete mix's normal volume change and significantly limits or eliminates the range of crack occurrence in general within the printed brick's set area, Reference FIG. 34.

The inventive external containment sleeves optimize a wide variety of concrete additives, such as contributing to improving the mixes cross linking and bridging and improves aggregate control and zoning, further including optimizing a wide variety of admixtures characteristics for improving and optimizing cement interface and expansion coefficients, such as self-consolidating (shrinkage-compensating) concrete. Note the containment sleeve and mix venting apertures regulating the slump control; producing less shrinkage.

In other exemplary embodiments encompasses methods and apparatuses such that the cast-in-place leave-in-place flexible fabric reinforced containment "form" may be used as a bulkhead form, and being lighter than plywood or steel forms, is easier, faster and more accurate to print in place onsite and requires no special formulations of concrete mix is necessary. The preferred mix slump ranges from about 0" to 2.5", a slump of up to about 3 "may be used with proper precautions. The most preferred slip-form printing slump ranges between about 0.0" to 1.5".

The current invention's containment "sleeves" significantly expands the printable range of concrete mix printable sections and cost less. The current invention thus optionally provides seismic upgrades by improving concrete mixes' highly complex stress transfer characteristics, such as when constructing highly durable structures that may encounter mudslides, flooding, that maybe subsequently dug out and re-occupied.

In several specified embodiments encompasses that the current invention's reinforced containment sleeve(s) are more cost effective and ecological, leaving a smaller "carbon footprint" than the concrete construction systems of the prior art.

The current invention's brick encapsulation processes encompass enclosing methods and enclosing apparatuses This is an object of the current invention. The containment sleeve provides for more accurate calculations of the mixes volume printing and control, improving conformational tolerances and simplifying inventory (much simpler than prior art). The containment sleeves and the slip-form provide the simultaneous and or sequential printing of multiple mixes, or different grades of mixes. The containment sleeve system is compatible with a wide variety of micro-reinforcements providing structural improvements for using fiber-reinforced concrete (FRC) mixes to improve a wide variety of concrete performance characteristics such as improved stiffness and reducing deflection.

FRC (fiber reinforced concrete) slip-form printed walls and other members, including with and without rebar reinforcement, may be used in combination with conventional and most preferred basalt reinforcement(s). The FRC increases structural stiffness and reduces deflection of printed concrete members as well as decreasing the stress in the reinforcement(s). This is particularly significant in thin printed reinforced concrete sections and other cementitious based members, where the structures geometry and profile significantly contribute to controlling complex deflection characteristics.

The containment sleeve additionally provides previously unavailable improvements in the surface strength of the innovatively slip-form printed brick(s) significantly improves the printed brick(s)' surface bonding strengths characteristics by increasing the mechanical bonding properties of the molded printed brick(s), further improving the containment sleeve bonding interface (grain boundary interface). As an option, the containment sleeves may provide multiple layers of external reinforcement and or internal net reinforcement (if necessary or required), reference FIGS. 34 and 37. The external containment sleeves improves the accuracy of reinforcement (rebar) placement such as but not limited to the placement accuracy of plumbing, piping, conduit, electrical, fiber optics, etc., reference FIG. 27. The external containment sleeves and the optional internal reinforcement net further provide previously unavailable multiple pre-engineered layers of a wide variety of external and internal reinforcements including composite materials, fiber bundles, a variety of filament windings, and other improvements of mechanical properties (if necessary or required). Reference FIGS. 37 and 42. The external containment sleeve has an option of using a wide variety of reinforcing microfibers and/or conventional rebar (reinforcement bars or rods), basalt reinforcements are preferred. Note conventionally the weakest point of a prior art "brick" or block is its surfaces. Note that by employing the current invention external brick's surface is now the brick's strongest area.

By employing and positioning and slip-forming the external containment "sleeve" on or near the surface of the printed "brick" improves the printed bricks dimensional stability where the maximum stress transfer zone is located and thus also improves the keyway interlocking bonding and other interface characteristics as is needed in the art. In a specified embodiment in a method aspect may encompass the spraying of a variety of cementitious materials in between the slip-form printed "brick" interlocking layers (the cold joints) (not shown) to provide an improved interlocking "brick" joint bond and provides additional reinforcement and strengthening to the interlocking bricks surface bonding characteristics, improving an interlocking key-way interface and reduces water moisture penetration and long-term corrosion.

The sleeve further provides a bonding surface for additional inside and outside materials that may be applied to slip-form printed "bricks" as necessary to flow through the interchangeable molding forms, such as but not limited to providing a attachable surface for plaster, stucco, clay/mud, tile, stone, etc. as needed.

The containment sleeves are compatible with a wide variety of manmade and indigenous aggregates, such as but not limited to crushed coral, pumice, scoria, stucco, plaster, clay (including local indigenous clays), mud, tiles, stone, etc., and are further encompasses a wide variety of recycled construction waste, recycled concrete (urbanite), glass, fibers, steel, cement, and a wide variety of additives and admixtures, etc., as needed and virtually any cementitious mix admixtures, aggregates, and additives including innovative reinforcements, such as micro-reinforcements.

The containment sleeves furthermore reduce or eliminate long-term leaching (such as when slip-form printing mixes containing fly ash).

The automated construction system's robotic arm(s) may insert a variety of slip-form reinforcements onto the containment sleeve's edge/surface materials, not shown, that has just been extruded, in order to further secure the positional accuracy and strength of the printed brick(s)' surface materials. The material for the reinforcement may be made out of any suitable material(s), such as basalt, plastics, metals, such as in the optional forms of coils, loops, or composite coils inserted into or within an external sleeve, reference FIGS. 42 and 43, which unrolls (dispensed) from spools and is easily cut/slit and if required shaped into the final form by an automated construction mechanism removably installed on operating platforms (reference FIGS. 28, 35, 40, and 41) which holds the automated construction slip-form extrusion printing assembly.

FIG. 42 depicts in an illustrative embodiment (not to scale) external sleeve reinforcement that may be made out of any suitable material(s), such as reinforcing basalt, plastics, metals, alloys, optionally maybe in the forms of reinforcing memory return coils, loops, or composite coils inserted into a sleeve, simplified for illustrative purposes, and which has at least one reinforcement sleeve continued therein or optionally two or more sleeves positioned in an overlapping relationship. The fabric reinforced containment sleeves mold slip-forming printed member may be manually and or mechanically automated operated (Reference FIG. 40) and dispensed from a variety of sleeve dispensing apparatuses and feed into the pre-slip-former.

FIG. 40 in an illustrative embodiment depicts the current invention's pre-slip-former sleeve (folding apparatus), spool (dispensing) device having an adjustable brake (not shown), and external containment sleeve labeled with QR codes. FIG. 40-1 illustrates a sleeve folding apparatus, FIG. 40-2 illustrates one of many possible encodings such as depicting numbers and letters. FIG. 40-3 further depicts a dispensing spool for the containment sleeve. FIG. 40-4 depicts a QR code. FIG. 40-5 depicts a removable and attachable dispensing mechanism for dispensing the internal and or external containment sleeve that is removably attached to the automated slipformer apparatus or optionally on the robotic arms (arms not shown). FIG. 40-6 illustrates an extruded printed brick depicting an external reinforcement containment sleeve of the current invention. FIG. 40-7 depicts the extended sleeve (prior to folding and or securement; such as stapling, gluing, stitching, etc.).

The current invention encompasses that the external reinforced containment sleeves are dispensed from a removably attached, reference FIG. 40-5, spool, and FIG. 40-3, and folded in a generally rectangular configuration (single folded overlapping sleeve, reference FIG. 40-1, or as an option or optionally two separate folded over (overlapping) sleeves secured together) to be filled with cementitious cements or concrete and fed into the slip-former molding and encapsulating brick printing apparatus to pass through mold the sleeves into a variety of interchangeable printed brick configurations and sizes, reference FIG. 40-6.

In combination, an automated cementitious slip-form brick molding encasing machine comprising, a metering mix pump (not shown) in communication with a source of fabric reinforcing "brick" containment sleeve and having an outlet nozzle extending therefrom to intermittently or continuously pump a slip-formed cementitious interchangeable molding brick having external reinforced containment sleeve product.

In a specified embodiment encompasses that the current inventions external containment "sleeves" may be in forms of tubes, flat folded gusseted sheet or sheets as needed depending on application, the sleeve(s) preferably to be spaced apart and folded over and secured together as needed. Reference FIGS. 40 and 41. The invention's external flexible reinforced containment "sleeves" may be in the forms of tubes and or flat fabric reinforced sheets and may further be scaled as needed depending on application.

Slip-forming extrusion having folded and overlapping secured sleeves are preferred. (Reference FIGS. 40 and 41). In a specified embodiment encompasses that the automated concrete construction apparatus may incorporate one or more spooled "sleeves" dispensers simultaneously slip-forming (printing) different types of "sleeves" having dissimilar inside reinforcing surfaces and outside reinforcing surfaces as needed, reference FIGS. 28, 35, 37 and 41.

In the adhesive applying section, reference FIG. 40-1, is provided with an optional automated adhesive applying means along the longitudinal direction of the fabric reinforced brick pass-through molding and encapsulating sleeve, reference FIG. 40-6 and FIG. 41-C, of the intervals from the adhesive is applied to the fabric reinforced encapsulating containment sleeve removably attached dispensing spool, reference FIG. 40-1, from a fabric reinforced containment sleeve spooled feeding system.

The external containment sleeves are preferably dispensed in flat sheets, preferably from removably attached spools or dispensing rolls, polypropylene and or basalt external reinforced containment sleeves are preferred.

The brick fabric reinforced external containment sleeve including molding and pass-through packaging methods, reference FIG. 40, of the current invention. Adjacent the bonding between the external fabric reinforced brick products; the gap portion is spot heated to melt and bond the external fabric reinforced containment sleeve, so that the containment sleeve melting a portion of the gap is solidified, cooling engagement; along the external fabric reinforced containment sleeve in the length direction of the gap portion of the external fabric reinforced containment sleeve enabling maintaining a high slip-forming pass-through rate to print large quantities of molded external fabric reinforced encapsulated brick products. In addition, the "brick" external fabric reinforced containment sleeve packaging apparatus according to the current invention, since the external fabric reinforced containment sleeve is melted between the two overlapping layers is cooled and solidified, enabling elimination of brick leakage or damage, and maintaining a high slip-form pass-through printing rate to produce large quantities of slip-form molded brick products onsite.

The slip-former apparatus comprising: a reinforced thin fabric containment sleeve fed from a dispensing spool, (Reference FIG. 40), the adhesive is applied along the adhesive coated portion spaced longitudinal direction of the external fabric reinforced containment sleeve encapsulated brick products and the external fabric reinforced containment packaging bonding gap packaging fabric reinforced bonding portion; overlapped fabric reinforced containment sleeve portion of the adhesive coincident; to the inner fabric reinforced containment sleeve folded and overlapping together with the external fabric reinforced containment sleeve packaging together in the longitudinal direction of the mold slip-former brick external fabric reinforced containment sleeve is folded over portion (overlapping) unit; (Reference FIG. 40-1), melt by heating the external fabric reinforced containment sleeve portion gap portion thawed; partially cooled adhesive portion of the gap has been cooled and solidified melt; and an optional cutting portion cut along the gap portion, if needed.

The current invention may be provided with the optional cutting portion rotatably on the pair of rotary cutters (not shown), in turn roller peripheral surface of the cutter blades (not shown) are mounted. When the two-rollover rotation, so that the respective cutting edges coincide, the rotary cutter facing the gap portion on the external fabric reinforced containment sleeve and cutting the external fabric reinforced containment sleeve in the width direction of the external fabric reinforced containment sleeve.

The current invention encompasses that the external fabric reinforced containment sleeve, reference FIG. 28 and FIG. 40, external reinforced wrapped reinforced brick articles, reference FIG. 26, first, the adhesive applying step, reference FIG. 40-1, sent from the removably attached external fabric reinforced containment sleeve dispensing spool(s), reference FIG. 40-3, to the spaced from the longitudinal direction of the external fabric reinforced containment sleeve is optionally coated with an adhesive or the like. Secondly, in the overlapping folding over processing step, reference FIGS. 40-1 and 41-C, the external fabric reinforced containment sleeve of the slip-former molded, extruded, printed brick with an adhesive coincide. Next, in the external fabric reinforced containment sleeve folding (overlapping) and sealing process, reference FIG. 40-1, to external reinforced brick a medial to the external fabric reinforced extruded, printed containment sleeve and external fabric reinforced brick containment sleeve folded overlapping sealing along the longitudinal direction of the external fabric reinforced containment sleeve. Further, in the overlapping sealing (heat) step (not shown), the gap between the adjacent external fabric reinforced brick containment sleeve heat sealed portion. Thus, in the optional cutting step (not shown), when the gap on the external fabric reinforced containment sleeve portion along the width direction of the external fabric reinforced containment sleeve, is optionally cut off, it is made of the external fabric reinforced containment sleeve overlapping sealing wrapped printed brick components.

The external containment sleeve preferably having a light-gage fabric "material" is readily folded, cut, stapled, heat sealed, tie-wired (stainless steel), zip-tied, and or glued as needed, reference FIG. 41-C. In a specified embodiment encompasses a method and apparatus such that the containment "sleeve" may be sewn, stitched edge(s) forming a seam may be positioned and fed into the slip-form optional seam-receiving and guiding groove (not shown), preferably fed into and positioned in an up or down manner to serve as a sleeve printing guide thus the "sleeve" seam may serve as feeding guide system, thus preventing undesired "sleeve" rotations.

The light-gage of the containment sleeve's "materials" are readily sewn folded, tied, cut, stapled, zip-tied, or glued etc. and the closing of the (bottom) end of the sleeve may be sewn stapled or glued forming an extruded encapsulated printed brick, reference FIG. 28. The end of the external "sleeves" may be sealed (closed off) such as folded and tied, stitched, glued, stapled, zip locked, or drawn closed with a draw string, tie-wired, etc. as needed.

As an option or a variation of the current invention, the ends of the external sleeve may be tapered to fit (interlock) together as needed, such as overlapping the printed corners (interlocking) printed layers. The current invention encompasses that initially the external containment sleeve extends past the molded brick (Reference FIG. 40-7). Due to the inventive application of the relatively light-gauge external containment sleeves' venting aperture's having configurations and material(s) of which the cast-in-place, leave-in-place containment "sleeve" is constructed or fabricated, the reinforced flexible containment sleeve(s) may be readily cut with hand shears (scissors) such as including openings to accommodate penetration of the semi-dry slip-form printed "bricks", as an example to install conduit and or fiber optic rods (not shown) may be made with an "X" cut at the center of the "sleeve" entry as needed.

The external containment "sleeve" fabric may be permanent (leave in place cast in place) or as an option may be cast onsite temporarily and the exposed sleeve's surfaces will dissolve in a few days by selecting the desired UV rating (or not) of the sleeve for optimal time required for dissolving the external containment sleeve, or any combination as needed, reference FIG. 35 and FIG. 37. In one specified embodiment encompasses that the method and apparatus of the current invention constructs reinforced cementitious structures without a leave-in-place cast-in-place external reinforced encapsulating containment form onsite or in a factory environment. In one exemplary embodiment encompasses that the current invention methods and apparatuses encompasses slip-form molding extrusion printing a long "brick" without the use of the inventive leave-in-place cast-in-place reinforced external containment sleeve and or optional internal reinforcement net as disclosed herein onsite or in a factory environment.

The inventive folded tubular reinforced concrete containment sleeves having a generally cylindrical body panel with one end of the panel to conform to the containment sleeve interchangeable pass-through molding cavity (Reference FIG. 40-6). Preferably, the cylindrical body panel of the reinforced concrete containment sleeve comprises a pre-engineered specified number and locations of venting aperture(s) (Reference FIG. 37) preferably along the direction of the cylindrical axis, reference FIG. 40-6. Furthermore, the spacing width of the said venting apertures is also specifiable by design as needed.

As an option, the invention encompasses simultaneously pumping (installing) semi-fluid insulation material on the outside with concrete inside the external folded containment sleeve or tubes (not shown). As an example the external containment sleeve (automated construction apparatus) having reinforcement may be pre-engineered by the described inventive measures of the current invention herein, there is not or only a little further manufacturing is needed for optional removable attachment of a pneumatic (air form) constructed roof securement components may be necessary to attach or insert to the printed structure if needed such as but not limited to attaching "hoops" "loops", eyelets, grommets, adjustable straps, flaps, pads, tabs (not shown), such as, but not limited to, openings for cementitious filling or injection and or valves and valve connections, to cut edges, to fasten adjustable straps and latches, such as for moving and positioning and air form accurate positioning and securement onsite as needed (Not shown), and to reinforce and or connect said reinforcing sleeves or other parts by additional layer(s) or strip(s) such as having "meshes" "nets" and/or reinforcing "rings" "coils" "loops", reference FIG. 42, or other coated materials or fabrics as needed. As an example, but not limited to for the removable securement (attachment) of air-formed (pneumatic) structures.

The current invention encompasses external containment sleeve having printed/painted on visual references such as but not limited for locations indicating the heights, distances, etc. reference FIGS. 40-2 and 40-4, as needed such as but not limited to accurately indicating their location(s) such as plumbing, electrical, stairs, fireplaces, panels (electrical junction boxes), windows, joints/seams, corners, doorways, columns, etc. As an option the external containment sleeve's surfaces may encompass surface impressions such as embossed patterns and or colors and/or logos on the external containment sleeves, reference FIGS. 40-2 and 40-4.

The containment sleeves optionally may incorporate color changing dyes thus indicating the cementitious mix critical curing/casting temperatures and the curing rate in real time by the sleeves containing color changing materials, such as color changing from a hot red to a cooler green color depending upon the mix for regulating (controlling) the critical evaporation rate and optimizing the mix's curing uniformity (more uniform heat dissipation), further improving the onsite printed mix's casting specifications for improved tolerances for reinforced concrete construction.

The external reinforced containment sleeves of the current invention encompass simplifying and verifying the printing quality and inspection process (i.e., viewing through the sleeve), reference FIG. 37. The containment sleeves accept a variety of in depth cementitious pigments (color dyes). The external containment "sleeve" prevents unsightly concrete staining and discoloration. The external containment "sleeve" helps maintain a uniform edge and improves the appearance of the concrete finish.

As an option or optionally each side or face of the inventive reinforced containment "sleeve" may be of different materials (composition), filaments, scaled venting apertures having different sizes and spacings, weaves and patterns, such as the diameter(s) of the filaments and the weaves or pattern, as specifically needed, reference FIGS. 35 and 37. The external reinforced containment sleeve method and apparatus encompasses a wide variety of suitable fabric reinforcing materials, such as basalt, polypropylene, and other fabric reinforcing materials, having suitable configurations such as but not limited to, herringbone, cross-weave, plain twill, basket, satin, leno, mock leno, further including multidirectional weaves, unidirectional weave, or as needed, reference FIG. 35.

The external reinforced containment sleeve method and apparatus encompasses having pre-engineered reinforcing fabrics having pre-engineered fabric contact surfaces as needed to improve the pre-engineered reinforcement characteristics, particularly when slip-form printing onsite. The basic size(s) and strengths of the reinforcing fibers of the warp and or weft needed for the desired reinforcing weaves of the flexible containment sleeve, reference FIG. 35.

The containment sleeve's basic size(s) and strengths of the fibers of the warp and or weft needed for the desired weave(s) of the flexible reinforcing containment sleeve, protects the printed concrete surfaces by reducing the bruising of the printed concrete brick surfaces where it most commonly occurs, at or near its surfaces. The present invention consists of a method and apparatus which inexpensively and efficiently manufactures such pre-engineered flexible moldable external containment "sleeves".

In other specified embodiments encompasses a leave-in-place cast-in-place external reinforcing containment "sleeve" having a variety of extruded surfaced textures having a combination of pre-engineered spaced filaments forming pre-engineered venting apertures having a variety of advantages and benefits. As for example, mixing different tensile ranges, sizes with thickness, shapes, transparencies, filaments and or fibers, materials specifically tailored to a wide variety of different concrete mixes and applications as needed.

The current invention encompasses four main reinforcing fiber orientation categories are: Unidirectional, Woven, Multiaxial, and Other/random. Fibers types are categorized by the orientation of the fibers used, and by the various assembly methods used to accurately position and hold the fibers together, reference FIG. 35.

The external containment sleeves may optionally have gusseted sides (edges) composed of 4 sides of the same or different materials such as, foils, filaments, filament windings, fiber orientations and fabrics, fiber bundles, having the same or different sizes, spacings, and having a wide variety of other improved mechanical properties each having their own uniquely tailored characteristics as needed depending upon the application, reference FIG. 37. As an option the current invention may employ pre-pleated or gusseted multi-sided external containment "sleeves", reference FIG. 37.

The inventive external containment "sleeves" such as but not limited to may be gusseted having multi-sided or multi-layered having external containment characteristics, composed of a wide variety of suitable mix materials, such as but not limited to a wide variety of foils, plastics, fibers, weaves, binding agents, sizes, venting apertures spacings and patterns, crossing angles, fabrics, and layering such as but not limited to reflective materials, in some situations, to optimize the casting environment, reference FIG. 37.

As for example, all four sides of the pleated or gusseted (pre-gusseted) external containment "sleeve(s)" slip-form printed having dissimilar structural material members in any printed section having the same or different printed materials, sizes, and filament spacing on a portion of sleeve, i.e. strip(s) on each side or face having encapsulating multi laminated mesh/layers "sleeves" may as stated herein to suit a wide variety of full architectural scale applications, or as needed, reference FIG. 37. In several specified embodiments encompasses that the containment "sleeves" itself is also encompassed as an apparatus by the current invention.

The fabric reinforced external containment sleeve is preferably composed of woven basalt materials including (composite) basalt materials, such as basalt fibers, many possible combinations of fibers materials, resins, its variations such as but not limited to fiber reinforced or fiber bundles and filament windings preferably having basalt fabric and or resin systems, further including solid core and or hollow core basalt reinforcement, basalt micro-fibers and filaments reinforced composite basalt provides sustainability and weight savings within the inventive slip-formed brick's structure Thermalguard® Epoxy and dual-network resins etc. Additionally, basalt reinforcement(s) having lower shipping costs (lite weight) and permits cementitious mixes up to about 150 degrees C. and has the advantage of increase surface area of contact for the surrounding cementitious materials, basalt reinforcements are easier and faster to handle and install, significantly reduces or eliminates long-term reinforcement degradation and expensive repair and maintenance (replacement costs).

High temperature composite basalt rebar reinforcement coefficient of thermal expansion (CTE) is very close to that of most cementitious mixes and provides improved tensile strengths that is twice that of steel reinforcement(s) and having improved mechanical strength gains, thermal stability, having significantly higher corrosion resistance and is compatible with a wide variety of additives, aggregates, admixtures, resins, and epoxies while simultaneously providing an electromagnetic insulator particularly solid composite basalt or advanced hollow basalt bars.

Polypropylene

The fabric reinforced external containment sleeve is preferably composed of basalt or polypropylene materials including (composite) polypropylene materials, polypropylene fibers, combinations of fibers materials, resins, its variations such as but not limited to fiber reinforced or fiber bundles and filament windings with polypropylene fabric and or resin systems, further including solid core and or hollow core polypropylene reinforcement, Micro-fibers and filaments reinforced composite polypropylene provides sustainability and weight savings, encapsulated within the inventive slip-form printed brick's structure.

Internal Reinforcement Net

The current invention optionally encompasses employing expanded net reinforcement internally (Reference FIGS. 34 A-4 and A-5) the reinforcing net(s) are preferably positioned within the external reinforcing containment sleeves' stress zone, further including custom designed and manufactured reinforcement sleeves.

FIG. 34 depicts in an exemplary illustrative embodiment an externally and internally reinforced printed brick apparatus of the current invention that is exaggerated and simplified for illustrative purposes and is not to scale. FIG. 34 A-1 illustrates the external fabric reinforced containment sleeve. FIGS. 34 A-2 and A-3 illustrates one of the many preferred interlocking keyway configurations. FIGS. 34 A-4 and A-5 represents two of many possible internal reinforcement net configurations simplified and exaggerated for illustrative purposes. FIG. 34 A-6 illustrates one of many possible internal reinforcement cables and or wire configurations, preferably composed of basalt, polypropylene, and or memory return metals.

The internal reinforcement net, reference FIGS. 34 A-4 and A-5, reduces or eliminates random internal cracking and or deformation caused by the concrete mix's normal volume change and limits or eliminates the range of crack occurrence in general within the brick's set area and provides significant additional internal reinforcement. As an example, but not limited to, woven poly propylene or basalt internal reinforcement nets, may be formed and configured in a wide variety of net configurations may range from about 20,000 psi to 90,000 psi for most applications. The preferred internal reinforcement nets range from about 45,000 psi to about 90,000 psi, or as specified.

When the concrete mix has sufficiently cured, the containment net system serves as a leave in place print in place internal protective and reinforcement apparatus, as disclosed herein, or as needed. As illustrated in FIG. 35. The other employed invention as illustrated in FIGS. 34 A-4 and A-5 optimize a wide variety of concrete mixes and additives that improves the internal brick reinforcements characteristics, such as but not limited to improving cross linking and bridging and improves the accuracy of aggregate placement and control and zoning, further including a wide variety of admixtures, to improve and optimize cracking resistance and the reinforcement and cement interface and their expansion coefficients.

The current invention encompasses lightweight internal reinforcement net tubes, flexible tubes or expandable net tubes, further including custom designed and manufactured internal reinforcing tubes such as not limited to in the form of extruded nets, reference FIGS. 34 A-4 and A-5. FIG. 34 illustrates several of the many possible internal reinforcement net configurations optionally having internal positioned wire and or cable reinforcement, reference FIG. 34 A-6. The internal containment apparatus has an option of encompassing having positioned wire(s) and or cable(s) internal reinforcements within the printed brick structure, reference FIG. 34 A-6 and FIG. 44. Memory return wire and or cable reinforcements are most preferred.

FIG. 44 depicts in an illustrative exemplary embodiment 6 of many possible cable and or wire configurations having internal reinforcement(s) apparatuses that are simplified and exaggerated for illustrative purposes and not to scale. FIGS. 44 A, B, C, and D depict four of many possible internal memory return reinforcement cable configurations, as an option encompassing same or multiple different memory return alloys as disclosed herein or as needed. FIGS. 44 E and F depict two of many possible memory return internal reinforcement cable, wire configurations.

Depending upon the application the spacing or distance between the internal reinforcement net or spacing of venting filaments to accurately produce the desired venting apertures, as needed, that ranges between about 2 mm to 25 mm, preferably ranging between about 5 mm to about 20 mm, most preferred ranging between about 10 mm to 15 mm, or may be pre-engineered and spaced apart as necessary or needed, preferably manufactured from polypropylene or bio-plastics $H_2O$, $CO_2$, or basalt, Reference FIGS. 34 A-4 and A-5.

The internal reinforcement net illustrated in FIGS. 34 A-4 and A-5 encompasses having a wide variety of pre-engineered venting apertures having different sizes and configurations as needed for specifically tailoring to the mixes net venting apertures' characteristics having venting dimensions to suit high performance and specialty cementitious concrete mixes. As an option employing internal reinforcement nets such as but not limited to pre-engineered nets in the form of tubes having pre-engineered fixed venting apertures and dimensional stability (Reference FIGS. 34 A-4 and A-5) providing improved pre-engineered internal and external reinforcement characteristics as disclosed herein.

As an option or variation of the invention flat stock plastic netting may be fabricated into said reinforcing tubes having flexible netting can be slip-formed as an internal reinforcement net. The internal reinforcing net may contain the same or a different mix than the surrounding external containment sleeve or any combination as needed. In a specified embodiment encompasses employing a dowel positionable apparatus.

Having adjustable dowel positioning means (not shown) that simplifies the positioning accuracy of the internal reinforcement apparatus (Reference FIGS. 34 A-4, A-5, and A-6) preferably within the pre-engineered stress zone as needed.

The current invention encompasses a preferred combination of pre-fabricated external reinforcing sleeves and internal reinforcing net tubes having a wide variety of scalable sizes, shapes, venting apertures, and configurations etc. (Reference FIG. 34) may be manufactured from a wide variety of flat (nets) that may be overlapped (rolled), welded, and or sealed to make a wide variety of pre-engineered net sizes for a wide variety of reinforced concrete applications. In several specified embodiments, the present invention encompasses that the internal extruded reinforcement nets is also used as a heavier duty internal protective reinforcement for the cast mixes' media. The thicker strands of these nets' extrusions provide maximum reinforcement characteristics preferably encompassing oriented netting that produces strong, flexible, light weight, rust-proof reinforcement meeting a wide variety of unique applications and requirements as needed. (Reference FIGS. 34 A-4 and A-5)

As for example, by combining different reinforcement bars, rods, wires cables, or micro-fibers improving concrete mixes, polypropylene. Basalt reinforcement micro-reinforcing filaments and or nets may be combined and positioned inside the printed "brick" walls, improving many previously unavailable reinforcing characteristics, reference FIGS. 34 A-4, A-5 and A-6.

In addition, to slip-form printing internal reinforcement net, optionally having internal reinforcing cores, Reference FIG. 34 A-5), as for example, but not limited to pre-formed internal reinforcement net configurations in the form of tubes with sonic welded seams, optionally the internal reinforcement tubes may be formed from folded flat netting, and tube with overlap, internal tubes, such as but not limited to having diamond net, square net, custom fabricated internal reinforcement net, as needed, such as but not limited to oriented netting, composed of basalt, polypropylene, polyethylene, low density polyethylene, medium density polyethylene, high density polyethylene, polytetrafluoroethylene, polybutylene, terephthalate, polyester, or other suitable reinforcing materials as disclosed herein or as needed. Pre-engineered basalt and polypropylene having net configurations are most preferred.

The current invention also encompasses internal containment sleeves in combination with the external reinforcements as disclosed herein that may contain hidden seams (not shown). In an exemplary embodiment encompasses that inventive internal reinforcing net apparatus having pre-engineered vent regulating curing apertures ranges spaced apart between about 10 mm to 30 mm, preferably ranging between about 20 mm to 25 mm for most applications or as needed. The diameter or thickness of the internal reinforcement net ranges between about 0.25 mm to 5 mm, most preferably ranging between about 1.00 mm to 4 mm or scaled as needed.

As an option a variety of adjustable "dowel" (not shown) having a variety of geometric configurations may be employed to accurately position and configure the internal reinforcement apparatus with a variety of onsite slip-form printing applications, such as but not limited to internally positioning and slip-form printing having an internally positioned reinforcement net (Reference FIGS. 34 A-4 and A-5) accurately positioned and spaced, preferably within the slip-formed "brick" pre-engineered stress zone(s) inside the "brick's" external containment sleeve as needed. Thus, the leave in place cast in place internal reinforcement net itself is also encompassed by the present invention. The internal reinforcement generally tubular "sleeve's" containing a wide variety of mix materials serves as a leave-in-place cast-in-place reinforced cementitious structure(s).

Temperature Indicating Sleeve

In an exemplary embodiment, the current invention encompasses that the external containment "sleeves" materials may employ a real time temperature indicating sleeve, as an example encompassing color-changing compounds embedded in the external containment sleeves such as for accurately indicating the slip-formed (encapsulated) mixes' temperature in real time, thus accurately indicating the onsite slipformed "brick's" curing rate and stage, of the mix temperature in real time, such as visually indicating the color of the sleeve as it changes as an example changing from red (hot) to green (cool), thus accurately indicating that the previous "brick" layer has sufficiently cured to receive and support the next printed "brick" layer, reference FIG. 25. The external fabric reinforced containment sleeves of the current invention as an option may easily accept a wide variety of in depth color changing pigments (colors) as needed.

Mesh/Net Manufacturing

As an example, the internal reinforcement net may be fabricated to produce a wide range of desired net configurations having pre-engineered apertures (hole sizes), weights, and thicknesses as needed, reference FIG. 35.

This extruded netting can be produced in a wide range of configurations as needed as, reference FIG. 34 A-1 and FIG. 35, to a larger extrusion mesh, reference FIGS. 34 A-4 and A-5, and may be produced by an expanding process to allow a variety of net configurations to be made from resins not otherwise available through an extrusion process.

Additionally, as an option or variation of the current invention the width of the expansion block (not shown) may be intentionally oversized with respect to the replaced width of the missing warp strands. Thus, during the weaving operation, a controlled amount of lateral squeezing force is produced which causes a pre-engineered packing of the woven warp along the edge of the aperture. FIGS. 35 A and B shows a perspective view of a small section of the detailed woven external containment "sleeve" or structure including the corresponding section of a pre-engineered venting apertures encompassed by the current invention. Along the two edges of the venting aperture are formed two squeeze zones (not shown) wherein both the woven warps in left squeeze zone and the woven warps in right squeeze zone are packed with a pitch tighter than elsewhere on the containment sleeve.

As shown in FIG. 40, a two-dimensional reinforcement net may be slip-form printed into a, wide variety of configurations for constructing reinforced walls and reinforced structures.

The slipform brick netting joints are commonly formed where two strands intersect or overlay each other forming a diamond pattern. Two distinct planes (known as flow channels in some applications) are created when the opposing strands overlap. Tooling and processing conditions may create diamond net patterns having angles ranging from about 40 degrees to about 105 degrees as needed to suit a variety of internally reinforced slip-form printing applications.

In other embodiments encompasses that the reinforcing internal and external materials may employ square mesh netting, reference FIG. 35 B. Square reinforcing mesh netting typically has one flat side created by the melted extruded mesh passing over a forming mandrel.

Note the reinforcing mesh can also be produced by an expanding process. This allows the mesh to be made from resins not otherwise available through the extrusion process. As stated herein, reinforcing woven mesh sleeve(s) fabrics may be produced by weaving a wide variety of monofilament fibers using advanced looms and finishing equipment. The mesh opening (apertures) for a given strand thickness is dictated by controlling the threads per inch (weft mesh count and warp mesh count), reference FIGS. 35 A and B.

Industrial textiles such as woven mesh may be constructed from a wide variety of monofilament synthetic fibers. This reinforcing weaving process creates fine industrial textiles with pre-engineered apertures (hole sizes), preferably having strand and thickness tolerance of about +/−5%. The manufacture of these reinforcing textiles is determined by the yarn type, yarn size, and thread count. Note, monofilament yarns are a single continuous filament, which produces a relatively smooth surface.

Note since monofilament reinforcing fabrics are preferably produced with equal yarn diameters and equal thread counts in both the warp and weft directions, the reinforcing fabric opening (aperture) is preferably square. Reference FIG. 35 B. These precision reinforcing woven fabrics are able to meet stringent technical conformational tolerance requirements. Note, synthetic reinforcing woven media is also used as an aggregate containment apparatus, usually from nylon, polyester, basalt, and polypropylene in a wide range of widths as needed.

In several specified embodiments encompasses that the current invention's external containment sleeves and the optional internal reinforcement net of the current invention may be composed of plastic materials selected from the group consisting of, polypropylene, polyethylene, polytetrafluoroethylene, polybutylene, terephthalate, polyamides, polyester, linear low density polyethylene, medium density polyethylene, high density polyethylene, ionomers, polyvinyl chloride, ethyl vinyl acetate, ethyl propyl copolymers, polyethylene copolymers, low density polyethylene, their copolymers, vinyl copolymers and mixtures thereof linear low density polyethylene, ionomers, polyvinyl chloride, ethyl vinyl acetate, ethyl propyl copolymers, polyethylene copolymers, low density polyethylene, their copolymers, vinyl copolymers polyolefin, polypropylene, polystyrene, polyethylene, polyurethane, polyvinyl alcohol (water soluble), basalt, silk, further including carbon, fiberglass, stainless steel, Kevlar™, graphene and their variances or other natural or hybrid materials and mixtures thereof. Polypropylene and basalt materials are preferred.

Since the cast-in-place fabric containment form is preferably spooled and fabricated from durable materials, it may be stored onsite or off site for appreciable periods without significant deterioration. Whatever the application function, extruded plastic netting, folded tubes, and sleeves contribute to both the brick's structural performances and aesthetics. The external containment "sleeves" may optionally incorporate a wide variety of embedded electronic chip(s). In a specific embodiment, the external containment sleeve may include printed (placed on), painted, or embossed logos, and or other advertising information, further including bar codes, and or QR codes, reference FIG. 40 A-4, and or other indicating codes as needed such as to indicate the location of electrical, plumbing etc. accurately in 3D space.

The containment "sleeve's" materials and characteristics may vary as needed during any construction phase, or point, or section as needed, thus simplifying previously complex steps for slip-form printing new materials onsite such as when constructing multiple-sided slip-form wall printing such as, insulating concrete, high pressure formulas having different coefficients for differing weights and mixture chemistries.

As an option the material may be selected so that the flexible containment "sleeve(s)" has a desirable amount of elasticity, which is useful where capability of energy absorption is required, for example to resist likelihood of tearing or breakage particularly when slip-form casting small radiuses. In several embodiments encompasses methods and apparatuses such that the containment "sleeve" in many applications of the current invention eliminates the need to install conventional rebar reinforcement bars, rods or cables etc.

As an example, biaxially oriented polypropylene nets are lighter weight and more flexible than extruded square mesh. The net's construction process "stretches" extruded square mesh in one or both directions under controlled conditions to produce strong, flexible, light-weight reinforcement netting. The external "sleeves", having synthetic filaments such as but not limited to, out of polyamides, polyethylene terephthalate or similar fibers are well known as basic fabrics for coating with suitable plastics and/or synthetic rubbers. If the coated containment "sleeve" material has to be manufactured into, e.g., sheets, sleeves, tubes, strips, bags, tapering, free form or other still more complicated geometric forms it is necessary to connect the coated fabric webs and the parts cut out of them such as by sewing, welding, stapling, gluing, bonding, or similar processes.

The weaving of tubular mesh is also a well-known and common process. When the folded overlapping generally tubular flexible configurations, reference FIG. 28, are to be coated, they are cut along one edge of a flattened folded tube to obtain a web of double width or along both edges to obtain two separate sheetings for the coating processes. It is also possible to cut tubular mesh(es) in a diagonal (helical) direction, which results in one web of diagonal materials. The dispensing rolls of reinforcing fabric mesh obtained by any of these methods may be coated with plastics and or synthetic rubbers as in the usual manner and manufactured into open and or closed hollow sleeve fabric (mesh) moldable slip-form printing by the methods and apparatuses described herein.

Additionally, the pre-engineered venting apertures can be accurately configured as needed by conventional bonding equipment, for example heat sealing, ultrasonic sealing, dielectric sealing or magnetic sealing etc., reference FIG. 28. The desired pre-engineered mix having corresponding venting apertures having mix curing regulating and controlling characteristics as needed in the art is useful where the slipform printed "brick" is to be contained within the containment sleeve needs controlled or regulated contact with the outside air.

These desired pre-engineered venting apertures as needed within said reinforcing bands thus form the desired aperture venting characteristics and structure as needed for the external reinforcing containment sleeve. Therefore, emerging from said flat or circular loom with the adaptation of the current invention embodiments is a woven flat or tubular external reinforcing mesh (sleeve) wherein a number of pre-engineered venting apertures parallel to the flat or tubular axis are accurately configured in wherever said invention embodiment is disposed along the circumferential periphery of the external reinforcing containment sleeve. It is also important to remark that, as part of the function of the flat or circular loom, as an option or optionally said emerging reinforcing woven flat or tubular external containment "sleeve" (apparatus) is preferably flattened into a continuous belt form, reference FIG. 28 A, and wound on to dispensing rolls, reference FIG. 40-3, for ease of subsequent handling and dispensing as needed.

The flat or tubular external reinforcing containment sleeve apparatus is sectioned off along a set of lines having predetermined spacing to form a set of tubular segments, each tubular segment having the desired set of pre-engineered venting "apertures" as needed with corresponding mesh/net sizes as needed extending axially from a first open end to a second open end. For convenience, the first open end of the said external tubular containment "sleeve" (apparatus).

Bonding of the transverse external reinforcing mesh strips prevents the containment "sleeves'" open end or edges from unraveling, such that the transverse reinforcement mesh at the open end will not slide off and become detached from the longitudinal reinforcement mesh. The folded reinforcement sheets or tubular "sleeve" can then be simultaneously pass-through molded and filled with the desired cementitious mix and the open end may be closed in any suitable manner, reference FIG. 40.

The containment "sleeve's" surface texture (fibers) and venting apertures provides a suitable bonding (adhesive) surface for a wide variety of cementitious materials that provides accurate pre-engineered regulation of grout and/or mix seepage in between and around the external containment sleeve's reinforcement filaments (apertures) (Reference FIGS. 35 A and B) to accurately regulate the cement mix(es)' pre-engineered overflow between and around the venting apertures' filament crossing points and spacing as needed.

The external containment "sleeve" may be accurately produced with any desired pre-engineered apertures (spacing) to regulate the mix's curing rate as needed to optimize a particular mix's performance characteristics (Reference FIGS. 35 A and B). Also, the bonding material increases the strength of the mix material. As an option at least some of the external containment mesh as an option may carry one or more bonding layers on both sides thereof, and the layer of bonding materials may comprise synthetic plastic material, reference FIGS. 28 A and B.

In several specified embodiments encompasses that each fiber reinforced containment "sleeve" is preferably molecularly oriented substantially in the direction of the length of the fiber reinforced containment mesh "sleeve", having spacings i.e. customized pre-engineered venting apertures for regulating a variety of mix curing properties as disclosed herein.

In several specified embodiments encompasses methods and apparatuses for employing the synergistic combination of a high tensile flexible reinforcement mesh and or net having a variety of reinforcing filaments in a flexible external fabric reinforced concrete containment sleeve having high compressive and ductile strength from the incorporation of a method aspect obtained by filling/pumping high compressive strength cementitious materials into the slip-form molding containment "sleeve" that is suitably molded or shaped (conformed inside the interchangeable slip-form molding apparatus (Reference FIG. 40) into a wide variety of full architectural scale reinforced "brick(s)" structures, reference FIG. 26, to print an initial high tensile and high ductile strength concrete materials onsite. As an option the current invention encompasses extruded plastic reinforcing mesh to produce and protect integral "brick" joint bonding structures to optimize the long "bricks" onsite printed dimensional stability and durability during positioning and placement, and improves related issues to designing workable reinforced concrete and may be used for both new construction and rehabilitation.

The current invention improves quality assurance for Concrete Mix Design, Quality Control and specifications, materials, and printing onsite having inventive mesh-type reinforcement apparatus and methods that improves placement of embedded items, analysis and design, and provides high strength and initial and long term serviceability that allows for a fast change of the pass-through concrete molds and their corresponding mixes at any point during the construction process by slip-form printing, reference FIG. 40, that simplifies previously complex reinforced concrete construction steps, including production preparations, delivery, placement, finishing, curing rate(s), for regulating the bleed-water evaporation rate, and significantly improving the external and internal protection of the printed concrete brick(s) over the prior art.

By employing the current invention's flexible external and internal reinforcement system (Reference FIG. 34) improves the mix's curing environment, including the initial hardening and other properties, and the performance and for use such as but not limited to: 1) mixture proportioning; 2) mechanical properties; 3) time dependent deformations; 4) flexural and shear behavior; 5) bonding behavior; 6) pre-stress losses; 7) the structural behavior of full architectural scale automated printed elements and the total structure.

In a specified embodiment, the current invention encompasses that the slip-form molded containment "sleeves" provides prevention from long-term leaching, as for example when printing concrete mixes containing fly ash etc. The external containment sleeve improves and simplifies the slip-form molding and mix "feeding mechanisms" (smoother) that eliminates binding and tearing of the molded "bricks" external sleeve, and associated wearing of the mold, thus increasing the life-cycle of the interchangeable molds, reference FIG. 32, particularly when printing small radiuses requiring accurate curves.

In one specified embodiment encompasses methods and apparatuses for onsite slip-form printing "bricks" having small radiuses (not shown) such as printing spiraling stairs, walls, roofs, foundations and other structures to a given profile. As an option printing the entire structure's foundation, that serves as a structurally reinforced supporting member for the automated construction system for three-dimensional concrete slip-form printing a complete structure, improving conformational tolerances with significantly improved printing speed and previously unavailable accuracy over the prior art.

The current invention improves the strength weight (mass) to volume ratio of reinforced concrete over the prior art's methods and apparatuses for molding and slip-form printing reinforced concrete "brick" structures at a reduced time and costs.

In several exemplary embodiments encompasses that the external reinforcement containment "sleeve's" thickness may range between about 25 denier to 2,000 denier depending on the application, more preferably ranging between about 25 denier to 1,500 denier most preferably ranging between about 50 denier to 850 denier and or in any combination of filaments' sizes or any derivative therein, reference FIGS. 35 A and B. In addition, the current invention encompasses a wide array of process capabilities to produce pre-engineered customized reinforcing mesh/nets to meet specific slip-form molding and extrusion requirements to suit a wide variety of custom mixes and other construction applications as needed.

Regulating Apertures

The current invention encompasses the fabric reinforced brick external encapsulating device comprising: a pre-engineered fabric reinforced containment sleeve having pre-engineered venting apertures, reference FIGS. 35 A and B, for accurately regulating the slip-form molding and printing characteristics for encapsulating and reinforcing said printed "brick(s)", further encompassing controlling the pre-engineered curing characteristics to optimize the onsite slip-forming conformational tolerance to improve the potential printing characteristics and the pass-through extrusion of the sleeve means.

Note, printing (casting) in hot weather causes concrete mixes' plastic-shrinkage, cracking, accelerated setting, increased slump loss, and decreased strength. The invention's flexible pre-engineered containment "sleeve" having pre-engineered venting apertures eliminates the "conventional" prior art critical issues such as but not limited to water permeability, shrinking, cracking, scaling, accelerated curing, increased slump loss, and decreased strength etc. for highly complex prints (casts); optimizing concrete's micro-structuring, improving a generalized quality assurance including improving surface protection, strength, proportions, production, and placement delivery characteristics.

Depending upon the application, the width of each external reinforcing mesh strip preferably ranges between about 1 mm to about 4 mm wide, more preferably ranges between about 1.5 mm to about 3.5 mm wide and the thickness of each external reinforcement mesh, including the transparent and or translucent viewing window such as in the form of a mesh strip, may be in the range of between about 0.01 mm to about 0.20 mm, more preferably ranging between about 0.02 mm to about 0.06 mm or as needed, depending upon the application.

The spacing or distance between the external containment mesh or filaments that produce the desired venting apertures spacings generally ranging between about 0 mm to 5 mm, preferably ranging between about 0.25 mm and 3 mm, most preferably ranging between about 0.25 mm to 1 mm, or may be pre-engineered and spaced as necessary, preferably manufactured from polypropylene or bio-plastics $H_2O$, $CO_2$, or basalt, as needed to suit a particular mix and or application. Note the viewing window can range in width and length as needed depending upon application.

The current invention provides means of controllably increasing and/or decreasing the degree of aperture's venting characteristics as needed to suit a specific cementitious mix as needed in the art having different sized venting apertures to suit a mix and applications as needed.

As an option or optionally the current invention encompasses that the pre-engineered venting apertures' dimensions can vary on different molded sides (faces) of the external fabric reinforced containment sleeve as needed, reference FIG. 37.

It should be understood that, with the present invention, for the external reinforced leave-in-place cast-in-place containment sleeves, the size and amount of pre-engineered venting aperture(s) can be adjustably controlled with the proper combination of the selection of number, location and size of the expansion block (not shown). The invention is applicable, in particularly, to the construction of slip-formed printed "bricks" of the current invention as stated in this disclosure.

The containment sleeve and its pre-engineered venting apertures and spacings further allows for simultaneous and/or sequential slip-forming of different mixes having a wide variety of bonding material(s) may contain one of more additives to improve the strength and/or having improved placement accuracy of the pre-engineered locations and securement (where they cross) and define the pre-engineered venting aperture spacing accuracy, as needed.

By customizing the apertures' spaces to accurately regulate the different combinations of sizes, types of filaments and or meshes for obtaining an optimized heat dissipation and or containment characteristics as needed per mix and simultaneously provides protection against wind driven rain and other harmful water sources thus reducing or eliminating damage exposure from a wide variety of debris and other commonly encountered contaminants.

Micro-Reinforcement

In several specified embodiments encompasses a wide variety of micro-fiber and other reinforcements as disclosed herein, preferably filling the external containment sleeve, may be optionally employed within external reinforced containment "sleeves", (Reference FIG. 37, FIG. 42, and FIG. 43) and or with a wide variety of micro-reinforcements such as "micro fibers", such as but not limited to polypropylene, stainless steel, basalt, graphene oxide and or carbon nano-tubes, micro-fiber. reinforcements. Basalt and or polypropylene micro reinforcements are preferred. Monofilament and woven or braided filaments may serve as reinforcement (mini reinforcement cables).

Reinforcement Loops/Coils

The current invention's overlapping non-touching memory return "loops" and "coils" (encompassing many different sizes of loops and coils) may be employed in a wide variety of configurations, FIG. 42 illustrates one of the many possible configurations. FIG. 42 illustrates an example of a memory return overlapping non-touching reinforcement apparatus of the current invention within a printed "brick" having reinforcement, i.e. bars, wires, cables, or rods, or other reinforcement materials (rebar) may be used. This seismic resistant "coil" system preferably installed within the edges of the printed "bricks" in an automated manner during the slip-form printed "brick" layer-wise slip-form construction system as described herein. FIG. 42 illustrate the seismic reinforcing coils, loops, cable, or rods (reinforcing elements) for constructing seismic resistant foundations, footings, walls, and roofs etc. As shown in FIG. 42, more complex and stronger memory return reinforcement may be constructed by creating two or three dimensional coiled layers such as within slip-form printed walls and columns using an interlocking layer wise approach. In the illustrated embodiments of reinforced cementitious structures, three elements, as well as two or more automated robotic manipulator arms (each having interchangeable attachments) may be used.

The containment "sleeve", having contiguous reinforcement memory return coils/loops, of the current invention having one or more seismic impact canceling apparatus having s-wave capturing and canceling characteristics in response to the encountered impact impulse such as earthquakes (ground accelerations), thereby translating and guiding and reflecting the encountered impact forces, preferably to cancel each other out, and, in part, are enabled by the shape or configuration of the inventive impact canceling apparatus configuration(s), as depicted in FIGS. (42) and (43), and further includes having contact and interface surfaces. The degree of phase displacement is a matter of design options, but some degree of phase displacement is preferred.

As an option or optionally the slip-form printed "brick" may contain embedded-type free, contiguous seismic resistant elements e.g., pre-engineered series of memory return reinforcement "rings" "coils" "loops" contained therein.

The inventive impact capturing apparatuses having "coils" "loops" that attenuates and cancels a wide variety of encountered impact(s) including highly non-linear system(s) is derived from their tunable dynamic response, encompassing canceling linear, and weakly nonlinear, and strongly nonlinear encountered impact(s) particularly s-wave impact canceling regimes, such as encountered from earthquakes. The current invention encompasses methods and apparatuses for suppressing and canceling the varying static and dynamic train waves load(s) that captures, guides, and attenuates and cancels the propagation of highly nonlinear solitary waves impacts from the encountered train waves, primarily in the form of S-waves, including the traveling pulses, widths, wave speeds, further including a number of separated pulses (singular or train of pulses), etc., are directed to and controlled by the inventive encountered impact controlling apparatuses of the current invention (Reference FIG. 42 and FIG. 43), thus modifying one or many of the encountered impact and force parameters, including the static and dynamic force amplitude, the type and duration of the initial excitation (impact or impacts) such as encountered by the inventive overlapping non-touching "coils" "loops" seismic event cancelling apparatus and system(s) (Reference FIG. 42), and/or the periodicity of the annular "coils" apparatus having the ability to capture the encountered s-waves, or other frequencies, in such apparatus. Further including the collective frequencies of the apparatuses' characteristics for capturing and controlling the encountered dynamic response of the apparatuses' seismic event cancelling system(s). Further including the transformation of reflected solitary s-waves propagating back from the encountered impact apparatus interface, which are sensitive and responsive to the non-touching overlapping continuous "loops" "coils" apparatus, preferably having geometric configurations and material properties advantages and interfacing with their adjoining media.

Note calculations and experimentation is required to define the optimized dimensions and characteristics of the S-wave attenuating method and apparatus.

The inventive internal reinforcement "meshes," and or "nets" configurations can take various sizes and forms, for example octagon, coils, and many other possible forms and configurations. (Reference FIGS. 34 A-4 and 34 A-5). Further including other geometries (not shown) having a variety of reinforcement characteristics and having encountered impact S-wave capturing and canceling characteristics such as but not limited to ellipse, parabola, hyperbola, polygon, chiliagon, enneagon, googolgon, hectagon, hendecagon, hexagon, myriagon, pentagon, quadrilateral, triangle, trapezium, myriagon, megagon, apeirogon, concave polygon, constructible polygon, convex polygon, cyclic polygon, equiangular polygon, equilateral polygon, regular polygon. Further including any and all combinations preferably having optimized curvilinear geometries.

As for example, but not limited to the inventive internal reinforcements in the form of mesh, nets as depicted in FIGS. 34 A-4 and 34 A-5 may be pass-through slip-form printed within an external containment "sleeve" in various pre-engineered locations and configurations as disclosed herein to accurately slip-form and position (in the stress zone) and accurately cast within a printed "brick" in place within the preferred stress zone and/or zones, that may employ a variety of s-wave canceling apparatuses and scaled as needed.

There are additionally many, natural, polyhedral patterns upon which the external reinforcement meshes' memory return "rings" "coils" can be suitably configured, as illustrated in FIG. 42, having geometric patterns having suitable characteristics or suitable three-dimensional geometric characteristics and effects as needed.

The current invention encompasses a wide variety of concrete construction advantages over prior art concrete construction including: ease in pass-through cement coating of all reinforcements surfaces within the containment "sleeve". By contrast, surface penetration of overlapping meshes is more difficult. However, the inventive reinforcement "rings" "coils" system may be efficiently mass produced, or as an option or alternatively designed, manufactured and employed in flattened wire and or cables in overlapping contiguous non-touching "rings" "coils", as in an illustrated embodiment FIG. 42, for ease of accurate placement. The current invention having lighter, simpler, smaller shipping, and mass handling of continuous "coil" "loop" reinforcement methods and apparatuses is simpler than prior art and having a longer lifespan. Note most prior art seismic resistant technologies are a one-time impact canceling system.

By employing the internal (inside the external reinforcement sleeve) inventive "rings" "coils" reinforcement reduces and or replaces and improves the use and function of a variety of aggregates. The pass-through slip-form molded and dispensed sleeve reinforcement(s) preferably is embedded-type continuous or free, light weight overlapping non-touching elements; e.g. set or "rings" "coils" (apparatus) having seismic (ground acceleration) S-wave impact, capturing, guiding, attenuating, and canceling characteristics.

The innovative concept that overlapping non-touching high tensile range memory return "rings" "coils", as illustrated in FIG. 42, when combined with a low cost high compressive strength cementitious material(s). The memory return "rings" "coils" apparatus is bound by compressive linking instead of by the prior art reinforcement's "rebar"

tensile continuum. Therefore, an innovative concept of having continuous memory return "coil" "ring" reinforcing methods and apparatuses of having "compressive chaining" is formed to "extrude" and position and place continuous "rings" "coils" reinforcements directly out of natural or synthetic materials instead of using prior art steel, bar, rod like base materials that oxidize and expand, thus eventually destroying the initial structure.

FIG. 42 illustrates the current invention's S-wave impact "ground acceleration canceling technology" properly located and secured inside external containment sleeves depicting the wave canceling "coil" "ring" technology on four sides of the external containment sleeves (Reference Illustrative Embodiment FIG. 42). The current invention encompasses that any combination of memory return "rings" "coils" and or optionally combined with smaller memory return "rings" "coils" may be scaled as needed. In other exemplary embodiments encompasses that the external flexible containment "sleeve" may contain embedded memory return reinforcing elements; e.g. set or "rings" "coils" combined internally with other reinforcement(s) and aggregates as needed that provides additional reinforcement memory return "coils" "rings" around key stress zones, I.E. doors, windows, etc. Reference FIG. 34.

In an exemplary embodiment, the current invention encompasses containment sleeves employing encountered S-wave impact canceling characteristics having non-touching continuous coils apparatus characteristics (geometries) are preferably positioned and secured inside the fabric reinforced external containment sleeve, reference FIG. 42.

The inventive external and internal reinforcement mesh or net "sleeves" may optionally incorporate a synergistic combination of mesh, net, and overlapping non-touching continuous memory return "ring" "coil" reinforcement apparatus having multidimensional, continuous memory return wire and or cable structural reinforcement net/mesh or "ring" "coil" apparatus encompassing many varied and diverse encountered S-wave capturing and guiding configurations having synergistic continuous reinforcement encapsulated in a variety of cementitious mix composites, such as but not limited to a variety of continuous memory return overlapping non-touching rings, curves, loops, turns, coils, spirals, helices, polyhedrons, including other grid works combined with nets/meshes all can provide a variety of strengthening and encountered S-wave canceling characteristics and other reinforcing functions as needed. (Therefore, these terms may be used interchangeably as used herein.) Preferably, the overlapping (non-touching) continuous memory return "coils" "rings" of the current invention which form an effective, contiguous, or efficient multiple-chain like, light weight, semi-flexible S-wave canceling and reinforcement apparatus, as illustrated in FIG. 42 and FIG. 43.

A wide variety of cementitious materials may be bound within each internal "ring" "coil" space, such as cement. The onsite casting materials bind the continuous overlapping (non-touching) memory return "rings"/"coils" together. Closely embedding memory return reinforcement "rings" preferably composed of high tensile strength materials. Depending upon application, preferably (non-touching rings) continuously overlap. The stronger memory return "coils" "rings" materials binds easily with a variety of cementitious materials, slip-form printed constructing a stronger memory return reinforced interlocking brick and the overall reinforced structure. Any "brick" shape or die (mold) can be economically reinforced with additional advantages such as used to reinforce a molded close fitting, composite reinforced concrete "bricks". In this example, smaller continuous "coils" "rings" may provide significant reinforcement coverage in a more stable three-dimensional space that will stabilize, at minimum, along three axes.

Efficient onsite printing of cement mixes depends on the external mesh to provide a suitable bonding surface area on which to contain cement that combines traditional masonry base such as stone and the invention's continuous memory return reinforcing "coils" "rings", (one nonlinear row at a time) as a structural base for efficient onsite printing "bricks" to print a wide variety of reinforced concrete structure(s). However, the external brick reinforcements, mesh, and or "coils" "rings" may employ a much broader selection of graded aggregates than conventional masonry or concrete, as this innovative combination of internal and external reinforcement systems is easily encapsulated with a wide variety of cement mixes. Yet it is this continuous grading of aggregate particles which economically improves the potential strengths for the cement mixtures. Emphasis on this inventive synergy allows for the horizontal and/or vertical slip-form printing of reinforced structures onsite to quickly progress minimizing the tendency of slumping (shrinkage). An object of the invention is to obtain a new synergy of reinforced innovatively positioned slip-form printed construction materials, having an onsite advantage to extend aggregate size range. Primarily, it is the preferred the external employment of containment sleeves having reinforcement "rings" "coils" as a synergistic reinforcement system. These inventive methods and apparatuses encourage all scales of implementation.

FIG. 42) illustrates a series of continuous "Compressive Coils", (overlapping but not touching rings) to construct improved reinforcement zones which "inter-loop" that serve as compressive units for a variety of slip-form printed concrete mixes to encapsulate and thus bind together the overlapping memory return wire and or cables "rings" "coils". Reinforced memory return wire and or cables "rings" "coils". The overlapping of compression zones, between neighboring continuous reinforced memory return wire and or cables "rings" "coils", provides an extension of tensile strength over the entire reinforced printed "brick" element and thus transfers to the whole structure.

The inventor theorizes that by employing continuous overlapping memory return wire and or cables "rings" "coils" reinforcement, as illustrated in FIGS. 42, 43, and 44. Theoretically, the overlapping reinforced memory return wire and or cables "rings" "coils" in a cured cementitious concrete structure captures and transmits the tensile characteristics of the reinforcement from one continuous "ring" "coil" to the next in compound curves, this is significant, since mesh is planar, (that is: it cannot be elastically formed without kinks which may cancel some of the tensile characteristics), and the memory return "rings" "coils" having compound curves are structurally more advantageous, such as reducing the surface area required to enclose a given space. Through such improved curvatures complex sculptural qualities are also possible, and cost may be thus reduced.

Additionally containment "Sleeves" containing internal embedded memory return "coil" "ring" reinforcements such as when printing "bricks" in compound curves can shape reinforced buildings very differently being unrestricted by traditional rigid rectilinear shapes, are hereby quickly and economically build-able using this memory return "ring" "coil" reinforcement system positioned and installed within a wide variety of printed reinforced containment "sleeve" apparatus, such as illustrated in FIG. 42.

The current invention encompasses multiple sizes of memory return reinforcement "rings" "coils", as for example smaller reinforcing "rings" "coils" may replace some or all of the brick's large aggregates as some locations may not have suitable concrete aggregate readily available. As a variation or optionally any combination of the internal and external sleeves having reinforcement mesh/net and or preferably combined with memory return "ring" "coil" reinforcement configurations that might utilize several possible combinations of memory return "ring" "coil" or "mesh" sizes as needed. For denser coverage of "rings" "coils" (or more rings per unit of area) would call for "ring" "coil" of a smaller diameter and gauge having "ring" "coil" as a more efficient additive and or replacement for aggregates. Note reinforcement rings reduce or replace and or improve aggregates performance characteristics such as pre-engineering the "rings" "coils" having suitable sizes and spacings in the manner of concrete aggregates. This advantage depends on comparative shipping costs, between steel and stone, which for some areas, could favor the use of greater proportions of smaller "rings" "coils", and or plastic, metallic, and non-metallic, preferably mineral, i.e. basalt "rings" "coils". Alloys of nitinol, polypropylene and or basalt "rings" "coils" are preferred.

As an example, but not limited to constructing reinforced concrete structures having squared torus geometries offers the advantages of compressive advantages of having arches combined with square floor plans, as it is a circulating barrel vault shape having compressive efficiencies, such as having modified soap bubble architectural characteristics composed of cementitious reinforced concrete and may be constructed onsite to withstand heavy loads I.E. earth-covering, wind loads, hurricanes, snow loads, floods, earthquakes and disasters in general.

Additionally, square-donut architecture offers superior strength and free form architectural creativity for above and below grade reinforced structures (positioned up to about 30 feet deep (below grade) or more if needed) Such structures greatly benefit economically from annualized-geo-thermal storage, AGS (winter-heating and summer-cooling). completely un-buried Squared Donuts architectural designs may be quickly and accurately constructed and adapted having customized arrangements of windows as Squared Donut architecture geometry may be optimized with true arcs (circles) at both center and along the diagonal joints. This provides a compressive-optimization along the interlocking printed "brick" joints of a reinforced concrete building or structure.

Nitinol

A shape-memory alloy (smart metal, memory return metal, memory alloy) that "remembers" its original shape and that when deformed returns to its pre-deformed shape when heated. Preferably, the diameter/gauge of the overlapping reinforced coiled continuous memory return reinforcement wire, cable "ring" "coils", preferably producing about a 90-degree shift or vector change from the encountered impacts frequency (destructive interference), the "ring" "coils" wire and or cable diameter ranges from about 0.0012 inches to about 0.250 inches. Preferably, the diameter of the reinforced memory return continuous S-Wave frequency capturing and nullifying wire, cable "ring" "coils" apparatus range from about 0.14 inches to about 0.20 inches. Preferably, the diameter of the wire, cable "ring" "coils" ranges between about 0.01 inches to about 0.20 inches or scaled as needed to suit a specific application compensating for the encountered S-wave frequency to be captured/attenuated/dampened/nullified. Preferably, the inventive previously unavailable overlapping continuous non-touching "coils" wire or cable are composed of nitinol alloys. Preferably, the overlapping continuous S-wave frequency nullifying wire, cable "ring" "coils", preferably producing about a 90 degree shift or vector change from the encountered S-wave impact frequency (destructive interference), are composed of memory return metals or alloys such as but not limited to Ag—Cd 44/49 at. % Cd; Au—Cd 46.5/50 at. % Cd; Cu—Al—Ni 14/14.5 wt % Al and 3/4.5 wt % Ni; Cu—Sn approx. 15 at % Sn; Cu—Zn 38.5/41.5 wt. % Zn; Cu—Zn—X (X=Si, Al, Sn); Fe—Pt approx. 25 at. % Pt; Mn—Cu 5/35 at % Cu; Fe—Mn—Si; Co—Ni—Al; Co—Ni—Ga; Ni—Fe—Ga; Ti—Nb; Ni—Ti approx. 55-60 wt % Ni; Ni—Ti—Hf; Ni—Ti—Pd; Ni—Mn—Ga, alloys of nitinol are most preferred.

As an example, the Nickel Titanium alloys, in a specified embodiment of the current invention encompasses the memory return process.

In some applications, low oxygen or oxygen free alloys of nitinol are most preferred.

Memory Return Alloys

Both forms of the Nitinol alloys are very strong: having tensile strength up to about 200,000 psi, and are extremely corrosion resistant.

Martensite is about 10,000 to 20,000 psi deformation stress and is able to absorb up to 8% recoverable strain.

Nitinol performance characteristics are specific to the precise composition ratio of the specific alloy and its manufacturing process, and may be adjusted as needed to suit a particular S-wave canceling application, such as but not limited to, structurally reinforcing for encountered impact vortex and frequency capturing and having S-wave seismic event (earthquake) canceling characteristics as disclosed herein.

In this mode of the current invention's use, alloys of nitinol behave like a super spring (memory return), possessing an elastic range about 10-30 times greater than that of normal spring materials. Note, the effect is observed about 0-40 K (0-40° C.; 0-72° F.) above the air temperature.

One can control the temperature in nitinol, but convenient super-elastic temperature ranges are from about −20° C. to +60° C.

Nitinol is typically composed of approximately 50 to 51% nickel by atomic percent (55 to 56% weight percent).

Nitinol of nickel titanium (also known as NiTi) is in the unique class of shape memory alloys. Nitinol memory alloys can be modified to a great extent including changes in alloy ratios composition, mechanical working, and heat treatments as needed.

As for example, the memory return "reinforcement" of the current invention specifications may be specifically engineered and manufactured and installed in an illustrative embodiment of FIG. 44 to meet a wide variety of specific encountered seismic safety characteristics and printed structural conformational tolerances such as, but not limited to having high encountered impact strength. In several exemplary embodiments encompasses that the S-wave frequency capturing and attenuating characteristics of the current invention preferably employing nitinol alloy reinforcements, itself is also encompassed as an apparatus by the present invention.

In several specified embodiments, the internal nitinol "reinforcement" may further prevent random micro cracking during the construction and manufacturing process of printed reinforced concrete structures and furthermore improves the long term (life cycle). In several embodiments encompasses an apparatus such that the nitinol "reinforcement" configurations may be specifically pre-engineered and manufactured to control micro-cracking (shrinkage) in reinforced structures and contribute to the reduction of thermal cracking, and having compatibility with a wide variety of cementitious mixes to suit a specific application or as needed.

Constructing Tension Rings

In other specified embodiments, the current invention encompasses methods and apparatuses for onsite construction of reinforced foundations, footings, and tension rings (not shown), and provides inventive reinforcing "coils" "rings" preferably accurately located within the brick's and structure's stress zones, further including doorways, windows having overhangs, etc.

Viewing Window

The "sleeve" mesh may contain a woven translucent viewing window (into a portion of the sleeves or optionally the entire sleeve) enabling quick visual verification such as the mix's pigment mixing, voids, air pockets, aggregate sizes and uniformity, etc.

As an option or optionally the onsite cast-in-place leave-in-place external reinforced containment "sleeves" of the current invention may encompass that the entire containment sleeve or any portion of the sleeve is composed of translucent or transparent reinforcing filaments provides a see through "viewing port" or "window", preferably woven into a portion of the containment "sleeve", such as having a viewing strip providing visual inspection of the printed "bricks" characteristics, such as visually checking a wide variety of printed mixes' casting characteristics and quality, such as looking for mix uniformity and saturation, aggregate characteristics, bug-holes. This greatly simplifies the printing inspection process (i.e. viewing through the printed external sleeve), and is viable at any point during the cast-in-place 'Brick' slip-forming extrusion process as the 'brick' materials are printed and cured.

Tapering Sleeves

FIG. 32 illustrates one of many possible embodiments of a slip-form molding pass-through printing nozzle assembly simplified and exaggerated for illustrative purposes and may be scaled as needed. As shown in FIG. 32, the printing nozzle assembly optionally may include a right mix feeding nozzle, a central mix feeding nozzle and a left mix feeding nozzle or other mix feeding nozzles as needed.

The width of the molded slip-form printed "brick" layer, respectively, may be varied as needed by adjusting the relative dimensions and separation of these mix input nozzles, either manually by inserting different interchangeable molding chambers or automatically such as under servo control (Not illustrated).

This may be reduced or adjusted as needed during a wider range of pressure settings to ensure that a complete printed "brick" layer is poisoned and extruded. The mix filling pressures may be varied during the "brick" extrusion process to facilitate the construction of structures optionally having progressively thinner walls, or roofs, or to print certain walls, such as interior walls, thinner or thicker (tapering) than other walls or roofs, such as exterior and or interior walls (pressures typically ranging between about 1 to 100 bars, more preferably ranging between about 5 to 50 bars, most preferably ranging between about 15 and 30 bars). Reference FIG. 31. In a specified embodiment encompasses that automated adjustments could also be made to print a "brick's" edge layer thinner or thicker than the other layers as needed or print a single tapering "brick" layer that may taper in any direction as needed. In a specified embodiment encompasses that the current invention may mold and slip-form print onto or around conventional (prior art) fixed or moving concrete mold(s) or as needed.

Folded Sleeves

In other exemplary embodiments encompasses methods and apparatuses such that a pair of separate containment "sleeves", such as in the form of flat sheets may be fed from a dispensing spool to the slip-form apparatus preferably overlapping and folded together (Reference FIG. 40 and FIG. 41 C), and printed and positioned in place to slipform print a single encapsulated "brick", forming an external containment sleeve and may also encompass employing a single "flat" folded sleeve if needed.

As an alternative, a pair of separate external fabric reinforced "sleeves" may be folded together and suitably secured together to form a single external reinforced containment form (sleeve) or a print in place "brick", reference FIG. 37. In several specified embodiments encompasses employing folding a pair of two different sleeves having separately dispensed external reinforcing "sleeves" (not shown) that are preferably simultaneously fed into the slip-form feeding and folding apparatus (Reference FIG. 40-1) that folds the pair of sleeves over each other and secured as needed, preferably just prior being fed into the pre slip-form (folding apparatus) and are subsequently molded and extruded into a single long printed "brick". This is an object of the invention.

In an exemplary embodiment encompasses a single "sleeve" that is folded and secured together to encapsulate a molded and slip-form "brick" Reference FIG. 40.

Multi-Layered Sleeves

In other embodiments, encompasses employing a pair of external containment "sleeves" that are simultaneously or sequentially dispensed from a pair of different dispensing rolls (not shown) that are removably attached to the automated construction printing apparatus. reference FIG. 40.

The sleeve is folded over (overlapping) between about ¼ inch to about 5 inches, more preferably between about ½ inch to about 2 inches (Reference FIGS. 40 and 41) forming a containment sleeve and moldable reinforced form as needed depending upon scale and application.

As an option an external containment "sleeve" having one or more mesh reinforcing layers and having slipform molded sides having the same or different materials and having a wide variety of thin moldable reinforced containment meshes having different curing and reinforcement and adhesion characteristics as needed, reference FIG. 37, as needed onsite when used or employed as an external containment "sleeve" providing for improved mix bonding characteristics between the two or more different external layers of the reinforced cementitious printed "brick" materials having the same or separate mixes as needed. The "sleeves'" cementitious bonding with the "sleeves'" filaments having materials may comprise hybrid and or synthetic plastic materials as for example may be selected from the group consisting of linear low-density polyethylene, ionomers (for example Surlyn®), polyvinyl chloride, ethyl vinyl acetate, ethyl propyl copolymers, polyethylene copolymers, low density polyethylene, their copolymers, vinyl copolymers and mixtures thereof. The mixes' bonding material(s) preferably contains one of more admixtures or additives as needed. As an option or optionally being perforated with a variety of attached filaments. In other specified embodiments encompasses having multi-layered (laminated) "sleeves" or portions of sleeves as needed.

Sleeve Dispensing Cartridge

In a specified embodiment encompasses that the external "sleeves" may be contained and dispensed from a self-contained cartridge (not shown). The external containment sleeves may be compressed and configured (folded) into the form of a dispensing cartridge to be quickly dispensed as needed (not shown). When dispensing molded cast generally tubular containment sleeves the dispensing apparatus may employ a "compressed sleeve" accordion (feeder) (not shown) dispensing containment "sleeves" as an option may be in the form of a reusable or replaceable cartridge. The accordion style dispenser(s) containment "sleeves" generally ranges from about 150 ft. up to about 300 ft. per removably attached dispending cartridge, depending on the sleeves weight and thickness of the sleeves. The inventive removably installable external containment sleeves may be compressed into a variety of insert-able dispensable cartridges of various lengths and dimensions, as needed.

The "sleeves" dispensing apparatus is preferably removably mounted (attached) on the automated mechanized and or robotic slipform printing frame or mechanized and or robotic arm(s), preferably incorporating removably attached spooled sleeves, reference FIG. 40-3, The current invention encompasses that the innovative temporarily connected external containment "sleeve" woven fabric(s) can easily be coated conventionally on normal manufacturing machines with plastics and or synthetic materials in the form of pastes, plastisols, organosoles, solutions, dispersions or latex emulsions as needed having a variety of weaving geometries, reference FIG. 37, in a wide variety of configurations such as with or without creases, gussets, or with expandable folds as needed.

As for example the external sleeve's material composition further contributes to making the (cold joints') adhesion surfaces significantly stronger and further increases the overall printed structure's long-term repair and maintenance life cycle.

Pre-Slip-Former

In a specified embodiment encompasses transferring the pre-slip-former and the slip-former from the mechanized concrete construction printing system to an optional external slip-forming automated construction "arm" having slip-form printing method and vice versa i.e. ranging between external slip-forming, reference FIG. 8, to the internally automated located supporting and operating platforms as disclosed herein to slip-form print, as illustrated in FIG. 22. The automated internally positioned supporting and operating platforms and slipform printing system is preferably located within the proposed structure.

The pre-slip-former (sleeve feeder) of FIG. 40 improves the external reinforcement sleeve folding and "feeder" characteristics to the slip-form printing apparatus of the current invention. The pre-slip-former in (A) horizontal and (B) vertical position or may be angled to simultaneously and/or sequentially slip-form print (cast) long bricks at any angle (position) or derivative therein as needed. When the melting section (bonding) (stitching) of the fabric reinforced containment sleeves may encompasses rotating, the containment sleeve in the same direction and synchronously. The current invention eliminates the need for a separate slip-form printing apparatus to pass-through mold an interlocking keyway(s) further including other molded and printed brick configurations or shapes as needed, such as in the illustrative embodiment of FIG. 26.

The current invention encompasses having single folded and overlapping sleeve or the option of two overlapping sleeves folded and secured together as needed. The current invention encompasses fabric reinforced containment sleeve "brick" packaging is characterized in that said fabric reinforced containment sleeve portion by the melting heat is generated from a hot wire or small hot plate (not shown), and between the adhesive and the reinforced containment sleeve packaging reinforcing fabric of the gap portion further comprises, by means of applying suitable adhesives to the containment sleeve materials setting (adjusting) the heat as needed, depending upon the sleeve's materials, to sufficiently penetrate the thermal barrier portion along the running direction. Note, pressure is applied to the side of the containment sleeve seam on rotating roller which is cooled thus sealing the sleeve's irregularities as needed.

In other specified embodiments encompasses that the method and apparatus encompasses that the inventive "sleeves" may be fed into the automated pre-slip-former, as illustrated in FIG. 40, feeding into a sleeve folding funnel-shaped apparatus. The cast-in-place containment form, that is fed into the pre-slip-former, is folded over inside (overlapping). The same or different extruded containment "sleeves" (Reference FIG. 40) may be cast onsite such as slip-form printed and placed in either horizontal or vertical manner or any angle or derivative thereof.

FIG. 32 is a side view of one illustrative embodiment of the current invention fabric reinforced brick containment sleeve extrusion molding and packaging apparatus. As shown, the interchangeable slipform molding pass-through extrusion (printing) apparatus is characterized in high speed positioning and dispensing of fabric reinforced containment sleeve printed brick products preferably dispensed from the removably attached containment sleeve dispensing roll(s)/spool(s).

The fabric reinforced containment sleeve may be optionally cut off by the edge portion (not shown).

In the said fabric reinforced brick containment sleeve molding and packaging apparatus, the adhesive portion may be optionally cooled by a pair of freely rotating rollers which is cooled seal irregularities (not shown), the irregularities cooled seal rolls in the roll peripheral surface at equal intervals in the circumferential direction of the optional cooling roller is provided along the axially extending a cooling roller unit (not shown); when the gap portion so that the melting of the containment sleeve running between the seal bump on the cooling rollers, by cooling the partially cured portion of the gap (not shown).

The heat-sealing reinforced fabric portion (not shown), upper and lower heat sealing roller (not shown) may be rotatably securing the containment sleeve sandwiched between the upper position of the roller, the rotational speed of the heat seal rollers, and the containment sleeve having traveling speed synchronization. The heat sealing roller peripheral surface of the roller in the circumferential direction at pre-engineered intervals along the roller is mounted axially extending portion of the heating. Since in the heating portion has a built-in heat generating component the heat core (not shown), and thus the heating section becomes a high temperature. (not shown) Two heating units heating through the pair of heat sealing rollers (not shown) of clamp (not shown) from above and below the containment sleeve, melting the fabric containment sleeve (not shown) having pre-engineered sufficient pressure for heat sealing said containment sleeves.

On the overlapped containment sleeve portion is provided with securing means (not shown) such as brick and containment sleeve packaging apparatus having adhesive where the adhesive portions coincide, reference FIG. 28. The containment sleeve melting (gluing) mechanism (not shown) the external fabric reinforced containment sleeve melting means is disposed close to the containment sleeve, thus can adjust the magnitude of the melting current to adjust the heating/melting temperature as needed. While cooling the solidified melt of the containment sleeve of the gap portion, while applying suitable pressure to cool the solidified adhesive, and therefore, to prevent the containment sleeve leaking mix contents or folding open, simultaneously, to achieve the containment sleeve having complete wrapping (encapsulating) effect. Cooling section bump roller (not shown) is adjustably pressurized and thus will not make a deformation of the printed brick.

As mentioned herein, fabric reinforced brick containment sleeve packaging apparatus of the present invention making fabric reinforced molded brick containment sleeves synchronistically, can obtain bonded fabric reinforced containment sleeve, to make a wide variety of reinforced slip-form molded brick products onsite to reduce losses and to maintain a high slip-form pass rate onsite to produce large quantities of reinforced molded and printed brick products on the construction site or in a factory environment. In several embodiments encompasses construction methods and apparatuses to extrude low slump cementitious materials (paste) through the slip-form into a variety of full architectural scale reusable and interchangeable molds for structurally encapsulating a variety of cementitious and non-cementitious materials within the pass-through extrusion molding chamber, outlet port(s), and extruded from the pass-through slip-forming nozzle(s). While slip-form printing bricks extrusions takes place, optionally two such automated mechanisms working in parallel, and feeding into the same slip-form nozzle(s) may provide a continuous or intermittent flow through of structurally reinforced cementitious construction materials preferably having a low slump ranges, ranging between about 0 to 3.0 (note slump values of 3 or more may be used with caution). At the completion of the construction operation, the automated construction system may be cleaned by rinsing with water coming in through the fluid inlet port(s).

As an option the onsite mixer and pump system may be provided with a hydraulic safety relief valve (not shown), where the pressure release stops the mixer and printing system without damage. In other specified embodiments encompasses that the inventive slip-form "printing machine" may optionally be adapted to print along the length of the previous interlocking slip-formed brick layer from the robotic generated propulsion forces, including propelling the slip-form printing machine forward as needed, and may be partially imparted by the mixes' pass-through pumping system and or auger feeders (not shown) to contribute to compensating for commonly encountered mix pumping system's inconsistencies (producing a faster and smoother printed cast).

The automated slip-form printing apparatus may be scaled as needed, and manufactured in a wide variety of sizes and shapes (configurations) to suit a wide variety of slip-form printing applications (Reference FIG. 32) such as incorporating pressure sensors, safety sensors, pneumatic sensors and regulators, temperature sensors, color sensors, air gas ports, sensors etc. In other exemplary embodiments encompasses that the slip-formed casting apparatus (machine) is adapted to travel along the length of the casting bed under the partial propulsion force is imparted from the inventions pumping system in real time, and the slip-form encapsulated external and internal mesh/net reinforced "brick" is positioned and slip-formed on the previous cast layer until sufficiently cured to receive the next interlocking layer. In the method according to the current invention feeding the mix into the feeder hopper to the slip-form casting machine is metered a desired grade of concrete mix, in real time, from the apparatus. A concrete mixing station, wherein the concrete mix to be encapsulated and cast is prepared prior to pouring the mix into the feeder hopper of the slip-form print casting apparatus, delivers synchronized predetermined amounts of a desired grade of concrete mix. The correct amounts of different grades of concrete mix can be computed on the basis of the cross section of the encapsulated reinforced concrete "bricks" being molded (manufactured), positioned, and cast in place, preferably including the predetermined length of the brick casting layer or bed over which the cast concrete mix of desired printed brick size, shape, and grade is to be cast, in real time.

In an exemplary method aspect, the progress of the slip-form extrusion printing apparatus travel is measured and, based on the measurement data, the location of the desired molded "bricks" concrete mix batch as well as the correct slip-formed synchronized delivery instant of the batch are determined. According to the apparatus and methods, also the amount of the concrete mix contained in the pass-through mix pumping system and feeder hoppers may be accurately monitored and automatically adjusted such as employing load cells sensing and indicating the weights of the feeder hoppers' mix, whereupon this information is utilized to determine the incremental "brick" printing length that can be slip-form extrusion printed (cast) using the concrete mix batches contained in the removably attached pass-through pumping systems and feeder hoppers. On the basis of this data, the correct delivery instant of the desired molded printed "bricks" concrete mix(s) batch and, respectively, the accurate delivery instant of the concrete mix from the attached feeder hoppers, can be accurately determined and adjusted in real time. This is an advantage and object of the invention.

The delivery of the concrete mix batches from a concrete mixing system to the attached feeder hoppers to the current invention's slip-form extrusion "brick" printing apparatus takes place by means of printing machinery adapted movable to the casting bed and the automated printing machines so that the concrete mix batches can be transferred from the stationary concrete mix stations to the fixed and or mobile automated a slip-form printing machinery as disclosed herein. By virtue of the data thus collected and indicated in a method aspect, sufficient time is assured for the delivery of the concrete mix batches at a precise instant of time as needed, provided that the location and travel speed of the "brick" slip—form printing (casting) machine plus the distance thereof from the concrete mixing system(s) are known.

In several specified embodiments, the invention relates to a method for slip-form molding such that one or more different concrete mixes may be extruded into a single containment sleeve(s) and movably positioned on a printing path with the help of mix pumps and or auger feeders as providing a portion of the automated motive power imparted from the pump(s) and or the augers imparting to the slip-form printing apparatus.

In a semi-continuously operating extruder, the concrete mix is extruded with the help of auger feeders into slip-former having a wide variety of many possible interchangeable extruded "brick" forming mold(s), whereby the automated printing machine arm(s) are propelled along the printing (casting) path by the reaction forces imposed on by the mix feeding pumps and or the auger feeders. The ready slip-form extrusion "brick" remains on the casting path. Then, this specific wall dictates the brick's internal and external reinforcement(s), reference FIG. 34, their pretension forces (if required) and the concrete mix grade(s) to be used in the printed brick(s). producing concrete mixes of a high grade(s). Such extra time and costs can be reduced, e.g., by way of using a reinforced concrete mix grade(s) individually tailored (adjusted) to meet the specifications of each printed brick layer or section of a layer. This is an object of the invention.

In a method aspect, a single casting path may also be used for casting reinforced concrete "bricks" of different quality or grades by intermittent and continuous extrusion printing if the automated slip-form printing machine is equipped with compartmentalized feeder hoppers (not shown), wherein the pass-through (discharge) of concrete mixes from the different compartments of the feeder hoppers takes place controlled by printing length covered to the printing path.

As an option, a mixer or mixers-extruder assembly(ies) (not shown) may be provided in association with the automated slip-form printing apparatus to allow the components of a fast-curing mix material(s) to be mixed and pumped to the printing head of the slip-form printing apparatus. Construction material (such as but not limited to cementitious materials) may be delivered in powdered and or liquid forms to the slip-form mixer-extruder assembly system, where the powder(s) and or liquid(s) may be mixed and slip-form printing extruded substantially concurrently. The mixer-extruder assembly may be disposed adjacent to a slip-form movable printing head (not shown) of the slip-form printing nozzle preferably configured into position, encapsulated, slip-form molded, and extrude a wide variety of molded "brick" configurations. Note interchangeable molds fit into the slip-former.

The invention's mixer-extruder assembly may include a hollow slip-forming extrusion channel or chamber(s) as disclosed herein as needed. The sealed slip-form printing apparatus (in some configurations) optionally may be manually operated and powered or powered by any practical combination of suitable motive power or power sources.

Feed Hopper Pumps

A feed hopper (FIG. 22) removably connected to the slip-form extrusion chambers having an interchangeable keyway molding channel(s). The interchangeable molding chamber may include an outlet port or ports at its end, and having low slump (paste) inlet port or ports at the other end of the chamber. The hopper(s) having input port(s) configured to receive a variety of input mix material(s) therethrough, and an output port(s) configured to quickly exchange a wide variety of interchangeable slip-form printing "molds" configurations (shapes) having different dimensions and configurations, as illustrated in FIG. 26, such as, but not limited to, a wide variety of shapes and configurations, such as preferably having interlocking keyways, and or receiving channels as needed.

As an option, a slip-form printing nozzle head (shown in FIG. 32) may be removably connected to the outlet port of interchangeable extrusion molding chamber(s). The powdered cementitious materials may be delivered to hopper using conventional conveyors or compressed nitrogen and or air as mix additive and or a transporter. For example, a closed circuit of flexible pass-through hose(s) or tube(s) may be used in which air circulates delivers powdered or premixed cementitious material from a remote reservoir on the construction site to a hopper connected to the automated attached mechanized slip-form printing apparatus having interchangeable mold extrusion chamber. Upon arrival at the hopper, under gravity a high portion of the mix(es) powder(s) in the hopper. When the hopper is full, the arriving material may simply return to the source tank by means of the return pipes or tubing.

Such delivery systems may be tailored to the cementitious fluid(s) or pastes with which they are used, and can include various metering (measuring or dosing) devices and other apparatuses as needed (not shown).

Referring to FIG. 32, the automated apparatus shown therein is a slip-form type printing machine, wherein the concrete mix being encapsulated, molded and printed flows from a feeder hopper onto auger feeders, whose flights during the rotation of the augers propel (pump) the low slump concrete mix onto the automated positioning apparatus and pumping into a removable attached slip-form printing mold. The inventive slip-form printing (machine) apparatus may alternatively or optionally be configured to travel along the length of a previously printed interlocking foundation slip-form printing long bricks preferably interlocking into the previous foundation layer.

As an option, the concrete mix delivery pumping system provides a percentage of the motive power to move the automated robot's arms and slip-form system that automatically adjusts and compensates for these minor erratic printing speeds providing a tunable dynamic response thus eliminating errors and reducing friction.

The motive power applied to the slip-form apparatus will automatically make these micro slip-form printing adjustments to produce smooth continuous and or intermittent slip-form printing of ripple free brick(s) by accurately corresponding to the delivered mix(s) pump's fluctuating pressures cycles and variations of printing speeds as needed. As an alternative to the above-described mixer and pump mechanisms, single or triple, or more, screw pumps having mixing capabilities may be used with the automated molding slip-form printing assembly(ies) described herein or as needed. As an option or alternative the current invention encompasses employing single or multiple pumps or cementitious feeding stations.

The current invention encompasses a preferred cementitious mix pumping range to optimize the slipform and printing characteristics preferably having a mix pumping pressure ranging between about 100 to 2,500 PSI, more preferably ranging between about 600 to 1,200 PSI or as needed, and the preferred volume and pressure ranges may be adjusted as needed depending upon the mix(s) printing speed, scale and specific application. Optionally may employ a variety of pressure sensors from the pumps to the slip-form printer.

The preferred mix slip-formed molding slump ranges between about 0 to 3, most preferred ranging between about 0.50 to 2.00 depending upon application.

In other specified embodiments, the invention's methods and apparatus encompasses removably attached adjustable vibrating system located on augers, hopper(s) and hoses for pass-through delivering of a wide variety of slumps within the disclosed and preferred range from the hopper to the slip-former. Dual augers are preferred.

The preferred cementitious mixes' vibration rates range between about 500 to 4,000 pulses per minute, more preferred ranges between about 1,200 to 2,200 per minute or adjusted to suit the specific mix pressures and flow rates as needed. Slip-form printing 60 feet of encapsulated brick per minute or about 30 cubic feet per minute ranging between 0.010 to 5.0 cubic ft. per second more preferably ranging between 1.0 to 5.0 cubic ft. per second or adjusted as needed depending upon the application.

As an option or optionally the current invention in a method aspect may employ printing different cementitious or other printable mixes simultaneously using two or three smaller cement pumps per automated robotic printing systems depending upon the specific application thus efficiently constructing with a variety of different concrete mixes and grades, such as accurately onsite slip-forming that within the prior art has been unobtainable, including casting highly complex cementitious mixes Vibrations/Pulses In a specified embodiment encompasses that the inventive automated slip-form printing methods and apparatuses having a wide variety of attachment devices preferred vibration rates of the cementitious materials is adjustable between about 500 to 4,000 pulses per minute, more preferably ranging between about 1,200 to 2,200 pulses per minute or adjusting the vibration rates as needed depending upon the mix pumping distance elevations and location(s) and volumes.

In an exemplary embodiment encompasses that the drive system encompasses having apparatus that preferably vibrates the mixes pass-through hoses, tubes, augers and hoppers ranging between about 500 to 4,000, more preferably between about 1,200 to 2,200 pulses per minute to maintain the "mix" in a pumpable semi-fluid state compacted and maintain the pass-through feeding from the hopper through the slip-form machine and out the slip-former with improved reliability with less power consumption.

Brick Printing

In other embodiments encompasses methods and apparatuses for replacing or mimicking traditional prior art mud bricks commonly called squinching configurations, designs, and patterns (Reference the illustrative embodiments in FIGS. 14, 15, 16, 17, 18, 19, 20, and 21) or having varying "brick" slip-formed "cast" at a variety of angles or wedges etc. as needed and scaled as needed. As is apparent from an examination of FIG. 32, the slip-form printing nozzle(s) assembly may be moved horizontally each time being elevated in height by approximately the thickness of each extruded brick layer. The collective effect is to print foundations, footings, walls and or roofs of a wide variety of structures consisting of a stacked set of separately reinforced extruded encapsulated layers or bricks, thus is potentially suitable for replacing all concrete construction casting including brick, block and mud-brick "squinching".

As a variation, the thickness of the molded brick is basically the resolution (speed of wall construction) by slip-forming with fabric reinforced "bricks" layers having taller heights. Thus, every time a taller brick layer is cast, the speed of construction is increased, and the construction time required to construct each layer decreases as the thickness of the brick (layer) increases. The current invention is capable and wider, higher (taller) bricks having improved placement accuracy and design flexibility than the prior art such as, Contour Crafting and Apis Cor; further providing a higher speed of onsite construction.

The innovatively slip-formed bricks of the current invention additionally having sharper edges than prior art 3D House Printing systems. Reference FIG. 6, and FIG. 7. For example. Free-form and highly complex architectural geometries also become conceivable and economically obtainable.

Multi-Pass

In a specified embodiment encompasses a reinforced multi-pass concrete construction method that optionally may include printing a first layer of two parallel equally spaced apart "bricks". After extruding the first layer of parallel "bricks" then sequentially printing the internally positioned s-shaped printed layer. From the side, the s-shaped printed layer resembles cardboard.

As an option each multi-pass cast brick directly or indirectly, along with a first layer of optional cementitious or other mix filler in between the s-shaped interior in between the two, parallel layer(s) of bricks. As for example, a multi-pass printed wall may include a set of equally spaced apart printed bricks, each composed of a set of internal s-shaped sequentially printed extruded brick layers; and as an optional the cementitious or other fillers maybe pumped in between the external and internal reinforced encapsulated multi-pass interlocking bricks comprised of a set of separately extruded interlocking multi-pass brick layers.

Such simultaneous mixing and extruding methods may alleviate some of the difficulties of building structures with extruded reinforced cementitious "brick" material(s). One fundamental aspect is that the "brick" materials should cure sufficiently fast enough to sustain and support the weight of the next printed brick's weight added at the progressive slip-formed cast "brick" layers or stages, reference FIGS. 25, 32, and 39, however, the printed "brick" material(s) should not cure too fast because it may solidify inside the mix's material storage and delivery systems, such as tanks, flow meters, pumps, extruders, hoses, tubes, and the slip-former(s), further including interchangeable molds. Note, many conventional concrete pumping systems usually deliver low slump concrete mixes, which is relatively easy to pump and or extrude.

In other specified embodiments encompasses a method and apparatuses to reduce the required time of curing and to shorten the required setting or curing time between each slip-form reinforced printed "brick" layer FIG. 26 depicts in an exemplary illustrative embodiment depicts 24 of many possible printed brick configurations.

The current invention encompasses a wide variety of interchangeable molds (Reference FIG. 26) such as replicating a wide variety of decorative bricks and stone, block work that allows the simultaneous layers of cementitious materials bonding of different "brick" materials as needed.

The current invention encompasses a brick-positioning (placement) precision of (±0.5 mm), more preferably a repeated positioning precision (±0.1-0.2 mm). As an option or variation the current invention encompasses that the automated reinforced concrete construction system can slip-form print extruded long bricks as small as about 1-inch wide by 1-inch high and up to about 14 by 14 inches. In an exemplary embodiment encompasses that the scaled-up extrusion-based printing process demonstrates that the strength of the onsite slip-formed concrete (cementitious) materials is equal to or greater than the equivalent strength of a conventional concrete cast.

The process may be applied to a wide variety of reinforced concrete slip-formed brick construction techniques instead of conventional flat-layered techniques in order to achieve smoother and stronger surfaces, including load bearing-type component. The current invention minimizes the common need for re-working concrete bonding surfaces, providing improved slip-form casts "bricks" in less time and further improves the mix compaction. The current invention's methods and apparatus thus in most applications eliminates the prior art's use of sand blasting, chipping or other joint surface preparations.

Note, preferably the "brick" is positioned with its interlocking keyway bonding surface protruding into the next printed brick face. Slip-forms near monolithic formed embossment or groove "bricks" including having dissimilar interlocking edgings with no weak cold joints or faces. The "bricks" function as interlocking box beams having integral interlocking key way extending into intersecting joints having improved structural support and stress displacement having improved inter-engaging edge sections between integral inter-fitting means IE face to face tongue and groove (key way) having for printing vertical and horizontal structural members as needed.

As a variation, the concrete construction system reads a file, and then constructs that into a physical structure one "brick" layer at a time. As an option may encompass the application (spraying) of cementitious bonding materials in between each slip-formed "brick" printed layer (cold joints) or in between each "brick" layers as needed to improve bonding characteristics such as but not limited to under water construction can also resist the heat of the tropics/deserts and freeze-thaw cycles in frigid climates.

After the last "brick" edge layers are extruded, as an option the next pass may extrude only a central filler layer, thus completing the wall structure.

In other specified embodiments, the filler layers can be two or more layers behind the neighboring "brick" edge layers. Indeed, none of the filler layers might be extruded until after all or at least several, of the "brick" edge layers have been extruded and sufficiently cured (hardened). In this embodiment, the entire "brick" wall filler or at least a large portion of it could be extruded in a single pass.

By sufficiently delaying (proper timing) the extrusion of filler (layer or layers) helps insure that the "brick" edge layers will be sufficiently strong enough (shear strength) to contain their neighboring filler layers as needed. Of course, the slip-forming extrusion system of each filler layer need not always or ever be exactly one traverse behind the extrusion of each neighboring "brick" edge layer. Thus provides simultaneously multi cementitious mixes feeds (feeding ports), to the slip-form (top feed) nozzles and the side feeds.

The filler may be of a much stronger material, such as, but not limited to high performance cement(s).

Interchangeable Molds

As an option or optionally the concrete construction apparatus mechanized arm(s) may employ a wide variety of and/or combinations of different scaled and configured slip-form interchangeable reusable slip-form dies, molds, FIG. 26 illustrates 24 of the many possible mold configurations, to suit a wide variety of onsite concrete construction applications as needed.

FIG. 32 illustrates a slip-form nozzle apparatus with a removable replaceable molding tray(s) having slots in a gate being used to shape and extrude having a keyway(s) (for interlocking separate "brick" layers). As shown in FIG. 32, a gate(s) includes receiving slots that cause corresponding receiving interlocking keyways to be molded and printed during the extrusion process. This method aspect may create a variety of different interlocking "bricks" having bonding faces (interlocking keyway channels) such as interlocking ribs, thus further strengthening the extruded "brick" interlocking layers. This is an object of the invention.

In several embodiments encompasses a wide variety of interchangeable slip-form (brick molds) for a wide variety of reinforced concrete construction applications onsite or in a factory environment as needed. A wide variety of quickly installed and removable slip-form molds further including conventional and custom "brick" designs and configurations, Reference FIG. 26, to provide new onsite or factory environment slip-forming possibilities and opportunities having quick installation and change (removable) of any slip-forming molds and all molds fit the slip-form apparatus.

The slip-form printing apparatus may employ a wide variety of interchangeable slip-form molds for slip-form printing a wide variety of hardenable materials containing similar or dissimilar mix materials members in any printed "brick" section, that ranges from about 1-inch wide by 1 inch high up to about 2.5 feet wide by 2.5 feet high or as needed, preferably ranging from about 4 inches by 4 inches to 12 inches by 12 inches or scaled as needed. The "printing" slip-form provides a wide variety of "brick" configurations that previously were unable to be "printed" in real time on the construction site, reference FIG. 26. The current invention methods and apparatuses eliminates the need for a separate mold (slip-form) to cast a keyway or other printed "bricks" having receiving grooves.

As an example the surfaces of the slip-form molds are illustrated (Reference FIG. 32) and having a key way, other contours may be used such as slip-form casting "bricks" having reinforcement mesh for settable material providing a wide variety of inter-locking features such as face-to-face tongue and groove, and provides for 'brick' printing, stacking, inter-engaging edge joint, edge, and faces having interlocking keyway, thus providing a wide variety of possible configurations to provide a previously unavailable full architectural scale high speed slip-form printing possibilities, preferably having elements inter-fitting or abutting to construct complex designs such as having thickness variations, or dissimilar ornamental elements forming patterns as needed.

Optionally having sections between integral inter-fitting means extending into intersecting joints between (1) brick or block courses, or (2) individual adjacent or interlocking bricks or blocks preferably designed for interlocking stacking (e.g. keyway on top and bottom surface). The printed concrete (cementitious) bricks may include complex exterior surfaces to permit different types of edges and faces for keyway interlocking, mortises, or key and mortise on opposed faces or edges, having multiple, finite, and continuous interlocking keys or curvature of the final structure, FIG. 26 illustrates some of the many possible configurations. As an option the interlocking keyway may be designed and configured for four direction lock having locking type characteristics; i.e. against lateral separation forces such as having opposed keyway projections abutting features and or multiple, finite and continuous keys, mortises, or key and mortise on opposed faces or edges. The printed "brick(s)" internal reinforced structure may be pre-engineered to significantly lower the brick's weight, and increase the strength and other characteristics required at stress points for a particular application and may introduce entirely new specialized "brick" types with feature engaging forms and or edge-embracing characteristics as needed in the art.

As an example, the reinforced brick(s) construction joints are easily "printed" in place with the inventive slip-form printing methods and apparatus. Either side of the molded and printed "brick" as an option produces an interlocking keyway for the bonding with the "brick" abutting printed faces, particularly when the mix is of a pre-engineered slump range or viscosity to cause small pre-engineered protrusions of the mix to project through the containment sleeve filaments or mesh having specifically pre-engineered venting apertures to the opposite side producing the pre-engineered venting characteristics as to produce the improved bonding surfaces between each layer-wise printed brick for improving the interlocking key for the adjoining printed "brick" reinforced surface(s) interface, thus eliminating the prior art steps of sand blasting, chipping, and other common cementitious joint bonding preparations. Preferably the keyway is positioned with its bonding surfaces protruding into the printed face that is printed first improving the brick(s) inter-locking characteristics.

The present invention relates to a method of packaging "bricks": having a wide variety of external containment sleeves folded and shaped into a reinforced substantially mold conforming sleeve, said reinforcing sleeve extending from both ends of the printed brick. As an option the current invention may encompass a variety of fabric films that may be employed, such as compound fabric film, aluminum foil, paper, or a composite fabric films. Herein, the term "brick", understood to include: The term "brick" should be understood as "a piece of "brick"," because in a package there may be more than the brick of the invention can be used packaging. The term "tubular" should not be understood only as "cylindrical", in the present invention, the cross-section is square, rectangular or other shapes also referred to as "tube." In general, the shape of the external sleeve is determined by the shape of the mold employed.

In a specified embodiment encompasses that the doubly curved "bricks" optionally having hollow cores and fiber encapsulated, having single or multiple hollow cavity and filling hollow or channel module forms hollow enclosure (e.g. tubular) optionally having mortise with internal space from variety of molds/dies for hardenable materials for such as settable material receiving modules, mutually bonded by internal settable material section, are printed complete with conformal voids inside to be later filled as an option depositing additional materials forming bonds with a variety of fillers as needed. Hollow blocks arranged to form passageway having means (e.g., hollow form or core) void-forming sections cavity, insulating core, or cell in wall(s).

Mandrels

As an option, the pre-slip-form section of the slip-form printing apparatus may incorporate a wide variety of interchangeable internal reinforcing nets preferably positioned by a variety of core-shaping mandrel(s) (not shown) that positions and shapes the internal reinforcing net(s) apparatus or optionally printing hollow-core "bricks" (not shown) having cavities to be printed in the hollow-core of the "brick". Mandrel shapes may include but are not limited to round, oval, ellipse, kidney, rectangular, square, star, hexagon, etc. as needed. As an option or variation, the inventive three-dimensional concrete casting system may slip-form reinforced hollow concrete brick "shells" to later be filled in as needed. The external reinforcing containment "sleeve's" having various shapes, prepared by the current invention, can be applied for construction by feeding the internal containment nets from the pre-slip-form into the slip-form printer positioned by the controlling mandrel to make reinforced or non-reinforced slip-formed printed (cast) hollow sections inside the printed "bricks" or "blocks" as needed.

In other specified embodiments encompasses methods and apparatuses for "casting" slip-form printed hollow ports or tubes in slip-form extruded printed walls, roofs in a variety of concrete structures, and further encompassing slip-form (printing), above grade and or below grade, variety of foundations having hollow pipes or tubes, as for an example slip-form printing (extruding) hollow tubes (pipes) such as for air filtering and or temperature regulating systems commonly referred to as earth tubes, heat exchangers, cooling tubes, tube venting apparatuses, etc. having a wide variety of lengths, diameters, shapes, materials, compositions, as needed for a wide variety of applications.

Slip-Form Printing

The versatile brick slip-form printing apparatus having a variety of configurations of the current invention, provides many significant improvements over the prior art concrete construction techniques such as the construction system having but not limited to a smaller size (envelope) (footprint), lower power consumption, lower manufacturing cost, longer service life, ease of assembly improved performance and reliability, and printing flexibility (construction flexibility), having a significantly lower tool cost and maintenance, optional sizes (scaled), in a specified embodiment encompasses that a particular model or version of the automated concrete construction system is preferably designed and manufactured to be easily operated within the operator's ergonomic zone thus minimizing motions, as an alternative or as a variation of the current invention provides adjustable casting speeds up to 60 ft per minute (1 ft of brick per second), and is simple and easy to work with on the construction site, even by unskilled labor. FIG. 32 depicts in an exemplary illustrative embodiment one of many possible slipform printing configurations encompassed by the current invention.

The current invention further encompasses a 'synchronized' automated brick containment sleeve packing machine, the slip-form printed brick packaging machine comprising a variety of different reusable interchangeable brick slip-form molds, reference FIG. 26, having extrusion outlet means downstream of the interchangeable slip-form molds, wherein the slip-form printing steps comprises, when each of the containment sleeve packaging material enclosing the molded reinforced printed brick passing through the inside of the slip-form printer. Reference FIG. 32.

More specifically, the current invention encompasses a system and method for simultaneously molding and printing an externally fabric reinforced slip-form printed brick onsite is described. A strip of reinforcing fabric sleeve material is extruded from one end of the slip-form to control the flow (speed) of the mix molding during the brick fabric reinforced encapsulation and printing process that the metering mix pump such as the slip-form printing and simultaneous placement of the long brick is synchronized and the said containment sleeve is simultaneously slip-form printed and adjustably compressed together (molded) from all directions, thereby enabling the fast reinforced brick encapsulation process, as needed.

In combination, a slip-forming fabric reinforcing brick containment sleeve and automated encasing machine comprising onsite molding, a mix metering pump (not shown) in removably connected communication with a source of brick mix products and having an outlet nozzle extending therefrom to continuously or intermittently pump a cementitious mix filled fabric reinforced containment sleeve encapsulated printed brick product there through in real time.

As an example of the diversity and versatility of the slip-form printing system, the current invention encompasses methods and apparatuses for an onsite slip-form printing system having a removably attached bottom door (plate) that dispenses a specified sized and dimensioned external reinforced containment "sleeve" for regulating/dispensing the "sleeves" "bottom" to meet the desired structural and conformational tolerances for self-adjusting filling/pumping of the external containment form, and as an option conforming to uneven or variable onsite ground/soil conditions such as when slipform printing a reinforced foundation as needed.

For example, as the printing speed of the current invention's slip-form apparatus extrusion characteristics change, such as the extrusion nozzle pressure (speeds) being adjusted, for example as the printing nozzle navigates around small radiuses (small corners), the low slump cementitious "paste" flow through rate needs to be reduced, which in the prior art have proven troublesome in which low slump settable/curable cementitious fluids or pastes are applied in slip-form printing (cast) contours.

The slip-formers assembly may include one or more nozzle(s) configured to extrude cementitious and or non-cementitious materials (received from the material feeding system) through an outlet or outlets, and a slip-form printer(s) provides sufficient pressure to the printed bricks configured to mold and shape cementitious or non-cementitious printed brick material(s) extruded by the nozzle or nozzles. And having means for selectively moving said support slip-form printing apparatus so that the inlet end of one of said fabric reinforced containment sleeve is placed in operative communication with said molding and slip-form printing head (outlet nozzle) and so that the other containment sleeve is moved into a loading position to enable a fabric reinforced containment sleeve to be molded and slip-form printed therein.

In optional embodiments side trowels and/or channel protrusions may also be present in molding (shaping) form printed "brick" structures may be attached to side walls to help shape (mold) the flow of extruding material as it exits the slip-form printing nozzle as the cementitious material moves in through inlet and outlet.

The innovative slip-form printer apparatus can be adjustably tapered to pressurize the concrete material with a variety of interchangeable, slip-form's mold or molding dies, for example having a male key or having a female key way in a wide variety of different printed brick configurations and scaled as needed, (reference FIG. 26).

In other specified embodiment encompasses a continuous and non-continuous (intermittent) slip-form printing method and apparatus for printing onsite in real time a wide variety of shaped and configured molded printed "bricks" formed by extrusion process from the molded shape(s) from the slip-form printer, as needed. When used for this purpose, the natural action of the print-in-place encapsulated printed "bricks" maintains the continuity of stress resisting capabilities from one reinforced brick layer to another.

As an option or optionally the slipformer of the current invention may be rotated with respect to the slip-form housing so that the inlet end of one of the fabric reinforced containment sleeves is placed in operative engagement with the slip-former is in communication with the inlet end of the fabric reinforced external containment sleeve. The other fabric reinforced sleeves dispensed (fed) within the slip-former or the combination of sleeves dispensed (fed) within the slip-former is in an onsite printing loading position when the said one folded over and overlapped fabric reinforced sleeve is in the dispensed encasing position (Reference FIGS. 40-6 and 40-7)). Adjustment means is provided for imparting small rotational movements from the slip-form to the fabric reinforced containment sleeve which is in engagement therewith. Means is also provided for maintaining the support member and fabric reinforced containment sleeves in pre-selected positions relative to the slip-former.

The apparatus and method having adjustment means is provided for selectively moving said support slip-form printed brick members in various synchronized positions of its movement such as but not limited to interchangeable slip-form printing from an automated in a vertical or horizontal arrangement having a variety of adjustable/removable attachment means held in position.

Because of the precision involved in positioning, the present invention encompasses that an adaptive fine positioning platform optionally equipped with a sensing mechanism (e.g., a laser or acoustical tracker) may be used for positioning the automated robotic reinforced concrete construction apparatus, and having the slip-form printer extrusion nozzle(s) positioning and motions systems optionally. Use standard program control set: code upload, choosing printing (slip-form) full architectural scale 3-dimensional envelope, including cylindrical coordinates calculation, linkage to a chosen printing (slip-form) location, having acceleration and printing speed control. As an option or optionally the slip-form printing apparatus of the current invention further encompasses having pressure and pneumatic sensors and regulators as needed.

In other specified embodiments encompasses that the first portion of the second link (Note: the links may be made of any suitable materials such as metal such as iron, steel, or aluminum, carbon, plastics, resins, composites, etc.) comprises means for use for removably attaching a variety of tool(s) or utility devices thereto, and may have two or more linear actuators, when activated virtually simultaneously, can accurately impart a curvilinear trajectory to the link(s) as needed.

Optionally a gyroscope and or laser rangefinder(s) may be employed to accurately direct and synchronistically position the slip-form extrusion printing head on site in real-time, an optional PID controller may be employed for accurate 3-dimensional spatial stabilization and monitoring. Note the gyroscope and or laser rangefinder(s) are used for extrusion head position tracking contributing to adjusting the tunable dynamic response in real time, additionally the PID controller may be used for obtaining improved accurate spatial stabilization. Software is used for controlling the printer head, preferably with formatted files under OS Windows by TCP protocol.

The slip-form printer extruder of the current invention preferably rotates in two or more planes further encompassing a large slip-form printing zone of up to virtually unlimited square feet and having virtually no height limitation. The horizontal direction of the slip-form printing nozzle assembly at the end of a pass may be altered by 90 to 200 degrees into the direction of the next print. This can construct an extruded slip-form printed wall or roof having sharp right angles or bends. Obviously, other types of changes in the printing angle and direction(s) may be used to construct other structures such as slip-form printed foundations, footings, walls and roofs etc., additionally including large open span structures having curved flowing walls, including walls that join or overlap one another at angles other than 90 degrees or any derivative therein as needed, reference FIGS. 8, 9, 10, 11, and 12.

The current invention encompasses that the height elevation of the slip-form printer may be controlled by the slip-form position controller (not shown), which, as disclosed herein, may include servo (motor) and slip-form linkage(s) as needed. The height of the slip-form printer(s) may be easily and quickly adjusted to correspond to the desired height of the positioned and slip-form cast "brick" layer that is printed (extruded). By making the height of the slip-form printer(s) adjustable, slip-form molded printed brick layers of different thickness may be slip-form positioned and extruded as needed.

The height of the exterior slip-form printer and the interior slip-form printer may, in turn be controlled by slip-form printing apparatus' position and controllers respectively. Positioning precision and repeated positioning precision of about (±0.5 mm) and repeated positioning precision of about (0.1-0.2 mm). The current invention encompasses several apparatuses and positioning systems for constructing a wide variety of reinforced concrete structures ranging from a simplified manually operated slip-form printing apparatus to a fully automated slip-form printing apparatus for simplifying progressive and or phased onsite concrete construction.

In a specified embodiment encompasses that the inventive automated slip-form system may be employed with other mechanized and or robotic construction apparatuses as needed. As an option the slip-form printer may be mechanically assisted or as a variation may be software and robotically controlled or assisted in any combination as needed. In other configurations of the current invention automated construction system having one or more servo motors, solenoids, pneumatic actuators, hydraulic actuators, or other automated controlling devices may be used to make the slip-form extrusion port or ports adjustable, optionally having manually adjustable mechanisms. In still other implementations, the slip-form printing nozzle assembly may incorporate more than one outlet or extrusion/flow ports, if needed.

The current invention further encompasses a slip-form printing apparatus that reduces many prior art complex steps, and simultaneously provides multi-mix printing for onsite casting, and feeds the mix into a wide variety of reusable interchangeable molding cartridge(s), as illustrated in FIG. 26, of the current invention that provides a wide variety of previously unavailable reusable full architectural scale interchangeable molds (brick shapes).

In several embodiments encompasses that the printed "brick" layers to sufficiently cure and thus sufficiently harden. Various methods and approaches such as thermal and chemical may be used if needed to speed up (adjust) the "brick" printing and curing process. For example, a torch, hot air blower, steam, air, nitrogen gas, radio or microwave energy sources may be removably attached to the slip-form printing assembly and or pre-slip-form assembly (not shown) to treat the extruded cast-able materials and or speed up or improve the curing characteristics and rates. Depending upon application, a judicious choice of "sleeve" material(s) and configurations may also be made for the printed "brick" surfaces that cures quickly such as plastics, or other hybrid materials.

As an option or variation of the invention encompasses slip-form printing systems having a multi-nozzle assembly (Reference FIG. 32) may include a first nozzle configured to extrude cementitious and or non-cementitious material(s) through a first outlet; a second nozzle configured to extrude cementitious and or non-cementitious material(s) through a second outlet; and a third nozzle configured to extrude cementitious and or non-cementitious material(s) through a third outlet, or the optional fourth outlet.

In a method aspect, according to the current invention, the selected concrete mix is cast homogeneously in a given cross section of the printed bricks, as for example in a longitudinal direction of the casting bed, or as required. Among others, the current invention offers the following significant advantages. Use of optimized-grade concrete gives savings in the consumption of extra amounts of cement and admixtures Use of a higher-grade or such as but not limited to fiber reinforced type of concrete mix allows elimination of reinforcing bars, rods, cables otherwise required for a given individual section of concrete structure. Replaced by an inexpensive, encapsulated, reinforced "brick" being constructed (printed) from the automated slip-form apparatus.

As an option a two, three, or four compartment slip-form printing apparatus, Reference FIG. 32, wherein two to four different brick layers (contiguous sections) of brick may be simultaneous cast encapsulated into "bricks" positioned layer-wise interlocking one another in order to construct a desired structure. As for example, the different printed concrete layers (brick) may be fed from different feed hoppers and, conventionally, all the hoppers are filled with the same concrete mix grade. In exceptional cases, a different concrete grade such as suitable for making high performance printed "bricks", for instance, is interlocking printed into either the top or bottom layers of the printed "bricks" wall or the structure layers thereof. In the prior-art method, each one of the printed concrete mix layers is compacted separately.

As a simultaneous or sequential option slip-form printing of extruded bricks each being encapsulated in separate containment sleeves. (Not Shown). Reference FIG. 32 that illustrates multi (four) (cement mix) nozzles feeding ports. As an option or variation of the current invention encompasses a slip-form printing nozzle assembly simultaneous printing filling a four section sleeve with four separate mixes using the same nozzle to extrude a wall section composed of printed "bricks" with optional insulation being extruded by a slip-form printing nozzle assembly that includes a stacked set of printed insulating layers is characterized in that, before slip-form printing a brick having external containment sleeve enclosing the extruded printed brick package.

The current invention's apparatus and method for filling the disclosed reinforced containment sleeves and defining their corresponding casting shapes, volumes, and printing rates simplifies the prior art complex measurements, particularly when constructing complex curvilinear structures.

In a specified embodiment encompasses analog slip-form printing system, having horizontal and vertical slip-form printing positions, producing (printing) smooth flowing transitions and joints during construction.

The inventive apparatus and components accurately controls the construction printing process to conform to a wide variety of pre-engineered reinforced concrete specifications, such as time and cost-effective layer-wise construction of "Free-Style" reinforced concrete structures with leave-in-place and cast-in-place printing "brick" components to meet a wide variety of engineered specifications The slip-form printer may be quickly changed from left to right extrusion (discharged) for slip-form printing "casting" smoother and sharper brick edges and tighter corners or radiuses than the prior art.

The current invention's construction methods may incorporate adjusting (tapering) the keyway slip-form(s) to print tapered walls and or roofs during the construction process as needed (not shown).

Although the surfaces of the interchangeable slip-form brick molds and the underneath surfaces are illustrated as being generally flat or having a keyway, other contours may be used as needed.

The construction system is particularly efficient when used for slip-form printing joints, particularly when constructing large concrete blocks or rafts, i.e. foundations, walls, etc. and is compatible with a wide variety of prior art air formed (pneumatic) structures, such as when constructing foundations, roofs, walls, etc. Due to the previously unavailable containment "sleeves" (flexible molding form's) print-in-place materials and structure and grid, it aids in the controlled, even dissipation of the concrete mix's heat of hydration, and cracking due to this cause. When used for this purpose, the external "sleeve" maintains the continuity of stress resisting capabilities as needed in the art.

In several specified embodiments encompasses a variety of construction techniques may also be employed in a semi-automated manner, if necessary, to mold and shape (slip-form print) into a containment "sleeve" casting a wide variety of "bricks" configurations to construct a wide variety of reinforced concrete structures such as but not limited to printing short span temporary "brick" arches or other configurations onsite up to about 4 to 5 feet long, buttresses, awnings, a variety of overhangs, stairs, etc. in a method aspect, the reinforced cementitious materials may furthermore be printed on top of conventional concrete forms and or the surrounding wall(s) if necessary. Prior art concrete extrusion (printing) technology suffers from the limitations of being unable to construct unsupported overhangs. This is overcome by the inventive reinforced concrete slip-form printing methods employing a separate printed temporary support material or structure to temporarily support the overhang (not shown). Afterwards, this temporary support is removed. A similar structural bridging approach may be used to construct window or door openings. A roof may similarly be constructed by placing conventional concrete forms and a series of neighboring structural reinforcement members such as reinforcement bars, rod, and or cable across the top walls of a structure, over which cementitious material(s) may be printed from the current invention the automated slip-form printing apparatus providing sufficient strength and esthetic form to the structure.

As an option balconies, stairs, walls, roofs, etc., reference FIGS. 8, 9, 10, 11, 23, and 31, can be slip-form printed optionally employing colored (embedded pigment) concrete thus, in many applications, making painting unnecessary, as well as later renovation painting, as through colored concrete grades can be used, additionally walls having a number of openings can be printed from a special grade concrete mix having greater strength and to reduce or eliminate cracking.

The current invention overcomes prior art limitations and other issues related to the design of workable reinforced concrete, ranging between (zero slump) to a three slump, such as self-consolidating concrete, and may be used for both new construction and rehabilitation. Any type of suitable material may be used and delivered into the slip-form printer's inlet(s), including a variety of cements or plastics. The printing materials may be delivered to the slip-form printer in a semi-liquid low-slump (paste) or slip-form printed with slumps ranging between about 0.00 to 3.00, preferably ranging between 0.00 to 2.50, and may include or receive a wide variety of cementitious additives or may have characteristics that regulate the mix material(s) to sufficiently harden into a solid shortly after extrusion.

One option is to use curing retardant or curing stimulating additives to control the desired curing rate and time(s) of the slipform printed "brick" layers. Preferably, the mixer-extruder assembly may provide solutions as for example, by delivering concrete (or other cementitious materials) in powder form near the automated slip-form printing nozzle head, and then mixing and extruding the "brick" material substantially concurrently, thus providing a faster and shorter printing path.

As an option, the concrete paste (low slump) is preferably fed to the slip-form printing apparatus then to supply sufficient adjustable vibration and pressure in to the molding cavity to remove excess water and to obtain sufficient molding and compaction of the cementitious concrete as needed.

Viscous cementitious fluids and low-slump pastes having solid aggregates or large particles have proven to be problematic for fluid or semi-pastes delivery devices and systems of the prior art, often resulting in malfunctioning and clogging of pumps and valves and or damaging the aggregates contained therein.

The current invention significantly expands the onsite variety of printable (castable) cementitious materials mixes, including aggregates over the prior art mix ranges, castings "slip-forming" printing of multi mixes.

The slip-form apparatus can simultaneously vibrate and pressurize the concrete mix and other cementitious materials as needed. The concrete pump (feeding system) may provide sufficient adjustable pressure within the slip-form printing apparatus as disclosed herein for pre-engineered compression of the specific concrete mix, improving the "brick" compaction and shortening the curing process (set time).

As an example, the semi-liquid (high viscosity) concrete mix (paste) is preferably pumped into the automated slip-form apparatus that supplies pre-engineered vibration rates and pressure rates to obtain optimized compaction rates of the concrete mix(es).

As an option, the concrete pump mix (feeding system) provides adjustable vibration rates and pressure rates inside the slip-form pass-through molding apparatus for uniformity and sufficient compression of a wide variety of reinforced cementitious materials (concrete) controlled by pre-engineered conditions responsive means shaped and strengthened by vibration and pressure and as an option may further include a vacuum pump for improving the mix characteristics as needed and shortening the curing process (set time).

In an exemplary embodiment encompasses methods and apparatus in the form of an external containment "sleeve" that automatically compensates for commonly encountered mix inconsistencies in virtually all delivered cementitious "mixes" such as, from mixing equipment, pumping pressures, mix temperatures, pumping distances, ambient temperature and humidity, different mixes, and when adjusting the vibration and pumping rates or speeds, having different external sleeve characteristics and sizes as needed. Additionally, by corresponding to the delivered mix(s) pump's fluctuating pressure cycles and variable speed control(s) as needed. As an option controlled by condition responsive means having shaped or strengthened by vibrations and fluid pressure rates or as needed. As an option or optionally encompasses a pressure release valve located in the slip-form that additionally stops the automated construction apparatus The inventive self-feeding slip-form apparatus (machine) will position onsite and slip-form encapsulated long "bricks" as fast as the cement mix(es) is fed into the hopper(s)' fluid guiding receiving port (not shown), producing a smooth and constant or highly variable printing rates, as needed. Thus, requiring less re-working and rendering a superior printed product onsite with less operating cost and time.

As an option or optionally a separator may be inserted prior to or during casting of two adjacent concrete sections if required (not shown).

If the "brick" edge layers are able to be sufficiently cured rapidly enough, and if their length is sufficiently long enough, the slip-form nozzle assembly may be able to return to the beginning of a printing pass to extrude the next printed layer of "brick" edges on top of the previous cast "brick" layer as soon as extrusion of the previous layer is complete. If the "brick" curing is sufficiently rapid enough, the slip-form printing assembly optionally may be directed to extrude its next "brick" layers of material during the traverse return. Other optional construction sequences may also be followed, including sufficient curing time between traverses as needed. This process system may be repeated until the height of the "brick" wall and or roof reaches the desired level. FIG. 39 illustrates the slip-form wall(s) having multi-printed layers.

Mix Feeding Hoses/Nozzles

FIG. 32 illustrates an embodiment of a slip-form extrusion nozzle assembly that includes four nozzles that may be scaled as needed.

Although slip-form printer nozzle assemblies optionally having four input nozzles (three are illustrated), it is to be understood that a different number of nozzles could be used, depending upon the application, such as having one, two, three, four (not illustrated) or more input nozzles as needed.

The slip-form printed reinforced "sleeve" surface materials smooths the exterior surface of the cast brick material(s) as it is pressurized, vibrated, molded, encapsulated, positioned, and extruded from the slip-form printing nozzle.

In other embodiments of the slip-form nozzle assembly having variable width nozzles. As an example, printing in this manner, the type of construction mix materials that is delivered to the slip-forms exterior input nozzle(s) and the interior input nozzle(s) may be different from the mix materials that is delivered to the central input nozzle or as needed.

The current invention encompasses a wide variety of onsite operational automated cementitious mix delivery systems characteristics such as having external removably attached hoses and or tubes that are quickly and easily accessible and or interchangeable, etc. (not shown) preferably having pre-engineered spaced apart vibration generating apparatuses (not shown) as disclosed herein.

FIG. 32 illustrates an embodiment of the slip-form printing nozzle assembly being used to print wall and or roof, etc.

As shown in FIG. 32 the printing nozzle assembly is extruding layers of reinforced concrete materials while being positioned in a generally horizontal direction.

As shown in FIG. 32, a first layer of an encapsulated "brick" wall may be extruded by moving the slip-form printing nozzle assembly in a horizontal direction and by pumping mix materials through the exterior nozzle and the interior nozzle. As an example, during this pass, no mix materials may be extruded from the central nozzle as required. Note this method and apparatus may be employed to cast hollow walls such as but not limited to foundations, box beams, hollow bricks, pipes, gutters, etc.

FIG. 32 illustrates one embodiment of a slip-form printing extrusion nozzle being used to slip-form a printed "brick" wall. This embodiment allows the beginning and end of each extruded "brick" layer may be conformed and shaped with sharp vertical surface if needed.

As an option or optionally the nozzle assembly provides a servo (motor) optionally may control the positions and height of the central slip-form printing nozzle assembly with respect to the exterior nozzle and the interior nozzle (not shown). This may include a belt drive that causes ball screws (not shown) to rotate and to thus cause a corresponding change in the elevation of the central slip-form (not shown).

As an option or variation of the current invention the slip-form nozzle may be used to extrude an insulation layer (not shown). In this embodiment, an insulating material optionally may be fed through an electrically heated tube so that molten plastic comes out through a printing nozzle. Optionally, compressed air or other gases may be mixed in as well to cause a section of insulation/foam to be positioned. One or more of these optional layers may serve as insulation. Other types of insulation or other materials may be used as needed.

The inventive apparatus provides a quick access for (changing) the mix(s) transport tube(s), hose(s) for ease of cleaning and de-clogging or replacement, preferably having a variety of quick connect and disconnect features. The tube feed system can be rotated to quickly switch to delivering different mixes feeding into the automated slip-form printer (not shown). The removable quick-change internal hoses "tubes" are easily rotated to reduce operating time, costs, and replaceable delivery tubes for pumping a variety of cementitious materials to the automated pre-slip-form and/or the slip-form printer as needed.

The mix material delivery tubes' hose(s) (not shown) through an independent routing approach by means of the automated active or passive modular articulated arm(s). The advantage of this innovative reinforced concrete construction system is derived by preferably positioned within and operating (constructing) within the proposed structure (or room) in a specified embodiment is reduction in the hose length (and shorter arms) and the possibility of using shorter and or larger diameter hoses, which would be problematic to route through conventional cable carriers (because of large diameter and large radius of the bend).

In another specified embodiment, each outer hoses or tube(s) may include four interior hoses or tubes, allowing a similar or different type of material (mixes) to be delivered to the slip-form printing outlet.

FIG. 22 illustrates a slip-form printer nozzle assembly having an orientation control mechanism being used to construct a free span or unsupported (supportless) roof or structures.

FIG. 27 illustrates how the printed bricks' (cast) receiving grooves or receiving channels ensures that the slip-form printing nozzle assembly does not collide with the installed reinforcing bars, cables, and or rods members during construction operations. Another embodiment of a slip-forming assembly further includes printing "bricks" having receiving channels or grooves for accurately positioning a wide variety of reinforcement bars, rods, and or cables, that accurately accommodates ease of accurate positioning and securement for a variety of reinforcement members, preferably in their pre-engineered stress zones.

In a further embodiment of the current invention encompasses a slip-form printing nozzle assembly including a controllable front and rear gate(s). A printing nozzle assembly including a controllable, front gate(s) and a controllable rear gate(s). The controllable gate(s) may be controlled by a gate controller, such as a servo (motor) and employing quick coupling. Similarly, the controllable gate(s) may be controlled by a gating controlling mechanism(s) such as a servo (motor) and an associated manual and automated control mechanism as needed.

In several specified embodiments encompasses that, depending upon the application, servos (motors) may be used to control the position and height of the slip-form printer(s). A servo (motor) may be used to control a slip-form printer's internal gate(s) or valve(s) (not shown) that is used to regulate the pressure and flow rates of mix material(s) to the slip-form printing nozzle. Similarly, a servo (motor) may be used to control a slip-form printer's internal gate valve(s) (not shown) that is used to regulate the pressure and flow rates of wide variety of mix materials to the slip-form printing nozzle. The flow of mix material to the slip-form printer's central nozzle may also be regulated in a similar or different manner as needed. When slip-form printing a curved wall having a small radius the edge "brick" mix material delivery rate may be different for the slip-form printer's exterior and interior pass-through feeding outlets.

This may be accomplished by appropriate adjustable settings of the servo (motors). The adjustable regulating valve(s) (not shown) as an option may be removably attached to or remote from the slip-form printing nozzle as needed. The slip-form regulating gate valve(s) may be configured to controllably adjust the slip-form printing rate and adjusting pressures and volume of mix flow, including completely cutting the flow off.

Slip-Form Printing at any Angle

As an option the slip-form printing nozzle assembly optionally may include orientation control mechanisms that may control the slip-form printing head to be angled in virtually any angle or direction as needed. As an option any type of control mechanisms may be employed, including monitoring and feedback controlling mechanism(s) that are capable of orienting the slip-form printing head in one, two, or three degrees of freedom. With respect to the slip-form printer's nozzle assembly, an orientation control mechanism may be selected that allows the slip-form printer head to be oriented in three dimensions. The slip-form printer's orientation control mechanism(s) may include automated and or manual adjustment(s) having adjustable locks and or servos (motors), each optionally controlling a separate axis of orientation. Of course, appropriate internal structures may be included to translate the motion of these servos (motors) into the necessary printing speeds and movement(s) as needed.

The slip-form molding and printing apparatus of the current invention encompasses brick slip-form printing a wide variety of brick designs and configurations such as but not limited to mimicking or replicating squinching (mud brick) structures. Reference FIGS. 14, 15, 16, 17, 18, 19, 20, and 21.

In other specified embodiments encompasses that the containment "sleeve's" apparatus' mesh or ribs of the brick may be slip-form printed and placed (cast) in either a vertical or horizontal position, or any combination or derivative therein, dependent on the selected slump range and the preferred containment sleeve, including the orientation of the supporting structure, the pitch of the roof, and or employing a temporary supporting structure.

Automated Construction System

In an exemplary embodiment the current invention preferably encompasses versatile reverse construction technique(s) that enables shorter, faster, accurate onsite construction of reinforced concrete brick printed structures, preferably positioning and slip-form printing from the inside (the room or structure) to the outside and is particularly useful and advantageous when constructing in inclement weather reducing the risk of damaging or destroying onsite construction tools, materials, and discouraging theft. This inventive reinforced concrete construction system has several advantages, most notably it has added stiffness and having a shorter carrying path from the mixes source by employing a more efficient reverse construction method and apparatus thus having a shorter delivery distance that would be difficult or impossible to achieve using prior art printing systems, and further encompasses quick change of mixes, and the construction of more complex shapes, geometries, thus being able to print from more angles.

The current invention's advantages are significant, since the reinforced concrete construction industry can make use of previously unavailable high-speed extrusion printing and deposition processes, or any combination to allow for a wider choice of mix materials, methods, and printing options, further including slipform printing of a variety of structurally reinforced components.

The current invention has further advantages such as but not limited to providing fully adjustable reversible and variable slip-form printing speeds onsite, having smaller and simpler assembly onsite with lower weights and sizes, in some of many possible configurations of the reconfigurable automated construction systems additionally having interchangeable or reconfigurable parts and components costing less and, in an optional version the multi-purpose robotic systems preferably made of lightweight materials and scaled as needed.

Two of the current invention's automated construction systems are compact, and easily transported in a small truck.

Having with adjunctive means for ease of fast onsite assembly or disassembly in less than 30 minutes having easy assembly as preferably the heaviest component/part weighs less than about 70 pounds, with the exception of the automated supporting operational platforms and or pedestals.

As an option or optionally most models or variations of the current invention's reinforced concrete construction apparatus fold into itself and collapse into itself for ease of transport and assembly, Reference FIGS. 45 and 46.

The automated slip-form system primarily uses standard cement construction machinery and mix delivery components, reference FIG. 8 and FIG. 22.

The speed of the automated reinforced concrete construction system is another significant advantage, and the construction process (speed) improves with operator's practice.

The slip-form printing apparatus (machine) preferably has a variable speed drive control system to change the printing system's operational speeds as needed.

The current invention is more convenient to operate and may stop or start concrete construction at any time during the slip-form printing process (casting) thus minimizing the time and labor, and may optionally operate multiple slipform printing construction systems simultaneously or sequentially in the same construction environment having simpler methods for regulating the slip-form printing processes, further having lower labor costs. This simple, time-saving concrete construction tool does not require highly skilled labor. The high speed of construction and lower skill requirements reduce time and labor costs.

In an exemplary embodiment encompasses that any suitable form of mechanized or multi-purpose robotic system(s) may be encompassed by the current invention. Reference FIGS. 8, 22, 29, 30, 45, 46, 47, and 48.

The current invention encompasses a wide variety of mechanized and robotic designs, variations, and systems may be employed within the scope of the current invention, reference FIG. 30.

The automated construction system and attachment tools has a low manufacturing cost and long service life cycle, and are usable for constructing hundreds of structures onsite without requiring any significant maintenance nor repairs. The current invention encompasses several varieties of the supporting and operating platforms, pedestals, or bases that are scaled as needed. Reference FIGS. 45, 49, and 50.

Some of the automated construction systems may employ an optional adjustable counter weight or counter balance apparatus, depending upon the individual printing system. Note, the motor location may contribute to counter balance system (not illustrated).

Furthermore the automated construction systems of the current invention encompass a variety of multi-purpose supporting and operating pedestals, platforms, and bases and scalable components such as but not limited to GPS location device, a variety of mounting fixtures as needed, having attaching means pivots or includes pivoting actuating means, a collapsible and demountable position adjusting means e.g. leveling that may optionally be adjusted to print at different angles and elevations as needed.

The current invention construction apparatus and methods encompass the construction of reinforced concrete structures in confined space (sites) such as when slip-form printing around trees, boulders, power lines, including other common onsite objects, employing novel techniques, particularly for complex small-scale worksites. This is an object of the invention In other specified embodiments encompasses inventive concrete construction methods and apparatuses that shortens the distance and carrying path, and simultaneously minimizes motions and thus significantly reduces time and labor cost, such as having accurate full-scale three-dimensional movements under the control of appropriate motion controllers.

For example, the two linear actuators when activated simultaneously can impart a curvilinear trajectory to the mechanized arm(s)' link.

By cycling the multi-purpose automated construction system in this manner with the removably attached slip-form printing apparatus, the structures' foundation and walls is quickly slip-form printed (assembled) in full architectural scale 3-dimensional space on the construction site or in a factory environment having structural junctions accurately and precisely defined, and having structural reinforcement being accurately located and positioning within slipform molded receiving grooves or channels, and their junctions being securely affixed.

Rather than being tied to a traditional three-axis system, the automated construction system "brick" printer optionally has several rotating supporting and operating bases or pedestals and having mechanized crane-like arms that rotate and swivel in all directions, printing entire brick structures from the inside out rather than manufacturing individual walls that require manual assembly on the construction site providing a significantly more economical approach for mobile and or on-site 3D construction printing, and presenting a viable and economic way to sustain global housing needs of the future, reference FIG. 22.

The adjustable slip-form positioning and printing system is preferably removably attached to the automated arms and may be quickly changed from slip-form printing in a left hand to right hand printing manner for slip-form "printing", particularly for slip-form printing small radiuses (tighter curves), circles, bends, ovals, ovoid ellipse shapes, and curvilinear geometries for guiding a wide variety of slip-form printing apparatus(es) as disclosed herein.

The current invention's methods and apparatuses significantly improves the prior art's slip-form printing capabilities.

As an option or optionally the automated construction system may employ an acoustic navigation system for accurately locating fixed and moving quadrants in real time to accurately position the automated construction system in three-dimensional space, as needed.

As an alternative or as an option of the invention the construction system apparatus may be simplified (not shown) to be powered and or manually operated and or mechanically operated and or pneumatically powered or assisted as needed such as operated i.e. by a manually hand cranked apparatus such as by an operator turning a steering wheel.

As a non-limiting example of a manually operated (hand crank) construction system (not shown) to promote the required motions such as to rotating and elevating the mechanized system arm(s).

As an option the simplified construction system's components (not shown) may employ having means to engage hand or cable-type lifting positioning means.

As an example of one of the many possible construction system apparatuses (not shown) may be manually operated and or mechanically operated, such as having or employing pulleys and cams, and or pneumatically assisted, and may further be assembled with a variety of adjustable fastening devices with lifting or handling means for primary components or assembly.

In an exemplary embodiment encompasses, FIG. 45 illustrates, one of many possible simplified versions of the construction apparatuses having extended mechanized arms optionally may employ a "one way" ratcheting system with a control switch or button for neutralizing and or reversing the construction apparatus, and optionally may employ a neutral position or switch, a neutral "set" position for making quick onsite adjustments and or re-positioning and or changing and or removal.

As an alternative or variation of the current invention's methods and apparatuses may be designed to impart ergonomic "feel" to the operator, and improves human interface characteristics, potentially improving the operational printing processes.

The automated construction system is preferably operated onsite by a single operator, or optionally by a pair of operators, and optionally no operators (completely automated computer controlled robotic construction system).

The construction methods and apparatus of the current invention may be simplified and or designed for low skilled labor for a wide variety of concrete construction operations such as retrofitting, refurbishing, repairs, seismic upgrading a wide variety of pre-existing structures etc.

In other specified embodiments encompasses that the invention's method(s) and apparatus(es) provides previously unavailable unique features and designs, minimizes the skill and training time, improves operational characteristics, and reduces or potentially eliminates many common prior art onsite construction errors.

The invention's (analogue) guide arms may be quickly adjusted to compensate for these minor errors onsite, and to make necessary corrections and adjustments, such as returning to the construction stopped point during the construction process as needed.

As an option, the current invention encompasses that the automated actuation components can further be equipped with optionally personal security devices so that only designated users can assemble and/or operate the automated construction system of the current invention.

As an option or variation of the current invention a reinforced concrete construction having a multi-purpose robotic manipulator that may be removably attached on a variety of supporting and operating pedestals or platforms as disclosed herein, such as having onsite assembly of guide rails, that moves on the guide rail system. The concrete construction tool's removably attached manipulator(s) may be used for placing reinforcement, plumbing, electrical, or other modules as needed.

The reinforced concrete construction system is configured of elements and mechanical motions and arranged transfer mechanisms for moving a fluidic slip-form printing delivery assembly accurately in three-dimensional space (volume) defined by an X axis in the direction of the guide rail apparatus.

As an option the automated mechanized arm "joints" may be adjusted or moved from 0 degrees to 180 degrees and or to 360 degrees or more as needed. Note the mechanized arms elbow arm joints may be re-positioned (moved) or adjusted ranging from 0 to 180 degrees or any derivative therein.

The current invention's automated construction system can be used to accurately locate and position a wide variety of structural and non-structural (ornamental) architectural components at any point during the printing construction process.

In another exemplary embodiment encompasses slip-form printing pre-made reinforced concrete sections, such as manufactured off site in a factory environment, which are subsequently shipped and assembled onsite into the final structure.

Guide Wheel System

As an option or optionally the current invention may encompasses that the automated construction system encompasses a slipform supporting guiding wheel system that is scaled as needed depending upon application, for a variety of construction operations for accurately guiding the extended slip-form printing apparatus encompassing a slip-form printing supporting and guiding system that employs removably attached supporting and guiding wheels (not shown) that are tightly in contact with the previously printed brick layer or layers. One or more attachment members may extend from points along the slipform guide apparatus' frame or structure. Preferably the slip-form frame or structure may have an optional supporting and guiding wheel(s) system removably affixed there to. The optional guide wheel system (not shown) improves 3-dimensional accuracy of the automated extending mechanized and or robotic arm's printing head when the wheels are tightly in contact with the previously printed "brick" surface(s), as an option, if needed, in contact with one to three previously printed brick layers. Optionally an adaptive positioning system may be removably attached to the slip-form printing frame or housing, in order to compensate for small dimensional errors, so that all of the guide wheels around the slipform(s) are kept in contact with the proposed printed structure.

In other specified embodiments encompasses a construction method and apparatus that employs a supporting and guiding wheel system that as a further option may be removably attached or secured to the slip-form printing apparatus and as an option may employ a male or female guiding groove that provides a positioning and guiding apparatus for the slip-form printing apparatus, such as having two or more wheels engaging either side of the protruding male interlocking system or employing tracking wheel(s) positioned within the female interlocking groove having one adjustable printer guiding wheel in the front and or one adjustable printer guiding wheel in the back of the slipform printing apparatus, the front location is preferred. Note the printed "brick's" male or female interlocking keyway provides an improved guide wheel receiving channel or groove for having improved guide wheel direction guidance and stability.

As an option the slip-form wheel guiding apparatus (not shown) may employ adjustable and or telescoping suspension system.

Flexible polyurethane wheels are preferred.

Armatron Supporting Wheel

As an option or optionally when constructing reinforced concrete structures having open spans over about 50 ft. in diameter a robotic supporting "arm" system is preferably employed preferably having self-adjusting supporting and guiding wheel(s) apparatus having 3-dimensional full architectural scale adjustment systems that may be removably attached to the end effector of the construction system (not shown).

The optional supporting arm having guiding wheel(s) may be used to support the automated slip-form printing system up to about 110 feet in diameter depending upon the configuration.

Which may be manipulated to deliver the end effector and attachment(s), such as but not limited to the slip-form "brick" slip-form printing apparatus to the correct 3-dimensional location(s), particularly when employing multi-parallel slip-form printers simultaneously slip-form printing "bricks". Note that when slip-form printing structures onsite larger than about 45 to 50 feet in diameter requires a supporting and wheel guiding apparatus.

As an option the mounted adjustable automated supporting wheel or wheels system (not shown) allows the guiding movement independently guiding the entire slipform printing machine without disturbing the newly printed "brick" section or layers. Flexible polyurethane wheels are preferred.

Guide Rail System

An automated transport train is driven by drive stations positioned along a guide rail track system for frictionally contacting side plates on the automated transport train. The adjustable drive speed is controlled in response to sensors located at each drive station sensing a position of a wheel and a side plate for accurately confirming the presence of the automated robotic transport train. A start command is transmitted from the drive station driving the robotic guiding train having a operating platform for the multi-purpose robotic system to a second drive station downstream when a lead robotic car is within a preselected distance from the second drive station. After receiving the train, the second drive station then transmits a command to the first drive station for decelerating of the drive station the multi-purpose robotic system operating platform to a stop.

The prior art transport systems are not energy efficient per weight-distance of material transported, also having limited hill climbing ability, and are dangerous because of potential of operator error.

The drivers need to be of sufficient weight so that the rotary drive tire makes contact with the onsite stationary installed guide rail.

The current invention encompasses a method of moving automated operating cars employing a stationary friction drive tire having advantages over conventional transport systems.

The current invention encompasses a lightweight automated guide rail construction platform and system that offers an innovative alternative to conventional material transport systems, and provides for the transport of the current invention's automated slip-form printing system and associated construction equipment and materials using a single or series of connected cars.

In a specified embodiment of the current invention, herein using the automated transport system by way of example, provides improved control through inter-drive station communications providing the ability of one drive station to simultaneously communicate both train speed and positioning data to synchronize drive stations. A high speed accurate communications network is preferably employed, which may move along a light rail track apparatus in a loop from a loading site to a slip-form printing construction site, and back to the material(s) loading point without stopping.

In a method aspect of the invention may comprise controlling movement of an automated construction system removably attached to a transport train system traveling along a guide rail track system, wherein the transport train and operating system is driven by a plurality of drive stations preferably positioned along the guide rail track apparatus.

FIG. 8 and FIG. 38 illustrates guide rail (track) arrangements operable with a control system of the current invention. The transition from one drive station to another is preferably synchronized.

As illustrated by way of example with reference to FIG. 8, the desired speed may be a load speed, a travelling printing speed, a fixed printing sped or duration, or an unload speed as is appropriate for the onsite location of the automated transport train printing apparatus having various adjustable speeds of the drive tire at the applicable drive station may include an initial speed at which the automated transport train is loaded, acceleration to a next speed for movement of the loaded automated transport train downstream for onsite printing, deceleration of the loaded automated transport train to a next speed for a printing construction thereof, acceleration of the unloaded train to the next speed, and deceleration of the automated construction system transport train to the initial speed for again loading the automated construction system transport train.

The automated transport train system can be made as long as is needed by merely adding more intermediate cars and more drive stations. An automated construction system transport train will always be in contact with a drive station to maintain control.

By way of example with regard to automated construction system's loading and unloading, prior to loading, the automated construction system transport train must decelerate to printing speed. The point at which the automated transport train begins deceleration is empirically determined considering drive weight, size, and braking capability. After completion of the construction printing, the automated transport train must accelerate when the final car of the automated transport train has been loaded and progressed to the next drive station.

The automated transport train system automated construction system having removably securable positioning and operating platforms is accurately sensed using a position sensing unit having plurality of position sensors arrayed in the direction of the automated transport train travel. The sensors respond to the presence and absence of a detection element on each train car, the detection apparatus being longer than the spacing between adjacent position sensors. A confirmed count of an automated transport train car passing the position sensing unit requires detection of a series of related position sensor activations and deactivations. Optionally, the position sensing unit senses data tags secured to the automated transport train cars, reading unique identifiers therefrom. A list of identifiers corresponding to the automated construction system car order is stored and compared to the identifiers read in order to determine the accurate train and supporting and operating platform position.

In view of the foregoing, it is an object of the present invention to provide improved automated construction system and methods for sensing transport train position(s). According to an embodiment of the present invention, an automated construction system transport train system comprises a guide rail track apparatus extending in a travel direction, one or more cars riding on the guide rail track apparatus and removably connected to form an automated construction system transport train system, a position sensing unit, and a programmable logic controller (PLC) in signal communication with the position sensing unit providing a tunable dynamic response method and apparatus and configured to determine the automated construction system accurate train positions based on inputs therefrom.

The position sensing unit includes a data tag reader arranged along the automated construction system guide rail track apparatus and operable to sense each of the plurality of data tags in sequence and read the unique identifiers therefrom. The programmable logic controller stores a list of the unique identifiers corresponding to the automated construction system car and is configured to determine an automated construction system transport train accurate position based on inputs from the position sensing unit and the stored list.

DETAILED DESCRIPTION

Referring to FIG. 8, according to the present invention the automated construction system transport train system includes an easily onsite assembled guide rail track system for transporting one or more automated construction system transport train(s) thereon. The guide rail track system extends in a travel direction and the automated construction system transport train or trains may be driven in (forward) and counter to (reverse) the travel direction by one or more drive stations. A plurality of position sensing units each determines the positions of the automated construction system transport train or trains. A programmable logic controller (PLC) is in signal communication with the drive stations and position sensing units, and is configured to accurately drive the automated construction system transport train with drive stations based on the train positions for accurately determined by the position sensing units.

The automated construction system guide rail track system preferably includes a pair of generally parallel rails, reference FIG. 8, although other possible automated construction system guide rail track system configurations may be employed, reference FIG. 38. The automated construction system guide rail track may be arranged in a continuous loop or have discrete start and end points. Optionally, the automated construction system guide rail track system may have separate and distinct branches, elevated sections, inverted sections, etc. Essentially, the present invention may be employed with virtually any automated construction system guide rail track system configuration.

The automated construction system transport train system includes a plurality of cars connected sequentially. Although only two cars are depicted for economy of illustration, the automated construction system transport train systems composed of more or fewer cars may also be employed.

The determination of the automated construction system transport "train position," as used herein, refers generally to the accurate determination of the physical location of the automated construction system located on the transport train in real time, such as train velocity and train acceleration/deceleration. The present invention is primarily focused on improved systems and methods for determining the automated construction system transport train position; the methods by which the PLC uses the determined train position to control trains can vary considerably within the scope of the present invention.

While the foregoing represents an improved system for reliably and accurately determining the automated construction system location including the train's position, the present invention is not necessarily limited thereto.

The current invention can transport said automated printing construction system over longer distances than the prior art due to reduced cumulative belt tension.

There is therefore a need to provide a more energy efficient and cost-effective system for automated transporting of reinforced concrete construction equipment over long distances.

Preferably, the light weight guide rail track system is a aluminum, plastic guide rail track system. Preferably, the wheels are plastic wheels arranged to run on the guide rail track system.

In an alternative form of the invention, the automated construction train system may be partially or wholly driven by linear motors spaced apart along the track and operable on the automated construction system carriages.

In some embodiments of the invention, pairs of plastic wheels in each automated construction system carriage are connected by a live axle.

In an alternative form of the invention, the automated construction system guide rail track comprises a monorail track (not shown) and idler rollers are provided depending downwardly from each automated construction system carriage to engage the side of the monorail track.

In one preferred form of the invention, the rail conveyor system is formed by providing an automated construction system guide rail track system which may either be mounted on the ground or on sleepers.

There are many different ways, for example by supporting the automated construction system rails on spaced apart frames or on pylons as needed.

Typically, two conductor plates are attached to each support carriage i.e. one on each side of the cable, preferably a linear electric motor is used to provide sufficient propulsive force to the conductor plates in the manner well-known for linear electrical drives.

It is also desirable to use wire or cable having tunable (adjustable) dynamic tension monitoring systems to integrate into the electrical control system for the distributed drive systems.

Normally the wire or cable is retained, and used to maintain the carriage spacing when the drive belt is being driven. In an alternative version, the wire or cable may be omitted altogether.

In many ways, the belt drive technology is superior over both the linear electric drives and the centralized drive systems described herein in delivering maximum available power to the transport system.

In this manner, the automated construction system guide rail system according to the invention combines the primary advantages of both belt and guide rail systems.

The automated construction system guide rail system also provides the option of using a distributed drive system to reduce loadings on many components in the system, having faster assembly, more flexible routing of the transport train including smaller radius horizontal curves, quieter operation, ease of maintenance and improved monitoring, and the ability to accurately position and operate the automated construction system more efficiently in low and higher onsite temperatures. The automated construction system having slip-form printing from a guide rail system for reinforced concrete construction method and apparatus is preferably controlled and operated onsite preferably operated from the outside of the proposed onsite structure, and optionally operated from the inside of the onsite structure, reference FIG. 38.

FIG. 38 illustrates four of many possible automated construction system configurations having several supporting and operating platform(s) may be slidably mounted to the rail(s), and the slipform printing nozzle assembly (shown only partially in FIG. 8 and FIG. 22) may be removably attached in such a way that the printing nozzle assembly follows the motion of the automated construction system apparatus positioned on to a variety of removably attached supporting and operating platform(s) as disclosed herein.

The invention's apparatus, or apparatuses may be removably mounted such as, employed on guide rails or a slidable operating tracking system, Reference FIG. 8, and FIG. 38, optionally may have a plurality of (multiple) multi-purpose robotic arms and optional yokes as needed. The slidably mounted guide rail system having supporting and operating apparatus or system may be quickly positioned and assembled on the construction site and serves as the temporary, reusable support and guiding apparatus and operating platform for the automated concrete construction systems.

The automated guide rail system of the current invention encompasses generally ranging between about 5 to 100 meters, or scaled as needed depending upon the application.

In a specified embodiment, the current invention encompasses movably/slidably mounting/positioning the automated concrete construction system, reference FIGS. 8 and 38, on guide rails onsite providing a variety of supporting and operating platforms having slip-form printing characteristics with optional combined synchronized motions of rail conveying system and the automated slip-form printing system both moving synchronously as needed and may be scaled as needed.

The automated guide rail system provides rail advantages such as slip-form printing on an upside, slip-form printing on a downside; printing at a variety of angles and printing at certain speeds, providing the ability to slip-form print on a sloped grade up to about 22 degrees (up or down), and further provides the automated construction system a transportable, easily assembled and disassembled onsite guide rail system removably attached to one or more operating platform(s) having improved accurate speed and acceleration and deceleration and accurate stopping control, reference FIG. 8.

In an exemplary embodiment, the current invention encompasses methods and apparatuses to quickly and cost effectively slip-form printing wind and sand fixation/intrusion walls (sand stopping) onsite for the desertification control of sand.

As an option or variation of the current invention encompasses a mechanized and or multi-purpose robotic onsite slip-form printing apparatus or system that includes a movable mechanized and or robotic apparatus to control the speeds and positions of the slip-form extrusion printing apparatus. An automatic construction system having mechanized and or robotic supporting systems may, as an example, include a movable mechanized and or robot slip-form printing system having mechanized flexibly extending arm or arms. As an example slidably mounted on a paired guide rail(s), reference FIG. 38, and having a manually operated movable platform (mounted and secured on the ground to which a complete automated slip-form printing apparatus and printing nozzle assembly apparatus is removably attached, or as an option, removably mounted on a supporting and operating pedestal(s), Reference FIGS. 29, 30, and 45, an auger, reference FIG. 50 A, a sleeve reinforced hole, reference FIG. 50 B, a pedestal cover, a collapsible trailer Reference FIG. 47, or a tractor, Reference FIG. 48. The transportable automated robotic system may have a beam that is supported by, and extends between, at least two side members that are slidably mounted on paired guide rails.

The inventive concrete construction apparatus may be mounted on a slidable mounted, transportable guide rail, Reference FIGS. 8 and 38, attached to the ground, floor, pedestals, reference FIGS. 49 and 50, etc. for being mounting and operating.

In the embodiment illustrated in FIGS. 29, 30, 45, and 49 the construction apparatus may include a pre-cast fixed and or transportable operating and supporting pedestal and or other suitable platform(s) preferably having a cross-member(s) that is slidably mounted, preferably the innovative automated reinforced concrete construction apparatus or system described herein that can be quickly and easily assembled and disassembled onsite. The mechanized and or robotic supporting platform(s) may have an extension platform that holds the materials (concrete batch, beams, tools, plumbing and electrical modules, etc.) (Not illustrated) as needed.

In several embodiments, the automated guide rails system and apparatus and methods of the current invention may move infrequently, and accurately stop at pre-selected positions while the slip-form construction takes place at those positions. While the automated construction system is stopped at a given position and the supporting and operating platform is held at the given position, all necessary construction at that platform may be performed, for slip-form printing "brick" layers, or as needed. This onsite slip-form construction cycle may be repeated until completion of the structure. For very large structures, multiple and or different supporting platform(s) assemblies may be used in simultaneous or sequential slipform printing operations as needed.

Walls

The current invention method and apparatus quickly constructs linear and non-linear (curved) near monolithic printed walls, reference FIG. 31, and or roofs or any combination.

Reinforced concrete walls have long been employed in construction as retainer walls. Concrete walls are also used as barrier walls along property lines, and as aesthetic features in industrial or commercial landscaping, reference FIG. 31. The need for reinforced durable, fast, cost effective concrete printed walls also arises to prevent erosion along the periphery of manmade lakes, and along, river banks and coast lines, further including fast cost-effective construction of sand fixating/intrusion walls (sand stopping).

The slip-form printing machine may be adapted to travel along the length of the casting wall under the propulsion force imparted from the auger feeders and the cast "brick" is left in place on the previous layer.

The current invention encompasses a fabric reinforced external containment sleeve for automated slipform molding and printing of interlocking brick walls preferably having a danier ranging between about 50 to 1200 danier, more preferably ranging between about 100 to 800 danier, most preferably ranging between about 350 to 700 danier for onsite slip-form printing flexible reinforced containment sleeves having sizes up to about 10 to 15 inches in diameter, reference FIG. 28 B, or as needed depending upon the application. Flexible reinforcing polypropylene and basalt materials are most preferred.

Another significant advantage over the prior art is that the current invention provides two or more planes for printing due to rotating extruder printing head that quickly prints sloping walls horizontally and vertically, further encompassing a rail guide system, thus providing more architectural and construction possibilities having rotating slip-form extrusion (printing) head that allows onsite printing sloping walls horizontally and vertically, reference FIGS. 8 and 51.

An option of simultaneous slip-form printing parallel and or non-parallel walls (in tandem), or optionally from the outside of the proposed structure or any combination as needed, reference FIG. 51.

The current invention further encompasses slip-form molding and printing parallel and or non-parallel walls that may optionally be "filled in" onsite with a suitable cementitious mix simultaneously, immediately after, or at a later time as desired depending upon the application.

As an option the method and apparatus of the current invention may encompass slip-form printing a series of parallel and or non-parallel "brick" walls employing multiple slip-form printers attached to said automated mechanized arm(s) and or optionally removably attached to multiple arms having slip-form printing and placing characteristics simultaneously and or sequentially, optionally operating multiple automated slip-form printing apparatuses onsite simultaneously or sequentially per room, or at room junctions, and or to print near monolithic multi-room reinforced structures, reference FIGS. 10, 11, and 51.

In several specified embodiment encompasses that the methods and apparatus may print "brick" walls simultaneously or sequentially having one or more mechanized arms employing multiple slip-form printing systems, as an example, having multiple adjustable automated construction apparatuses having base/support, (Reference FIG. 51), constructing simultaneously and or sequentially and as an option of operating multiple slip-form printing systems such as when constructing staggered levels such as employing multiple removably attached slip-form printers per the automated construction tool (such as two workers operating in tandem), or operating multiple automated construction systems simultaneously.

In other specified embodiments, the current invention encompasses methods for slip-form printing in place an interior and or exterior buttress in a vertical or near vertical slip-form printed casting angle or casting any desired derivative or angle therein. Two plane slip-form printing due to rotating extruder that prints reinforced "bricks". This is an object of the invention.

Furthermore, if there is a risk of exceeding the shear strength of long or heavily stressed walls close to their support point, the end portion of the wall can be slip-form printed (cast in place) using concrete mixes of a higher strength grade or, e.g., by reinforcing the supported beam portion with external and internal reinforcement, reference FIGS. 34 A-4, A-6, and A-7, apparatus as disclosed herein and further encompassing a wide variety of fiber-reinforcements, whereby the shear strength of the printed wall increases thus making it possible to increase the load-bearing strength to a value specified for each individual wall or structure. The shear strength of a wall may also become a limiting factor if walls are mounted on yielding steel beams, whereby the additional stress due to the lateral bending of the wall reduces the shear load bearing capacity of the wall. Hereby, extra strengthening of the printed wall end portion will give the printed wall additional strength so that the wall can take the load imposed thereon.

As an example, by alternating the printing of the "brick" layers or block(s) where the walls meet to keyway interlock for extra strength as needed, reference FIG. 39.

The full architectural scale automated construction system's apparatus and methods of the current invention such as when printing compound curve structures such as hyperbolic paraboloid shapes, arches, or pre-fabricated arches. Improves three-way corner construction (e.g. two walls and a foundation or floor) such as the intersection of a printed stone-like component (e.g., concrete foundation, floors, or walls) to another component (e.g., wall).

The onsite concrete construction methods and apparatus having significant advantages may take place in different orders such as but not limited to initially constructing the proposed printed structure's doorways, archways, window frames, etc. onsite such as for optimizing sun angles and view corridors and improving the architectural perspectives IE view inclusions and view exclusions then slip-form printing onsite the adjoining walls and roofs as needed.

The current invention encompasses quickly and cost effectively slipform printing a wide variety of "brick" retaining walls and quickly and easily making last minute changes onsite, further encompasses slip-form printing a wide variety of wall thicknesses, including hollow module and discrete dam for a cast section (to be filled in later), further including walls of modular construction such as inserting fiber optics through the semi-dry brick walls and further improves installing and securing a wide variety of cladding, due to having improved 3-dimensional printing control and having a wide variety of materials and the locations or interface of the cladding.

Then, in this specific embodiment the printed "brick" wall dictates the pre-tensioning reinforcement, their pretension forces and the concrete mix grade to be used in the printed structure. Thus, an extra high quantity of reinforcing characteristics and concrete mix costs can be reduced, e.g., by way of using a concrete mix grade individually adjusted to meet the optimum specifications of each structure.

Depending upon application, the current invention's construction methods and apparatus optionally may or may not encompasses incorporating pre- and post-tensioning devises such as a wide variety of reinforcements including reinforcement cables and or bars and rods, etc. basalt reinforcement(s) are preferred.

As an option or optionally one or more of the automated mechanized and multi-purpose robotic systems described herein may also be used to slip-form mold, print, and extrude a print in place aperture venting (regulating) containment "sleeve(s)" printed and positioned over (on top of) conventional temporary and/or reusable concrete forms containing a wide variety of cementitious materials if needed, to construct a wide combination and variety of printed walls, roof(s), arches, domes, vaults, or any combination as needed.

Stairs

The current invention's apparatuses may be simplified and scaled as needed to slip-form onsite and print small built-in reinforced concrete structures such as stairs and/or window frames, chairs, benches, shelves, etc.

FIG. 23 in an illustrative exemplary embodiment depicts four of many possible built-in place stair configurations simplified for illustrative purposes, that may be constructed using the current invention's system.

Roofs

The inventive reinforced concrete construction techniques include the onsite construction of near monolithic interlocking structures including roof(s), preferably having compound curves that are quickly and accurately printed in place operationally having interior/exterior/ribs/buttresses or any combination including hyperbolic parabolic shapes constructed (printed) onsite with minimum adjustments and motions, such as including monolithic arches.

The current invention encompasses slipform onsite printing a supportless open span roof in its completed state atop a wall structure, reference FIG. 22.

Planar Roofs

FIG. 22 illustrates semi-automated or automated onsite reinforced concrete roof construction system, such as for planar roofs, logs/beams may be used. Under each beam, a thin sheet may be attached, to hold the mix roof material deposited by the nozzle assembly (not shown). The optional beams may be picked up and positioned mechanically and or robotically by the automated multi-purpose robotic system(s). The roof may then be covered by suitable mix material such as delivered by the automated slip-form printing system. Depending upon application, the construction of reinforced concrete roofs may or may not need structural support beams. The invention encompasses that open and supportless structures such as arches, domes, and vaults (reference FIGS. 10, 11, and 24), and or free-form open span structures may be built with or without buttress or support beams as needed.

Note that the methods and apparatus of the current invention encompasses constructing reinforced concrete structures onsite such as having a wide variety of structurally reinforced printed beams, columns, stairs, roofs. ceilings, foundations, footings, doorways, bridges, buttresses, arches, tension rings, culverts, bridges, silos, tanks, canals, etc.

Foundations

It is an object of the current invention to provide a fast, accurate onsite slip-form automated printing system having accurate placement for printing reinforced concrete foundations, footings, box beams, columns, walls, roof, arches, etc. which is readily and accurately adjustable on site to any desired contour and scaled as needed, reference FIGS. 8, 10, 11, 12, 22, and 24.

In some applications, the current invention construction methods and apparatuses may minimize the construction site preparations and minimizes the common difficulties of poor construction terrain.

Conventional forms require purchasing, shipping, and assembly costs, which are expensive and usually made from wood, often used once, and discarded, or further requiring cleaning reshipping inventorying storage.

The current invention resolves many of these prior art construction limitations and further promotes more efficient usage of land for high-density usage, such as preserving more open or green spaces or constructing on difficult uneven building sites, e.g. building on to boulders, or around boulders, trees etc.

Furthermore, prior art conventional forms do not allow for the visual inspection of the mix cast quality as they do not reveal air pockets, "bug holes", voids, etc. and conventional concrete forms have about a 3% blow out rate.

The current invention system quickly and accurately extrudes (constructs) a self-leveling reinforced concrete foundation in the form of a reinforced cementitious paste that automatically conforms to the construction sites irregularities of the soil/ground conditions (such as hard pan) significantly simplifying the construction sites' preparation process, reference FIG. 36.

This foundation slip-form printing system quickly and accurately molds and casts a stronger interlocking keyway bond that improves concrete construction joints and increases soil/ground bonding characteristics and simultaneously improves seismic (earthquake) resistance and freeze/thaw cycle resistance, reference FIGS. 36 A and B.

The current invention encompasses a method and apparatus for onsite printing a self-adjusting ground compensating foundation having improved foundations and having significant seismic resistant characteristics and other advantages, such as resisting (uplift) of footings onsite in real time, reference FIGS. 36 A and B.

As an option or variation of the current invention encompasses back filling inside the foundation to reduce and preferably eliminate uplift from freeze thaw cycles.

The innovative foundation casting method of the current invention improves reinforced concrete construction foundation joints.

Having the previously unavailable advantages of high-strength reinforcements and quality control in a wide variety of foundations and footings on-site, enabling the previously unavailable ability to accurately fit encasements, blocks or extensions to the surface that may be keyway interlocked into each other (Reference FIG. 36 B) having a number of advantages, including lower costs, improved quality control (thus longer life), lower labor mobilization and high speed delivery and accurate installations.

As for example, the methods and apparatus encompasses constructing foundations and other concrete reinforcements structures on-grade and or off-grade, i.e. printing on a slope. Reference FIG. 8.

The current invention further encompasses two or more plane printing due to rotating extruder that slip-forms sloping walls horizontally and vertically, reference FIG. 51.

Thus, the current invention quickly and easily constructs printed structures on what would conventionally be very complex, and thus expensive (such as constructing on to highly irregular lots or boulders, around trees, and constructing on steep or uneven grades, etc.) and further allows for fast and accurate last minute construction changes on the construction site and providing an option of having one or two-person operation.

In several specified embodiments encompasses the combination of a preferred basalt or polypropylene folded tubular foundation reinforced containment "sleeve" (flexible form) containing cement mixes containing a variety of reinforcement fibers as disclosed herein to increase the memory return, ductile and or compression strength and other improved characteristics of the foundation's casting materials.

The current invention encompasses a fabric reinforced external containment sleeve preferably having a danier ranging between about 50 to 1200 danier, more preferably ranging between about 100 to 800 danier, most preferably ranging between about 350 to 700 danier for improved onsite slip-form printed brick having sizes up to about 10 inches high by 14 inches wide or as needed depending upon the application. Polypropylene and basalt reinforcing materials are most preferred.

The current invention further encompasses a fabric reinforced external containment sleeve for the onsite construction of a supporting and operating pedestal, reference FIG. 50 B, preferably having a danier ranging between about 1,100 to 4,000 danier, more preferably ranging between about 1,200 to 2,500 danier, most preferably ranging between about 1,500 to 2,000 danier for onsite slip-form leave in place print in place containment form having sizes larger than about 10 inches high by 14 inches wide up to about 20 inches high by 25 inches wide or as needed depending upon the application. Polypropylene and basalt reinforcing materials are most preferred.

Practicing this invention with all possible combinations of reinforced concrete printing, including foundations, in an illustrative embodiment Reference FIG. 36, enables the economical production of series in various containment and or reinforcement sleeves with a wide capability of onsite shaping and printing, reference FIGS. 26 and 34.

As an option or optionally the inventive slip-form printing method and apparatus of the current invention may in some instances employ a "pull through" cement vibrator (not shown).

Ground Preparation

In most foundation concrete construction applications, the method and apparatus of the current invention reduces conventional onsite ground preparation work, and thus reduces onsite construction time and costs with less labor costs constructing highly efficient reinforced concrete structures with virtually no on-site waste during the printing process, reference FIG. 13).

It is common for prior art concrete construction methods and machines to leave wasted material along the edge of a cast. This waste material (slag) can be up to about 20% of the total material cost. This slag material must be removed or smoothed down and often buried. This invention does not produce these wasted materials.

Slip-Form Printing in a Trench

The current invention encompasses onsite slip-form printing or extruding reinforced concrete foundations, such as into or within an open trench in one pass, for constructing a near monolithic reinforced concrete foundations, reference FIG. 24, as the current invention's methods and apparatus eliminates necessitating the step of digging a flat trench or hole, as the inventions slip-form printing foundation self-conforms to any contours. Reference FIGS. 36 A and B:

In many instances, the current invention methods and apparatuses reduces prior art onsite ground preparations and simultaneously enables the construction operator(s) to onsite slip-form print, even when the trench and/or ground is variable or uneven.

In many applications, the invention reduces back fill excavation (particularly when constructing from the inside), constructing from internal to external is preferred, as operating the internally positioned automated system is more efficient and eliminates the prior art steps requiring a flat trench or hole, as the apparatus (sleeve) self-conforms to almost any contour having automatic ground/soil compensating characteristics with a high speed high degree of placement accuracy. Reference FIGS. 36 A and B.

The inventions method's and apparatus significantly reduces conventional site preparation that reduces or eliminates back filling in most applications, and reduces below grade removal in some instances for sub-grade (below ground) use.

The current invention simplifies the construction of reinforced concrete foundations, footings, box beams, particularly when constructing foundations on a slope including when constructing tapering horizontal curvilinear reinforced concrete walls and/or rectilinear or any desirable combination such as but not limited to monolithic arch, hyperbolic parabolic shape, staggered levels and or compound curve structures.

The current invention encompasses slip-form printing on a slope or the side of a structure up to desired height as needed, Reference FIG. 8, and further simplifies the site preparation having self-leveling top edge characteristics of the foundation.

As an option or optionally the current invention may employ slip-form printing a hollow module and discrete dam for cast section (to be filled in later).

As an option or alternative the current invention further encompasses having fully reversible and variable slip-form printing speeds, as needed.

The inventor theorizes (and calculates) that the current invention's slip-form printing foundations or footings extrusion printing rate (per minute) may be adjusted as needed to range between about 1 foot to 60 feet per minute or ranging between 0.010 to 10.0 cubic ft. per second more preferably ranging between 1.0 to 10.0 cubic ft. per second or as needed, and easily accommodates fast, accurate printing of circles, bends, right angles, into a trench. This is an object of the invention.

The current invention enables the automated construction system's operator(s) to quickly and accurately slip-form prints simple to highly complex reinforced foundations and footings even when the ground or trench is uneven with significantly less time and physical effort including design/functional features for accommodating dimensional variation responsive to changing ground/soil conditions having means for receiving settable material and is significantly more convenient to operate and may stop or start construction at any time during the construction process.

In an exemplary embodiment encompasses employing the method(s) and apparatuses of the current invention to print onsite a wide variety of on grade and or off grade simple to highly complex foundations, and footings having reinforcing tension rings that simplifies previously difficult cementitious casting environments such as onsite slip-form casting in mud/water/sand/etc.

In one specified embodiment encompasses that the method and apparatus of the current invention is suitable for a wide variety of underwater construction.

The internal and external reinforcement apparatuses encapsulate foundations, footings, walls and roof components, thus may be adjusted, as desired, to position a variety of molded and printed interlocking keyway brick/block configurations with a variety of diameters of wall surface, with the automated slip-form printing system.

Cycling the automated construction system apparatus in this manner, the foundation, walls, roofs, and complete structure is printed onsite in three-dimensional space with structural junctions accurately and precisely defined, and any type of structural reinforcements are accurately located and junctions are securely affixed.

Additionally, the current invention encompasses significantly reducing and/or eliminating uplifting and foundation cracking and breaking that is encountered in large ground accelerations (earthquake). Reference FIG. 36 B.

The current invention having a wider range of mix use with less physical effort, and simultaneously improves the strength, accuracy, and appearance to complement a wide variety of architectural design configurations requiring a wide variety of structurally reinforced foundations.

As an option or optionally the current invention's methods and apparatus may employ an adjustable "airblower" that pre-inflates and that maintains the foundation external containment form "sleeve" in an open position (not shown). Employing the optional air blower/fan(s) (not shown) is less noisy than the prior art, the external flexible containment "sleeve" having pre-engineered sized and spaced venting apertures for accurately regulating the concrete mix curing environment as needed in the external "sleeve", further reducing or eliminating the foundation's containment sleeve(s) wrinkles/ripples, additionally providing faster and larger slip-form printed foundation (castings) over the prior art, simultaneously and or sequentially slip-form printing foundations or any combination as needed, particularly advantageous when constructing foundations having staggered levels, and providing more accurate mix volume calculations and accurately monitoring and controlling the construction process onsite in real time as needed in the art, thus improving the conformational tolerance over the prior art and providing previously unavailable features such as flexible moldable reinforced containment sleeve(s) having automatically self-leveling characteristics and conforming to the irregular onsite ground/soil conditions, Reference FIG. 36 B, and simultaneously delivering multi-cementitious mixes feeds, such as pumped from the (top) of the printed foundation within the containment sleeve feeds.

As an option or optionally the onsite foundation printing apparatus employing optional "airblowers" (not shown) simultaneously provides fast filling such as pumping different mixes into the foundation's slip-form printed flexible reinforced external containment "sleeve's" bottom and side(s) and optionally may pre-inflate a foundation/footing reinforced external containment "sleeve" cast-in-place leave-in-place structurally reinforcing and encapsulating form that maintains an open position that selectively "breathes" to maintain the desired air pressure within range, and is significantly faster than the prior art, particularly when casting large complex curvilinear reinforced foundations, having box beams, footings, particularly having staggered levels, etc.

As for example, if there is a potential for exceeding the shear strength of long or heavily stressed walls and or roofs close to their support point (stress zone), the end portion of the interlocking walls can be slip-form printed (cast) using concrete mix or mixes of a higher strength grade or, e.g., by fortifying the supported foundation or box beam portions with a combination of internal reinforcement meshes and fiber-reinforced concrete, whereby the shear strength of the foundation and wall increases thus making it possible to increase the load-bearing strength to a value specified for each individual structural foundations. The shear strength of a foundation may also become a limiting factor if foundations are mounted on yielding steel beams, whereby the additional stress due to the lateral bending of the foundation reduces the shear load bearing capacity of the foundation, thereby, extra reinforcement strengthening of the foundation end portion can give the foundation additional structural strength so that the foundation can take the load(s) imposed thereon.

Depending upon application, such use of higher-strength and fiber-reinforced concrete mixes at the foundation end portion may remove the need for conventional iron, reinforcing bars, rods, cables at the support-load-bearing area of the foundation, a possibility that without innovative slip-form printing technology has been almost impossible to implement without essentially degrading the cost-efficiency of mass production of foundation castings currently within the art. The inventive slip-form printing technology according to the invention increases the range of reinforced foundation applications and thus provides previously unavailable advantages of the entire manufacturing branch of reinforced concrete structures and components.

The current invention's method(s) and apparatuses accurately prints single to multiple foundations in the same or in different configurations.

One further advantage of the current invention's methods and apparatus is its applicability to pre-existing slip-form printing machines.

In other specified embodiments encompasses that the method and apparatus of the current invention encompasses slip-form printing extrusion methods and apparatuses that are suitable for mass commercial concrete construction of sustainable low-income housing having significant seismic resistance with improved sustainability and energy efficiencies that eliminates in many applications the need to install conventional rebar, this is an object of the invention.

The method and apparatus may encompass constructing a wide variety of reinforced concrete structures having reinforcement mesh/net for settable (curable) material, such as but not limited to constructing or incorporating built-in ground air transportation (earth tubes) such as within the structure's walls, floors and or ceilings, as needed. This is an object of the invention.

In the method and apparatus of the invention or manufacture of fiber-reinforced concrete products by slip-form printing extrusion technique(s) a slip-form printing machine is disclosed having its feed hopper partitioned into at least two mix compartments and equipped with controlling gates adapted to cover alternately as required the side or bottom discharge opening of either one of the four (or more) mix feeding compartments. As an example, in this system, one compartment of the feed hopper contains a concrete mix, while the compartment may be filled with fiber-reinforced cementitious mix. In this manner, the control gate of the feed hopper discharge openings can be controlled to adjust the feed ratio of the different concrete mixes so as to obtain a desired type of printed end product. As for example, one of many functions of this construction apparatus is to provide non-homogeneous distribution of cementitious mixes and fiber reinforcement in the cross section of the end printed "brick" product.

The current invention provides previously unavailable novel type of slip-form "printing" method(s) and encompasses apparatus capable of continuously changing the grades of concrete mix(es) during an onsite slip-form "brick" printing run, thus making it possible to print reinforced and encapsulated concrete "bricks" having an optimized grade(s) of concrete mix in their different layers and or portions. In a method aspect according to the invention, the selected concrete mix grade is slip-form printed homogeneously at a given cross section of the "brick" in the longitudinal direction of the printed brick or not, as required.

Mix Metering

The cementitious construction materials of any of the types described herein may be delivered to the invention's automated construction system onsite extrusion molding slip-form printing nozzle(s) or from any suitable material(s) delivery system. The construction material(s) (mixes) delivery system may include one or more construction material(s) storage tanks, one or more pumps, one or more mix vibration and pressure and or flow regulators (not shown), one or more mixers, or any suitable combination as needed. The cementitious (mixes) construction material(s) delivery system(s) may also include one or more pass through elements, such as hose and tube element(s).

The present disclosure presents several exemplary embodiments for mix metering devices, some of which also have adjustable pumping capability. An advantage provided by such embodiments is that they employ a minimal number of moving parts and do not explicitly use one-way valves, which are prone to clogging and freezing, that are common in other metering devices and pumps. These features make the inventive construction devices especially suitable for delivering low slump cementitious fluids and pastes with hollow and or solid aggregates (e.g., such as containing pumice, scoria, crushed coral, concrete fibers and other additives and various reinforcing continuous coil/wire loops components).

In other embodiments, a different number of metering devices (including just one or more) may be employed; moreover, any suitable metering device(s) may be employed.

Monitoring

The current invention encompasses captured images may be used to monitor and control the mix(es) flow rate(s), which may be needed for a variety of reasons depending upon application.

In a method aspect according to the invention, a desired grade of concrete mix is metered onsite preferably from above or beside the printing head and or after the concrete mixing station, wherein the concrete mix to be slip-form printed (cast) is prepared prior to pumping the mix into the feed hopper into the printing machine, that delivers predetermined amounts of a desired grade of concrete mix. The correct amounts of different grades of concrete mix can be accurately computed on the basis of the cross section of the encapsulated concrete "brick's" volume being positioned and printed in place in a layer-wise method aspect and the predetermined length on the previous interlocking over which the concrete mix of desired grade is to be slipform printed.

Optionally when slip-form printing at faster rates, the delivery of the concrete mix batches from the concrete mixing station to the feed hopper feeding the automated construction apparatus takes place by means of moveable machinery, preferably located beside the invention's automated printing machines so that the concrete mix batch can be easily and quickly transferred from the concrete mixing station to the slip-form printing machinery. By virtue of the data thus collected in a method aspect, sufficient time reserve is assured for the delivery of a concrete mix batch at a correct instant of time provided that the location and travel speed of the slip-form printing machine plus the distance thereof from the concrete mixing station are known.

Sensors/Controllers

Controllers are a processing unit that is connected to the current invention's mechanized and/or robotic apparatus (automated construction system) for automated operation of the mechanized or robotic components onsite (not shown), such as to provide system networking, dynamic user control and other programs and or teach.

The current invention's mechanized and or robotic apparatus or systems preferably includes a position controller system that accurately controls the position and movements of the automated reinforced concrete construction apparatus, including the position and movement of the supporting and operating platform and the slip-form printing assembly preferably incorporated with the optional automated synchronized slip-form printing wall wheel supporting and guiding (wall roller wheel) system.

Onsite sensors relay the information about the preferably robotic construction system(s) axis position(s), including end effector attachment orientation(s) motions and surrounding work environment as needed.

The position controller may include a position sensor(s) that senses the position of the automated concrete slip-form printing apparatus, and an actuator that controllably moves the automated construction system slip-form printing assembly to a desired position(s) in real time in response to the output of the position sensor. The position sensor(s) may be a mechanical and or laser or acoustic rangefinder, although any other position and motion detection device known in the art may be encompassed herein. As for example, three or more reflectors installed on moveably fixed poles installed at the construction site may provide fixed reference points for the laser or acoustic rangefinder as needed.

The laser, and or an optical rangefinder (also referred to as a laser tracker) (not shown) may be any known device that can accurately measure the distance to an object(s) in 3-dimensional space by sending out light or sound to the object and analyzing the light or sound that is reflected or scattered off of an object(s). The range to the object may be calculated and determined by measuring the time for the light or sound to reach the object and return. As an option, the laser rangefinder may include: 1) a transmitter (not shown) that generates laser light and transmits the laser light toward the reflectors (not shown); 2) a receiver (not shown) configured to receive the transmitted light that is backscattered from retro reflectors at the reference points; 3) a photo detector (not shown) configured to detect the intensity of the light received by the receiver; and a data acquisition system (not shown), effective to accurately compute the distance to the object by making time-of-flight measurements, i.e. by measuring the time required for the light to reach the object and return.

In certain embodiments, 3-dimensional positioning information may be sent back to a servo controller (not shown) and used in one or more tunable dynamic feedback loops to maximize the automated construction system's accuracy of the 3-dimensional positioning and motion data that is obtained. The automated construction system's printing nozzle assembly may itself be moved around by a XYZ/ABC positioning system(s), thus providing about 2 to 8 degrees of freedom, to the automated constructing system's slip-form printer's nozzle head.

A material feed system preferably removably coupled to the beginning of the automated construction system's slip-form printing apparatus that is configured to pump (feed) a wide variety of cementitious mix(es) materials to the automated construction system's slip-form printing nozzle assembly. The mix material feed system preferably includes a reservoir (container) configured to store a wide variety of mix(es) materials, and articulated feeding hoses or tubes configured to feed mix materials stored in the container(s) to the automated construction system's slip-form printing apparatus. The mix(es) materials may be pumped in a premixed form by the ground based hoses or articulated delivery arm(s), such as from conventional concrete mix delivery pumping systems (reference FIG. 8). In the latter case, the automated articulated delivery arm(s) may be active or passive or any combination as needed, in which case it may be suitably removably attached to the slip-form printing apparatus, i.e. the connecting members between the delivery system and the slip-form printing apparatus(es). In this configuration, the automated pumping system delivers a portion of the necessary motive force to move the slipform printing system. All excessive opposing force may be exerted in this case, however, due to the inertia of the possibly high mass of the material mix(es) feeding system.

As an option or optionally, the current invention material mix(es) feeding system(s) may have its own active motion controls (drive mechanism) such as controllable by joystick (not shown). In this embodiment of the automated reinforced concrete construction system, the mechanized and or robotic construction system may be in active communication with a remote joystick, and the material mix feeding system may follow the automated robotic system. In this master slave control setting, the slip-form printed material(s) delivery arm(s) should not be rigidly connected to the automated robotic system, because the delays and imprecision involved in positioning would necessitate a flexible connection between the automated robotic system and the material delivery arm, to compensate for the positioning lags and errors (tunable dynamic response).

The current invention encompasses a mechanized and or automated robotic reinforced concrete construction system comprising several transportable automated construction systems supporting and guiding apparatuses that may be easily operated on site.

The slip-form printing system assembly of the current invention is supported by at least two side members, being slidably mounted on a pair of guide rails, moveably (slidably) coupled to the mounting rails or beams of the mechanized and robotic automated construction apparatus, preferably configured to mold and slip-form print long "bricks" and extrude encapsulated compacted and molded cementitious materials through a slip-form printing outlet or outlets, and having a position controller system, and wherein the position controller system comprises a position or sensor configured to sense the position of the slip-form printing nozzle assembly with respect to multiple 3-dimensional locations on the surface, and an actuator configured to controllably move the inventive slip-form "brick" printing assembly to a desired position in response to an output of the position sensor.

As an option or optionally the current invention automated construction system may encompass two or more multi-purpose robotic arms preferably having internal pneumatic sensors and regulators sensors, such as but not limited to encoders, temperature sensors, safety sensors, humidity sensors, such as video, visual tracking, sensing or touch, etc.

In other specified embodiments that when operated from an optional gantry or haptic operating platform sensing there is a human interface in the automated mechanized arms and or the robotic loop. As an option the controls may be operated by a single operator controlling the automated systems mechanized or robotic arm's movements remotely, reference FIG. 8. As an example by a hand held computer and or controller such as X-Box™ or Playstation™ Controllers or other joystick style controllers (not shown).

The automated construction system is preferably operated onsite by a single operator, or optionally by a pair of operators, and optionally no operators (completely computer controlled).

As an option or optionally the current invention may be operated from referencing a miniature scaled model having inputs and positioning sensors such as employing a computer to create sketches and molds.

As an option or optionally the current invention may encompass a cable to the internal memory of the microcontroller in motors or monitor the state of switches. Note that some mechanized and or robotic arms may have feedback sensors (such as touch) for moving, positioning and or locking "brick" joints, etc. as needed.

The inventive automated construction system may employ a three to seven axis multi-purpose robotic arm(s).

In a specified embodiment encompasses onsite slip-form printing apparatuses and methods for molding and printing "bricks" from one or more delivery nozzles in an adjustable upward and or downward manner (not shown) from the input or any angles or derivative as needed employing up to 6 axes or as needed.

As an option or variation the current invention encompasses a separate brick section(s) having connecting feature interlocking keyway on angularly related edges or faces printed in a generally vertical arrangement and or printed in a generally horizontal arrangement having fiber reinforced slip-form printed vertical and horizontal "brick" members as needed.

As a further option or further variation of the current invention the various adjustable (telescopic) automated extending arm members, it should be noted, are self-locking in their adjusted positions to avoid distortion of the adjusted position of the slip-form printer head. The mechanized adjustable hinges may be locked by means of bolts (not shown). When desired, the automated slip-form printer of the present invention may optionally encompass either an upward-narrowing or an upward flaring of the overall size of the slip-form printed "brick" (layer-by-layer) structure. Also, it is to be understood that a given encapsulated slip-form printed "brick" structure may be tapered for a portion of its width or height and widened for another portion of its width or height as needed. When limits of expansion or constriction of the slip-form printer head diameter are reached, in such cases, the respective addition or removal of slip-form printer members will permit continued divergence or convergence of the constructed structure as needed.

The current invention encompasses a variety of different automated construction system variations having separate and distinct operational characteristics to provide previously unavailable reinforced concrete construction diversity and versatility, particularly onsite in real time.

FIG. 30 illustrates 4 of many possible automated robotic and or mechanized configurations.

As an option or optionally the current invention encompasses employing a lifting mechanism that further encompasses 3 or more telescopic hydraulic cylinders with individual servo controls or as needed (not shown).

Therefore, it is apparent that the present invention provides a particularly advantageous reinforced concrete slip-form printing construction system capable of previously unknown speed and versatility. The invention's onsite adjustable and reconfigurable mechanized arm(s) having simpler, more accurate construction of reinforced concrete structures of considerably larger dimensions than safely possible heretofore, while the full system permits slip-form printing of new materials and structural configurations onsite not previously economically possible with the prior art slip-form techniques.

As an option or optionally the current invention incorporates the removable mounting and construction operations of the inventive automated construction system apparatus on a conventional gantry robotic apparatus.

Robots

The current invention encompasses a wide variety of mechanized and robotic configurations, variations, and systems.

One of many possible robotic configurations are available from the following such as but not limited to Zhengzhou Wantuo Import and Export Co., LTD., at Room 1006, Floor 10, Unit 1, Building 3, South Yongping Road And West Kangping Road, Zhengdong New District, Zhengzhou, Henan, China (Mainland) website, zzwanto.en.alibaba.com.

One of many possible robotic configurations are available from the following such as but not limited to Donggguan Changlilai Robot Technology Co., LTD., at 1/F, Bldg. D, Jinxiongda Science Park, Xingyuan Road, Datanglang Village, Dalingshan Town, Dongguan, Guangdong, China (Mainland), website http://en.cllrobot.com.

One of many possible robotic configurations are available from the following such as but not limited to Nanchang IKV Robot Co., LTD, No. 188, Changxin Road, Qingshanhu Dist., Nanchang, Jiangxi, China (Mainland), website, http://www.ikvrobot.com.

One of many possible robotic configurations are available from the following such as but not limited to Comau S.p.A, at 21000 Telegraph Road, Southfield, Mich. 48033—USA, website, http://www.comau.com.

In several specified embodiments, the current invention encompasses employing a variety of mechanized and or robotic removably mounted supporting and operating apparatuses such as but not limited to "overhead" gantry (haptic), reverse gantry, cartesian, cylindrical, spherical, polar, scara, delta, parallel, articulated, jointed arm, and other robotic systems (apparatus) not specifically mentioned, nor shown, herein are encompassed by the current invention.

The automated construction system such as in the form of a mobile robot has three capabilities: it can be operated and driven with a universal remote control that automatically senses when it hits an obstruction, and it automatically reverses away from said obstruction, and optionally works in conjunction with other robot systems. A roving robot is easy to modify and expand its actions with relatively simple programming and working hardware changes and having a wide multitude of hardware add-ons.

As an option or optionally adding infrared and or laser sensors can enable basic object identification or collision avoidance characteristics as needed.

As an option or optionally may encompass removably installing a camera onto the automated construction system to record stills or video from the robot's eye view, as needed.

Parallel Robots and walking robots are an order of magnitude more complex than wheel or track-based robots, generally having a number of legs and joints producing a walking robotic machine. Track robots having a guide rail system or track driven robot of the current invention can carry heavier loads than a caster robot, and, more easily handle off-road construction operations such as on sand, dirt, gravel, grass, snow, even mud. Holonomic robots (not shown) are omnidirectional robots having a trio of specially designed wheels, each with its own set of casters, to be mobile in all directions and are well suited to camera-centric operations to move laterally, or rotate in place as needed. Automaton or autonomous robots (not shown), robots that are not controlled by humans, are commonly wheeled, but also include legged robots with two or more legs (not shown), self-operating robots (not shown), such as performing exactly the same actions over and over (repetitive). Autonomous robot vehicle equipped with an autopilot system, which is capable of moving from one point to another without input from a human operator (not shown). Hexapod robots (walker) are generally a six-legged walking robot.

Industrial robots (not shown) are reprogrammable, having multifunctional manipulators designed to move materials, parts, tools, or specialized devices through variable programmed motions for the performance of a variety of tasks.

Mobile robots are self-propelled and self-contained robots (not shown) that are capable of moving over a mechanically unconstrained course (not shown). Mobile robots may be classified by: The environment in which they travel and are commonly wheeled, but also include legged robots with two or more legs (not shown).

The mechanized and or robotic construction system as disclosed herein may include any suitable fixed and or movable mechanized and or robotic system, in conjunction with a slip-form printing nozzle assembly removably coupled to that apparatus. The robotic system may be operated onsite from a guiding and supporting beam apparatus or series of beams extending between and supported by at least two side members, as an example slidably mounted on a pair of automated or semi-automated or manually operated guide rail system apparatus as depicted in FIGS. 8 and 38. The automated slip-form printing nozzle(s) assembly may be removably coupled (attached) to the end effector of the robot, and may be configured to position and extrude material(s) through an outlet(s). The mechanized and or robotic system may further include a position controller configured to control and position the 3-dimensional movements of the robotic apparatus and removably attached slip-form printing nozzle(s) assembly as needed.

In other specified embodiments encompasses methods and apparatus of the current invention encompassing a variety of guide rail supporting systems as needed, as referenced in FIG. 8 and FIG. 38.

In other embodiments encompasses mobile and or mechanized robotic slip-form printing concrete construction method and apparatus optionally may include a variety of moveable robotic supporting operating pedestal(s) or base(s); preferably having a variety of articulated mechanized and or robotic arm(s) extending from the mechanized or robotic supporting pedestal or operating base; having a removably attached printing nozzle assembly coupled to a distal end of the automated apparatus mechanized and or robotic arm(s).

The inventive mobile mechanized and or robotic concrete construction system may include a motorized wheel assembly.

The inventive robotic operating systems disclosed herein having a re-programmable, multifunctional manipulator(s) designed to move, position, and print reinforced concrete materials onsite, and to install and remove components, parts, tools, or special devices through variable continuous and or non-continuous manual and or pre-programmed motions to perform a wide variety of onsite concrete construction tasks.

As for example in a specific application the mechanized and/or robotic system's reinforced concrete construction method(s) and apparatuses consist of several links connected in series by linear and non-linear revolute or prismatic joints.

Mechanized Arms

The current invention relates to reinforced concrete construction methods and apparatuses having a variety of mechanical multi-purpose arm(s), reference FIGS. 29, 30, and 45, capable of performing a variety of construction operations onsite, which are required for moving the slip-form printing system. Preferably, the automated construction system's mechanical arm(s) preferably having about four degrees of freedom (or possibilities of motion) and may be actuated by two electric motors depending upon application, each motor of these alternately controls the movements corresponding to at least two degrees of freedom, providing a highly adjustable arm(s) having mixed control for more onsite movement(s) precision in series and in parallel in which the motions controlled onsite by the same motor(s) are carried out in different instants of time, whereas the motions controlled by different motors can be performed simultaneously which later, in its turn, may be supported as needed.

The automated construction arm(s) are thus capable of working with the sequential motions which are the most suitable for optimizing onsite slip-form printing operations, particularly as to the reduction of time and tolerances which is required for carrying them out and as to the reduction of the stresses originated both by positive and negative accelerations such as to permit that the operation times may be reduced, but not to a degree as would theoretically be impossible, because the simultaneous occurrence of the automated construction system's movements requires that the displacement velocities and the acceleration which can be adopted for the individual onsite construction movements be reduced in order that the arm(s) structure may not be excessively stressed to secure such onsite concrete construction performances as to balance the intricacy of the weight and the hulk of the arms so constructed A Brief Description of the Automated Construction System By doing rotational (1) and translational (2) movements, such as XOY plane, the slip-form printing extrusion head (A; B) travels along the preset trajectory (3).

Power Source(s)

The current invention's automated construction system's power may be derived from any suitable source, such as but not limited to, pneumatic, electric, solar, gas, diesel motors or hydraulic actuators, or manual operation etc. or any combination as needed.

Drive(s)

Motors can be geared to the joints and or direct drive, the source of the motive power to the automated construction system's arm(s) motors and or pumps etc. The automated construction system's motors can be geared to the joints and or direct drive, etc. Note the drives provide the motive power source to the mechanized or robotic apparatus, including the arm's motors and or pumps etc.

Joystick Path Following (Controller)

The operator controls the printing head of the robot arm(s) and the controller computes the required information to make the body follow the path of the head such as an X-Box™ style hand held controller or joy-stick controller (not shown).

Joint Mode

The operator can independently control the automated construction system's (robotic system) individual joints, if necessary, to fine tune a position or motions located in three-dimensional space or camera view or laser/acoustic coordinates as needed.

Cartesian/Gantry Robots

A Cartesian robot is also known as a gantry robot. It is a stationary robot and usually contains a minimum of three elements of motion. Each motion refers to linear motion in a single direction. In a gantry robot, each of these motions are arranged to be perpendicular to each other and are typically labeled X, Y and Z. X and Y are located in the horizontal plane and Z is vertical. The X and Y are the width and length of a footprint and Z as the height of the footprint. The interior of this footprint is referred to as the working envelope of a gantry robot and can move articles anywhere within this envelope or perform some operation on an item within the operating envelope onsite.

For example, a slip-form printing apparatus may be removably attached to a mechanized arm of an automated robotic system. Under computer or other controls, may print reinforced concrete foundations, stairs, footings, walls and roofs of an entire structure or building, including several rooms. The inventive robotic construction apparatus may be used to support and position the inventive slip-form printing extrusion apparatus and slip-form printing nozzle assembly as it traverses the required slip-form printing paths. A positioning system may also be used to accurately position the slip-form printing apparatus, such as a system that includes fixed reference points and laser or acoustical rangefinders preferably removably mounted on the slip-form printer head or mechanized arm(s).

The current invention offers a wide variety of reinforced concrete construction applications may advantageously utilize one or more of the slip-form printing assemblies that have been described herein.

Mobile Robots

In another embodiment of the onsite automated robotic system, mobile automated construction systems may be used. FIG. 8 illustrates one embodiment of a mobile robotic automated construction system, having a mobile supporting and operational base, having articulated robotic arm or arms extending from a robotic base. The mobile automated construction system may employ any suitable mechanized joint structure, and be preferably removably attached with material storage containers and delivery hoses and or pipes. The automated slip-form printing assembly may be coupled to the distal attachment end (wrist) or the end effector of any robotic arm(s), and can be lifted and positioned by the removably attached robotic arm(s) to a desired height above or below the supporting and operating base or any derivative position and motions as needed. The automated slip-form printing nozzle assembly can thus reach at or below the ground level, such as when printing in a ditch, when slip-form printing of foundations and or footings, etc., all the way to the top of a print in place brick wall, including the roof. As an option a material feeding system may be mounted on the supporting and operating base (not shown), and may be configured to feed mix material(s) to the automated slip-form printing assembly.

If the automated robotic arm(s) is made of a sufficiently rigid structure, position sensing at the end effector (wrist) may not be necessary. Instead, optionally position sensors may be removably mounted on the automated robotic construction apparatus supporting base. The position sensor(s) may be a laser and or acoustical tracker, for example. In this configuration, the mobile robotic apparatus does not engage in slip-form printing construction while in motion. Once it reaches a desired predetermined post, it may anchor itself by any suitable means within the art. Then the mobile robotic construction apparatus may restart the "brick" printing construction process, from the last point of slip-form printing construction, while at the previous post.

The construction process may be quickly and safely stopped and restarted at any point during the construction process.

FIG. 8 illustrates the mobile robotic system being used to construct a slip-form printed wall. In its upright position, the mobile robotic apparatus can complete the construction of the top of high walls and or ceilings. Reference FIGS. 22, and 48, as an example, a mobile robotic version may position itself at each of the four corners of a room, and slip-form print (builds) the layer section of the brick wall within its reach. A automated mobile robotic construction system may return to energy charging and material filling location(s), as needed.

As an option or variation of the invention, depending upon the application, the invention may include using a single mobile robot that controls a single slip-form printing construction assembly, a plurality of slip-form printing assemblies may be employed sequentially and or simultaneously as needed. Each slip-form printer may be attached and controlled by the automated arm(s) or a transportable supporting pedestal apparatus with the automated mechanized and or robot arm(s) removably attached to the slip-form printing assembly and or reusable supporting pedestals. Additionally the inventive construction apparatus may be mounted on a transportable collapsible trailer having a supporting platform, Reference FIG. 47, and the mobile robotics approach may have previously unavailable operating features such as providing improved speed and ease of transportation and onsite setup, including scalability in terms of the number of pedestal and or guide rails employed and or mobile robot(s) deployed onsite, and the possibility of concurrent construction where multiple movable or fixed automated pedestals and or mobile robots simultaneously or sequentially construct various sections of a structure or structures as needed.

In several embodiments of the inventive reinforced concrete construction apparatus and systems, the automated mobile robotic system may be equipped with an optional motorized wheel assembly (not shown). FIGS. 8, 22, 47 and 48 illustrate embodiments of a mobile robotic system. The mobile automated robotic system includes a slip-form printing assembly coupled to the automated construction system(s), reference FIG. 40, having mechanized arms) and a mix material feed system (including an optional container(s) and a delivery arm(s)) mounted on the motorized wheel assembly and configured to feed a wide variety of mix materials to the automated slip-form printing assembly. The automated material feed system may include a container and feeding hoses and or tube(s) as needed.

The robotic construction system version fills the container(s) of the mix material feed system by stopping at one or more supplying stations as available at the construction site, as for example adjacent to a wall or structure to be constructed. The robotic system may be powered by any power source such as an electric line, battery, compressed air, gas, or diesel generator. The configuration illustrated in FIGS. 8 and 38 may be well-suited for constructing long walls. A wide variety of mix materials may be used in this implementation, e.g. different materials may be used for outside surfaces and inside surfaces as needed and for printing a wide variety of solid and hollow core structures, respectively or different mix materials at any section of the wall as needed.

A mobile robotic system shown may optionally be used to slip-form print "brick" corners. The automated slip-form printer having removably attachment assemblies preferably rotates, under on-board computer control, with respect to the vertical axis of the feeding hoses or tube(s). Also, the mix material containers (not shown) and the removably attached mix feeding hoses and or tubes (not shown) may rotate 360 degrees or more if needed. This allows for efficient onsite construction of various structural shapes, such as corners. Concurrent control of rotation of the mix material container(s) and transfer hoses or tubes, and the printing nozzle(s) orientation may be used to mold and slip-form print various "bricks" configurations (Reference FIG. 26), having simple to highly complex geometrical features as needed.

FIGS. 8 and 22 illustrates a mobile robotic system progressing from a completed printed "brick" layer to the next "brick" layer. As seen in FIGS. 8, 22, and 51, in a specified embodiment encompasses as an example one of the many possible automated construction systems may swivel, so that the robotic system may progress above each completed printed "brick" layer. The climbing (elevation) action, combined with a 360-degree or more rotation of the mix material container(s) and the slip-form printing assembly, may also accomplish the construction of "brick" walls having ends. The robotic system may print as much of a "brick" wall layer as possible, and when it reaches very close to the end of the printed layer, it may optionally rotate the slip-form printer assembly 180 degrees, then printing backward and climb and previously printed "brick" layer, providing sufficient time for the previous "brick" mix material to sufficiently harden and cure, preferably ranging between about one to four minutes, depending on mix temperature, timing, sleeve characteristics, slump, humidity, ambient temperature, etc.

As an option, depending upon application, rigid horizontal support members may be used to facilitate inventive onsite slip-form printing of openings such as window openings, door opening, and ceilings by bridging openings beneath them for example. To create a reinforced window frame, the controller of the slip-form printing assembly may turn off the flow of printing mix material(s) to all outlets in the slip-form printing assembly when the slip-form printing assembly is traversing an area that has been designated as the window opening. After the top of the wall surrounding the window frame has been slip-form printed (extruded), optionally rigid horizontal member may be placed across the top of these walls to create the header of the window. One or more continuous slip-form printed layers of "brick" mix material(s) may then be extruded and positioned on top of the header and the surrounding walls if necessary. A similar reinforced structural bridging approach may be used to construct door and other openings. A ceiling may similarly be constructed onsite by printing a series of neighboring structural reinforcement members (bars, cables) within the printed bricks across the top walls of a structure, over which cementitious material(s) may be extruded to give sufficient strength and esthetic form to the structure.

One or more of the robotic automated construction systems described herein may also be used to place these reinforcing structural members where needed, i.e., across the tops of window and door openings and across the tops of wall structures to construct Tension Rings and roof(s).

End Effector (Wrist) Attachment Tools

As an option the automated construction system apparatuses may employ a wide variety of wrist attachment (end effectors) and installable and removable tools such as but not limited to Paint Sprayer, Lacquer Sprayer, Sprayer (water atomizer) cooling system, Water Mister or Fogger for printing in dry climates, Scrapers, Rollers/Imprinters or Embossers or Texturizers, Brushes, Laser Cutter, Laser Guide and Measurer, 3-dimensional locator, Water Cutter, Heaters (Conventional and Laser) (fusion), Foams and/or Sponges, Cooler, Acoustical Measurer, Vibrators, Steamer, hand-held high pressure concrete sprayer, Chalk Dispenser(s), Sand Blasters, Peening (glass bead) Blaster, High pressure concrete crack filler, Large wisk, atomizer, and a variety of sensors, reference FIG. 29-1.

The removably attached devices on the end or side of the robotic arm(s) may be suitably equipped for operational attachment compatible with a variety of attachment tools to perform a variety of onsite construction tasks once the automated arm or arms is delivered to the correct position. i.e., pre-slip-former, slip-form printer apparatus, grippers, lasers, reflectors, spray guns, vacuums, brushes, air blowers, sandblaster or peening (glass beads), blaster rollers, sensors, embossing rollers, vision camera, etc.

The construction apparatus robotic arms may employ a variety of attachment construction tools (apparatuses) such as but not limited to a variety of fixed and adjustable slipform printing components systems, imprinting apparatuses, measuring tools (such as but not limited to guiding, lasers, cutting tools, etc.).

The current invention encompasses end effector (wrist) having removable attachment means providing quick tools attachments and removal such as but not limited to a pivoting end attachment (wrist), reference FIG. 29-1.

As an option or optionally the current invention may encompass two axes are incorporated onsite to reach any point in a plane (x,y) and three axes are preferred to reach any position or point in 3-dimensional space (x,y,z). Further axis of roll, pitch and yaw are preferred to control the orientation of the automated robot system's end effector wrist attachment(s).

The controllable robotic arm(s) may have at its distal end attachment, such as a coupler(s) or a gripper(s) configured to grab and position desired component(s) within an accurate position relative to the pre- and/or post-extruded material(s).

The embodiment of the robotic arm(s) illustrated in FIG. 29 A shows a simplified universal passive robotic end effectors configuration, although other variations may be employed. As an option the robotic arm(s) may also employ a removably mounted heater element. The optional grippers removably mounted at the end wrist of the robotic arm are capable of grabbing locating, and positioning such as piping and other components by being lowered onto each of the piping components positioned within the "brick's" receiving groove or channels, Reference FIG. 27 B, each gripper of the robotic arm(s) may grab the component. As an option, the heater element may open up, then closed to engage the area to be heated.

The current invention encompasses semi-automated or automated painting apparatuses such as for painting of the surfaces of the structures that have been printed. A removably mounted painting system secured to one end of the automated construction system's controllable robotic arm(s) (or is coupled to a nozzle assembly described herein) may be configured to controllably paint a desired color(s) on to the surface(s) of the printed "brick" material, in accordance with a desired specification. The painting mechanisms may be a conventional roller to which liquid paint is automatically fed or a spray nozzle, or optionally, an inkjet type printer head, for example inkjet printer heads used for printing large billboards. The inkjet printer painting mechanism may allow wallpaper or other desired patterns to be printed on each wall or surface.

As an option or optionally, an approach to positioning and printing wallpaper, the wallpaper process may be performed after all the walls are completed. In the example of spray painting, positioning accuracy of spray nozzle may not be crucial. In the example of roller painting, a fixed pressure between the roller and the wall surface is maintained by means of a simple distance or pressure sensor(s). In the case of inkjet printing, the automated construction system's robotic end-effector carrying the inkjet painting mechanism may include a fine position sensing and adjusting system, e.g., a laser or acoustical tracking system. As an option, the robotic end-effecter may also include a sensor(s) to maintain a relatively fixed distance between the inkjet print head and wall surface. For both roller and inkjet painting, the end-effecter (wrist) may conform to possible variations in the wall curves, surface textures, and slopes etc. as needed.

Synchronized Construction

The invention's automated construction apparatus' (tool) may be software and computer controlled and/or monitored onsite or offsite, reference FIG. 8, that optionally may provide the simultaneous construction of several fixed and or mobile concrete construction systems working together onsite in synchronized reinforced concrete construction, reference FIG. 51.

A computer rendering of a concept for distributed mobile three-dimensional concrete slip-form printing optionally having external and internal reinforced cementitious interlocking bricks for a structure. As for example, multiple automated robots may work together in tandem, to simultaneously construct employing several automated three-dimensional concrete printers in a cooperative simultaneous manner to additively construct slip-form printed external and internal reinforced concrete brick structures. Reference FIG. 51.

A single operator may deploy and operate the automated slip-form printing apparatus thus minimizes human interaction such that reinforced concrete structures are routinely and quickly produced onsite by rather small synchronized mobile robotic automated three-dimensional concrete slip-form panting systems.

In a method aspect, the current invention may incorporate multiple small concrete pumps for constructing slip-form printed structures in a cooperative manner having a single or multiple operating automated system improving the speed and reliability of reinforced concrete construction.

As an option two or more slip-form printers may be operated in tandem, Reference FIG. 51.

When printing a reinforced concrete wall employing multiple automated slip-form printing systems that are attached to a single mechanical arm (not shown), or printing with multiple mechanized arms constructing simultaneously and or sequentially, onsite operating multiple slip-form printing apparatuses such as when constructing reinforced concrete walls, rooms, and or constructing complex near monolithic structures with interlocking bricks. Reference FIG. 24. The method and apparatus according to any claim encompasses combining the internal reinforcement mesh and the external reinforced containment sleeve slip-forming simultaneously onsite.

The method and apparatus according to any claim encompasses that the internal reinforcement mesh is accurately positioned within the slip-formed concrete bricks structural stress zone.

The method and apparatus according to any claim encompasses reinforced internal mesh/net reinforcement preferably composed of polypropylene/basalt having a variety of mesh/net dimensions and characteristics as needed depending upon the application.

The method and apparatus according to any claim encompasses the option of using the interlocking keyway as a guiding system for the next slip-form printed brick layer.

The previously unavailable onsite versatile methods and apparatuses according to any claim encompasses that the preferred onsite construction sequences can be varied as needed depending upon the application.

The method and apparatus according to any claim encompasses a dowel guiding and positioning apparatus (not shown) for accurately positioning the internal reinforcement mesh/net during the onsite slip-form printing process.

The method and apparatus according to any claim encompasses slipform casting onsite built-in furniture, shelves, benches, recesses, alcoves, etc. within a wall or walls.

The method and apparatus according to any claim encompasses as an option or optionally having the advantage of onsite single point reinforced concrete construction.

The method and apparatus according to any claim encompasses slip-forming double walls, roofs such as simultaneously casting parallel walls onsite (not shown).

The method and apparatus according to any claim encompasses employing a reinforced containment sleeve having pre-engineered apertures having regulating characteristics for a wide variety of cementitious mixes to provide predictable slump control characteristics and to simultaneously obtain less onsite shrinkage.

The method and apparatus according to any claim encompasses an onsite cementitious curing management system such as but not limited to optimizing heat dissipation.

The external containment sleeve method and apparatus according to any claim encompasses being internally filled with a variety of micro-reinforcement such as but not limited to basalt fibers and its variations.

The external containment sleeve method and apparatus according to any claim encompasses being internally filled with a variety of micro-reinforcement such as but not limited to polypropylene fibers and its variations.

A full architectural scale automated interchangeable slip-form die molding externally fabric reinforced leave in place print in place pass-through layer wise brick positioning and printing method and apparatus according to any claim for onsite printing construction of full architectural scale reinforced interlocking concrete structures from a plurality of flexible/deformable into the slipformed interior mold position bricks comprising:

an external fabric reinforced leave in place print in place slipform having keyway interlocking brick positioning and layerwise printing multi-purpose automated system provided with supporting and operating bases coupled at one end to a moveable positioning and support structure and an interchangeable die or mold slipform extruded printed interlocking brick's layer wise deposition printing system removably coupled to an opposite end of the moveable operating and supporting pedestal structure, the slipform printing nozzle comprising at least one interchangeable slipforming die or mold automated manipulator operable to position and print molded extruded interlocking layer wise deposition slipform printed bricks;

having tunable dynamic response feedback measurement systems which measures the 3-dimensional position of the external leave in place print in place fabric reinforced printed brick in real time through the pass-through full architectural scale slipform interchangeable die or molds and produces corresponding 3-dimensional position data, on the construction site in real time wherein the referenced measurements are adjusted to obtain a tunable dynamic response feed-back system includes a non-contact optical measuring device having line-of-sight position measuring system closely located on or from said automated supporting and operating pedestal(s) to accurately determine a 3-dimensional location on the opposite end of the moveable supporting and operating pedestal(s) structure;

and having a programmable controller which receives the full architectural scale position data and produces control data on the basis of a comparison between the full architectural scale position data and the stored predetermined positions for the full architectural scale slipform apparatus printing the external leave in place print in place reinforced brick to position and print an interlocking brick at a predetermined location for the full architectural scale reinforced structure, the controller controlling the automated robotic construction apparatus having several fixed and or moveable operating and supporting platform(s) to provide a tunable dynamic response of a method and apparatus having an initial coarse positioning of the slipformer having interchangeable full architectural scale pass-through brick die or molds and controlling at least one manipulator to provide fine 3-dimensional positioning of the slipform printed interlocking bricks, wherein the fine 3-dimensional full architectural scale positioning apparatus provides finer positioning than the initial coarse positioning, and wherein the controller controls the slipform printing moveable and supporting operating structure to move and accurately position with a slow dynamic response, and controls the at least one robotic manipulator to move with a fast dynamic response to compensate for encountered dynamic effects and deflection of said leave-in-place, print-in-place moveable supporting and operating apparatus, wherein the fast tunable dynamic response is faster than the slow dynamic response.

The full architectural scale automated 3-dimensional slipform pass-through interchangeable molding and printing system method and apparatus according to any claim encompasses slip-form printing without an external fabric reinforced cementitious containment sleeve onsite and slipform molding and printing in a factory environment.

The current invention full architectural scale automated slipform molding and printing methods and apparatuses according to any claim encompasses onsite full architectural scale 3-dimensional layer-wise slip-form pass-through molding having interchangeable molds/dies and printing a wide variety of reinforced concrete roofs.

The full architectural scale automated slipform molding and printing method or apparatus according to any claim, encompasses simultaneous slip-forming parallel and or non-parallel walls (in tandem) from inside of the structure, or optionally from the outside of the structure or any combination.

The full architectural scale automated 3-dimensional slipform molding and layer-wise printing having external flexible fabric reinforced containment sleeve method and apparatus according to any claim encompasses slip-form molding and printing a foundation onsite further encompassing automatic ground compensating characteristics (self-leveling).

The full architectural scale automated 3-dimensional slipform molding and printing method and apparatus according to any claim encompasses onsite slipform construction printing over/around fixed/conventional moving forms, in real time.

The method and apparatus according to any claim, of incorporating an interchangeable brick molding/shaping system having an external fabric reinforced containment sleeve package system, as set forth in any claim, wherein step (a) comprises positioning and securing a plurality of continuous overlapping non-touching memory return "coils" "loops" seismic impact canceling apparatus having s-wave capturing and canceling characteristics on the inside edge of the external containment sleeve surface to slip-form onsite an external reinforced brick for constructing seismic resistant foundations, footings, walls, and roofs.

The full architectural scale automated slipform 3-dimensional pass-through molded, extruded, printed, and dispensed interlocking external reinforced flexible fabric sleeve/deformable into the interior of said interchangeable molds/dies method and apparatus according to any claim wherein the automated construction system and/or the scanning laser measures the positions in real time of the pass-through slipform printing nozzle with a low update rate of data, and the 3-dimensional full architectural scale tunable measurement system also measures the position in real time of the interchangeable slipform full architectural scale die or molds apparatus at a high data update rate to enable real time correction of the tunable dynamic response effects and deflection in real time, and may be automatically adjusted as needed.

The automated full architectural scale 3-dimensional flexible leave in place print in place deformable into position external reinforcing containment sleeve having pass-through interchangeable die/mold slipform layer wise interlocking printing method and apparatus according to any claim wherein the slipform die or mold nozzle comprises at least one interchangeable slipform die or mold arranged to 3-dimensional full architectural scale position and pass-through printing external fabric reinforced slipform printed interlocking full architectural scale bricks having tunable dynamic response at its predetermined location in 3-dimensional space on the structure.

The full architectural scale automated 3-dimensional moldable leave in place print in place deformable into molding position external reinforcing containment sleeve pass-through interchangeable die/mold slipform layer wise having interlocking printing method and apparatus according to any claim wherein the interchangeable brick slipform mold nozzle comprises first extruders, to (a) position and layerwise pass-through print dye or molded slipform printed brick at a predetermined full architectural scale 3-dimensional position; positioned and extruded in layer wise interlocking deposition having tunable dynamic response characteristics.

The full architectural scale flexible external leave in place print in place fabric reinforced automated brick positioning and layer wise interlocking pass-through deformable into the interior position slipform die or mold 3-dimensional printing system having interchangeable molds/dies method and apparatus according to any claim wherein, when a brick is sequentially slipform molded and printed, employing a flexible sleeve/deformable into the interior position of the interchangeable molds/dies, positioned and layer wise printed on the previously interlocking said laid brick on the same course and a horizontal face of that laid brick and a structure on which the laid brick is keyway interlocked supported and having tunable dynamic response.

The full architectural scale flexible external leave in place print in place fabric reinforced automated brick positioning and layer wise pass-through deformable into the interior position slipform die or mold 3-dimensional printing system having interchangeable molds/dies method and apparatus according to any claim wherein, when a brick is sequentially slipform molded and printed, employing a flexible sleeve/deformable into the interior position of the interchangeable molds/dies, positioned and layer wise printed on the previously said laid brick on the same course and a horizontal face of that laid brick and a structure on which the laid brick is non keyway interlocked supported and having tunable dynamic response.

A full architectural scale automated 3-dimensional slipform molding and layerwise printing method and apparatus according to any claim of slip-form printing a molded print in place leave in place brick having an external flexible fabric reinforcing containment sleeve package comprising: providing a variety of interchangeable molds; filling one end of the fabric reinforced external cementitious containment sleeve with a cementitious material with an adjustable pumping force; removably installing one of a variety of interchangeable brick molding devices such that the brick molding apparatus is parallel to the pumped cementitious material and flexible external reinforcing cementitious containment sleeve that flows through the interchangeable pass-through mold; and pumping a cementitious mix compound such that the cementitious mix compound first flows inside brick's external flexible fabric reinforced containment sleeve device and adjustably compresses the extruded brick's surfaces radially inward together between the interchangeable pass-through dies/molds, then the externally fabric reinforced molded brick flows through an opening at an opposing end of an installed pass-through interchangeable slip-form mold to print the molded external fabric reinforced containment sleeve interlocking brick package.

The full architectural scale automated 3-dimensional interchangeable die or mold slipform printing system having flexible/deformable into position external reinforcing containment sleeve pass-through interchangeable die/mold slipform layer wise interlocking printing method and apparatus according to any claim wherein the automated measurement method and apparatus comprises an inertial navigation system to measure the position in real time the slipform pass-through print nozzle at a high data update rate, that provides data relating to the location in 3-dimensional full architectural scale space of the interchangeable slipform die or molding extruding nozzle to the controller in real time.

The full architectural scale automated flexible external leave in place print in place fabric reinforced brick positioning and layer wise interlocking pass-through slipform die or mold 3-dimensional brick printing system having interchangeable molds/dies method and apparatus according to any claim wherein the measurement system comprises a scanning laser system to provide tunable dynamic response location data relating to the real-time position of an interchangeable dye or molding slipform construction apparatus in a brick layer wise deposition manner, wherein the measurement system uses the location data to accurately print the interlocking layer wise printing deposition position data.

The full architectural scale automated 3-dimensional flexible leave in place print in place deformable into position external reinforcing containment sleeve having pass-through interchangeable die/mold slipform layer wise interlocking printing method and apparatus according to any claim wherein the controller controls the die or molding interchangeable slipform pass-through printing nozzle to layer wise interlock deposit position and place the slipform die or mold extruded interlocking keyway printed bricks at respective predetermined 3-dimensional full architectural scale locations in a layer wise deposition interlocking sequence having tunable dynamic response where a complete course of external fabric reinforced die or molded slipform printed bricks onsite is laid prior to the laying of a slipform printed interlocking external reinforced brick for a next course of external leave in place print in place fabric reinforced slipform interlocking bricks.

The full architectural scale automated flexible external leave in place print in place fabric reinforced brick positioning and layer wise interlocking pass-through being deformable into position within the interior position of the full architectural scale slipform die or mold 3-dimensional printing system having interchangeable molds/dies method and apparatus according to any claim wherein, another of the modular automated manipulators slipform prints the previously positioned and pass-through printed external flexible fabric reinforced deformable into the interior position interlocking brick while the adjustable compressive force is being applied as needed.

The full architectural scale automated flexible external leave in place print in place fabric reinforced brick positioning and layer wise interlocking pass-through deformable into the interior position of said slipform die or mold 3-dimensional printing system having scalable interchangeable molds/dies method and apparatus according to any claim wherein the pass through slipform printer system further comprises an interlocking brick die or molding positioning and carrying apparatus which pass through pumps a source of printed extruded die or molded bricks to be positioned and printed in place.

The full architectural scale automated external flexible/deformable into the interior position leave in place print in place fabric reinforced brick positioning and layer wise interlocking 3-dimensional printing system having interchangeable molds/dies method and apparatus according to any claim wherein the concrete construction system's automated robotic system further comprises several ground engaging and supporting operating bases to which the robotic arms are universal mounting attachment coupled, and wherein the controller controls the positions of the multi-purpose mechanized modular arms on the basis of the control data.

The full architectural scale automated flexible external leave in place print in place fabric reinforced brick positioning and layer wise interlocking pass-through deformable into the interior position slipform die or mold 3-dimensional printing system having interchangeable molds/dies method and apparatus according to any claim wherein the controller controls the positions of the multi-purpose modular mechanized arms to maintain the position of the slipform mold printing head having interchangeable molds/dies in a datum plane for a particular pre-engineered flexible external leave in place print in place fabric reinforced interlocking brick having layer wise deposition brick path being printed, positioned, and continuously or intermittently laid in real time.

The full architectural scale automated flexible external leave in place print in place fabric reinforced brick positioning and layer wise interlocking pass-through deformable into position within the interior of the slipform die or mold 3-dimensional printing system having interchangeable molds/dies method and apparatus according to any claim wherein the transportable multi-purpose removably attached having universal mounting attachment modular robotic support and operating pedestal structures comprise one of the group consisting of a telescopic boom (crane), a gantry, a transportable collapsible trailer having an operating platform, a guide rail system, and a light weight sand and or water filled reusable supporting and operating pedestal, a reinforced leave in place cast in place operating pedestal platform, a temporary auger supporting and operating platform, a Bobcat®, or other crane like structure.

A full architectural scale automated 3-dimensional slipfrom molding and printing method and apparatus according to any claim encompasses the vertically stowable modular automated construction system transporting and operating trailer platform encompassing an onsite slip-form printing reinforced concrete construction system comprising:

a forward support frame having a first upper platform and frame and a rear interface side attached to and projecting downward from the first upper platform wherein the forward support frame has a recess underneath the first upper frame which is adapted to receive a spare wheel and tire assembly;

a trailer neck connected to the forward support frame and extending therefrom;

a first planar deck plate attached to and covering a substantial portion of the first upper platform and or trailer/frame;

mounting operating pedestal assembly apparatuses having laser, acoustic, bubble, level indicating systems;

a pair of adjustable caster wheels;

caster wheels attached proximate the rear interface side;

a rear support frame having a second upper platform and frame and a forward interface side attached to and projecting downward from the second upper platform and frame;

a second planar deck plate attached to and covering a substantial portion of the second upper platform;

a third adjustable caster wheel attached to the forward interface side; and at least one hinge interconnecting the rear frame interface and forward interface sides;

wherein the automated construction system transporting and operating platform trailer (system) is adapted to be configured in a deployed mode in which the rear and forward frame interfaces are positioned adjacent each other such that the forward and rear support frames form a generally oriented common flatbed operating platform for supporting and operating a complete automated construction slip-form molding and printing system onsite lifting and positioning apparatus having 360 degree rotation operating (onsite) and further transporting in a confined space.

A full architectural scale automated 3-dimensional slipform molding and printing method and apparatus according to any claim provides a external fabric reinforced containment tube for casting a reinforced concrete cast in place leave in place supporting and operating platform and pedestal having removable attachment means to the automated construction system adapted to be inserted and conform to an onsite drilled hole and thereafter to be filled with hardenable concrete, said protective reinforced containment sleeve comprising body portion formed of flexible/deformable into position woven material so that the diameter of said protective reinforced sleeve is slightly larger than that of said drilled hole after removal of said auger/drill, and a closed lower portion reinforced tube, whereby when filled with hardenable cementitious "concrete" under gravitational force and pressure.

In a method and apparatus according to any claim for casting a leave in place cast in pedestal vertically elongated supporting and operating pedestal having an external reinforced cementitious containment sleeve (mold), comprising providing a vertically elongated reinforced cementitious containment sleeve, casting reinforced cementitious materials within said vertically elongated external containment sleeve, and hardening said cementitious casting material(s) to form said external supporting and operating cast in place leave in place pedestal, the improvement wherein said vertically elongated protective reinforced external containment sleeve is a moldable (form fitting) flexible and inelastic elongated cast in place leave in place external reinforcement containment sleeve automatically conforming to ground irregularities having an opening at one end thereof for supplying said cementitious casting material(s), said flexible pre-engineered reinforcement sleeve constituting means for alone containing said casting cementitious materials therein, upon said casting (pedestal) of said casting material in said elongated self-adjusting external containment sleeve, onsite while contained in an excavated hole.

The full architectural scale automated slipform flexible/deformable into the interior position external leave in place print in place fabric reinforced brick printing positioning and layer wise interlocking printing having interchangeable molds/dies method and apparatus according to any claim wherein the transportable supporting and operating structures is adapted to reach over an entire area of the full architectural scale 3-dimensional slipform printed rooms and or structure being constructed.

The full architectural scale automated flexible/deformable into the interior position external leave in place print in place fabric reinforced slipform brick positioning and layer wise interlocking 3-dimensional printing system having interchangeable molds/dies method and apparatus according to any claim wherein the non-contact optical line-of-sight position measuring system is selected from an automated total construction station, a scanning laser, and a combination of the automated total construction station and the scanning laser contributes to the automated construction system's tunable dynamic response.

The full architectural scale automated flexible external leave in place print in place fabric reinforced brick positioning and layer wise interlocking pass-through deformable into the interior characteristics of the slipform die or mold 3-dimensional printing system having interchangeable molds/dies method and apparatus according to any claim wherein said method comprises:

sequentially layering a self-consolidating cementitious architectural material on all surfaces of a three-dimensional brick form made of a cementitious material, thereby producing said printed reinforced architectural component on the construction site and or in a factory environment; and, installing said architectural component in said three-dimensional structure.

The automated method and apparatus according to any claim, wherein said steps of preparing a three-dimensional fabric reinforced slipform brick layer wise interlocking printing system having interchangeable molds printing from a cementitious material comprises preparing a full architectural scale three-dimensional slipform printing system having adjustable tunable dynamic response characteristics by use of a computer-controlled multi-task modular robotic arm.

The full architectural scale automated flexible/deformable within the interchangeable mold's interior position 3-dimensional printing having external leave in place print in place fabric reinforced brick slipform printing positioning and layer wise interlocking printing method and apparatus according to any claim, wherein said steps of constructing a full architectural scale three-dimensional slipform cementitious material comprises:

material on a movable support pedestal in tunable dynamic response communication with a computer processor, said supporting and operating pedestals capable of movement in response to commands from said computer processor; and, simultaneously or sequentially printing structurally reinforced cementitious materials by use of an end effector printing head positioned at a distal end of a multi-task robotic arm in tunable dynamic response communication with said computer processor and moving in cooperation from said supporting and operating pedestals in response to commands from said computer processor, thereby slipform printing a three-dimensional reinforced structure having a desired 3-dimensional shape.

The full architectural scale automated flexible external leave in place print in place fabric reinforced brick having positioning and layer wise interlocking pass-through deformable into the interior position slipform die or mold 3-dimensional printing system having interchangeable molds/dies encompassing method and apparatus according to any claim, wherein said steps of simultaneously and or sequentially positioning and interlocking said printed brick layers of structural cementitious materials comprises using a second effector at said distal end of said multi-task modular robotic arm(s) and in cooperation with said supporting and operating platforms, simultaneously and or sequentially positioning and printing interlocking printed brick layers of structural cementitious materials from said three-dimensional automated slipform, thereby slip-forming an full architectural scale reinforced cementitious components.

The full architectural scale automated flexible external leave in place print in place fabric reinforced brick positioning and layer wise interlocking pass-through having deformable into position within the interior 3-dimensional surfaces of the interchangeable slipform die or mold 3-dimensional printing system method and apparatus according to any claim, comprising preparing said surfaces of said automated three-dimensional slip-form prior to said step of sequentially positioning and applying interlocking printed layers of printable reinforced structural cementitious materials.

The full architectural scale automated flexible external leave in place print in place fabric reinforced brick positioning and layer wise interlocking pass-through deformable to the interior of the interchangeable slipform die or mold 3-dimensional printing system method and apparatus according to any claim, wherein:

said step of preparing a three-dimensional interchangeable slip-form moldable reinforced cementitious material comprises:

automated 3-dimensional printing system robotic arms supported and operated from a wide variety of movable or fixed supporting and operating platforms (pedestals) providing a tunable dynamic response having communication with a computer processor, said supporting and operating platforms capable of automated movements in response to commands from said computer processor; and, simultaneously and or sequentially adding (printing) materials by use of interchangeable end effectors positioned at a distal end of a multi-task modular robotic arm in tunable dynamic response communication with said computer processor and moving in cooperation with said supporting platform in response to commands from said computer processor, thereby forming a three-dimensional slipform printed structure having a full architectural scale and desired shape;

said steps of printing and positioning a layer of material comprises printing and positioning said material from a second effector at said distal end of said multi-purpose robotic system in cooperation with said supporting and operating platforms, said second effector in communication with said mix storage vessels; and, said step of simultaneously and or sequentially printing and positioning layers of structural architectural material comprises simultaneously and or sequentially printing and positioning layers of structural architectural material from said three-dimensional slip-form by using said second effector.

The full architectural scale flexible external leave in place print in place fabric reinforced brick positioning and layer wise interlocking interchangeable full architectural scale molds/dies pass-through 3-dimensional brick printing system method and apparatus according to any claim relates generally to interchangeable apparatuses (devices) for slip-form printing reinforced concrete structures, such as automated construction of reinforced foundations, footings, walls, retaining walls, and other horizontal and vertically extending reinforced structural barriers, and further including roofs. More specifically, the automated invention pertains to an apparatus including one or more interchangeable full architectural scale slipformers.

The full architectural scale automated flexible external leave in place print in place fabric reinforced brick positioning and layer wise interlocking pass-through deformable into the interior of the interchangeable molds/dies 3-dimensional printing system method and apparatus according to any claim, wherein said interchangeable slipform print head is positioned at a distal end of modular multi-task robotic arms.

The full architectural scale automated 3-dimensional slipform molding and layerwise printing method and apparatus according to any claims encompasses the external reinforcing containment sleeve having a wide variety of pre-engineered venting aperture sizes, shapes and dimensions, and configurations scaled as needed, encompassing containing and reinforcing a wide variety of onsite slip-form printed cementitious mixes for regulating the onsite cementitious mix's curing environment employing inventive external flexible fabric reinforcing cementitious brick encapsulating characteristics such as having a variety of pre-engineered external reinforced containment sleeves' venting apertures providing improved uniformity of heat dissipation characteristics and a variety of improved pre-engineered evaporation control characteristics, improving a wide variety of cementitious bonding (curing) characteristics, particularly for optimizing the onsite slip-form printing cementitious mixes environment for high performance and specialty structural reinforced concrete interlocking brick mixes in real time.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, wherein said slipform printed self-consolidating and or non-self-consolidating cementitious material obtains a sufficient curing state to support the next printed layer within a pre-engineered setting time of between 30 seconds and 5 minutes by modifying/adjusting the cementitious mix combined with the sleeves pre-engineered venting apertures to predictably obtain the optimized and preferred curing environment.

The full architectural scale automated 3-dimensional slipfrom molding and layerwise printing method and apparatus according to any claim encompasses slip-form interchangeable molding having onsite placement and printing of a variety of low slump cementitious mixes that are interlocking and externally encapsulated in a fabric reinforced external moldable reinforcing containment sleeve having a delivered cementitious mix slump ranging between about 0 to 3, and more preferred cementitious mixes' having a preferred delivered (printed) slump ranging between about 1.5 to 2.0, and the most preferred cementitious mix delivered slump ranging between about 0.0 to 1.50.

The flexible/deformable into the interior of the interchangeable mold/die fabric reinforced external cementitious containment sleeve method and apparatus according to any claim significantly shortens cementitious mix curing rate/time between each interlocking brick layerwise printing layer; thus optimizing the casting rate/speed having an average slip-form printing casting rate of about 60 feet per minute or slip-form printing about 1 foot per second or significantly more depending upon the application.

The external reinforced containment sleeve method and apparatus encompasses the spacing or distance between the mesh or filaments configurations such as but not limited to plain, herringbone, cross-weave, twill, basket, satin, leno, mock leno that produce pre-engineered crossing sections comprises weld joints and defines the pre-engineered spacings and desired venting regulating aperture sizes generally ranging between about 0 mm to 5 mm, preferably ranging between about 0.25 mm and 3 mm, most preferably ranging between about 0.25 mm to 1 mm, or may be pre-engineered and spaced as necessary, preferably manufactured from polypropylene or bio-plastics H2O, CO2, or basalt, to control and regulate the mix curing, thermal dissipation, water dissipation, and external reinforcing providing a desired pre-engineered curing environment for the 3-dimensional full architectural scale slipform molded and layer wise printed interlocking brick having a slip-form pass-through die or mold shape and size.

A full architectural scale automated 3-dimensional interlocking brick layer-wise slipform pass-through molding and printing system having external cementitious reinforcing flexible deformable into position flexible plastic material method and apparatus according to any claim, wherein the width of each cementitious reinforcing strip is in the range of from about 1 mm to about 4 mm wide, more preferably ranges between about 1.5 mm to about 3.5 mm wide.

A full architectural scale automated 3-dimensional interlocking brick layerwise slipform pass-through molding and printing woven external cementitious reinforcing flexible deformable into position plastic material method and apparatus according to any claim, wherein the thickness of each mesh in the range of from about 0.01 mm to about 0.20 mm, more preferably ranging between about 0.02 mm to about 0.06 mm.

A full architectural scale automated 3-dimensional interlocking 'brick' layerwise slipform printing external tubular cementitious reinforcing flexible/deformable into the interior of the interchangeable pass-through mold containment sleeve method and apparatus composed of woven plastic material according to any claim, wherein the thickness of each strip is in the range of from about 0.01 mm to about 0.20 mm, more preferably ranging between about 0.02 mm to about 0.06 mm.

The full architectural scale automated 3-dimensional slipform interlocking brick layerwise printing apparatus and method according to any claim, characterized in that it further comprises for each flexible deformable into position external fabric reinforced cementitious brick containment sleeve having printed label(s), logo, Bar code, QR Code, ID and or serial numbers.

The internal reinforcement mesh/net method and apparatus encompasses spacing or distance between the internal reinforcement mesh or filaments that produce the desired regulating apertures generally ranges between about 2 mm to 25 mm, preferably ranging between about 5 mm to about 20 mm, most preferred ranging between about 10 mm to 15 mm, or may be pre-engineered and spaced as necessary or needed, preferably manufactured from polypropylene or bio-plastics $H_2O$, $CO_2$, or basalt.

The full architectural scale automated 3-dimensional slipform molding and layerwise printing method and apparatus according to any claim, encompasses extruding onsite with a reinforced flexible external containment sleeve that further contains an internal reinforcement mesh that is positioned in the stress zones as needed.

The full architectural scale automated 3-dimensional slipform molding and printing method and apparatus according to any claim, having accurately positioning of the internal reinforcement mesh/net in the pre-engineered stress zones for containing a wide variety of cementitious mixes.

A full architectural scale external flexible fabric reinforced cementitious containment sleeve method and apparatus according to any claim, wherein the reinforced cementitious containment sleeve is made of a thin woven plastic of pre-engineered filament diameter, spacings, and gauges sufficient to provide said reinforced cementitious containment sleeve with enough selective reinforced cementitious mesh and pre-engineered apertures (spacing) and strength to provide the support required for assuming and maintaining said vertical extension without any additional exterior supporting form or wall.

A full architectural scale automated 3-dimensional slipform molding and layerwise printing having external fabric reinforced flexible cementitious containment sleeve method and apparatus according to any claim for printing high performance concrete mixes on site in real time providing a wider variety of slip-form printing cementitious mixes and having a wider range of onsite casting temperatures and humidity ranges.

The full architectural scale automated external fabric reinforced slip-form molding and printing containment sleeve method and apparatus according to any claim encompasses having a variety of encapsulating containment sleeve materials and textures to prevent the cementitious materials and the external fabric reinforced containment sleeve to prevent sticking to the inside surfaces of the interchangeable mold/die, reducing on site waste materials including concrete waste and associated clean up.

The full architectural scale automated 3-dimensional slipform printing external fabric reinforced cementitious flexible/deformable into the interior of the interchangeable molds containment sleeve method and apparatus according to any claim having printed/painted on visual references such as but not limited to indicating locations, height, distance, encompassing other identification codes indicating the location(s) of plumbing, electrical, stairs, fireplaces, panels (electrical junction boxes), windows, walls/ceiling, doorways, joints/seams, corners, columns, etc.

A method and apparatus of any claim for manufacturing a external reinforced concrete brick product in a slip-form molding and printing process onsite using two or more different grades of reinforced concrete mix on the construction site, in which apparatus and method concrete mix is fed into the interchangeable slip-form brick printing extrusion mold(s) of a defined cross section moving progressively in the printing process so as to give a external fabric reinforced cementitious brick product a desired profile (shape), whereby two or more different grades of concrete mix can be used in the brick product cast in accordance with the method and apparatus, characterized in that the batches of the different brick concrete mix grades are metered in predetermined amounts into the feeder hopper of the automated slip-form printing machine at predetermined instants during the external reinforced brick slip-form printing process.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, wherein said printable structural architectural material comprises Portland cement powder, additives, aggregate, a superplasticizer, water, a setting time accelerant, and a thickening agent.

The full architectural scale automated flexible external leave in place print in place fabric reinforced brick positioning and layer wise interlocking pass-through deformable into the interior position of the interchangeable slipform die or mold 3-dimensional printing system method and apparatus according to any claim, wherein said step of simultaneous and or sequential printing and positioning a printable structural architectural material on at least one surface of a three-dimensional brick structure comprises:

preparing a wet structural cementitious material characterized by an initial setting time;

applying a layer of said wet structural cementitious material to said full architectural scale three-dimensional slip-form printed layer prior to said initial setting time; and, repeating at least one of said steps of preparing a wet structural cementitious material and applying a layer of said wet structural cementitious material to said three-dimensional full architectural scale structure as necessary.

The full architectural scale automated flexible external leave in place print in place fabric reinforced brick positioning and layer wise interlocking pass-through deformable into the interior of the interchangeable slipform die or mold 3-dimensional structural printing system method and apparatus according to any claim, wherein said steps of preparing a wet structural architectural material comprises:

preparing a mixture of cementitious mix, aggregate, and optionally thickening agent;

adding a solution of superplasticizer to said mixture; mixing until a homogeneous mix is obtained; and, dispersing a setting time accelerant into said reinforcing cementitious mix.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, wherein said steps of preparing a wet structural architectural material comprises:

introducing a cement mix, aggregate, water, optionally at least one of thickening agent and superplasticizer into a first mixing chamber in fluid communication with a first inlet into a nozzle;

mixing said self-consolidating cementitious mix, aggregate, water, and, if present, superplasticizer in said first mixing chamber, thereby producing a mixture;

introducing a solution or dispersion comprising a setting time accelerant into a second inlet into said nozzle;

introducing a thickening agent into a second mixing chamber in fluid connection with a third inlet into said nozzle;

introducing said solution or dispersion into said nozzle via said second inlet such that said first solution is at least partially atomized from said nozzle mixing chamber;

introducing said thickening agent into said nozzle via said third inlet such that said thickening agent is at least partially atomized dispensed from said nozzle; introducing said mixture into said nozzle mixing chamber via said first inlet such that said mixture passes through said solution and said thickening agent from said nozzle, thereby creating a pass-through moldable wet structural architectural material;

and, passing said moldable wet structural architectural material into said pump nozzle and interchangeable mold/die before said initial setting time of said wet structural architectural material.

The full architectural scale automated flexible external leave in place print in place fabric reinforced brick positioning and layer wise interlocking pass-through deformable into the interior of the interchangeable slipform die or mold 3-dimensional printing system method and apparatus according to any claim for preparing a three-dimensional full architectural scale slip-form printed brick made of structural reinforcing material, comprising:

printable reinforcing material on a cast in place or transportable onsite movable supporting and operating platforms having an adjustable tunable dynamic response in communication with a computer processor, said supporting and operating platforms capable of real time movements in response to commands from said computer processor; and, simultaneously and or sequentially printing layer wise printed reinforcing materials from said nozzle by use of an interchangeable end effector positioned at a distal end of a multi-purpose robotic arms in communication with said computer processor and moving in cooperation with tunable dynamic response having real time adjustments with said supporting and operating platforms in response to commands from said computer processor, thereby printing a full architectural scale three-dimensional interchangeable slipform printed brick having a 3-dimensional desired moldable shape.

The full architectural scale automated flexible external leave in place print in place fabric reinforced brick positioning and layer wise interlocking pass-through deformable into the interior of the interchangeable slipform die or mold 3-dimensional printing system method and apparatus according to any claim of sequentially layer wise printing a full architectural scale material on at least one surface of a three-dimensional interchangeable slip-form, comprising:

preparing a wet structural architectural material characterized by having an initial curing time;

supplying a source of said printed wet structural architectural material to a three-dimensional full architectural scale slip-form mold/die prior to said initial curing time; and, repeating at least one of said steps of preparing a wet reinforcing architectural materials and printing of said wet reinforcing architectural materials within said three-dimensional interchangeable slip-form mold/die as necessary.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, wherein said steps of preparing a wet architectural reinforcing material comprises:

preparing a mixture of self-consolidating cementitious mix, aggregate, and adding a solution of superplasticizer to said mixture;

mixing until a homogeneous slurry is obtained; and, addition of a setting time accelerant dispersion and a thickening agent into said self-consolidating cementitious mix.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, wherein said steps of preparing a wet structural architectural material comprises:

introducing a self-consolidating cementitious mix, aggregate, water, at least one of a superplasticizer into a first mixing chamber in fluid communication with a first inlet into a nozzle;

mixing said self-consolidating cementitious mix, aggregate, water, and, if present, superplasticizer in said first mixing chamber, thereby producing a printable mixture;

introducing a solution or dispersion comprising a setting time accelerant into a second inlet into said nozzle;

introducing a thickening agent into a second mixing chamber in fluid connection with a third inlet into said nozzle;

introducing said solution or dispersion into said nozzle via said second inlet such that said first solution is at least partially atomized within said nozzle mixing chamber; introducing said thickening agent into said nozzle via said third inlet such that said thickening agent is at least partially atomized within said nozzle;

introducing said mixture into said nozzle mixing chamber via said first inlet such that said mixture passes through said nozzle, thereby die or molding a wet structural architectural material; and, passing said wet structural architectural material into said pass-through nozzle before said preferred initial setting time of said wet structural architectural material.

The full architectural scale automated flexible external leave in place print in place fabric reinforced brick positioning and layer wise interlocking pass-through deformable into the interior of the interchangeable slipform die or mold 3-dimensional printing system method and apparatus according to any claim having tunable dynamic response having computer controlled system for constructing an interlocking full architectural scale printed component from a three-dimensional interchangeable slip-form die or mold apparatus comprising:

an operating and supporting platform for supporting and positioning a three-dimensional full architectural scale printed form, said support platform being configured for translational and/or rotational movement;

a modular multi-task robotic arm having a supporting and operating pedestal (base) and a distal end, said removably attached base being configured for controlling the tunable dynamic response movements along a path proximate the supporting and operating pedestal, said distal end of said multi-task robotic arms being configured to extend and retract, translate, and/or rotate relative to said supporting and operating pedestal and further configured to includes a removably attached end effector for slipform layer wise printing successive layers of interlocking structurally reinforced material onto and having, a computer processor containing instructions for controlling a sequence of movements of said supporting and operating pedestal and each of said base and said distal end of said multi-task modular robotic arms and for determining and simultaneously and or sequentially positioning and printing interlocking structurally reinforced layers of material onto and/or sequentially adding material from said three-dimensional full architectural scale slipform molded and printing onsite a full architectural scale component of a predetermined shape and dimension.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, further comprising a guide rail system to which said base is removably attached.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, wherein said print head comprises at least one interchangeable slip-form molding print head pass-through outlet, and said concrete pumping rig comprises:

a first mixing chamber comprising an pass-through outlet in fluid connection with a first slip-form molding print head inlet;

a second mixing chamber comprising at least one inlet and an outlet in fluid connection with a second slipform molding print head inlet; and, a third mixing chamber comprising at least one inlet and an outlet in fluid connection with a third slipform molding print head inlet;

and further wherein said slipform molding print head is configured such that when self-consolidating mix material enters said slipform molding head simultaneously through said first slipform molding print head inlet and at least one of said second slipform molding print head inlet and said third slipform molding print head inlet, at least part of mix material entering said slipform molding print head from said first slipform molding print head inlet encounters mix material entering from any other slipform molding print head inlet through which mix material is entering said slipform molding print head.

The full architectural scale automated mechanized and or robotic 3-dimensional slipform molding and layerwise printing construction method and apparatus of any claim, wherein the single or multi-nozzle assembly further includes a slip-forming nozzle position controller configured to controllably vary the extruded "brick" shape or configuration with respect to the position and height of at least one of the previous slip-formed brick layers.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, wherein said fluid connection between said first mixing chamber and said first slipform molding print head inlet comprises a flexible hose removably connected to said vibrating means.

The full architectural scale automated flexible external leave in place print in place fabric reinforced brick positioning and layer wise interlocking pass-through deformable into the interior of the interchangeable slipform die or mold 3-dimensional printing system method and apparatus according to any claim, wherein said construction instructions comprise software configured to accept as input a desired geometry of said three-dimensional full architectural scale structural form and to control said automated slipform molding printing system having tunable dynamic response system from said input to construct a full architectural scale component without any significant intervention by an operator of the automated construction system.

The full architectural scale automated external leave in place print in place flexible fabric reinforced brick positioning and layer wise interlocking pass-through deformable into the interior of the interchangeable slipform die or mold 3-dimensional printing system method and apparatus according to any claim comprises having a concrete pumping rig for preparing and pumping concrete wherein said concrete pumping rig comprises:

a pumping head;

a first mixing chamber comprising an outlet in fluid connection with a first slipform molding print head inlet;

a second mixing chamber comprising at least one inlet and an outlet in fluid connection with a second slipform molding print head inlet; and, a third mixing chamber comprising at least one inlet and an outlet in fluid connection with a third slipform molding print head inlet;

and further wherein said slipform molding print head is configured such that when self-consolidating mix material enters said slipform molding print head simultaneously through said first slipform molding print head inlet and at least one of said second slipform molding print head inlet and said third slipform molding print head inlet, at least part of reinforced cementitious material entering said slipform molding print head from said first slipform molding print head inlet encounters material entering from any other slipform molding print head inlet through which mix material is entering said slipform interchangeable molding print head.

An automated apparatus and a method according to any claim for interchangeable slipform mold or die three-dimensional full architectural scale patterns on an external flexible and deformable into the interior position of the interchangeable slipform mold/die external leave in place print in place fabric reinforced cementitious interlocking brick for constructing reinforced structures such as foundations, walls, and/or roofs, having at least one interchangeable slipform die or mold is provided at the discharge end of a full architectural scale pass-through slipform printing apparatus;

the interchangeable slipform die or mold includes an outer periphery, provided with a layer or coating, of resilient material.

The interchangeable slipform die or mold interior dimensions and surface is pre-formed or pre-cast to include a structurally and aesthetically desirable, full architectural scale three-dimensional slipform die or mold pattern.

The axis of the interchangeable slipform die or mold is maintained in parallel relation to the plane of the exposed surface of the slipform printed reinforced foundation, footing, wall, door and or window frame, and/or roof with the inner periphery of the interchangeable slip-form die or mold having the slipform printed external leave in place print in place external flexible deformable into the interior position of the interchangeable slipform die/mold fiber reinforced brick surfaces.

As the semi-cured cementitious concrete interlocking layer wise printed brick is extruded from the slipform molding printing apparatus, the interchangeable slipform mold/die molds 3-dimensional patterns into the wall surface corresponds to the full architectural scale pattern inside the die or mold.

Along the interlocking layer wise printed section(s) causes the slipform system to die or mold (impress) successively formed semi-cured portions of the foundation, footing, wall, and/or roof with the interchangeable 3-dimensional full architectural scale printed brick die or molding pattern(s). Additional die or molds may be used to impress virtually any conceivable patterns on the opposing brick surfaces, as well as the top and bottom of the dye or molded slip-formed printed brick's surface. After the slip-formed concrete bricks has fully cured; stain, paint, or other bonding or decorative features may be applied, adding further visual interest and variety as needed.

The full architectural scale automated flexible external leave in place print in place fabric reinforced brick positioning and layer wise interlocking pass-through deformable into the interior of the interchangeable molds/dies slipform die or mold 3-dimensional printing system method and apparatus according to any claim for printed die or molding a three-dimensional pattern onto a semi-cured cementitious "brick's" external leave in place print in place reinforcing containment sleeve previously die or molded (formed) by the interchangeable inventive full architectural scale slip-form molding or die apparatus comprising: an having interchangeable die or molds having an axis of rotation and an outer periphery, at least a portion of said outer periphery including an outer layer of thin deformable into place containment sleeve material having an outwardly facing pattern side impressed with a three-dimensional die or molding pattern; upper and lower adjustable arms rotatably attached to a respective upper and a respective lower end of said interchangeable impression die or mold: said arms extending from a containment sleeve support pedestal;

said supporting and operating pedestal configured for removable coupling to a automated slip-form printing (machine);

said interchangeable modular adjustable multi-purpose robotic arms configured to support and operate said die or mold for rotation about said axis with said outer periphery being partially depressed into a first exposed deformable into desired die or mold shape having containment sleeve side surface of the semi-wet cementitious paste extruded from said slip-former, said axis of said die or mold being maintained substantially parallel to the exposed printed "brick" surfaces;

whereby interlocking keyway surface engagement between said outer periphery of said die or mold and the first exposed printed containment sleeve surface of the semi-wet (concrete) paste cause said die or mold to rotate and impress successive portions of the semi-wet cementitious concrete paste with successive portions of said three-dimensional pattern: and an opposing element displaced to engage a second exposed bricks containment sleeve side surface opposite said first exposed containment sleeve side surface of said printed "brick" section.

A full architectural scale automated slip-form printing extrusion reinforced concrete construction system method and apparatus according to any claim comprising: a flexible fabric reinforced sleeve deformable into the interior position of the interchangeable slipform die/mold extrusion nozzle; a pumping element coupled to the slipform molding printing extrusion nozzle and to a source of reinforced concrete construction material(s) the pumping element configured to transport the mix materials to the interchangeable slipform die or molding extrusion nozzle for extruding the cementitious mix materials into a die or molding system; a sensor element disposed at least partly within the mix and comprising an array of optical fibers configured to measure light illuminated from the mix materials flowing through the interchangeable die or molding element; an imaging device configured to produce a plurality of real time images based on said measurements; and a controller configured to accurately determine the reinforced cementitious mix flow rate in real time based on the plurality of images.

The full architectural scale automated flexible external leave in place print in place fabric reinforced brick positioning and layer wise interlocking pass-through deformable into the interior position of the interchangeable slipform die or mold 3-dimensional printing system method and apparatus according to any claim wherein the controller is further configured to adjust an actual flow rate of the self-consolidating mix materials in real time through the slipform molding printing element to produce an adjustable flow rate in response to determining that the estimated mix flow rate is any of higher and lower than a reference flow rate in real time.

The full architectural scale automated flexible external leave in place print in place fabric reinforced brick positioning and layer wise interlocking pass-through deformable into the interior of the interchangeable slipform die or mold 3-dimensional printing system method and apparatus according to any claim comprising: a positionable extrusion nozzle for accurately extruding self-consolidating concrete construction material through an interchangeable mold slip-form printing apparatus; a pass-through pumping element configured to transport the mix materials through the interchangeable slipform printing extrusion nozzle; wherein a surface of the die or molding element comprises a transparent substrate such that a flow of the cementitious mix material is viewable through the substrate; an imaging device configured to capture images of the mix material flow in real time; and a controller configured to accurately measure and adjust the flow rate in real time of the cementitious mix materials based on the images.

The full architectural scale automated 3-dimensional slip-form pass-through molding and printing system having interchangeable molds/dies to layerwise print interlocking bricks method and apparatus according to any claim encompasses external reinforcing flexible/deformable into position fabric cementitious containment sleeve that improves the mix hardening properties and the performance and for use such as but not limited to: 1) mixture proportioning; 2) mechanical properties; 3) time-dependent mix deformations; 4) flexural and shear behavior; 5) bonding behavior; 6) prestress losses; 7) the structural behavior of full architectural scale elements; 8) Improves grain boundary; 9) Improves electrophysical bonding characteristics; 10) Improves electrochemical bonding characteristics.

The full architectural scale automated flexible external leave in place print in place fabric reinforced brick positioning and layer wise interlocking pass-through deformable into the interior of the interchangeable slipform die or mold 3-dimensional printing system method and apparatus according to any claim:
employing a external leave in place print in place reinforcing flexible mesh sleeve deformable into the interior of the interchangeable slipform printing die or mold such that a external reinforced brick bound by at least two opposing portions of the external reinforced containment mesh sleeve is molded;
pumping a self-consolidating cementations material in to the full architectural scale interchangeable mold or die cavity; and
regulating the cementations material to partially harden;
wherein pre-engineered venting apertures control and regulate the mix curing, thermal dissipation, water dissipation, and external reinforcing in the at least two opposing portions of the fabric reinforced external mesh sleeve element are adapted to the optimized curing environment of the pumped flow through cementations material or vice versa such that at least two surfaces of the hardenable cementations material substantially take on the respective die or mold shapes defined by the at least two opposing molding portions of the interchangeable slipform mold/die apparatus.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, wherein the external flexible leave in place print in place containment sleeve fabric reinforcing mesh sleeve comprises a regular arrangement of pre-engineered regulating venting apertures providing a interlocking layer wise slipform die or mold molded and printed encapsulated brick shape conforming to the external leave in place print in place molded external reinforcing mesh having tunable dynamic response.

The full architectural scale automated fabric reinforced brick positioning and layer wise interlocking 3-dimensional pass-through printing method and apparatus according to any claim, wherein providing the external flexible leave in place print in place deformable into the interior of the interchangeable mold/die mesh reinforced structural brick element printing system further comprises pass-through molding a flexible external leave in place print in place reinforcing mesh structure between the at least two opposing portions and across the interchangeable molding cavity.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, wherein the external flexible leave in place print in place reinforcing mesh's pre-engineered regulating venting aperture structures having mix keyway interlocking characteristics to at least two opposing surfaces of the interchangeable slipform mold/die printed reinforced brick external mesh containment sleeve for supporting the at least two opposing surfaces of the externally fabric reinforced slipform molded and printed bricks in their respective shapes.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, wherein the external flexible deformable into the interior of the interchangeable mold/die leave in place print in place fabric reinforcing mesh pre-engineered regulating venting aperture structures differ in size, shape, spacing, and configuration to control and regulate the mix curing, thermal dissipation, water dissipation, and external reinforcing of the slipform molded and printed brick.

The full architectural scale automated fabric reinforced brick positioning and interlocking layer wise 3-dimensional pass-through printing system having interchangeable molds and dies method and apparatus according to any claim, wherein the external leave in place print in place fabric reinforcing mesh further comprises providing pre-engineered venting apertures in the external reinforced flexible/deformable into position mesh structure to facilitate accumulating the self-consolidating cementitious material in the pass-through cavity.

The full architectural scale automated fabric reinforced brick positioning and layer wise interlocking 3-dimensional pass-through printing system having interchangeable molds/dies method and apparatus according to any claim, wherein the external flexible deformable into position leave in place print in place fabric reinforcing mesh's venting apertures are defined in gaps between adjacent mesh structures to optimize the bonding surface between successive interlocking layer wise printed layers by simultaneously regulating the curing environment, reinforcing the printed brick, and regulating and optimizing the bonding surface between interlocking printed brick layers by regulating and optimizing the predictable and selective protrusion of encapsulated cementitious material through the pre-engineered venting apertures.

The full architectural scale automated fabric reinforced brick positioning and layer wise interlocking 3-dimensional pass-through printing system method and apparatus according to any claim, wherein the external leave in place print in place reinforcing mesh formwork is supplied with sufficient vibration and cementitious mix pumping pressure in to the interchangeable mold to remove excess water and to obtain sufficient molding and compaction of the cementitious materials bound by four surface portions of the flexible external deformable into position leave in place print in place reinforcing mesh formwork element.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, wherein the flexible external deformable into position leave in place print in place reinforcing mesh is fabricated (formed) from pre-engineered filament materials chosen for increasing tensile strength of the 3-dimensional full architectural scale interlocking layer wise printed brick structure.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, wherein the flexible external deformable into position leave in place print in place reinforcing mesh is fabricated from (comprises) pre-engineered filament sections and components chosen for increasing tensile strength of the 3-dimensional full architectural scale interlocking layer wise printed brick structure.

The full architectural scale automated externally reinforced flexible deformable into position mesh formwork containment sleeve element method and apparatus according to any claim, wherein woven dimensions of mix regulating venting apertures in the externally reinforced mesh structure varies in size, spacing, and or configurations for optimized control and regulation of the the mix curing, thermal dissipation, water dissipation, and external reinforcing in relation to the specific cementitious mix to be tailored to such as self-consolidating concrete, high performance concrete, ultra-high performance concrete, generic concrete, Portland cement, indigenous clays and aggregates, urbanite, humidity regulating concrete, smog absorbing concrete, fiber reinforced concrete, memory return concrete, air and or gas entrained concrete, mud, stone such as crushed coral, pumice, scoria, stucco, plaster, EMF shielding concrete.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, wherein the size and spacings of the pre-engineered regulating venting apertures in the at least two opposing portions of the flexible deformable into position leave in place print in place external reinforced mesh structural element varies, for example as a function of applicable force and/or a desired full architectural scale 3-dimensional bricks slipform interchangeable die or mold printed shape.

Scaled as needed.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, further comprising inserting one or more reinforcement structures in the mesh slipform molded and printed structural element for increasing tensile strength of the full architectural scale 3-dimensional reinforced printed brick structure.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, wherein the self-consolidating cementitious material "passes through" the interchangeable slipform die or molding cavity with the flexible external reinforcing deformable into position containment form fabric material keyway interlocking with the previous interlocking layer wise 3-dimensional slipfrom molded printed brick layer by layer.

The full architectural scale automated flexible external leave in place print in place fabric reinforced brick positioning and layer wise interlocking pass-through deformable into the interior of the interchangeable slipform molds/dies 3-dimensional printing system method and apparatus according to any claim, wherein the self-consolidating cementitious material in one slipform interlocking printed structural brick layer is allowed sufficient time to sufficiently harden before a next slipform molded and printed interlocking brick layer is positioned and printed directly on top of said previous brick layer.

The full architectural scale automated 3-dimensional flexible deformable into the interior of the interchangeable mold/die external reinforcing containment sleeve pass-through slipform layer wise interlocking positioning and printing method and apparatus according to any claim, wherein the layer wise interlocking printed structural architectural material comprises one or more of a group consisting of a cementitious mixture, a foam, and resin.

The full architectural scale external fabric reinforced cementitious containment sleeves combined with the slipform molding and interlocking layerwise printing method and apparatus according to any claim provide the simultaneous and sequential externally reinforced cementitious printing onsite in real time of multiple reinforced cementitious mixes, or different grades of reinforced cementitious mixes, such as simultaneously interchangeably molding and encapsulating and slip-form printing externally reinforced structural concrete, plaster, and exterior insulating concrete mixes.

The full architectural scale automated 3-dimensional flexible deformable into the interior of the interchangeable mold/die external reinforcing containment sleeve pass-through slipform layer wise interlocking positioning and printing method and apparatus according to any claim, wherein the external flexible deformable into position leave in place print in place fabric mesh venting apertures in one or more of the at least two opposing portions of the external full architectural scale leave in place print in place reinforcing mesh sleeve are pre-engineered (adapted) to a specific cementitious mix during the automated slipform die or molding of the mix material or vice versa to control and regulate the mix curing, thermal dissipation, water dissipation, and external reinforcing, and further reduces or eliminates random printed brick cracking and edge curling caused by the concrete mix's normal volume change and significantly limits or eliminates the range of crack occurrence in general within the external reinforced bricks set area.

The full architectural scale flexible fabric reinforced cementitious external containment sleeve method and apparatus according to any claim provides previously unavailable improvements in the surface strength of the innovatively slip-form interchangeably pass-through molded and printed cementitious brick(s) and simultaneously improves the brick(s)' surface bonding characteristics by increasing the mechanical properties and surface strength of the cementitious brick(s), further improving the cementitious containment sleeve bonding interface (grain boundary interface).

The full architectural scale flexible fabric reinforced external cementitious containment sleeves method and apparatus according to any claim provide accurate pre-engineered regulation and control of cementitious mix and/or mortar selective penetration and predictably protrudes through the external reinforced cementitious sleeve's pre-engineered venting apertures (filament spacing) for pre-engineered accurate and predictable regulating of the cementitious mix overflow prior to hardening between and around the external reinforced filaments (apertures) for improved interlocking layerwise brick adhesion between each layer and significantly reduces or eliminates cold joint interfaces.

The full architectural scale automated 3-dimensional flexible deformable into the interior of the interchangeable mold/die external reinforcing containment sleeve pass-through slipform molding and layer wise interlocking printing method and apparatus according to any claim, wherein the flexible fabric reinforced cementitious containment sleeve material in the interchangeable automated slipform molding cavity comprises providing a base surface through which the self-consolidating encapsulated cementitious material can selectively penetrate, the base surface bounding the cavity.

The full architectural scale automated flexible fabric reinforced external pass-through cementitious containment sleeves and internal reinforcement methods and apparatuses according to any claim provides previously unavailable multiple layers of a wide variety of cementitious reinforcements including composite materials, fiber bundles, a variety of filament windings, and other improvements of mechanical reinforced properties.

The full architectural scale automated fabric reinforced flexible external cementitious containment sleeve method and apparatus according to any claim improves the slip-form molding and printing system interchangeable mold/die "feeding mechanisms" to provide a smoother external sleeve reinforced printed brick feeding system that reduces ripples and potential binding and tearing of the external containment sleeve during the casting process, particularly when slip-form printing small accurate curves.

The full architectural scale external fabric reinforced flexible/deformable into the interior of the interchangeable mold/die cementitious containment sleeve method and apparatus according to any claim having a light-gage fabric "material" is readily folded, cut, stitched, sewn, stapled, heat sealed, tie-wired, zip-tied, and or glued as needed.

The full architectural scale automated 3-dimensional flexible deformable into the interior of the interchangeable mold/die external reinforcing containment sleeve pass-through slipform layer wise interlocking molding, positioning, and printing method and apparatus according to any claim for fabricating a 3-dimensional full architectural scale interlocking layer wise printed external reinforced leave in place print in place printed brick structures, comprising:

an interchangeable full architectural scale die or molding cavity molding/bound by at least two opposing portions of the pass-through external leave in place print in place structurally reinforcing external containment mesh sleeve wherein the pre-engineered venting apertures in the at least two opposing portions of the external leave in place print in place reinforcing mesh sleeve are sized, spaced, and configured to the specific optimized curing characteristics environment of the specific cementitious material intended to be pumped through the interchangeable slip-form molding cavity for formation of the externally fabric reinforced 3-dimensional slipform printed layer wise interlocking structural brick structure that encapsulates said cementitious material, such that at least two surfaces of the semi-hardened material and at least two opposing portions of the externally fabric reinforced printed brick element substantially take on the respective shapes and sizes defined by the interchangeable pass-through slip-form die or mold.

The full architectural scale automated 3-dimensional flexible deformable into the interior of the interchangeable mold/die external reinforcing containment sleeve pass-through slipform layer wise interlocking molding, positioning, and printing method and apparatus according to any claim, further comprising providing one or more regulating venting aperture regions in the externally reinforced mesh cementitious containment sleeve to facilitate controlling the curing characteristics of the mix material that passes through interchangeable die or molding cavity.

The full architectural scale automated 3-dimensional flexible deformable into the interior of the interchangeable mold/die external reinforcing containment sleeve pass-through slipform layer wise interlocking molding, positioning, and printing method and apparatus according to any claim, further comprising one or more venting aperture mix channel regions in the external mesh structure to facilitate accumulating the self-consolidating mix material in the venting apertures pre-engineered cavities.

The full architectural scale automated 3-dimensional flexible deformable into the interior of the interchangeable mold/die external reinforcing containment sleeve pass-through slipform layer wise interlocking molding, positioning, and printing method and apparatus according to any claim, wherein the full architectural scale die or molding cavity is bound by (sufficiently/completely occupied/filled by) four surface portions of the flexible deformable into position fabric reinforced external containment sleeve mesh that is molded by the pass-through interchangeable die or molding formwork element.

Containment Sleeves

The full architectural scale method and apparatus according to any claim, of slip-forming a variety of interchangeable bricks shaping molds having external fabric containment sleeve package, as set forth in any claim, wherein comprises pumping a cementitious mix compound in low slump paste form.

The full architectural scale method and apparatus of any claim encompasses that the printed cast in place leave in place containment sleeve(s) are more cost effective and ecological, leaving a smaller "carbon footprint", as for example the containment sleeve(s) may be specifically tailored to promote reducing thermal shock and provides a higher insulation per mass to volumes ratio reducing alkali-silica expansion, thermal cracking, and improving resistance to sulfate attack, and eliminating excessive water reduction and improving water penetration resistance and improving durability and the cementitious mix's compatibility and long term sustainability.

The method and apparatus according to any claim encompasses slip-form printing a wide variety of interlocking bricks onsite in real time having a full architectural scale external fabric reinforced slip-form printing and shaping system having interchangeable pass-through molds/dies and molding of a desired grade of concrete mix is slip-form molded, printed, and extruded into the entire cross section of the concrete brick product being manufactured.

The full architectural scale automated 3-dimensional slip-form brick molding, printing, and extrusion having interchangeable pass-through molds/dies reinforced concrete construction method and apparatus of any claim wherein the printed cementitious substance comprises a colored dye.

A full architectural scale automated 3-dimensional slip-form molding and layerwise brick printing method and apparatus according to any claim encompasses fabric reinforced containment sleeve "brick" packaging is characterized in that the overlapping portion of the folded fabric reinforced containment sleeve is sealed by the melting heat that is generated from a hot wire or small hot plate, and between the adhesive and the reinforced containment sleeve packaging reinforcing fabric of the gap portion further comprises, by means of applying suitable adhesives to the containment sleeve materials setting (adjusting) the heat as needed, depending upon the sleeve's materials, to sufficiently penetrate the thermal barrier portion along the pass-through molding and printing running direction.

The full architectural scale automated 3-dimensional slipform molding and layerwise printing method or apparatus according to any claim, encompasses having adjustable pressure applied to the side of the containment sleeve seam by a rotating roller which is cooled thus sealing the sleeve's irregularities as needed.

As set forth in any claim, the full architectural scale method and apparatus according to any claim of slipform printing an external fabric reinforced slip-form printed shaping and molding system having interchangeable molds/dies, having a wide variety of flexible/deformable into the interior of the mold containment sleeves, wherein securing one end of the molded brick externally fabric reinforced containment sleeve comprises enclosing the end(s) of the containment sleeve with tape, glue, heat adhesion, staples, or stitched/sewn as needed.

The full architectural scale automated method and apparatus according to any claim of slip-form molding having interchangeable molds/dies and layerwise printing an externally fabric reinforced molded cementitious interlocking brick package, as set forth in any claim, wherein enclosing the ends of the slip-form molded brick external flexible/deformable into position containment sleeve comprises attaching an adhesive glue or tape, tie-wire, staple, zip-tie, stitch, onto the containment sleeve.

The combination of any claim wherein the full architectural scale automated slip-form interlocking layerwise printing system having interchangeable dies/molds and having flexible deformable into position external fabric reinforced containment sleeve method and apparatus according to any claim, wherein fabric reinforced containment sleeve consists of heat shrinkable materials selected from the group that includes polyvinyl fluoride, polyolefin, Neoprene and Teflon.

The automated full architectural scale 3-dimensional slipform interlocking brick layer wise printing method and apparatus according to any claim, comprises a flexible deformable into position external cementitious reinforced containment sleeve encapsulating apparatus and method employs: a wide variety of slip-form printing reusable interchangeable brick shaping molds/dies having shaping and forming means; and thus form each of the external fabric reinforced cementitious containment sleeve encapsulated brick product.

The full architectural scale automated 3-dimensional interlocking layerwise slipform printing method and apparatus according to any claim, characterized in that it comprises forming flexible deformable into position external fabric reinforced cementitious containment sleeve packaging, as well as in each external fabric reinforced cementitious containment sleeve forming—four or more sides and two or more bottom folds in the form of a trademark cementitious brick fabric reinforced containment sleeve and two side seams, and will display trademark(s), logo(s), bar code(s) on every external brick containment sleeve.

A full architectural scale automated 3-dimensional interlocking layerwise slipform printing brick having woven external reinforcing plastic material method and apparatus according to any claim, wherein said reinforcing layer of flexible deformable into position sleeve material comprises synthetic plastic material.

A full architectural scale automated 3-dimensional interlocking layerwise slipform printing brick having woven external flexible deformable into position plastic material apparatus and method according to any claim, wherein each reinforcing mesh is molecularly oriented substantially in the direction of the length of the strip.

A full architectural scale automated 3-dimensional interlocking brick layerwise slipform printing woven external cementitious reinforcing plastic material apparatus and method according to any claim, wherein each flexible deformable into position reinforcing mesh is preferably molecularly oriented substantially in the direction of the length of the reinforcing mesh of a synthetic plastic material selected from the group consisting of polypropylene, basalt, polyethylene, linear low density polyethylene, polyamides, high density polyethylene, polyesters, polystyrene, polyvinyl chloride, their copolymers and mixtures thereof.

A full architectural scale automated 3-dimensional interlocking 'brick' layerwise slipform printing external woven cementitious reinforcing flexible deformable into position plastic material method and apparatus according to any claim, wherein said cementitious reinforcing encapsulating surface bonding material comprises synthetic plastic material selected from the group consisting of linear low density polyethylene, ionomers, polyvinyl chloride, ethyl vinyl acetate, ethyl propyl copolymers, polyethylene copolymers, low density polyethylene, their copolymers, vinyl copolymers and mixtures thereof.

A full architectural scale external tubular cementitious reinforcement sleeve apparatus and method composed of woven flexible/deformable into position plastic reinforcement materials according to any claim, wherein said layer of reinforcement bonding material comprises synthetic plastic material.

A full architectural scale automated 3-dimensional interlocking 'brick' layerwise slipform printing method and apparatus according to any claim for manufacturing a external flexible deformable into position reinforcing cementitious mix containment product in a substantially horizontal slip-form cementitious printing process using two or more different grades of reinforcing cementitious concrete mix, in which method and apparatus reinforcing concrete mix is fed into preselected cementitious slip-form printing interchangeable mold/die of a defined cross section moving progressively in the cementitious printing process so as to give a concrete product of a desired profile whereby two or more different grades of concrete mix can be contained within the printed brick product in accordance with the method and apparatus, characterized in that the batches of the different cementitious mix grades are metered in predetermined amounts into the feeder hopper and into the slip-form printing machine at predetermined instants during the progress of interlocking layerwise slip-form brick printing process.

In an off-site factory, interlocking 'brick' layerwise slipform printing having reinforced with a flexible deformable into position cementitious external containment sleeve method and apparatus according to any claim in a factory environment then transporting and assembling onsite.

A full architectural scale automated 3-dimensional interlocking 'brick' layerwise slipform printing external containment sleeves method and apparatus according to any claim allow for the quick change of concrete mixes at any point.

A full architectural scale automated 3-dimensional interlocking 'brick' layerwise slipform printing external flexible deformable into position reinforcing containment sleeves method and apparatus according to any claim simplifies previously complex steps including hot weather casting requirements including production preparations, delivery, placement, finishing, bleed-water evaporation, curing, and environmental protection of concrete.

A full architectural scale automated 3-dimensional interlocking 'brick' layerwise slipform printing external cementitious reinforcing flexible deformable into position reinforcing containment sleeves method and apparatus according to any claim improve related issues to designing workable concrete and may be used for both new construction and rehabilitation.

A full architectural scale automated 3-dimensional interlocking 'brick' layerwise slipform printing external reinforcing flexible deformable into position cementitious containment sleeves method and apparatus according to any claim improves quality assurance for Concrete Mix Design, Quality Control and Specifications, materials, and the methods improve accuracy and placement of embedded items, analysis and design, and improved strength and serviceability.

A full architectural scale automated 3-dimensional interlocking 'brick' layerwise slipform interchangeable pass-through molding and brick printing method and apparatus according to any claim having external reinforcing cementitious containment "sleeves" ensuring the mix test specimens are properly cured to better adapt their designs to the realities of actual field construction.

The leave in place, cast in place, external flexible/deformable into the interior of the interchangeable die/mold fabric reinforced cementitious containment sleeves method and apparatus according to any claim may be manufactured to suit a wide variety of slip-form printing uses.

The full architectural scale leave in place, cast in place, external flexible/deformable into the interior of the interchangeable die/mold fabric reinforced cementitious containment sleeve methods and apparatuses according to any claim encompasses molding and layerwise printing interlocking bricks containing air or gas entrainment I.E. nitrogen, argon.

The full architectural scale leave in place, cast in place, external flexible/deformable into the interior of the interchangeable die/mold fabric reinforced cementitious containment sleeves methods and apparatuses according to any claim encompasses being tailored (customized) for highly complex cementitious cast characteristics thus optimizing a higher percentage of the cementitious concrete mix potential performance characteristics: Microstructure, Properties, and Materials improving a generalized quality assurance including optimizing, Strengthening, Protection, proportions, production, and delivery on the construction site, that previously has required casting in an atmospherically controlled factory environment, particularly when casting high performance and specialty concrete mixes.

The leave in place, cast in place, flexible/deformable into the interior of the interchangeable die/mold fabric reinforced cementitious external containment sleeves method and apparatus according to any claim encompasses reducing or eliminating long-term leaching such as when slip-form printing mixes containing fly ash.

The full architectural scale reinforced cementitious external flexible containment sleeves method and apparatus according to any claim improves the accuracy (conformational tolerance) of reinforced cementitious printed brick having layerwise interlocking placement.

The full architectural scale fabric reinforced flexible/deformable into position cementitious external containment sleeves method and apparatus according to any claim improves the placement and accuracy of plumbing, piping, conduit, electrical, fiber optics, etc.

The full architectural scale fabric reinforced cementitious external flexible/deformable into the interior of the interchangeable mold/die containment sleeve method and apparatus according to any claim has an option of using a wide variety of reinforcing micro-fibers and/or conventional rebar (reinforcement bars or rods).

The full architectural scale fabric reinforced cementitious external flexible containment sleeve method and apparatus according to any claim provides a reduced price in corrosion protection of the steelwork (rebar).

The full architectural scale fabric reinforced cementitious external flexible/deformable into the interior of the interchangeable mold/die containment sleeve method and apparatus according to any claim may be manufactured in the form of a dispensable compressed cartridge and rapidly removably installed and dispensed.

The full architectural scale automated external flexible fabric reinforced cementitious containment sleeve method and apparatus according to any claim is compatible with virtually any cementitious mix and admixtures, aggregates, additives, reinforcements.

The full architectural scale automated external flexible fabric reinforced cementitious containment sleeve method and apparatus according to any claim eliminates the formation of air pockets (bug holes), bubbles, and or voids, and improves permeability resistance, surface and internal cementitious mix shrinking, surface and internal cracking, and surface scaling of the interlocking layerwise 3D slipform molded and printed bricks.

The full architectural scale flexible fabric reinforced cementitious external containment sleeve's surface texture (fibers) method and apparatus according to any claim provides an improved previously unavailable cementitious bonding (adhesive) surface area and other cementitious bonding characteristics for a wide variety of cementitious concrete mixes and other cementitious and reinforcement materials to be 3D slipform interchangeably molded and printed.

The full architectural scale flexible external fabric reinforced cementitious containment sleeves' material(s) method and apparatus according to any claim repel bulk water penetration on contact, including wind driven rain, snow etc., by directing it away from the external reinforced cementitious sleeves' exterior surfaces.

The full architectural scale flexible fabric reinforced external cementitious containment sleeves that are deformable into the interior of the pass-through interchangeable mold/die method and apparatus according to any claim significantly expands the accuracy, speed, variation, and size of each layerwise slip-form printed interlocking reinforced cementitious brick layer or section.

The slip-form printed flexible fabric external reinforced containment sleeve brick method and apparatus according to any claim increases the external reinforcement mechanical properties of the interchangeably molded cementitious brick surface producing an externally reinforced interlocking cementitious key-way interface.

The full architectural scale automated fabric reinforced external reinforced cementitious containment sleeves method and apparatus according to any claim improves the surface appearance of the pass-through slip-form molded and printed concrete "brick"; producing a variety of aesthetically appealing texture(s) and finish(es) including mimicking slump block, chipped stone, conventional brick and mud brick (squinching) styles.

The full architectural scale flexible fabric reinforced external cementitious containment sleeve having 3 dimensional pass-through slipform interchangeable brick molding and printing system method and apparatus according to any claim provides horizontal and vertical slip-form printing construction (casting) from a rail guide system pathup to about 22 degrees.

The full architectural scale flexible external reinforced cementitious containment sleeves method and apparatus according to any claim having external reinforced gusseted sides composed of different materials, filaments, filament windings, fiber orientation and fabrics, fiber bundles, sizes, apertures (spacings), each external reinforced cementitious sleeves that is flexible/deformable into the interior of the interchangeable mold/die and having their own uniquely tailored characteristics as needed depending upon the external reinforced cementitious brick molding and printing application.

The fabric reinforced flexible/deformable into position external cementitious containment sleeves method and apparatus according to any claim are compatible with a wide variety of recycled construction waste, recycled concrete (urbanite), glass, fibers, steel, cement, and a wide variety of reinforced cementitious additives and admixtures, etc.

The full architectural scale automated 3-dimensional molding and printing system having external flexible fabric reinforced cementitious containment sleeve method and apparatus according to any claim allows for onsite high speed simultaneous and/or sequential reinforced cementitious layer wise interlocking slip-form printing in real time.

The full architectural scale external fabric reinforced cementitious pass-through containment sleeve method and apparatus according to any claim allows for accurate calculations of volume printing and control, improving conformational tolerances and simplifying inventory and reducing waste.

The full architectural scale external fabric reinforced cementitious containment sleeve method and apparatus according to any claim having pre-engineered venting and regulating apertures permits improved reinforced cementitious printing characteristics for a variety of highly complex reinforced cementitious mixes such as memory return, air purifying (smog absorbing), self-consolidating concrete, and or humidity regulating cement mixes.

The full architectural scale automated 3-dimensional slip-form pass-through molding and printing system having interchangeable molds/dies to layerwise print interlocking bricks method and apparatus according to any claim encompasses external fabric reinforced flexible/deformable into position cementitious containment sleeves controlling and optimizing the cementitious mix's pre-engineered rate of evaporation and improving heat dissipation, improving evaporation control measures, and improves the performance of a wide variety of cementitious concrete mix's mechanical properties and structural strength.

The full architectural scale automated 3-dimension slip-form pass-through molding and printing method and apparatus of any claim may slip-form print (cast) onsite in real time with cementitious mixes that are designed and formulated to control and self-regulate the structure's internal humidity ranging between about 30 to 60 percent, optimally ranging between about 45 to 55 percent The full architectural scale external flexible fabric reinforced cementitious containment sleeves method and apparatus according to any claim accept a variety of in depth pigments (color dyes).

The full architectural scale external fabric reinforced cementitious containment sleeve method and apparatus according to any claim improves the cement molding and printing extrusion process making it faster, simpler, and more adaptable on the construction site in real time during any point in the reinforced concrete construction process.

The full architectural scale automated method and apparatus according to any claim wherein said external fabric reinforced cementitious containment sleeve when being compressed together within the pass-through interchangeable mold/die will produce a variety of molded and printed bricks.

The full architectural scale automated external flexible fabric reinforced cementitious containment sleeve method and apparatus according to any claim, characterized in that the longitudinal edges of the external fabric reinforced cementitious containment sleeve are overlapped and bonded together, thereby forming said external reinforced cementitious slip-form molded and interlocking and layerwise printed brick.

The method and apparatus according to any claim, characterized in that said external fabric reinforced cementitious containment sleeve adhesive is heat sealing, cold sealing or ultrasonic welding.

A full architectural scale automated 3-dimensional slip-form layer wise interlocking printing external reinforcing containment mesh formwork element that is flexible and deformable into the interior of the interchangeable mold/die method and apparatus according to any claim, wherein the mesh regions are defined by pre-engineered venting apertures of a specific size and spacings of the externally reinforced mesh brick structure.

The full architectural scale automated 3-dimensional flexible deformable into position external reinforcing containment sleeve pass-through interchangeable die/mold slipform layer wise interlocking printing method and apparatus according to any claim, comprising providing a base reinforcing surface through which the mix material can selectively partially penetrate, the reinforcing base surface for encapsulating the layerwise slipform molded and printed brick.

The full architectural scale cementitious containment external sleeve's flexible fabric method and apparatus according to any claim may be permanent (leave in place print in place) or used as a temporary cementitious containment sleeve, may be dissolved by sunlight in a few days.

A fabric reinforced external containment sleeve method and apparatus according to any claims encompasses \ ranging between about 50 to 1200 danier, more preferably ranging between about 100 to 800 danier, most preferably ranging between about 350 to 700 danier for onsite slip-form printing reinforced bricks having sizes up to about 10 inches high by 14 inches wide or as needed depending upon the application preferably manufactured from polypropylene or basalt reinforcing and containment materials.

The full architectural scale automated 3-dimensional slip-form pass-through molding and printing system having interchangeable molds/dies to layerwise print interlocking bricks method and apparatus according to any claim encompasses external reinforcing flexible/deformable into position containment sleeves that controls and regulates the specific cementitious mix curing and hardening properties and the performance and for use such as but not limited to: 1) mixture proportioning; 2) mechanical properties; 3) time-dependent deformations; 4) flexural and shear characteristics; 5) bonding behavior; 6) prestress losses; 7) the structural behavior of full architectural scale elements; 8) Improves cementitious grain boundary characteristics; 9) Improves cementitious electrophysical bonding characteristics; 10) Improves cementitious electrochemical bonding characteristics.

The inventive full architectural scale internal reinforcing flexible net method and apparatus according to any claim improves the mix hardening properties and the performance and for use such as but not limited to: 1) mixture proportioning; 2) mechanical properties; 3) time-dependent mix deformations; 4) flexural and shear behavior; 5) bonding behavior; 6) prestress losses; 7) the structural behavior of full architectural scale elements; 8) Improves grain boundary; 9) Improves electrophysical bonding characteristics; 10) Improves electrochemical bonding characteristics.

Venting Apertures

The full architectural scale automated 3-dimensional slipform printing external fabric reinforced cementitious flexible/deformable into the interior of said pass-through interchangeable molds/dies reinforcing containment sleeve method and apparatus according to any claim having a wide variety of pre-engineered regulating venting apertures, dimensions, and configurations comprising external sleeve pre-engineered for regulating the specific cementitious mix's water content, providing, more uniform evaporation rate and improving thermal dissipation, promoting an optimized curing environment such as increased cementitious bonding surface area characteristics, particularly for optimizing the interlocking layerwise printing (casting) environment of generic and specialty concrete mixes.

The full architectural scale automated flexible external leave in place print in place fabric reinforced brick positioning and layer wise interlocking pass-through deformable into the interior of the interchangeable slipform molds dies 3-dimensional brick printing system method and apparatus according to any claim, wherein the pre-engineered external flexible deformable into position fabric reinforcing filaments having pre-engineered crossing sections comprises weld joints and defines the pre-engineered aperture spacings and cementitious mix regulating venting aperture size to generally ranging between about 0 mm to 5 mm, preferably ranging between about 0.25 mm and 3 mm, most preferably ranging between about 0.25 mm to 1 mm. (MOVE).

The flexible external deformable into position mesh reinforcing formwork element method and apparatus according to any claim, wherein the external mesh formwork element comprises a regular arrangement of the pre-engineered mix regulating venting apertures having pre-engineered spacings generally ranging between about 0 mm to 5 mm, preferably ranging between about 0.25 mm and 3 mm, most preferably ranging between about 0.25 mm to 1 mm to control and regulate the mix curing, thermal dissipation, water dissipation, and having improved external reinforcing characteristics providing a desired pre-engineered curing environment for the 3-dimensional full architectural scale slipform molded and layer wise printed interlocking brick system having a slip-form pass-through die or mold shape and size scaled as needed.

The full architectural scale 3-dimensional automated slipform molding and printing method and apparatus according to any claim encompasses that the fabric reinforced brick having external encapsulating apparatus comprising: a pre-engineered external fabric reinforced containment sleeve having pre-engineered fabric spacing's providing the desired regulation and venting apertures characteristics to predictably regulate the slip-form molded brick(s) optimized curing characteristics to optimize the onsite slip-form printing processes.

Basalt Reinforcement

The external fabric reinforced flexible containment sleeve method and apparatus according to any claim encompasses a wide variety of external fabric reinforcing basalt materials having configurations including plain, herringbone, cross-weave, twill, basket, satin, leno, mock leno having venting aperture sizes ranging between about 0 mm to 5 mm, preferably ranging between about 0.25 mm and 3 mm, most preferably ranging between about 0.25 mm to 1 mm, preferably pre-engineered and spaced as necessary to suit a specific mix.

The fabric reinforced external flexible/deformable into the interior of the interchangeable mold/die cementitious containment sleeve method and apparatus according to any claim is composed of basalt materials (composite) including basalt materials, basalt fibers, combinations of fibers materials, resins, its variations of fiber reinforced or fiber bundles and filament windings having basalt fabric and or resin reinforcing systems, including Thermalguard™ Epoxy and dual-network resins etc. having pre-engineered regulating venting apertures as needed.

A full architectural scale automated 3-dimensional pass-through molding and layerwise printing method and apparatus according to any claim encompasses molded and printed brick's external reinforcing fabric apparatus composed of basalt, and its variations, external reinforcing cementitious containment sleeve packaging apparatus provided with an adhesive fabric reinforced external coating unit, coincidence unit, the folded overlapping external encapsulating fabric reinforced sleeve as disclosed herein having pre-engineered venting apertures for specifically regulating a specific cementitious mix curing characteristics.

The full architectural scale automated 3-dimensional pass-through molding and layerwise printing method and apparatus according to any claim encompasses that the external encapsulating fabric reinforced cementitious containment sleeve preferably is a external basalt fabric reinforced containment sleeve.

The full architectural scale automated 3-dimensional slipform molding and layerwise printing of reinforced printed bricks having an external reinforced containment sleeve method and apparatus encompasses employing basalt reinforcement(s) having lower shipping costs to the construction site and permits cementitious casts mixes up to about 150 degrees C. and provides the advantage of increased surface area of contact for the encapsulated cementitious materials, and is further easier and faster to handle and install, that eliminates long-term external reinforcement degradation and repair and maintenance (replacement costs).

The full architectural scale automated 3-dimensional slipform molding and layerwise printing of reinforced bricks with an external reinforced containment sleeve method and apparatus encompasses composite basalt rebar reinforcement having a coefficient of thermal expansion (CTE) that is very close to that of most cementitious mixes and providing improved tensile strengths (twice that of steel) reinforcement(s) and having improved mechanical strength gains including thermal stability, higher corrosion resistance and is compatible with a wide variety of admixtures, aggregates, resins and epoxies while simultaneously providing an electromagnetic insulator specifically solid composite basalt or advanced hollow basalt reinforcing materials.

By combining some or all of the features described herein into a single method and apparatus of any claim, the vast majority of a sustainable, durable, and quality reinforced concrete structure(s) may be constructed according to a wide variety of standard or custom specifications very quickly, efficiently, accurately and with few personnel Polypropylene The external reinforced containment sleeve method and apparatus according to any claim encompasses a wide variety of external fabric reinforced polypropylene materials having configurations such as but not limited to plain, herringbone, cross-weave, twill, basket, satin, leno, mock leno preferably having aperture sizes ranging between about 1 micron to 50 mm, preferably ranging between about 0 mm to 5 mm, preferably ranging between about 0.25 mm and 3 mm, most preferably ranging between about 0.25 mm to 1 mm, or may be pre-engineered and spaced as necessary.

A full architectural scale folded flexible deformable into position external tubular cementitious containment sleeve apparatus and method composed of reinforcing woven plastic material according to any claim, wherein said layer of reinforcing bonding material comprises synthetic cementitious plastic material selected from the group consisting of linear low density polyethylene, ionomers, polyvinyl chloride, ethyl vinyl acetate, ethyl propyl copolymers, polyethylene copolymers, low density polyethylene, their copolymers, vinyl copolymers and mixtures thereof linear low density polyethylene, ionomers, polyvinyl chloride, ethyl vinyl acetate, ethyl propyl copolymers, polyethylene copolymers, low density polyethylene, their copolymers, vinyl copolymers polyolefin, polypropylene, polystyrene, polyethylene, polyurethane, polyvinyl alcohol (water soluble), basalt, burlap, carbon, or other hybrid materials and mixtures thereof.

The full architectural scale automated 3-dimensional pass-through molding and layerwise printing method and apparatus according to any claim encompasses that the flexible external encapsulating fabric reinforced sleeve preferably is a polypropylene fabric reinforced containment sleeve.

The method and apparatus of full architectural scale automated 3-dimensional slip-form molding and printing onsite in real time a interchangeably molded cementitious brick having a external flexible fabric reinforced cementitious containment sleeve package, as set forth in any claim, wherein the material comprises a polypropylene reinforced fabric material.

Internal Reinforcement

The full architectural scale internal reinforcement net method and apparatus according to any claim encompasses a wide variety of internal fabric reinforced basalt materials having configurations such as but not limited to plain, herringbone, cross-weave, twill, basket, satin, leno, mock leno preferably having pre-engineered regulating and containment venting aperture sizes ranging between about 2 mm to 25 mm, preferably ranging between about 5 mm to about 20 mm, most preferred ranging between about 10 mm to 15 mm, or may be pre-engineered and spaced as necessary or needed.

The full architectural scale internal reinforcement net method and apparatus according to any claim encompasses a wide variety of internal fabric reinforced polypropylene materials having configurations such as but not limited to plain, herringbone, cross-weave, twill, basket, satin, leno, mock leno preferably having pre-engineered regulating and containment venting aperture sizes ranging between about 2 mm to 25 mm, preferably ranging between about 5 mm to about 20 mm, most preferred ranging between about 10 mm to 15 mm, or may be pre-engineered and spaced as necessary or needed.

Temperature Indicating Sleeves

The leave in place, cast in place, external flexible/deformable into the interior of the interchangeable die/mold fabric reinforced cementitious containment sleeves methods and apparatuses according to any claim encompasses impregnating the sleeve materials with color changing dyes thus indicating the cementitious mix critical curing/casting onsite temperature in real time and curing rate in real time as indicated by the color change from the dye, such as changing from a hot (red) to a cooler (green) depending upon the mix for indicating the critical evaporation and heat dissipation rate and optimizing the cementitious mix's curing uniformity (more uniform heat dissipation), further improving the onsite cementitious mix's casting specifications for optimizing reinforced cementitious concrete construction.

Mesh/Net Manufacturing

The full architectural scale external flexible fabric reinforced cementitious containment sleeve method or apparatus according to any claim encompasses tubular (preferred) configurations such as single folded and overlapping reinforcing containment sleeves.

The full architectural scale external flexible fabric reinforced cementitious containment sleeve method or apparatus according to any claim encompasses tubular (preferred) configurations such as two containment sleeves are folded together and overlapped and secured together.

The method or apparatus according to any claim, as an option or optionally, whose two layers may in part be connected closely or with distance spaced reinforcing fibers, or any combination, by means of weaving, so that fabric cementitious containment "sleeves" of various shapes can be manufactured by a simple and economical working method and apparatus almost without or wholly without any stitching, welding or bonding operations. The final shape of cementitious reinforcing containment "sleeves" is predetermined by the weaving and coating technique.

Reinforcing Coils Loops

The full architectural scale internally positioned "coil" "loop" reinforcement method and apparatus according to any claim is preferably composed of nitinol (memory alloy), nickel and titanium metal alloy, where the two elements are present in about equal atomic percentages e.g. Nitinol 55, Nitinol 60.

Coils Reinforcement

Methods and apparatuses according to any claim encompasses many possible automated seismically reinforced concrete construction system configurations for constructing a wide variety of above and below grade seismically reinforced concrete foundation structures onsite, having overlapping reinforcing memory return non-touching "coils", "loops", pre-engineered spaced apart isolators, tension rings, riser walls, and or footings and box beams.

Viewing Window

A full architectural scale automated 3-dimensional interlocking 'brick' layerwise slipform molding and printing method and apparatus according to any claim encompasses an external fabric reinforced containment sleeve having a woven see through viewing window section being transparent or translucent preferably having suitable see through characteristics as needed enabling quick visual verification of the printed mix's pigment mixing, voids, air pockets, aggregate sizes and uniformity.

A full architectural scale automated 3-dimensional interlocking 'brick' layerwise slipform molding and printing method and apparatus according to any claim encompasses an external fabric reinforced containment sleeve that is entirely transparent or translucent preferably having suitable see through characteristics as needed enabling quick visual verification of the printed mix's pigment mixing, voids, air pockets, aggregate sizes and uniformity.

Feed Hopper/Pumps

The method and apparatus of any claim characterized in that the amount of cementitious mix remaining in the feeder hopper is measured and the delivery of cementitious mix is controlled based on the measurement result.

The method and apparatus of any claim is characterized in that the distance covered in slip-form brick casting is measured and the delivery of said cementitious mix is controlled based on the measurement result.

Vibration

The full architectural scale automated 3-dimensional slip-form molding and layerwise printing method and apparatus according to any claim, encompasses that the inventive slip-forming methods and apparatus slip-form printing removably attachment devices that specifically generates vibration rates in the pass-through hoses, tubes, augers and hoppers for said cementitious materials in the adjustable range between about 500 to 4,000 pulses per minute, more preferred ranging between about 1,200 to 2,200 pulses per minute to maintain the "mix" in a pumpable semi-fluid state compacted and maintain the pass-through feeding from the hopper through the slip-form molding and printing machine and out the slip-former with improved reliability with less power consumption depending upon the mix pumping distance elevations and location(s) and volumes.

Bricks

The method and apparatus of any claim wherein the onsite automated construction system articulated mechanized and or robotic arm(s) is configured to direct the printed brick's outlet to be parallel or above at each height to which the slip-form printer method and apparatus is interlocking positioned by the automated articulated mechanized or robotic arm(s), thereby causing the external reinforced cementitious brick materials to be extruded and interlocked parallel from the slip-form printer at each height.

The method and apparatus according to any claim, encompasses wherein said cementitious slip-form molded external fabric reinforced printed brick products replicates the appearance of squinching brick, chipped stone, slump block structures onsite.

The method and apparatus according to any claim, encompasses wherein said cementitious slip-form molded external fabric reinforced brick product slipform prints cast-in-place furniture, shelving onsite.

Molds

The full architectural scale automated external leave in place print in place fabric reinforced slipform printed brick positioning and layerwise interlocking printing system employing full architectural scale interchangeable dies/molds method and apparatus according to any claim wherein, when applies an adjustable pumping force to the interchangeable slipform molded printed brick having an externally flexible fabric reinforced containment sleeve being deformable into the interchangeable mold's 3-dimensional interior surfaces then being positioned and printed in a layer wise interlocking keyway deposition manner to adjustably compress the extruded brick's surfaces between the interchangeable pass-through dies/molds.

The full architectural scale automated 3-dimensional flexible deformable into position external reinforcing containment sleeve pass-through interchangeable die/mold slipform layer wise interlocking printing method and apparatus according to any claim, wherein the slipform molding and printing system comprises pumping self-consolidating cementitious materials into the molded flexible deformable into position external fabric reinforced containment form that simultaneously passes through the interchangeable die or molding cavity to print the desired shape and size of externally reinforced interlocking printed brick layer.

The full architectural scale automated 3-dimensional external flexible deformable into position reinforcing containment sleeve pass-through slipform printing method and apparatus having quickly interchangeable molds/dies according to any claim, wherein the layer wise interlocking printed concrete bricks base surface is provided having a keyway interlocking surface on which the slipform structure is being fabricated.

A full architectural scale automated 3-dimensional slip-form molding and printing method and apparatus according to any claim having synchronized slip-form brick molding, printing and extrusion manner conveying and placement (printing) means feeding the spooled external fabric reinforced containment sleeve packaging material along the pumped cementitious mix feed path; together collection means; external containment sleeve cementitious mix feed means and having onsite slip-form placement means located downstream of the slip-form interchangeable mold/die apparatus having external enclosing means enclosing the fabric reinforced brick external containment sleeve containment materials having means for cementitious mix feeding brick shaping and molding apparatus provides external fabric reinforced containment sleeve materials.

The full architectural scale automated 3-dimensional slip-form molding and printing method and apparatus according to any claim encompasses feeding the external fabric reinforced cementitious containment sleeve within the slip-form printer apparatus having previously inserted one of a wide variety of possible interchangeable molds/dies; and pumping a wide variety of cementitious mix(es) into the slip-form printer having interchangeable molds such that it first flows within the external fabric reinforced containment sleeve to be simultaneously molded by the interchangeable molding device and then depositing (printing) said interlocking brick onsite in a layerwise placement.

The full architectural scale automated method and apparatus according to any claim is characterized that slip-form printing on the construction site a fabric reinforced molded brick having external reinforcing containment sleeve system comprising:

Having a wide variety of interchangeable slip-form mold configurations a fabric reinforced containment sleeve encapsulating a wide variety of interchangeable slip-form molded bricks having external fabric reinforced containment sleeves on the surfaces of the molded bricks with a basalt reinforcing fabric material;

encapsulating the external fabric reinforced brick containment sleeve on the surfaces of the printed brick with a polypropylene reinforcing fabric material.

The full architectural scale automated method and apparatus according to any claim is characterized that slip-form printing in a factory environment a fabric reinforced molded brick having external reinforcing containment sleeve system comprising:

Having a wide variety of interchangeable slip-form mold configurations a fabric reinforced containment sleeve encapsulating a wide variety of interchangeable slip-form molded bricks having external fabric reinforced containment sleeves on the surfaces of the molded bricks with a basalt reinforcing fabric material;

encapsulating the external fabric reinforced brick containment sleeve on the surfaces of the printed brick with a polypropylene reinforcing fabric material.

Method and apparatus according to any claim, said slip-form molding device to the surfaces of the external fabric reinforced containment layer/process such that the bricks slip-form interchangeable molding apparatus is inserted within the external fabric reinforced brick slipform printing apparatus that encapsulates the external fabric reinforced brick containment sleeve, further providing (inserting) a slip-form brick having key way interlocking mold configurations, the mold(s) apparatus having inlet gates at an edge of the mold(s) for introduction of a cementitious compound.

Onsite Slip-Forming

The method or apparatus according to any claim said external containment sleeve is slip-form printed and compressed together from all directions, thereby enabling the reinforced brick simultaneous molding and encapsulation process.

The method or apparatus according to any claim, characterized in that said sleeve-type brick packing machine is a brick forming and molding packing machine, and the packaging machine has an external fabric reinforced containment sleeve having a variety of tailorable characteristics to specifically suit a cementitious mix within the containment sleeve that is molded and extruded so that the external packaging material is wrapped around the brick.

The method or apparatus according to any claim, such as the slip-forming and simultaneous placement of the long-printed bricks is synchronized.

As set forth in any claim, the method and apparatus according to any claim of slip-form brick molds having interchangeable configurations incorporating an external fabric reinforced containment sleeve package.

The full architectural scale flexible/deformable into the interior of the interchangeable mold/die external fabric reinforced cementitious containment sleeve method or apparatus according to any claim encompasses external containment sleeves that may be initially open at one or both ends.

The full architectural scale automated 3-dimensional flexible deformable into the interior of the interchangeable mold/die external reinforcing containment sleeve pass-through slipform layer wise interlocking printing method and apparatus according to any claim, the method comprising providing a (moldable) deformable into position external leave in place print in place reinforcing mesh slipform printed structural brick comprising a plurality of the mesh formwork elements and pumping the self-consolidating material in the respective molding cavities of the external leave in place print in place reinforcing mesh formwork elements passing through the interchangeable mold/die cavity and allowing the material to harden.

The full architectural scale flexible/deformable into the interior of the interchangeable mold/die external fabric reinforced cementitious containment sleeve encompasses a fabric reinforced external containment sleeve for automated slipform molding and printing of interlocking brick walls preferably having a danier ranging between about 50 to 1200 danier, more preferably ranging between about 100 to 800 danier, most preferably ranging between about 350 to 700 danier for onsite slip-formed flexible reinforced containment sleeves having sizes up to about 10 to 15 inches in diameter, or as needed depending upon the application, with flexible reinforced polypropylene and basalt materials being preferred.

The full architectural scale flexible/deformable into the interior of the interchangeable mold/die external fabric reinforced cementitious containment sleeve method and apparatus according to any claim encompasses slip-form molding and printing with a variety of dissolvable external reinforcing "sleeves".

The slip-forming extrusion reinforced concrete construction method and apparatus of any claim wherein the substance comprises a compressed gas substance and the masses comprise gas bubbles.

The slip-forming extrusion reinforced concrete construction method and apparatus of any claim wherein the gas entrainment substance comprises compressed air.

The slip-forming extrusion reinforced concrete construction method and apparatus of any claim wherein the gas entrainment substance comprises compressed nitrogen.

The slip-forming extrusion reinforced concrete construction method and apparatus of any claim wherein the gas entrainment substance comprises compressed argon.

A cementitious reinforced concrete metering method and apparatus of any claim wherein the pumping and metering chamber is configured to keep the first and the second mix separate so that they do not mix.

The method and apparatus of any claim wherein the onsite slip-form printing nozzle assembly includes a nozzle configured to extrude cementitious material through the outlets feeding into a pre-engineered folded "sleeve" or different folded sleeves within the slip-form(s) apparatus and method configured to slip-form (shape) the bricks cementitious encapsulated material(s) extruded from the nozzle assembly.

The full architectural scale automated computer controlling method and apparatus according to any claim having laser interface system with semi-automated concrete slip-form printing operations, and or automatic slip-forming concrete construction operations.

The method and apparatus according to any claim, characterized in that the external fabric reinforced brick containment sleeve packing machine is synchronistically slip-form printed in place on site in a layerwise interlocking manner.

The method and apparatus according to any claim, characterized in that the slip-form external fabric reinforced containment sleeve having brick shaping and molding and packing machine having an extruded outlet means, and the method further comprises, when the other apparatus and methods comprising the external brick shaping and molding fabric reinforced containment sleeve packing machine including stop working, so that the extruded outlet means to continue work.

The method and apparatus according to any claim, characterized in that, when each of the external fabric reinforced brick packaging material is extruded so that the external fabric reinforced packaging material is externally wrapped around the brick located inside the shaping and molding slip-form printer, extrusion manner having synchronistic transposition and onsite placement.

A method and apparatus according to any claim encompasses a slip-form printed fabric externally structurally reinforced brick containment packaging sleeve apparatus and method, which consists of the following parts: In fed from an external fabric reinforced containment sleeve dispensing roll having a intermittent or continuous external fabric reinforced packaging portion in the longitudinal direction of the external packaging containment fabric.

A method and apparatus according to any claim encompasses the combination of any claim wherein said external fabric reinforced slip-form printed brick having synchronized positioning means comprises at least a motion controlling pin means mounted on said supporting and operating platforms having positioning and robotic members and a second motion controlling means operatively.

A method and apparatus according to any claim encompasses a external fabric reinforced containment sleeve having slip-form positioning and having synchronized molding assembly method and apparatus according to any claim mounted on said supporting and operating means comprising an adjustable slip-form support member selectively movably mounted on said rotatable operating pedestal having support means and having external brick containment sleeves mounted and dispensed thereon in a dispensable relationship, each of said dispensable external fabric reinforced containment sleeve having cementitious mix slip-form printing inlet and molded brick discharge ends.

Method and apparatus according to any claim and means for selectively moving said slip-form printer supporting and positioning apparatus so that the slip-form inlet end of said external fabric reinforced containment sleeve is placed in operative communication with said outlet is accurately moved to pre-engineered positions to enable a folded external fabric reinforced containment sleeve to be slip-form printed thereon.

Method and apparatus according to any claim and means for rotating said one slip-form printed fabric reinforced external containment sleeve about its longitudinal axis when said one external containment sleeve is in operative communication with said interchangeable molding slip-form printing outlet.

The apparatus and method according to any claim, characterized in that the external brick containment sleeve packing machine is a molding slip-form extruded type brick having fabric reinforced encapsulating machine comprising cementitious mix processing situated upstream of the extruded outlet means.

Apparatus and method according to any claim slip-form external brick containment sleeve packing machine, the slip-form printed brick packaging machine comprising a variety of different reusable interchangeable brick slip-form molds having extrusion outlet means downstream of the slip-form mold, wherein the slip-form step comprises, when each of the external containment sleeve packaging material enclosing the brick mold is located inside of the slip-form apparatus.

The apparatus and method of any claim wherein means is provided for accurately moving said guiding and supporting slip-form apparatus member in various synchronized positions of its movement.

The slip-form printer method and apparatus of any claim, further including pivotal mounting means having vertical axes for removably attaching said operating platforms having supporting base mounting rotatable and to said mechanized automated construction system, so that said positioned supporting platform (pedestal) having mounts for pivoting with respect to both the automated construction system's mechanized members and the attached end effector slip-form printing.

The slip-form printer method and apparatus of any claim including means for securing the slip-form printing apparatus and method adjacent one end to the slip-form printer removably attached, wherein said removably securing means allows movement of said slip-form printer along the course of said printed "bricks" being positioned, further including mechanical pivoted to said lateral members to swivel about horizontal axes.

The slip-form printer method and apparatus of any claim, further including pivotal mounting means having horizontal axes for removably attaching said slip-form mount to said automated mechanized frame, so that said mechanized mounts pivot, with respect to both the lateral mechanized frame and slip-form printing system.

The motive power method or apparatus according to any claim applied to the slip-form printer will automatically make the micro slip-form printing adjustments to produce smooth continuous and or intermittent slip-form printing of ripple free reinforced printed brick(s) by corresponding to the delivered cementitious mix(s) pump's fluctuating pumping cycles and speeds as needed having positioning precision and repeated positioning precision.

Onsite slip-form method or apparatus according to any claim, constructing from the inside out is most preferred to simultaneously construct/synchronized preferably slip-form constructing from the inside out and optionally from the outside in or any combination.

Guide Rails

The reinforced concrete construction method and apparatus of any claim wherein the operating platform is positioned and supported by guide rails and or operating platform(s) apparatuses and methods and wherein the lifting and positioned mechanism is configured to the operating platform(s), or pedestal(s), to a desired position and height.

A reverse mechanized and or robotic reinforced concrete construction apparatus and method according to any claim comprising: slidably riding a substantially removably attached horizontal guide rail system; a removably attached bridge slidably connected to the supporting platform or base having a first removably attached multi-purpose robot so as to permit a printing nozzle connected and attached to the printing nozzle automated platform.

A mechanized and or guide rail reinforced concrete construction apparatus and method according to any claim comprising a removably attached supporting base/platform slidably moving along and guided by a substantially removably attached horizontal rail mounting system having a removably attached mechanized arm(s); a guide rail slidably removably attached connected to the automated construction system having removably attached mechanized arms so as to permit sliding of the removably attached operating platform horizontally with respect to the slip-form printing nozzle assembly slidably connected to the removably attached automated construction system and configured to extrude structurally reinforced concrete construction materials.

A mechanized and or robotic reinforced concrete construction method and apparatus of any claim, comprising: a variety of movable cooperative robots including and supported by, at least two side members slidably mounted on a pair of guide rails; a automated construction system slip-form molding and printing assembly movably coupled to the automated mechanized arm(s) or robotic method and apparatus and configured to mold and extrude cementitious materials through an outlet or outlets; and a slip-form position controller configured to accurately control and position the movements of the robot and the slip-form printing apparatus assembly; wherein the automated construction system slip-form molding and printing assembly comprises a printing nozzle assembly including: a first nozzle configured to extrude reinforced concrete material through a first outlet; a second nozzle configured to extrude reinforced concrete material through a second outlet; a third nozzle configured to extrude reinforced concrete material through a third outlet, the third outlet being between the first and second outlets; a fourth nozzle configured to extrude reinforced concrete material through a fourth outlet; and a first and second slip-form printer apparatus configured to shape from a mold(s) reinforced concrete cementitious materials extruded from the first and second or third nozzles, respectively.

The mechanized and or robotic automated reinforced concrete construction method and apparatus of any claim further comprising a second platform coupled to a mounting, supporting, and operating platform or pedestal such as a guide rail mounted platform(s) as an option or optionally having a responsive servo apparatus and method, wherein the positioning sensor is mounted on the supporting and operating platform, and wherein the automated supporting and operating platform is configured to adaptively correct its position with respect to the rail mounted platform in response to the output of the position sensors providing tunable dynamic response.

A mechanized and or removably attached automated reinforced concrete construction apparatus and method according to any claim comprising slidably moving along and guided by a substantially horizontal guide rail apparatus and method: a supporting bridge slidably connected to a removably attached supporting and operating base and the mechanized arms so as to permit moving along and guided by the supporting and operating bridge.

A full architectural scale mechanized and or robotic reinforced concrete construction method and apparatus according to any claim comprising: first and second removably attached automated construction system having removably attached mechanized arms each secured to the mobile supporting and operating base moving along and guided by a horizontal or vertical up to about 22 degrees printing from the guide rail system; a bridge slidably connected automated construction system so as to permit sliding of the supporting and operating base and configured to extrude reinforced concrete.

The full architectural scale automated robotic slip-form layerwise printing reinforced concrete construction method and apparatus according to any claim is preferably operated onsite in real time from inside/within the structure that is slip-form constructed/printed. The slip-form printing process is preferably carried out from within the inside of the structure.

A full architectural scale mechanized and or robotic reinforced concrete construction method and apparatus according to any claim comprising transportable methods and apparatus that is assembled on the construction site supported by at least two side members slidably mounted on a pair of guide rail systems; an automated slip-form printing nozzle assembly moveably coupled to the mechanized arm of the automated multi-purpose robotic system configured to slip-form and extrude a wide variety of fabric reinforced concrete materials through a removably attached printing head, and having a positioning controller configured to control and position the automated robotic apparatus the attached slip-form printing nozzle assembly; wherein the multi-purpose robotic apparatus and methods is configured to rest on a surface and wherein the position controller comprises a position or sensor configured to sense the position of the automated onsite slip-form printing system with respect to multiple locations, and having an actuator configured to controllably position the slip-form printing nozzle assembly to a desired position in response to an output of the position sensors and having tunable dynamic response.

An automated method and apparatus according to any claim wherein attaching and operating the full-architectural scale automated 3-dimensional printing apparatus on to a multi-purpose robotic operating platform(s) having an attached cementitious pass-through slip-form printer having a containment sleeve feeding system with interchangeable molds/dies.

Walls

The full architectural scale 3-dimensional slipform printing method or apparatus according to any claim, for molding and printing temporary supporting arches, temporary walls, temporary sections in walls.

Foundations

The slip-form printing system method and apparatus of any claim including removably attached mechanized means for securing the removably attached slip-form printer adjacent one edge to the carrying frames, wherein said removably attached securing means allows mechanized movement of said slip-form printer along the course of said cast in place foundation, footing, roofs/ceilings, walls being slip-form printed (cast), said removably attached slip-form printer, further including removably attached mechanized brackets pivoted to said lateral removably attached mechanized frame members to swivel (rotate) about horizontal axes, wherein one or more removably attached automated mechanized arm(s) of the removably attached brackets applies motion to the slip-form printer along an area adjacent said one edge and the other automated removably attached mechanized arm of the brackets applies motion to the slip-form printer along an area adjacent said one edge and motion the other arm "brackets applies motion to the slip-form printer along an area adjacent the other edge.

A method and apparatus according to any claim encompasses a removably attached slip-form printer apparatus and method for molding and printing reinforced foundation, footing, wall or roof of a cementitious structure.

A apparatus and method according to any claim encompasses means for supporting and movably positioning said removably attached mechanized slip-form printer, wherein said removably attached mechanized slip-form printer supporting means projects upwardly from a removably attached supporting and operating pedestal and or removably attached leave in place cast in place supporting and operating bases or a mobile positionable supporting and operating bases.

The automated construction system method and apparatus according to any claim having quick onsite installation and operation on to all supporting and operating platforms and apparatuses having quick attaching and detaching of the multi-purpose robotic construction system having a universal mounting attachment system.

A method and apparatus according to any claim encompasses removably attached means for supporting and positioning said removably attached automated slip-form printing system, wherein said lifting and positioning means are removably attached (mounted) on said removably attached mechanized arm(s) having removably attached slip-form printer positionable means.

Automated Construction System A full architectural scale method and apparatus according to any claim for onsite fabric reinforced brick molding and encasing machine which includes a cementitious mix pumping system in combination with a source of cementitious mix or mixes.

The automated concrete construction system method and apparatus according to any claims encompasses attaching and operating the disclosed inventive automated concrete construction apparatus and system removably secured on to a movable multi-purpose robotic platform(s) having an attached molding and removable attached slip-form printer and having a sleeve feeding system.

Full architectural scale method and apparatus according to any claim for automatically and or semi-automatically extruding a three-dimensional cementitious reinforced "brick" structure onsite which may include a wall having a substantial height, the method and apparatus comprising a manual and or automated, self-contained automated concrete construction system having transportable or cast in place reinforced supporting and operating pedestal(s), or mobile positionable operating platform(s) and or guide rail system(s) slidably secured to a mechanized and or robotic system configured to manually or automatically, or any combination, extrude the three-dimensional reinforced cementitious "brick" structure, including the walls, roofs, foundation(s), footing, or any combination or derivative therein, having: a variety of transportable, reusable supporting and operating bases including a mechanized and or motorized wheel assembly configured to cause the manual or mechanized, and or robotic reinforced concrete construction system, to move during one mode of slipform construction operation horizontally and vertically or any angle or derivative as needed; encompasses a printing nozzle assembly configured to extrude a wide variety of reinforced cementitious material through a printing outlet; and having a cementitious material feed system removably mounted on the construction assembly system and configured to contain the cementitious material(s) and to feed into the slip-form printing nozzle assembly.

A method and apparatus according to any claim encompasses an automated reinforced concrete construction system assembly removably mounted on said supporting and operating pedestals having rotating means comprising a removably support mounting apparatus selectively movably mounted on said support and operating pedestal's means and automated mounting system having dispensing means at least one fabric reinforced containment sleeve spool mounted thereon, each of said sleeve having an inlet end.

The mechanized and or robotic reinforced concrete construction method and apparatus of any claim wherein the automated position sensors comprise a removably mounted laser rangefinder, including: a transmitter configured to generate laser light and transmit the laser light to one or more reflectors positioned at a respective one of the one or more reference locations; a receiver configured to receive laser light generated by the transmitter and back-scattered from the reflectors, and having a photo detector system configured to detect the intensity of the received light; and having a processor configured to determine the positions of the automated slip-form printing brick extrusion assembly by measuring the time required for the laser to travel to and from each of the retro reflectors and provide tunable dynamic response.

A mechanized and or robotic reinforced concrete construction apparatus and method of any claim comprising a moveable and transportable rail guide mounted apparatus and method including an adjustable ground supported guide rail(s) system or beam(s) extending between, and supported by, at least two side members slidably mounted on a pair of guide rails; a slip-form printing assembly removably coupled to a rail guiding robot apparatus and method and configured to extrude cementitious material through a brick molding slip-form printing outlet, wherein the slip-form printing assembly includes a nozzle(s) configured to extrude cementitious material through the outlet; a position controller configured to control position and movement of the rail guiding mechanized and or multi-purpose robotic construction system and the slip-form molding and printing apparatus and method assembly; and the cementitious material feed apparatus and method configured to feed cementitious materials to the slip-form molding and printing apparatus.

The robotic reinforced concrete construction apparatus and method of any claim wherein the cementitious materials feed method and apparatus includes containers configured to store and dispense cementitious materials, and feeding hoses or tubes configured to deliver cementitious materials stored and dispensed in the containers to the automated slip-form printing apparatus and the slip-form molding and printing extrusion apparatus.

The mechanized and or robotic reinforced concrete construction method and apparatus of any claim wherein the drive mechanism comprises a joystick specifically configured to accurately position the cementitious materials feeding apparatus in response to one or more commands from the automated construction system position and motion controllers, and wherein the cementitious mix feeding tube or tubes is removably coupled to a fixed and or movable supporting and operating platform or any combination.

Transporting and Operating Trailer

The collapsible (folded down) Transportable automated construction system collapsible Trailer methods and apparatus according to any claim encompasses Onsite Supporting and Operating Platform System.

A method and apparatus according to any claim wherein the automated construction system supporting and operating collapsible trailer is further adapted to be configured in a onsite vertically transportable or stowed mode in which the first and second planar deck plates are adapted to be positioned adjacent each other in an upright position, providing convenient onsite assembly and disassembly having 360 degrees or more of rotation A method and apparatus according to any claim encompasses the automated construction system encompassing a collapsible trailer having supporting and operating platform for ease of transportation and comprising onsite having a removably attached slip-form printing reinforced concrete construction system comprising a front platform a rear platform connected to said front platform so that the platforms are pivotably moved between an open position wherein they extend horizontally in the same general plane, and a closed position wherein the automated construction system operating platform are in folded relation;

a pair of adjustable caster wheels mounted on and extending laterally from one of the trailer frame having supporting and operating platform(s) for supporting and operating the automated construction system wherein the trailer system is in an open position; and a pair of adjustable caster wheels mounted to said trailer frame platform, one or more adjustable caster wheels mounted on the other one of said automated construction system trailer frame platform, each adjustable caster wheel being fixed with respect to the automated construction system trailer frame platform to which it is mounted, said adjustable caster wheels being positioned so that when the automated construction system supporting and operating platform frame platforms are in said open position, the adjustable caster wheels mounted to the front of the trailer frame platform extend rearwardly beneath the rear platform and the adjustable caster wheels on the rear automated construction system operating platform extend forwardly beneath the front of the trailer frame platform, and the adjustable caster wheels being spaced above the surface on which the caster wheels rest when supporting the automated construction system trailer operating platform frame, said caster wheels further being positioned so that when the frame platforms are in the closed position and then rotated about the caster wheels to a preferred position, wherein the platforms extend generally vertically, the support of the automated construction system operating platform trailer system is shifted from the wheels to the adjustable caster wheels to facilitate moving the automated construction system trailer system in said preferred position.

A method and apparatus according to any claim encompasses the automated construction system collapsible trailer operating platform system of any claim further including a straight axle assembly mounted to the automated construction system operating platform trailer, the assembly including a pair of wheel and tire assemblies mounted on opposing hub ends thereof.

A method and apparatus according to any claim encompasses the automated construction system collapsible trailer operating platform system having straight axle assembly being mounted to the forward support frame.

A method and apparatus encompasses the automated construction system collapsible trailer operating platform system of any claim wherein the straight axle assembly is mounted transversely across the forward tubular trailer support frame.

A method and apparatus according to any claim encompasses the automated construction system operating platform collapsible trailer system of any claim, further comprising at least one automated construction system having slip-form printing operating platform having receiving and supporting pedestal adapted to be removably positioned within the trailer rear support frame.

A method and apparatus encompasses the automated construction system operating platform collapsible trailer system of any claim wherein when the automated construction system trailer operating platform system is vertically tilted and transported within the construction site and or when stowed, the pair of adjustable caster wheels and the third adjustable caster wheel are in contact with a supporting surface (ground) of the automated construction system collapsible trailer system's frame, and when the automated construction system trailer operating platform system is opened and deployed, the pair of adjustable caster wheels and the third adjustable caster wheel are elevated from the supporting surface (ground) of the automated construction system trailer operating system.

A method and apparatus encompasses the automated construction system collapsible trailer system of any claim wherein the trailer operating system is configured to transport onsite and operate at least one automated reinforced concrete construction system and components.

A method and apparatus encompasses that the transportable automated construction system collapsible trailer system of any claim further comprising at least one adjustable receiving supporting and operating pedestal having an adjustable pedestal mounting system assembly being removably attached to the first upper automated construction system removably secured to trailer's operating frame.

A method and apparatus encompasses the automated construction system having collapsible transportable trailer system of any claim further comprising at least one removably attached supporting and operating pedestal base having robotic construction system receiving system having adjustable guide rail assembly system removably attached to the first upper trailer frame of the forward support trailer frame.

A method and apparatus encompasses the automated construction system collapsible trailer apparatus having compatibility with several automated slip-form printing reinforced concrete construction systems of any claim wherein the guide rail assembly further comprises a pivotable choke assembly.

A method and apparatus encompasses the automated slip-form molding and printing reinforced concrete construction collapsible trailer system of any claim, the forward transportable trailer support frame, first upper frame and first planar deck plate having a forward apex shaped portion adapted to receive one of a removable stone guard or a removable utility box.

A method and apparatus encompasses a transportable collapsible trailer having one or more automated slip-form printing reinforced concrete construction system(s) of any claim wherein when the transportable trailer system is moved (repositioned) onsite vertically transported on a construction site then opened into the deployed operating position.

A method and apparatus encompasses the transportable collapsible trailer having an automated slip-form printing reinforced concrete construction system of any claim wherein the transportable automated construction system is installable onsite and removably attached to a mounting operating pedestal assembly apparatus having laser, acoustic, bubble, level indicating systems A method and apparatus encompasses the automated slip-form printing reinforced concrete construction systems removably secured to a collapsible trailer system of any claim, wherein said wheels define a rotational axis and said adjustable caster wheels are spaced from said axis an amount sufficient to cause the weight of said automated construction system operating trailer system to be shifted from said trailer wheels to said caster wheels when the trailer is tilted to said moving or storage positions.

A method and apparatus encompasses the automated slip-form molding and printing reinforced concrete construction system removably secured to the collapsible trailer system of any claim, wherein said rear platform has surfaces which engage surfaces on said front platform to distribute a load when said operating platforms are in said open (operational) position, and said surfaces are disengaged when said operating platform is in said closed (movable) position.

A method and apparatus according to any claim encompasses the slip-form printing reinforced concrete construction system removably attached to the collapsible trailer system, wherein said one or more adjustable caster wheels includes an adjustable caster wheel centrally positioned with respect to said adjustable caster wheels.

A method and apparatus according to any claim encompasses a a slip-form molding and printing reinforced concrete construction system removably secured to a transportable collapsible trailer system, including two or more adjustable caster wheels secured on to the rear of said front operating platform and one or more adjustable caster wheels secured on to the forward end of said rear operating platform, said adjustable caster wheels being positioned so that when said trailer operating platform(s) are in said closed position and are rotated to a generally vertical moving position about said adjustable caster wheels, the supporting weight of said operating trailer system is transferred on to said caster wheels.

A method and apparatus according to any claim encompasses the transportable automated construction system trailer system having collapsible characteristics, wherein one of said one or more adjustable caster wheels is centrally mounted on said other one of said operating platforms so that said pair of said adjustable caster wheels straddle said one adjustable caster wheel so that a narrow triangular movable support arrangement is provided.

The automated onsite slipform printing reinforced concrete construction system having removable securement to said collapsible trailer system method and apparatus according to any claim, is preferably operated onsite from inside/within the proposed structure to be slip-form constructed/ printed. The proposed slip-form printing process is preferably carried out from within the inside of the structure.

Concrete Pedestal (Cast In Place)

A method and apparatus according to any claim encompasses the combination of any claim wherein said means for selectively maintaining said supporting and operating pedestal system providing a placement means.

The automated construction system slip-form molding and printing print in place leave in place reinforced concrete construction method and apparatus of any claim is preferably centrally positioned and operated onsite from inside/within the proposed structure that is slip-form constructed/3D printed.

A method and apparatus according to any claim provides an automated construction system having supporting and operating pedestal casting fabric reinforced containment mold, wherein the containment sleeve is open at one end.

A method and apparatus according to any claim provides an automated construction system having supporting and operating pedestal casting containment mold, wherein the cast in place leave in place external reinforcing containment sleeve is formed by a member separated from an elongated, folded flat fabric reinforced containment sleeve (tube).

A full architectural scale cast in place leave in place supporting and operating pedestal for supporting said automated construction system method and apparatus encompasses a fabric reinforced external containment sleeve ranging between about 50 to 1200 danier, more preferably ranging between about 100 to 800 danier, most preferably ranging between about 350 to 700 danier for onsite slip-form pedestal supporting containment sleeve having sizes up to about 10 to 15 inches in diameter, depending upon the application, with polypropylene and basalt containment sleeve materials being preferred.

The quickly installed and removed automated construction system print in place leave in place method and apparatus according to any claim encompasses having supporting and operating pedestal depths ranging between about 4 feet to 10 feet; the preferred depth ranges between about 4½ feet to 6 feet.

A method and apparatus according to any claim encompasses the combination of any claim wherein said automated construction system print in place leave in place pedestal supporting and operating member has attached level indicators and a handle operating means thereon for selectively rotating said support member.

The full architectural scale automated construction printing method and apparatus of any claim characterized in that a desired grade of reinforcing cementitious mix is pumped and poured into a cast-in-place leave-in-place supporting and operating pedestal defining and reinforcing containment "sleeve" that is placed into the existing hole.

A full architectural scale automated construction printing system method and apparatus according to any claim encompasses provides a fabric reinforced supporting and operating pedestal casting containment mold for supporting said automated construction printing system, wherein the pedestal's containment sleeve is made of woven plastic material.

A full architectural scale automated construction printing system method and apparatus according to any claim encompasses provides a fabric reinforced supporting and operating pedestal casting containment mold for supporting said automated construction printing system, wherein the pedestal's containment sleeve is made of woven polypropylene material.

A full architectural scale automated construction printing system method and apparatus according to any claim encompasses provides a fabric reinforced supporting and operating pedestal casting containment mold for supporting said automated construction printing system, wherein the pedestal's containment sleeve is made of woven basalt material.

A full architectural scale method and apparatus according to any claim encompasses providing a cast in place leave in place fabric reinforced automated construction printing system providing a castable containment form or mold for supporting and operating pedestal for supporting and operating a multi-purpose robotic construction system, wherein the woven containment sleeve has a circumference being substantially constant in the longitudinal direction thereof and is positioned and arranged to assume the shape of a conforming cylinder in the filled part thereof in the state in which it is filled by a curable cementitious cast compound.

A full architectural scale method and apparatus according to any claim encompasses providing a cast in place leave in place fabric reinforced automated construction printing system's supporting and operating pedestal (casting mold), wherein the fabric reinforced containment sleeve (reinforcement mold) has a circumference changing continuously in the longitudinal direction thereof and is positioned and arranged to assume the shape of a cylinder in the filled part thereof in the state in which it is filled by cementitious casting compounds.

A full architectural scale method and apparatus according to any claim encompasses providing a cast in place leave in place fabric reinforced automated construction printing system's supporting and operating pedestal casting mold, wherein the reinforced pedestal containment sleeve is formed by a member separated from an elongated woven tube folded flat sleeve.

A full architectural scale method and apparatus according to any claim encompasses providing a cast in place leave in place fabric reinforced containment mold for encapsulating a casting material together when casting supporting and operating pedestals that provide support to the multi-purpose robotic construction system therefrom defined and supported by the existing hole extending vertically, said reinforced fabric casting containment sleeve (mold) comprising a thin fabric reinforced flexible elongated sleeve (envelope) having an opening at the top end thereof for supplying the cementitious "casting" material(s), said inelastic generally elongated protective fabric reinforced containment sleeve having a suitable thickness and sufficient strength to provide said reinforced fabric sleeve having sufficient containment strength to provide by itself support required for assuming and maintaining vertical extension without any exterior supporting forms, said protective fabric reinforced containment sleeve being arranged to be accurately positioned and held substantially vertically while being filled with the casting material(s) introduced through said opening so as to form a cast in place leave in place molded automated construction printing system's supporting and operating fabric reinforced pedestal having a generally circular cross section, extending vertically and supporting and encapsulating the cementitious casting material together, so that the cast in place leave in place fabric reinforced protective containment mold can be completely filled within the excavated cylindrical hole during casting.

A full architectural scale method and apparatus according to any claim provides a cast in place leave in place external fabric reinforced automated construction printing system supporting and operating pedestal casting, wherein the woven reinforced external containment mold has a circumference being substantially constant in the longitudinal direction thereof and is designed to assume the shape of an excavated cylinder in the filled part thereof in the state in which it is filled by cementitious cast compounds.

A cast in place leave in place external reinforced automated construction system supporting and operating pedestal method and apparatus according to any claim for casting an elongated, vertically extending external reinforced automated construction system supporting and operating pedestal having insertable vertically extending reinforcement bars or rods attached together and secured to a universal mounting system.

The full architectural scale method and apparatus of any claim encompasses hanging a flexible and elastic elongated external containment sleeve automated construction system supporting and operating pedestal having a lower end thereof resting against the ground/soil, an opposite and upper end of said external flexible and elastic elongated reinforced automated construction system supporting and operating pedestal having protective external sleeve being open; filling cementitious casting material through said opening at said upper end thereof so as to fill said automated construction system supporting and operating flexible protective external containment sleeve from said lower end thereof while filling said supporting and operating pedestal having cast in place leave in place containment sleeve from the bottom and upwardly with internal pressure provided by said cementitious casting materials to form a substantially circular cross-section and conforming to the exterior support of said excavated hole circular cross-section, wherein said automated construction system supporting and operating pedestal having protective external containment sleeve by itself is capable of containing and keeping said casting material together so that said external reinforced protective containment sleeve with a portion of said casting materials therein.

The leave in place cast in place pedestal method and apparatus according to any claim can contain a model number, serial code, location, QR code, dates, ID info.

Pedestals

A method and apparatus according to any claim provides a fabric reinforced protective containment sleeve, wherein the outer side of the sleeve is circular.

A method and apparatus according to any claim provides a fabric reinforced protective containment sleeve, wherein the outer side of the sleeve is the same or different materials as the other sides.

A method and apparatus according to any claim provides a reinforced protective containment sleeve, wherein the outer side of the sleeve wall being formed in thin flexible Basalt and or Polypropylene materials.

Auger

The full architectural scale method and apparatus according to any claim encompasses that the onsite auger drilling system can be temporarily drilled onsite into the preferred onsite ground locality to removably attach and secure the use of the automated construction printing system removably secured on to the end auger providing a supporting and operating system for the automated construction system to provide a single point onsite reinforced concrete automated construction system supporting and operating platform which is subsequently removed and reused. (See FIG. 52)

Reusable Pedestal

The full architectural scale method and apparatus according to any claim encompasses onsite water/sand filled removable/reusable transportable supporting and operating pedestals further encompasses easy and quick water and or sand filling and draining onsite. (See FIGS. 49 A and B)

Multi-Story Structures

The automated slip-form molding and printing reinforced concrete construction method and apparatus of any claim encompasses automated slipform printing construction of multi-story structures with several different construction systems and may be scaled as needed.

Fiber Reinforced Concrete

The external fabric reinforced cementitious containment sleeve system method and apparatus according to any claim is compatible with a wide variety of micro-reinforcements providing improvement in structural reinforcement and having pre-engineered regulating venting apertures to optimize the pre-engineered curing environment for using fiber-reinforced concrete (FRC) mixes to enhance a wide variety of reinforced concrete characteristics including improved stiffness and reducing deflection.

The full architectural scale automated method and apparatus according to any claim encompasses slip-form molding and printing walls and structural members, including with and without rebar reinforcement, may be used onsite in combination with conventional and basalt reinforcement(s), and fiber-reinforced concrete (FRC) that can increase structural stiffness and reduce deflection of cracked concrete members as well as decreasing the stress in the cementitious reinforcement(s), which is particularly significant in thin external reinforced concrete sections and cementitious slip-form printed structural members, where the geometry and profile significantly contribute to controlling complex deflection characteristics.

Temporary and Emergency Structures

The automated slip-form molding and printing temporary construction method and apparatus is preferably operated onsite from inside/within the structure that is slip-form constructed/printed. The slip-form printing process is preferably carried out from within the inside of the temporary structure.

The current invention method and apparatus according to any claim encompasses slip-form printing on the construction site in real time with the fabric reinforced exterior brick edge, having an initial high strength sufficient to support the above brick layer, accurately slip-form printed onsite to sufficiently cast interlocking into the supporting underlying "brick" or foundation having interface keyway interlocking characteristics that support the other slip-form printed bricks onsite or layers above, i.e. to support the completed wall weight.

The method and apparatus of any claim further encompasses the attachment of "hoops" "loops", eyelets, grommets, adjustable straps, flaps, pads, tabs secured on to the external reinforcement containment sleeve for additional removable attachment of conventional pneumatic air form molds for the onsite reinforced concrete construction of a variety of pneumatic formed roofs and or a variety of adjoining structures as needed; such as but not limited to the removable attachment of air formed roofs, walls, etc.

The method and apparatus of any claim encompasses dispensing from an automated construction system a reinforced external containment form from a dispensing spool that is removably attached to the automated positioning robotic arm(s) that is folded over to fabricate and construct a pre-engineered reinforced external brick containment form, Reference FIG. 40.

The method and apparatus according to any claim encompasses interfacing with conventional prior art concrete molding systems.

The automated construction system's methods and apparatuses according to any claim can be operated onsite either externally or internally, or in unison (simultaneously).

The method and apparatus according to any claim encompasses quickly obtaining high initial shear strengths onsite in real time.

The method and apparatus of the current invention according to any claim encompasses the offsite slip-form printing of reinforced concrete walls and or any structural section slip-form printed in a factory environment preferably having an accurately controlled temperature and humidity environment and then transporting the walls and or any structural sections to the construction site for their assembly.

The method and automated apparatus according to any claim encompasses, during the reinforced concrete construction process, the inventive disclosed automated system methods and apparatuses having mechanized arm(s) and platform functioning as a high speed square during onsite construction process in real time.

The method and apparatus according to any claim encompasses the onsite construction of high performance cementitious externally reinforced molding and printing of high performance concrete mixes encompassing memory return, moisture wicking, and preferably the encapsulation of fly ash.

The method and apparatus according to any claim encompasses pre-engineered apertures, mesh configurations, and the desired sleeve configurations such as but not limited to tubular, single piece, folded over and overlapped, such as having multiple materials glued (attached) together.

The method and apparatus according to any claim encompasses the onsite slip-form printing of double parallel and double non-parallel brick walls as needed depending upon the application.

The method and apparatus according to any claim encompasses onsite back hoe style mounting of the automated reinforced concrete construction system, Reference FIG. 48.

The method and apparatus of any claim encompasses onsite slip-form printing of a reinforced external brick containment sleeve simultaneously with an internal reinforcing mesh/net as needed depending upon application, Reference FIG. 34.

The method and apparatus according to any claim encompasses folding (collapsing) the complete automated apparatus.

The method and apparatus of any claim encompasses onsite printing of temporarily employed unsupported slip-form printed arches having temporary supporting characteristics as needed such as for supporting temporary and or permanent walls, sections, and structures in real time as needed.

The method and apparatus of any claim encompasses a variety of continuous coil reinforcement positioned within the pre-engineered stress zones such as but not limited to the inside of the four sides of the external containment sleeve having the same or different configurations on each of the slip-form printed brick sides.

The current invention encompasses methods and apparatuses not shown, and further encompasses other configurations not encompassed not discussed nor shown.

While certain embodiments are depicted in the drawings, one skilled in the art will appreciate that the embodiments depicted are illustrative and that variations of those shown, as well as other embodiments described herein, may be envisioned and practiced within the scope of the present disclosure.

Aspects of the disclosure may be more fully understood from the following description when read together with the accompanying drawings, which are to be regarded as illustrative in nature, and not as limiting. In the drawings, like elements are indicated by the same reference character(s). The drawings are not necessarily to scale and simplified for illustrative purposes, emphasis instead placed on the principles of the disclosure.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. The headings herein are provided for ease of reference and likewise are not intended to identify key or essential features and are not intended to limit the scope of the claimed subject matter.

BRIEF DESCRIPTION OF THE DRAWINGS

With reference to the appended drawings, below follows a description of a preferred illustrative embodiment of the inventions cited as an example.

FIG. 1A illustrates a side view of a conventional prior art wooden molding system for conventionally molding a footing on a construction site, not to scale further illustrating wooden supports or being supported and positioned in place with wooden stakes. FIG. 1B illustrates a conventional prior art wooden foundation form sitting on hard pan.

FIG. 2A illustrates a conventional concrete wall form. FIG. 2B illustrates a removably supported conventional high wall disposable wooden concrete molding system required for concrete casting large/tall supported wooden structures, positioned above a previously cast foundation and supported with large disposable wooden supports having wooden crossing members.

FIGS. 29, 30 A, 30 B, 30 C, 30 D, and 45 depicts in illustrative embodiments 6 of many possible mechanized and or robotic automated configurations.

FIG. 32 depicts a perspective view of the invention's slip-forming apparatus with metering devices (not shown), and fluidic mix delivery hose; FIG. 32 illustrates a slip-forming nozzle assembly that includes three nozzles; FIG. 32 illustrates the embodiment of the slip-forming nozzle assembly being used to extrude a reinforced slip-formed brick wall; FIG. 32 illustrates a side view of a portion of the slip-forming molding extrusion nozzle assembly; FIG. 32 illustrates the slip-forming nozzle apparatus depicts one of many possible configurations and design alternatives being used to extrude an external fabric reinforced brick layer being used to extrude reinforced bricks in a layer by layer method; FIG. 32 illustrates another embodiment of a slip-forming nozzle assembly that includes a mold forming receiving channel in the slip-former that.

FIGS. 44 A, B, C, and D depict four of many possible internal reinforcement memory return cable configurations, as an option encompassing same or multiple different memory return alloys as disclosed herein or as needed. FIGS. 44 E and F depict two of many possible memory return internal reinforcement wire configurations.

FIG. 49 A depicts a top view. FIG. 49 B depicts a bottom view. FIG. 49 C depicts a side view. FIG. 49 D depicts a cutaway side view. Inlet and drain not shown. The water/sand pedestal reservoir may optionally be in a collapsible accordion type configuration (not shown).

FIG. 50 A depicts a side view of an auger drilled hole with a removably attached supporting and operating pedestal providing temporary support and operating for the above automated system. FIG. 50 B depicts a side view of a cast in place leave in place permanent supporting pedestal system with a removably attached operating platform. FIG. 50-1 depicts the removably attached supporting and operating pedestal.

FIG. 50 B illustrates a vertical section showing the onsite mix filling of a protective reinforced external containment sleeve with concrete mix after the removal of the drilling auger.

FIG. 51 illustrates the mobile mechanized or automated robotic system being used to construct multi-story structure employing multiple automated systems simultaneously onsite. FIG. 51 illustrates the embodiment of the slip-forming nozzle assembly being used to extrude a slip-formed wall in an angled orientation. FIG. 51 illustrates a plurality of the mobile automated robotic systems operated concurrently for reinforced onsite concrete construction.

FIG. 53 depicts one of many supporting and transporting caster wheel assemblies providing 360 degrees or more of rotation that is simplified and exaggerated for illustrative purposes and is not to scale.

BOBCAT™ OPERATING PLATFORM

Figure 48:
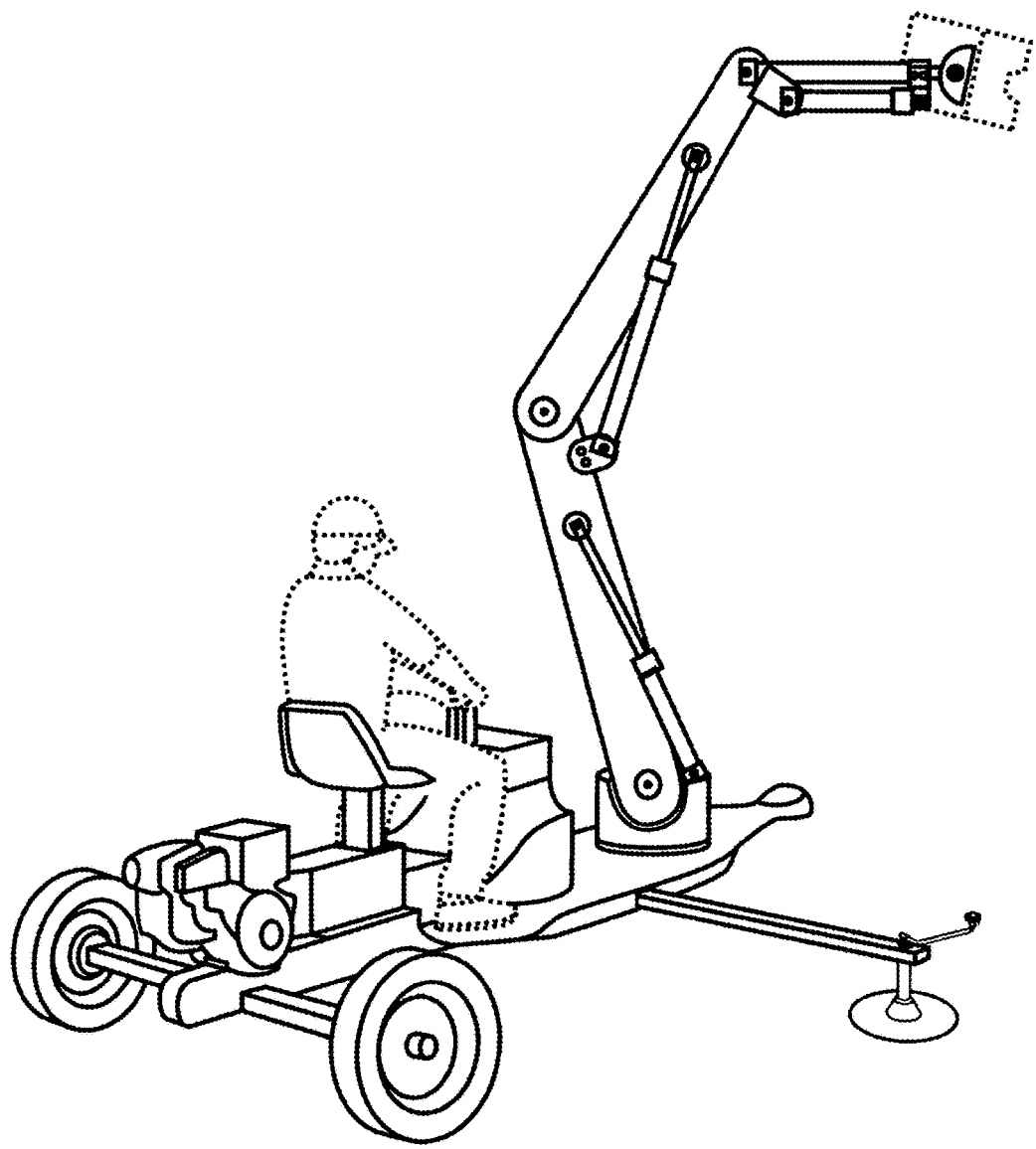
FIG. 48 illustrates a ¾ side view of a mobile operated tractor style construction system having a removably attached multi-purpose robotic construction system illustrating slip form printing a brick from the overhead.

The slip-form printed "bricks" may be printed on site or from a mobile trailer, Bobcat®, Reference FIG. 48, or from a truck (not illustrated) as needed.

Trailer Supporting and Operating System

Another object of the invention is to provide a collapsible trailer system which when in the open (deployed) position provides onsite automated three-dimensional concrete slip-form printing construction platform, also known within the art as 3D House Printing.

The following section will now briefly describe how to operate the trailer system.

Figure 46:
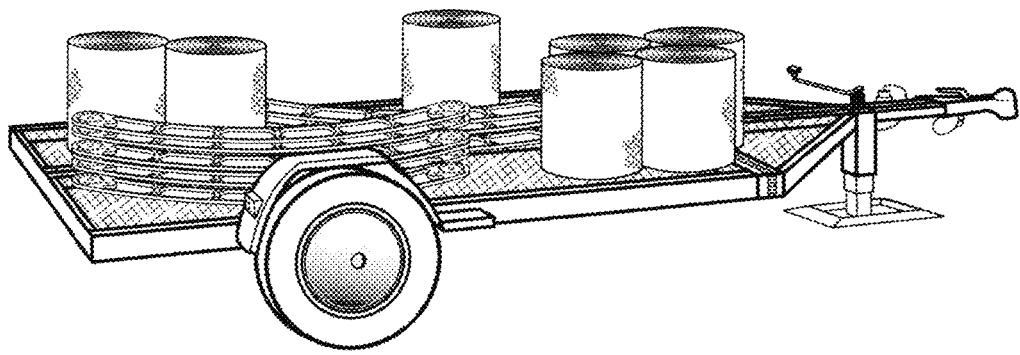
FIG. 46 is a side perspective view of an embodiment converted into one of many possible automated construction system flatbed trailer configurations for transporting an automated construction system cargo onsite (operating platform); including other slip-forming equipment and components as disclosed herein, including spooled sleeves, hoses, pedestal tools/gauge that is simplified and exaggerated for illustrative purposes and is not to scale.

FIG. 46 is a side perspective view of an illustrated embodiment converted into one of many possible flatbed trailer configurations for transporting an automated construction system cargo onsite (operating attachment platform); including other slip-form printing equipment and components as disclosed herein, including spooled sleeves, hoses, pedestal tools/gauges that is simplified and exaggerated for illustrative purposes and is not to scale.

Figure 47:
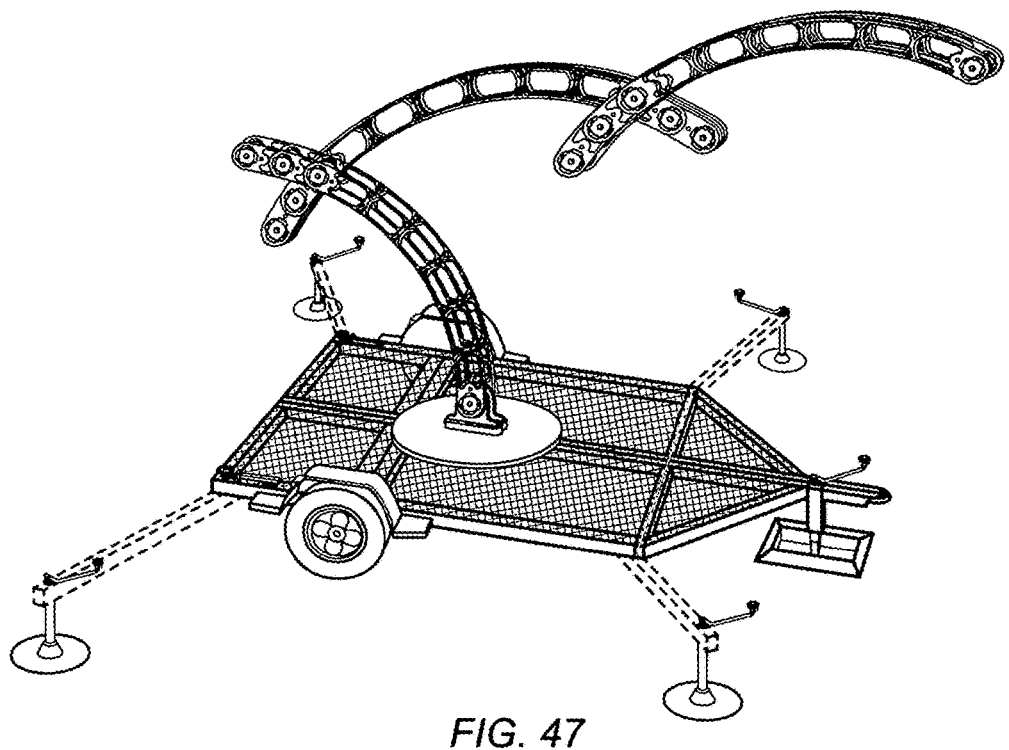
FIG. 47 is a perspective view of a transportable and collapsible automated construction system trailer onsite (operating platform) constructed in accordance with the invention in the open position having onsite (operating platform) adjustable stabilizing pontoons that is simplified and exaggerated for illustrative purposes and is not to scale.

FIG. 47 is a perspective view of a transportable and collapsible trailer employed onsite (operating platform) constructed in accordance with the invention in the open position having onsite (operating platform) adjustable stabilizing pontoons that is simplified and exaggerated for illustrative purposes and is not to scale.

Figure 1:
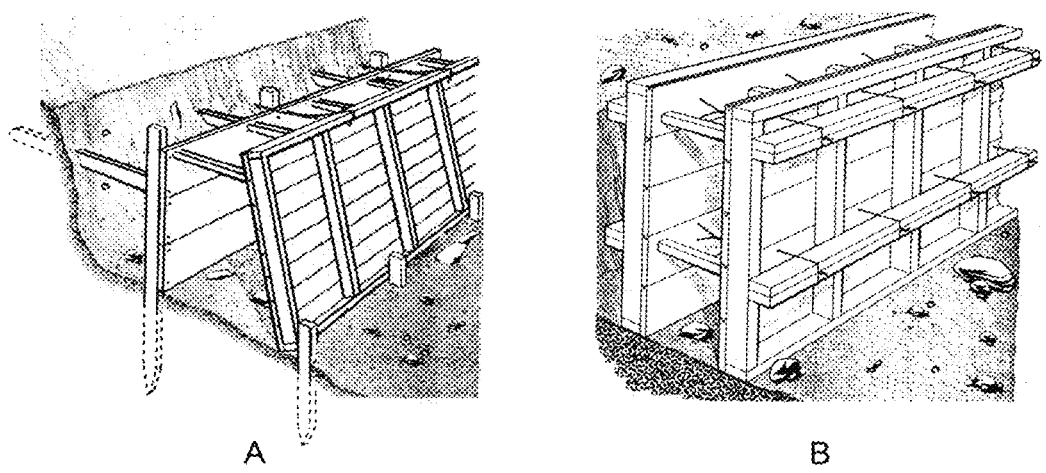
Figure 2:
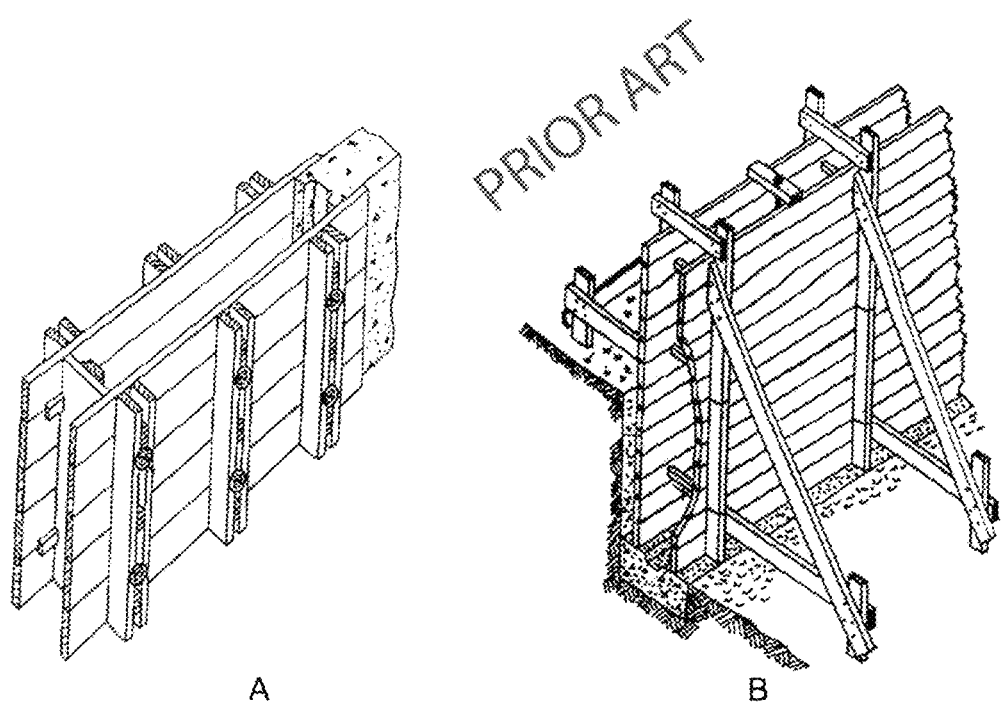
FIG. 2 illustrates a prior art conventional wooden panelized concrete onsite molding system for casting high concrete walls.
Figure 3:
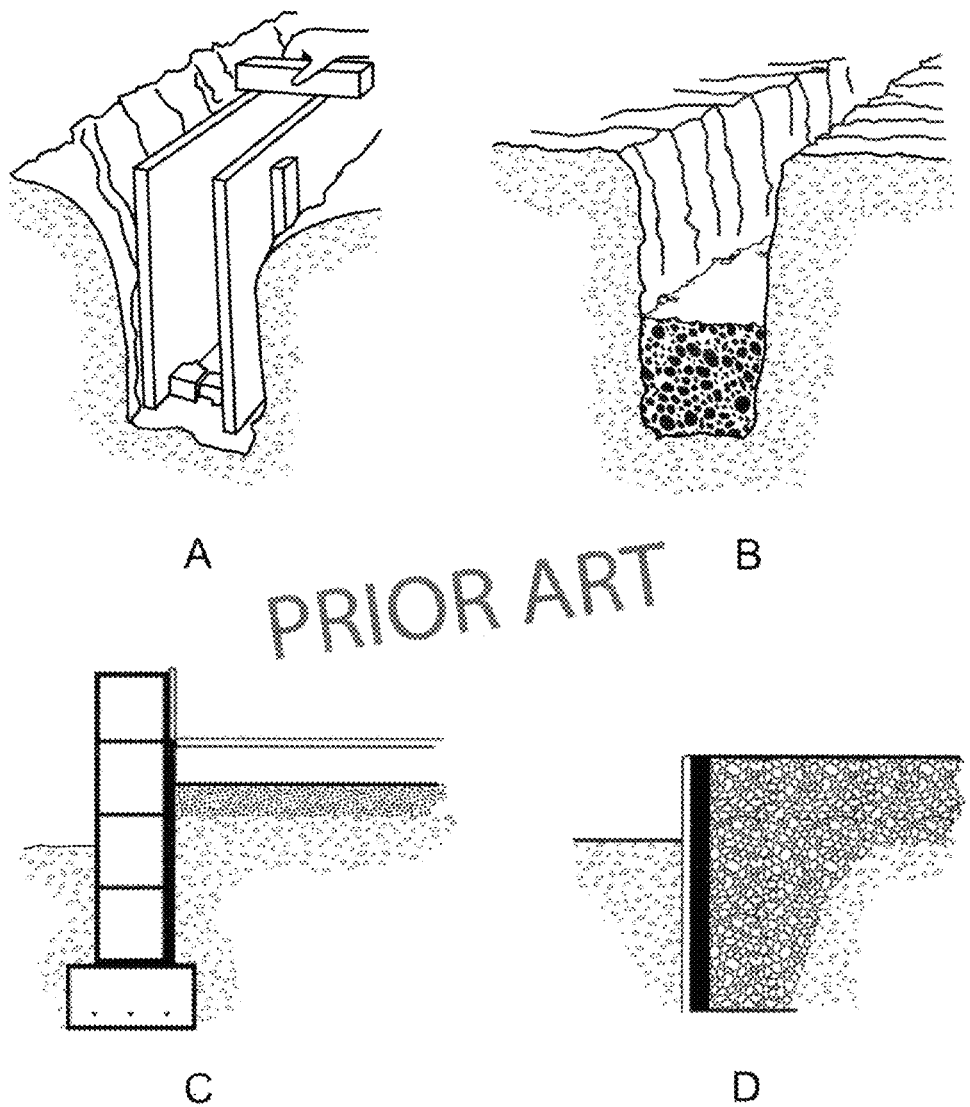
FIG. 3A illustrates a prior art foam panel molding system consisting of two parallel spaced apart disposable foam panels for onsite casting within a trench.
FIG. 3B illustrates casting a concrete foundation without a containment form by directly pouring concrete into a trench.
FIG. 3C illustrates a side view of a block foundation structure with an attached floor system.
FIG. 3D illustrates a side cutaway view of a conventionally cast combination of a floor and insulated concrete foundation illustrating an insulation barrier between the concrete foundation and the soil.
Figure 4:
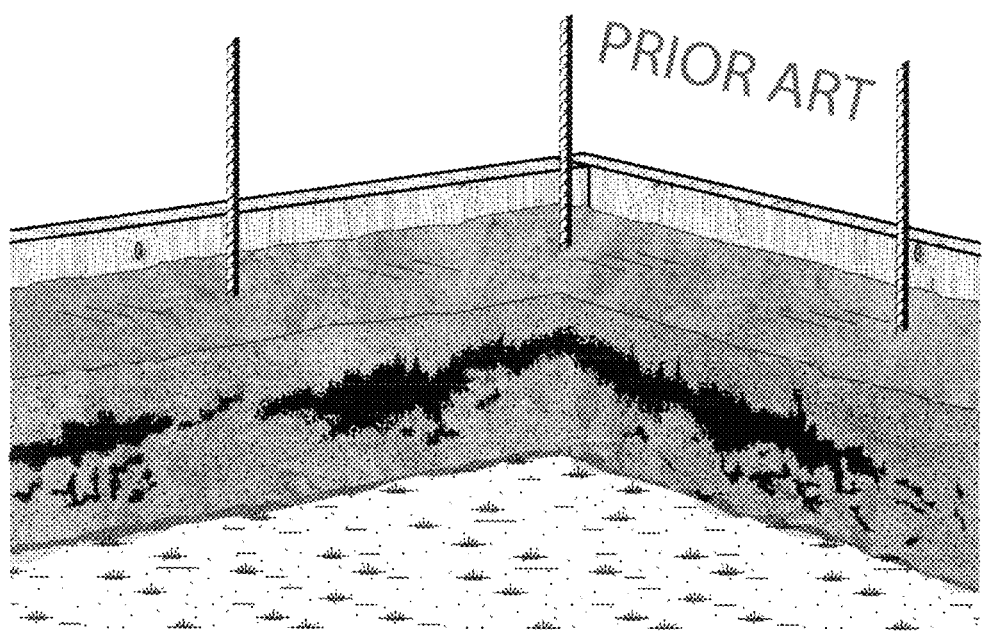
FIG. 4 illustrates a side view of a conventionally onsite cast reinforced concrete foundation revealing large cavities (voids/bug holes) just after the removal of the side of the mold.
Figure 5:
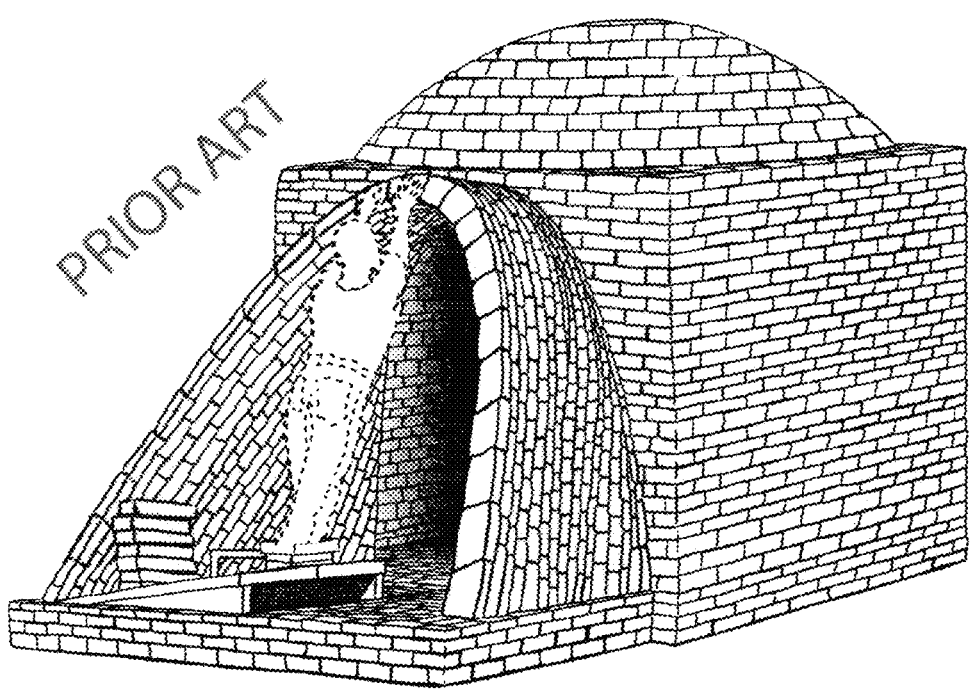
FIG. 5 illustrates a side view of the prior art conventional squinching construction system.
Figure 6:
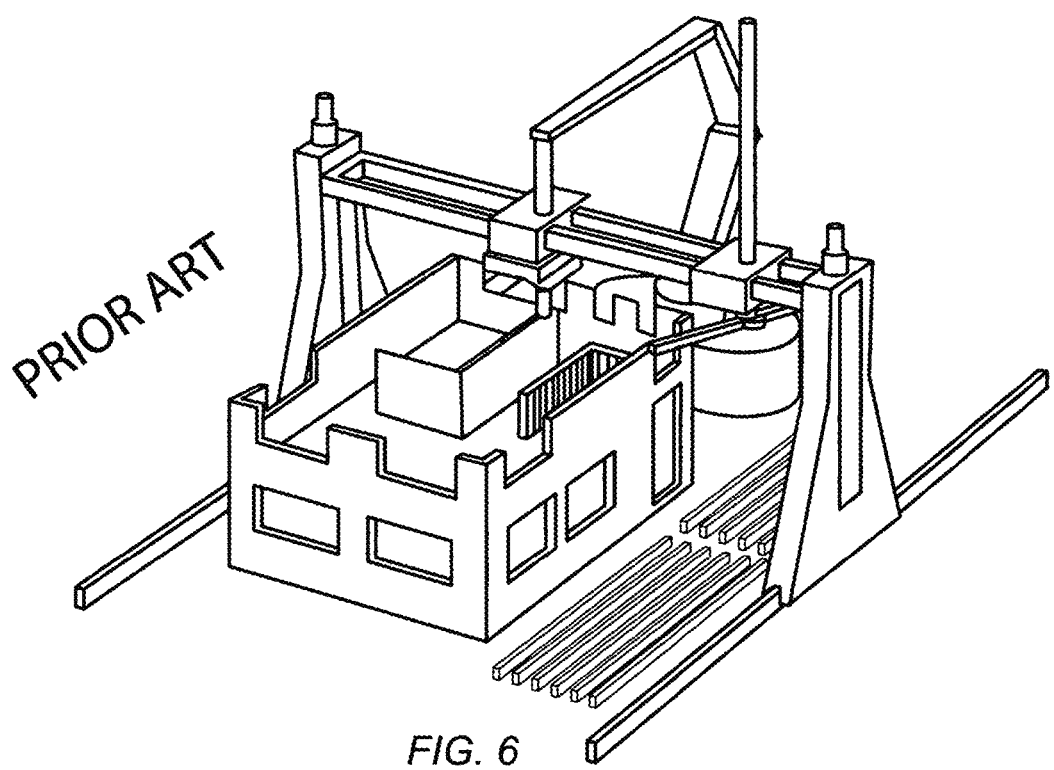
FIG. 6 illustrates a slight side overhead view of Khoshnevis' large overhead gantry printing system.
Figure 7:
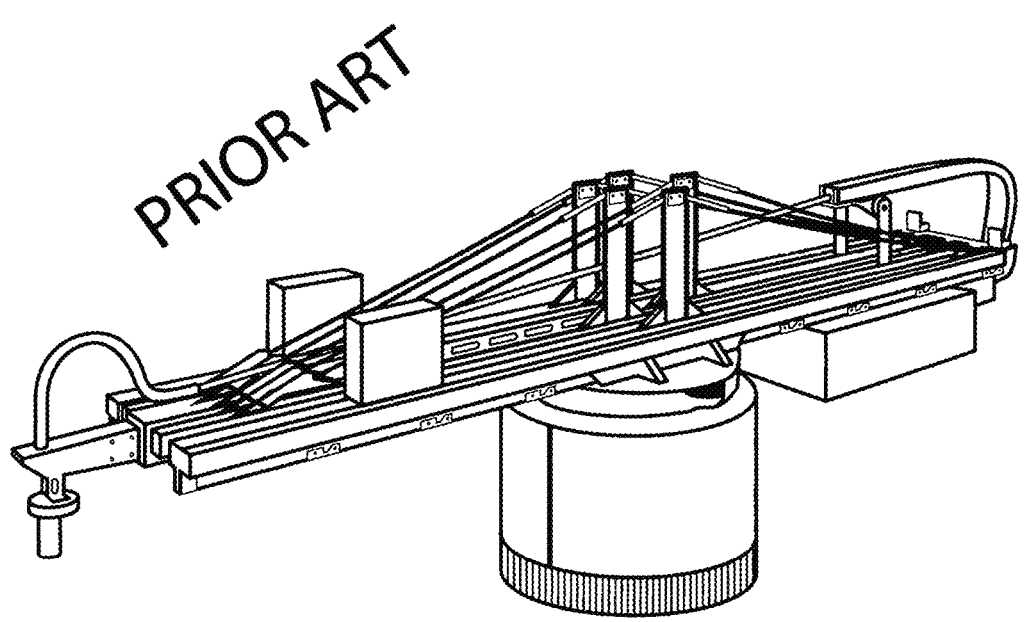
FIG. 7 illustrates the mechanized construction printing system from Apis-Cor.
Figure 53:
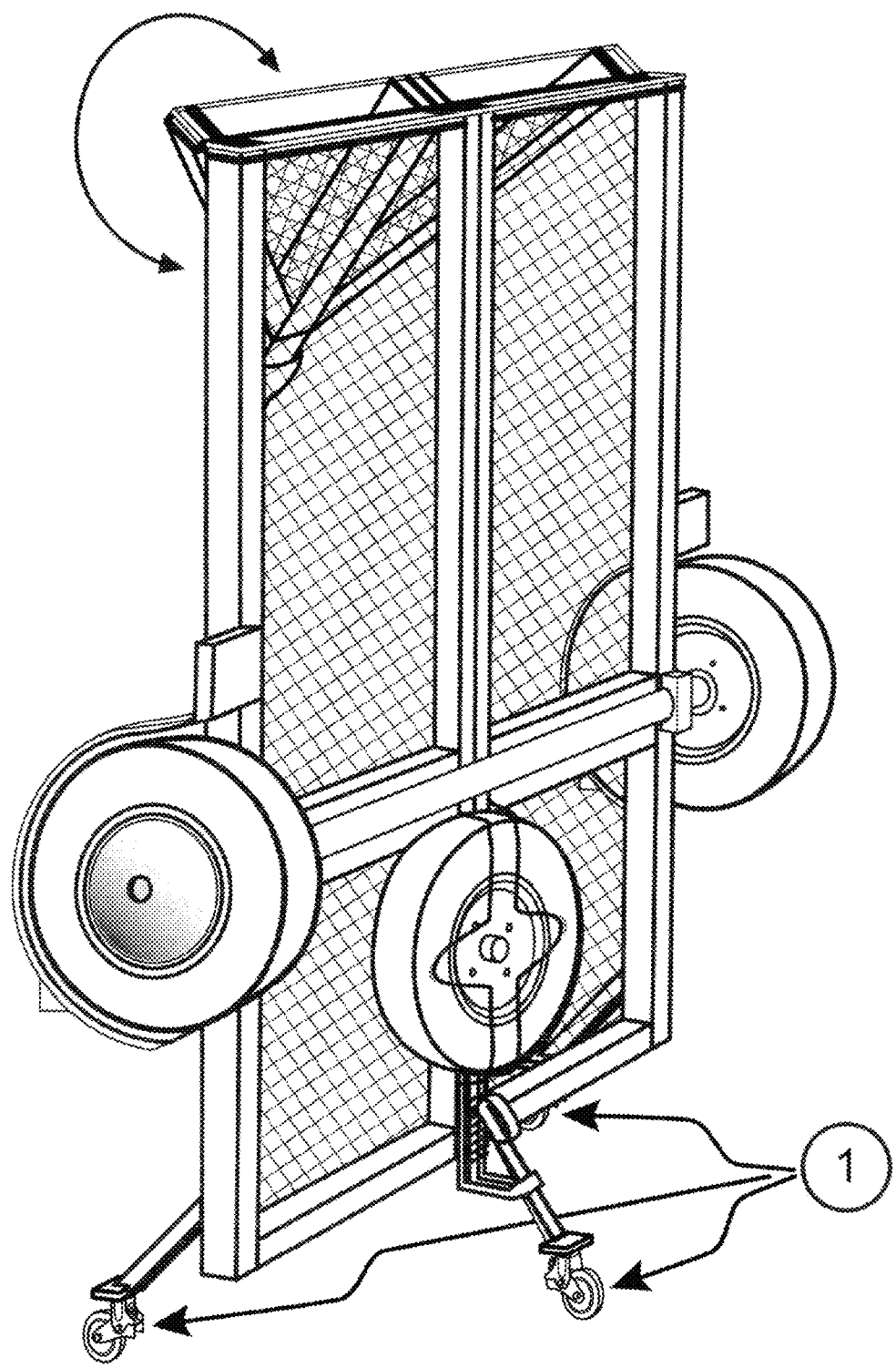
FIG. 53 is a partial view of the transportable and collapsible trailer system constructed in accordance with the current invention in the folded down and tilted up and standing position (closed) for ease of transport on the construction site having movable position relative to the ground.

FIG. 53 is a partial view of the transportable and collapsible trailer system constructed in accordance with the current invention in the folded down and tilted up and standing position (closed) for ease of transport on the construction site having movable position relative to the ground. FIG. 53-1 depicts one of many supporting and transporting caster wheel assemblies providing 360 degrees or more of rotation that is simplified and exaggerated for illustrative purposes and is not to scale.

The integration of the automated system having reinforced concrete slip-form printing components and operation of the robotic construction trailer transport and operating platform system is described herein. Accordingly, it is desirable to provide a collapsible transporting trailer system to reduce its standing width and height to be easily moved around onsite such as underneath doors, hallways, corridors, archways, etc. and re-expanded locked in place in the deployed position and easily assembled and operated on and off the construction site while utilizing less materials for lighter weight, ease of manufacture and fuel efficiency. Installing the invention's three dimensional reinforced concrete construction apparatus on a movable trailer system having onsite adjustable pontoons (leg extensions) (Reference FIGS. 22 and 47) to stabilize and increase the trailer footprint to employ the transportable supporting and operating trailer into an automated construction operating platform and operating area.

As an option or optionally the automated construction system transporting and operating trailer system is may be easily tilted on end and the top end portion of the trailer can be easily collapsed down to fit underneath a doorway for transporting to another construction area, such as another room. Reference FIG. 53).

The transport trailer is easily transported on the construction site or stored tilted on end in the closed position in an upright manner. In the collapsed and closed position, being easily moved through doorways, halls.

A further object of the current invention is to provide a previously unavailable transportable and collapsible trailer system providing easy transport of the current invention's multi-purpose robotic construction system to and on the construction site.

A further object of the invention is to provide onsite conservation of footprint and envelope space having a folded down trailer system that is easily tilted upright onsite into a collapsed and standing movable position.

The first support and second support having adjustable caster wheels mounted thereon, reference FIG. 53-1, and the three caster wheels being positioned to come in contact with the ground to transport and support the trailer system when tilted upright in the closed position and in an orientation substantially 90° to the ground.

The third caster wheel provides a complete rotation system of the fold down trailer in a confined space. Employing three casters providing tilting upright into position enabling turning 360 degrees or more, thus being able to easily maneuver on the construction site and quickly deployed and operated in a confined space, and additionally being further horizontally and vertically movable (Adjustable).

The transport and operating trailer system may now be easily transported or slidably moved on the construction site such as into or out of slip-form printing construction operations (also known as 3D House Printing) or in storage as needed. Because adjustable caster wheel arms are in an opposed spaced relationship from support legs, provides a larger stable three-point platform.

The movable transportable base is provided for ease of onsite automated construction operations. The caster wheel support assembly thereby provides onsite trailer support and maneuverability to support the trailer system in an upright fixed or mobile position.

The "fold down" trailer provides ease of transport and deployment to the next onsite slip-form printing location, reference FIG. 46.

This trailer's novel design exhibits very desirable features such as the ability to be easily tilted up and stored in a vertical upright position and having a more compact design and easily maneuverable on the construction site preferably having a platform receiving collar that rotates 360 degrees or more (not shown) as needed for ease of a variety of onsite reinforced concrete construction operations having lightweight design and a balanced chassis providing easy transport and easy onsite deployment and operation by one or more operators.

The current invention encompasses wherein a reinforced concrete construction trailer system encompasses installable and removable mounting pedestal systems having laser, compass, acoustic, bubble levels, laser level indicating systems, I.D. plate/serial no., and optional legs/feet as needed.

The current invention encompasses as an option or optionally having two automated construction systems removably attached on a single trailer system (not shown).

Accordingly, it is an object of the current inventions to provide an improved collapsible transporting and operating trailer system providing a novel onsite automated construction system slip-form reinforced concrete construction system having onsite slip-form printing operating platform.

The current invention encompasses as an option or optionally attaching a Global Positioning System preferably Skylink™ or LoJack™ system.

The current invention encompasses a vertically stowable modular multi-purpose automated construction transporting system and having onsite operating platform trailer is provided. The trailer system, reference FIGS. 22, 46, 47, and 53, preferably includes a unibody construction having a forward support section including a first tubular frame having a main body portion with a first upper platform and rear interface side, and forward trailer neck; a pair of parallel preset adjustable caster wheels attached proximate said rear frame interface; and a planar operating deck substantially covering the first upper platform. The transporting and operating trailer system further includes a rear support section including a second tubular frame having a supporting operating platform and a forward interface; and a planar deck substantially covering the operating platform. A pair of hinge assemblies interconnecting rear interface and said forward interface. The transporting and operating trailer system is adapted to be accurately configured in an onsite deployed (folded flat) automated construction system operating configurations, wherein the forward support section and rear support section are longitudinally positioned next to each other forming a generally horizontally oriented onsite construction platform operating system and for supporting payloads and the trailer is further adapted to be easily reconfigured in a vertically transportable and or storable configuration, wherein the forward support section is adapted to be folded up and down about the pair of hinge assemblies such that the forward support section and rear support section are latitudinally positioned next to each other in a generally vertical orientation which may be folded down or collapsed into a smaller compact vertically upright transportable and stowable transporting and operating trailer system.

As an option the operating mesh base encompasses having four adjustable supporting leg extensions (Reference FIGS. 22 and 47) to increase and stabilize the trailer operating platform.

In a specified embodiment, the current invention encompasses a transporting and operating trailer apparatus and having an adjustable counterweight (not shown).

In a specified embodiment, the current invention encompasses a transporting and operating trailer apparatus and method having an optional adjustable/movable seat (not shown).

For instance, round tubular steel double frame construction has been shown to be lighter than traditional rectangular and square tubing frame designs, while still exhibiting the same structural strength. The ability to manufacture bent tube transporting and operating trailer platform system's frame economically opens up the opportunity to incorporate a variety of improvements in trailer frame designs, such as but not limited to wheel covers that provide a platform or step, that are difficult or very costly to achieve with square or rectangular tubing which does not lend itself well to being bent. By utilizing similar sub-components in various scales and models of trailers, overall costs of manufacturing the various trailer systems may be reduced, and thus, the savings may be passed to the consumer.

According to another aspect of the current invention, when the transporting and operating trailer system is vertically positioned and is mobile, as needed, on the construction site, the pair of adjustable caster wheels are in contact with a ground surface. According to another aspect of the current invention, when the transporting and operating trailer system deployed in the horizontal operating position, the adjustable caster wheels are elevated from the ground.

A further aspect of the current invention includes the transporting and operating trailer system being configured to transport a variety of operating systems and to transport a variety of slip-form printed concrete construction molds, sleeves and other equipment as disclosed herein such as but not limited to mechanized arms, hoses, piping, gauges, a wide variety of spooled containment sleeves. (Reference FIG. 46)

According to another aspect of the current invention, the transporting and operating trailer system further comprises at least one automated construction system removably receiving and adjustable mounting platform system and choke (not shown), having a receiving assembly removably attached to the first upper trailer frame platform.

And another aspect of the current invention includes optionally providing a plurality of antislip/footing grating panels attached to the trailer first and second frame platforms, said grating panels laterally positioned outboard of the planar deck.

Moreover, when the onsite transporting and operating trailer system is moved and the at least one automated construction system receiving and choke assembly may be quickly removed, the generally horizontally oriented common planar frame platform provides a flat automated construction system operating flat platform for an optional automated construction system operator depending upon the configurations ranging between about 5 feet to 7 feet to 7 feet to 10 feet.

A preferred embodiment of the movable and stowable modular transporting and operating trailer construction system may have a weight of about 300 lbs., a transport capacity of about 1200 lbs., having an operating deck area of about 60 inches by 80 inches, having a standing height of about 70 inches, having a width of about 75 inches, having a depth ranging between about 20 inches about 28 inches, and having a length of about 100 inches or scaled as needed. Preferably in a stowable non-deployed configuration which allows the transporting and operating trailer to be quickly compacted into an upright vertical position are quick-disconnects which allow easy installation and removal of the automated construction system having received and adjustable guide rail positions and easily and quickly moved and operated on the construction site as needed (see FIGS. 22, 46, 47, and 53).

The trailer's A-frame which is considered to be the most forward body portion of a trailer frame. It is preferred that all four portions of the A-shaped member are formed from one unitarily hollow bent tube. Having a standard trailer hitch assembly is preferably attached to the distal end of the trailer neck. Preferably, trailer hitch is adapted to receive a ball. The trailer hitch is a component well known in the art, and therefore, is not described in any further detail.

The foldable transporting and operating trailer system front section primarily includes a rear hollow tubular frame. The rear frame preferably comprises a round tube steel double frame construction similar to the forward frame. The round hollow tubing material may vary with regard to strength, weight and dimension (e.g., diameter and thickness) depending on the specified scale and capacity of the transporting and operating trailer system. For instance, the round tubing may be a high strength steel alloy for heavy duty trailer construction or a lightweight high strength aluminum alloy for a light weight build.

Moreover, any other type of frame plate and or mesh materials known in the art may be utilized.

Figure 22:
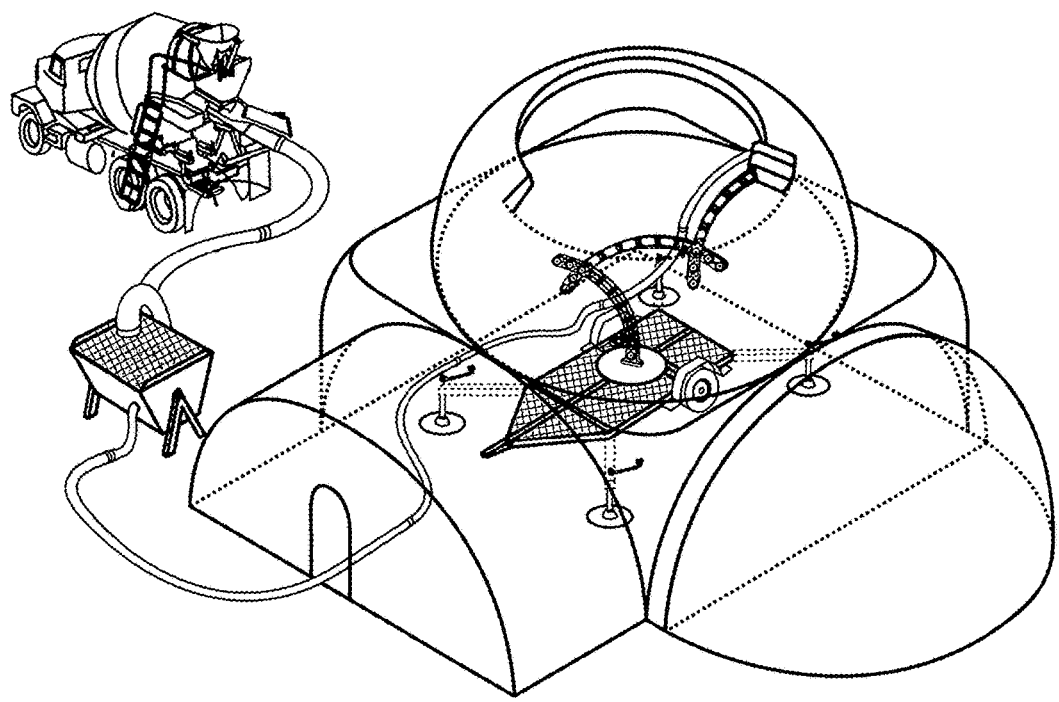
FIG. 22 illustrates a semi-automated onsite printing construction system of having a reinforced concrete roof, further illustrating a semi-automated slip-form printing nozzle assembly having an orientation control mechanism being used to construct an embodiment of an open span (support less roof). One of many possible configurations depicting the inventive printing apparatus and technology.
Figure 23:
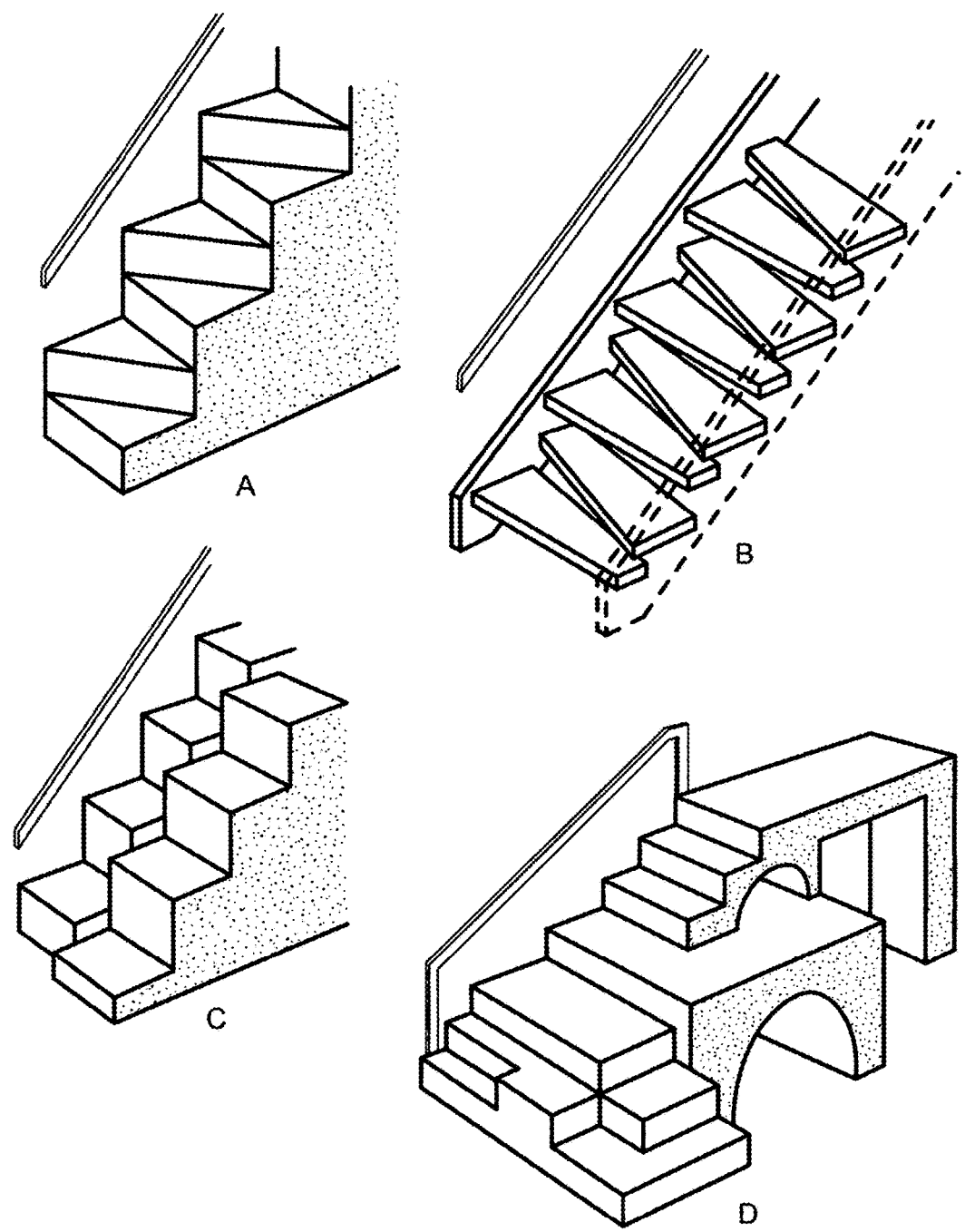
FIG. 23 illustrates four of many possible onsite slip-form printed stairway configurations.
Figure 24:
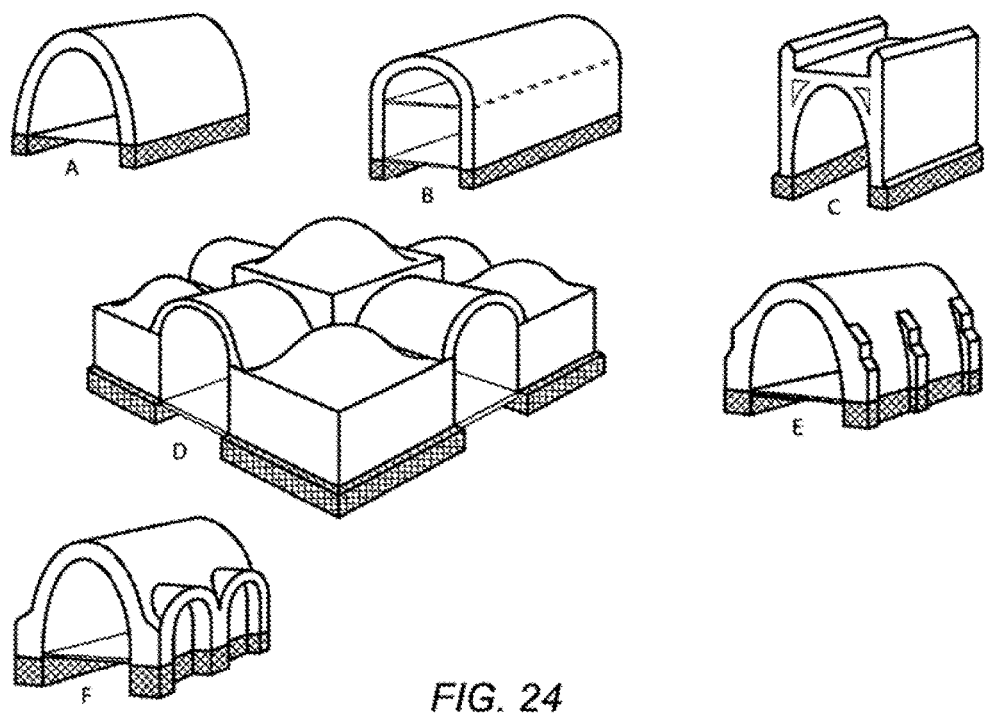
FIG. 24 A thru F depicts in an illustrative embodiment 7 of many possible reinforced concrete structures composed of domes, arches, and vaults that are simplified and exaggerated for illustrative purposes and are not to scale, that are able to be slipform molded constructed onsite with the current invention's methods and apparatuses.
Figure 25:
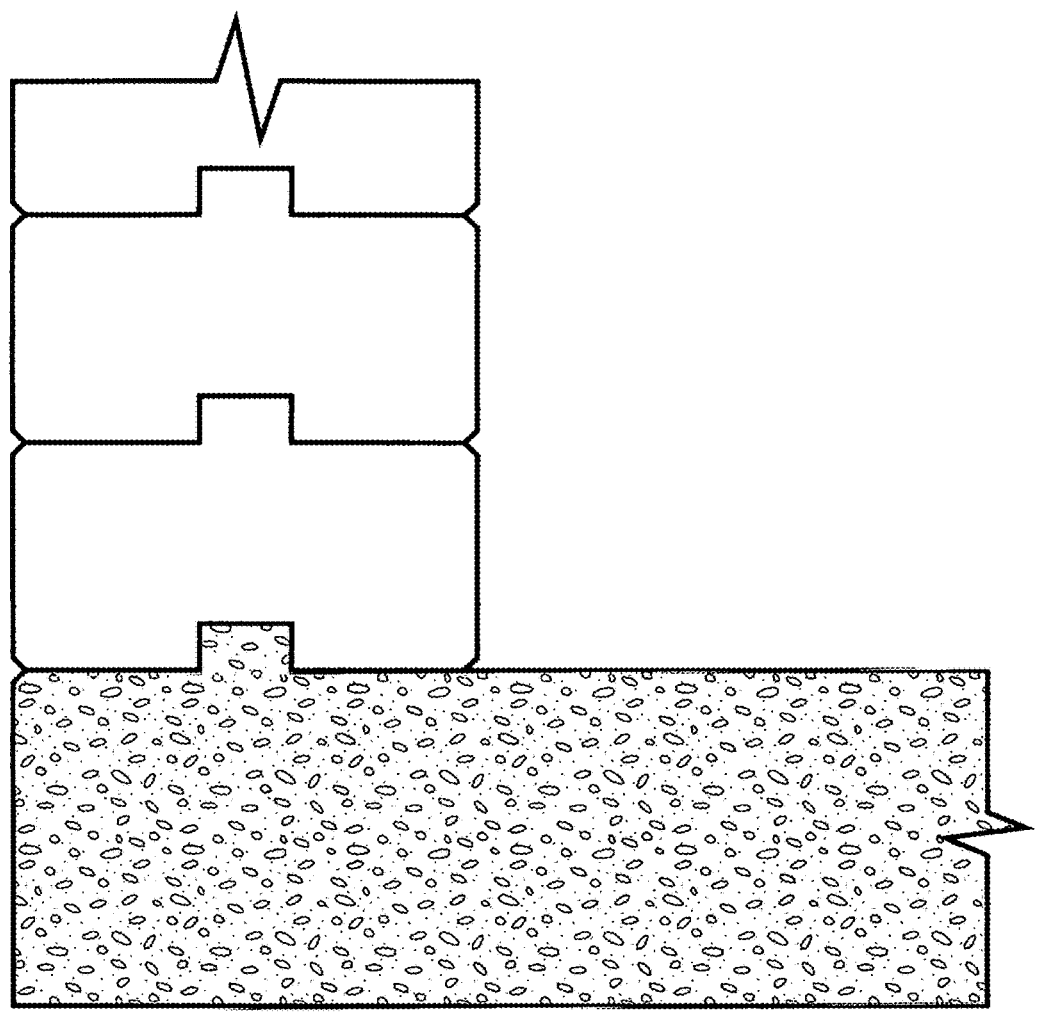
FIG. 25 illustrates from a cut away side view of a foundation having keyway interlocking bricks.
Figure 26:
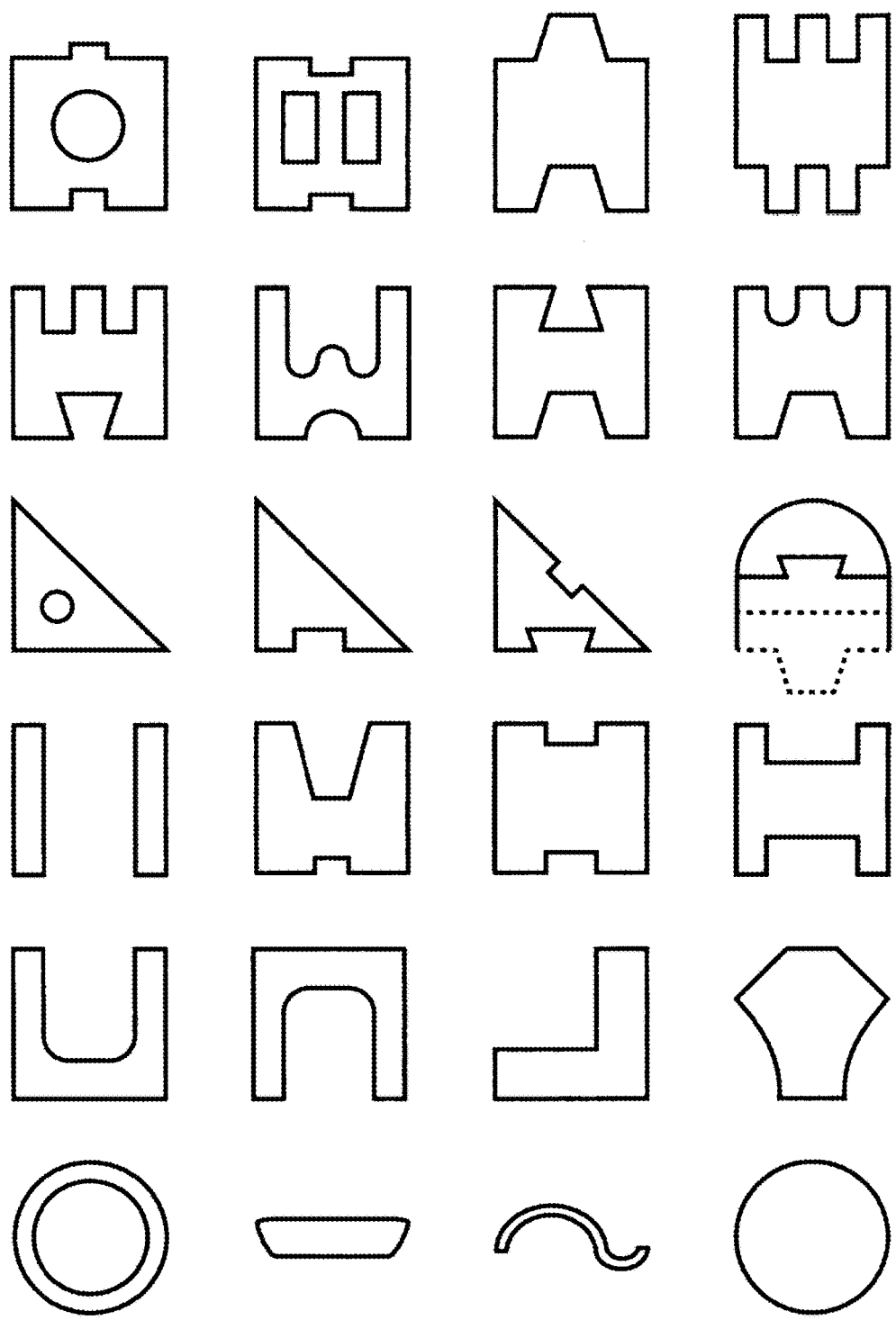
FIG. 26 represents 24 of many possible reinforced brick configurations that are slip-formed and molded onsite in real time.

Forward frame support section and foldable front frame support section are rotatably attached via hinge assemblies to form a foldable support frame interface. As a result, a hinged joint is formed between forward support frame support section and foldable forward frame support section. Thus, when transporting and operating trailer system is fully deployed (as shown in FIGS. 22 and 47), the horizontal plane defined by forward frame support section is coincident with the horizontal plane defined by front frame support section, thereby constructing a continuous transport frame and operating platform. However, when the shipping and operating trailer system is to be moved and repositioned as needed on the construction site or placed in storage (not in use), front frame support section may be folded down about the axis defined by the pair of hinge assemblies (see FIG. 53) and rubber toggle locked and positioned on top or vertically next to rearward frame support section.

Other components of the stowable modular automated construction trailer system includes wheels and tires, fenders and tail lights.

FIG. 53, depicts that the under body of the tubular trailer frame is designed such that a spare tire and wheel may be stored in a recessed area. Another feature of the transporting and operating trailer system is the strategic position and placement of three adjustable caster wheels assemblies on the underside of trailer frame at the most rearward and lower end of the trailer frame. In particular, a left adjustable caster wheel assembly is preferably attached to the corner where left vertical frame member and the rear lower crossmember intersect to form a corner joint. Similarly, a right adjustable caster wheel assembly is preferably attached to the frame corner where right vertical member and the rear lower crossmember intersect to form a corner frame joint. Additionally, the third adjustable caster wheel is preferably removably attached to the lower forward crossmember of the rear frame support section. Moreover, a frame securing member is provided on the transporting and operating trailer frame to secure the foldable front support section to the rearward support frame section.

Figure 8:
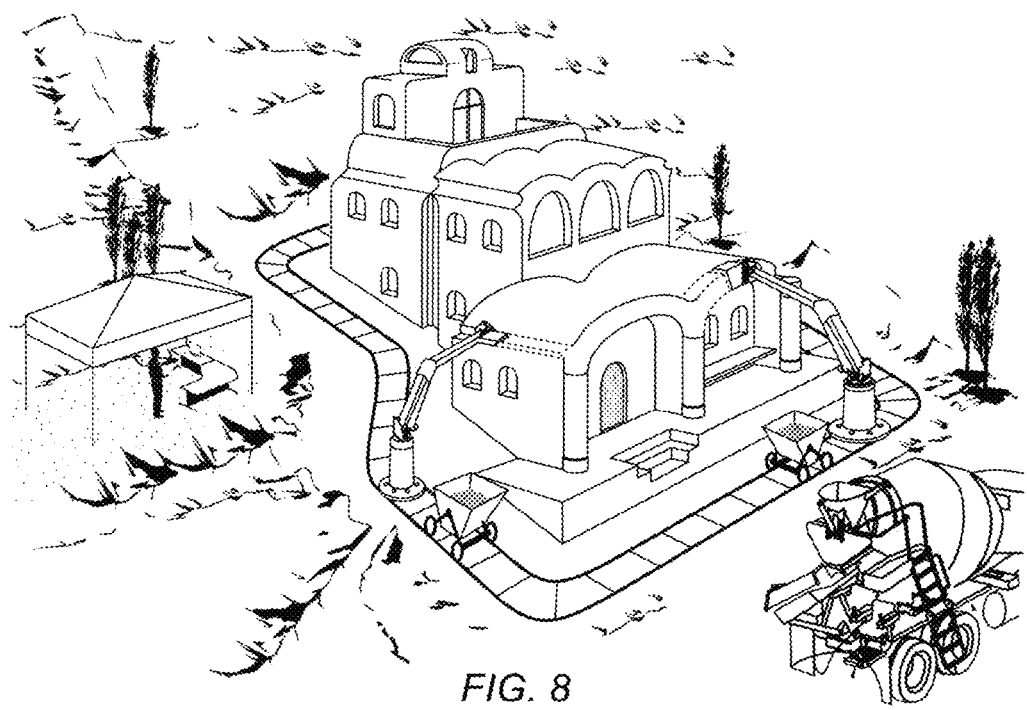
FIGS. 8 and 51 illustrates two perspective views of one embodiment of an automated construction apparatus having a lifting and positioning mechanism to print multi story structures onsite.
Figure 9:
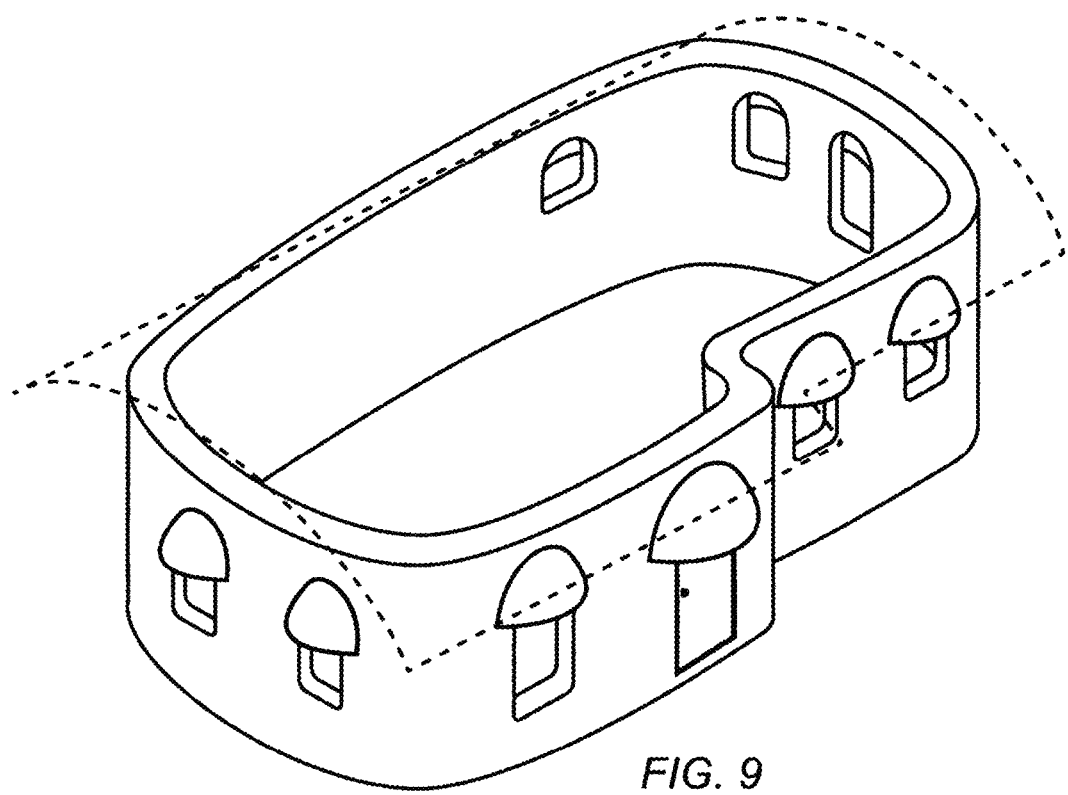
FIG. 9 illustrates a simplified illustration of a simple robotically printed structure.
Figure 10:
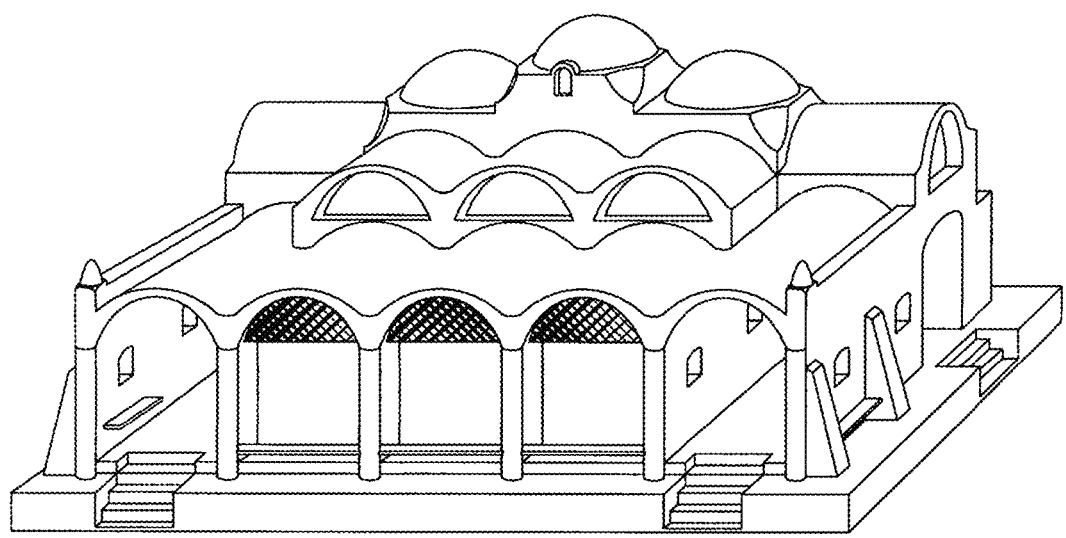
FIG. 10 illustrates an ornamental structure depicting one of many possible reinforced concrete structures having a wide variety of architectural configurations that may be printed onsite with the current invention.
Figure 11:
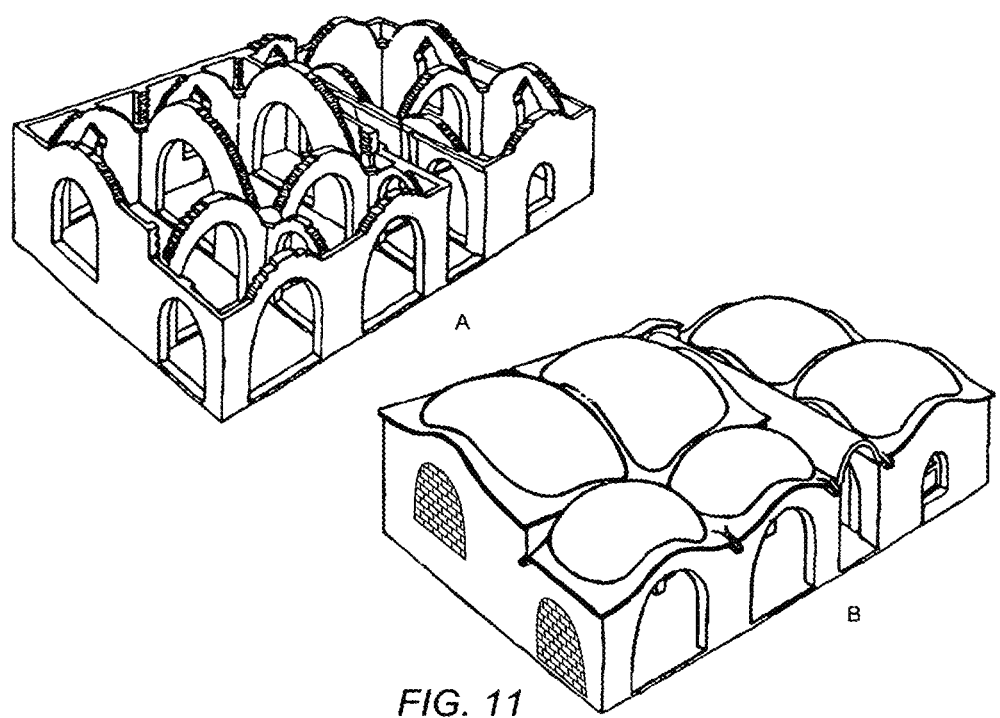
FIG. 11A illustrates a traditional Mediterranean style structure with its roof removed revealing having a variety of interior supporting arches and vaults.
FIG. 11B illustrates the same structure with the elipsed domed roofs in place.
Figure 38:
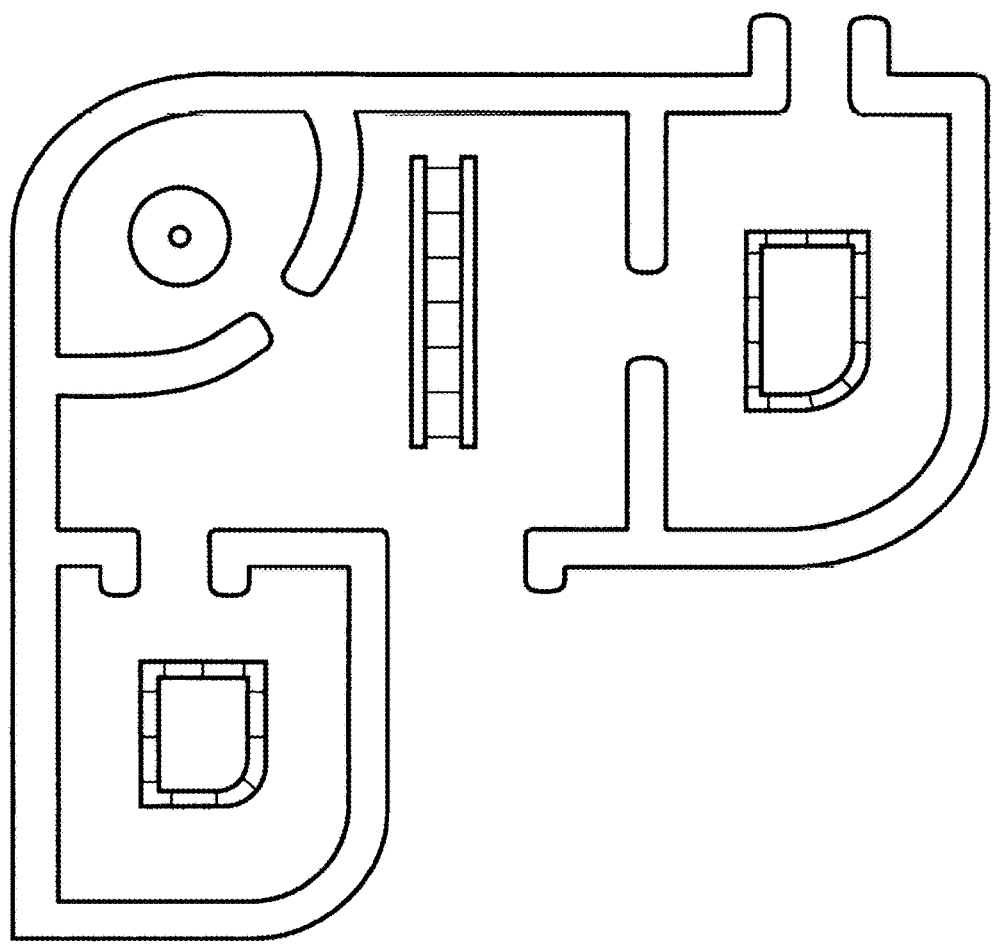
FIG. 38 depicts a perspective view of the automated sliding connection between a guide rail.
Figure 39:
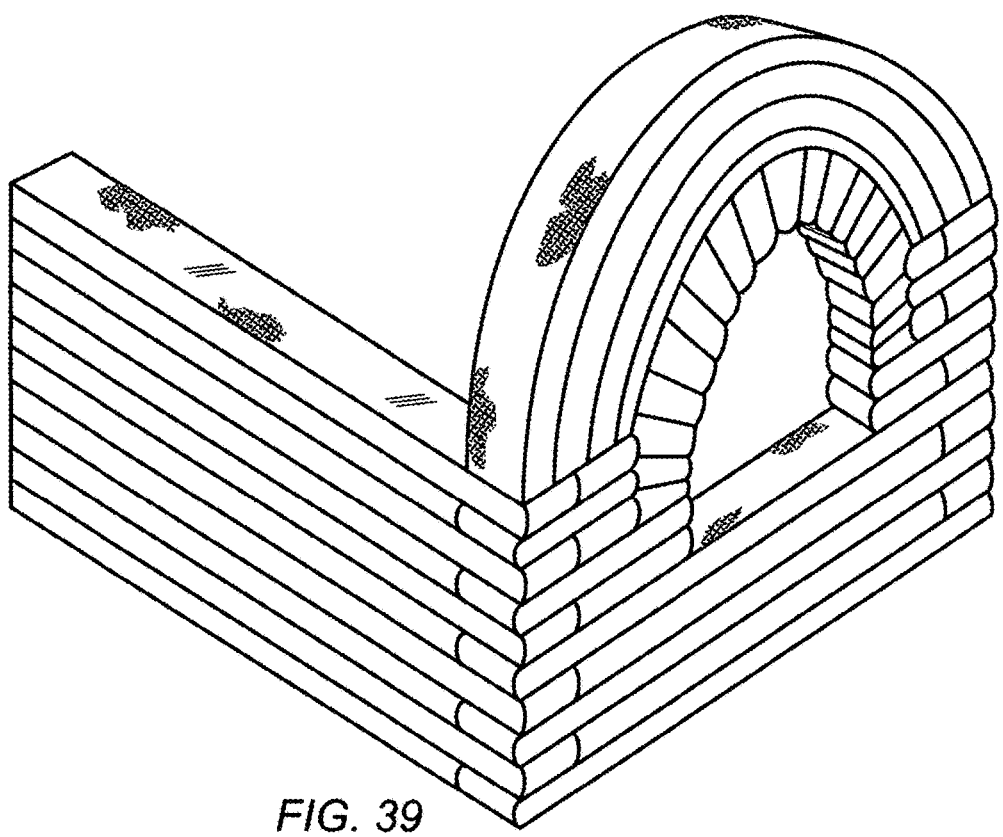
FIG. 39 in an illustrative embodiment depicts a partially completed onsite slip form printed reinforced brick structure having an arched window opening.

The modular transporting and operating trailer system preferably includes a removably attached automated construction system having a receiving and adjustable supporting guide rail system and choke (not illustrated) and having a slidably adjustable guide rail system is configured to receive at least one automated slip-form printing apparatus and operating platform or base having one or more receiving and supporting guide rail pedestal(s) as described herein, reference FIGS. 8 and 38.

It is noted that the scale and dimensions may vary with respect to differing embodiments of the present invention. Therefore, various modular embodiments of the onsite installable and removable automated construction system having a variety of receiving and supporting pedestal(s) or platform(s) may be provided which are configured for the automated construction system supporting pedestal(s) or platform(s) having onsite removably installable and receiving pedestal(s) or platform(s) within specific ranges of widths or as needed. Because the automated construction system receiving and supporting pedestal(s) or platform(s) system are removable and reusable, the transporting and operating trailer system is able to quickly convert having fast assembly characteristics to an onsite flat slip-form printing system operating platform. Thus, this is another aspect which adds onsite reinforced concrete construction versatility to the current invention.

The removably attached adjustable receiving guide rail system depicts an aspect of the design of the current invention (not shown).

The transporting and operating trailer system is provided which is adapted to receive the automated construction system having attachment means when the automated construction system is positioned into the trailer frame's receiving collar (not shown) having an adjustable slip-form printing system receiving and operating pedestal that is preferably centered and secured on the slightly forward end of the trailer platform frame. An optional locking choke is rotatably mounted with a receiving bracket structure such that the choke will automatically accept the insertable slidably adjusted mounting base (pedestal) and locked in place when the automated construction system is fully engaged in the receiving chock and the front of the receiving chock is lying down flat against the receiving guide rail system. A feature of the transporting and operating trailer system receiving chock is that it is capable of holding the assembled automated construction system in an upright position without the assistance of any other bracing members. Once the automated construction system is correctly secured in the receiving choke, the automated construction system is easily onsite assembled and operated as disclosed herein.

The current invention encompasses that a foldable interface is defined thereby creating an onsite automated construction system operating platform. However, when the transporting and operating trailer is not in use, front support section may be folded about the axis defined by the pair of hinge assemblies (see FIG. 53) such that front frame support section is positioned either on top or vertically next to forward frame support section.

Another aspect of the present invention is that transporting and operating trailer system has been designed to transport automated reinforcing concrete construction equipment as disclosed herein. As an example, having removable utility boxes (see FIG. 46). Furthermore, a stoneguard may be installed at the forward area of the trailers.

Cast in Place Pedestal

The automated slip-form printing reinforced concrete construction method and apparatus is preferably operated on the construction site preferably from inside/within the proposed structure that is to be slip-form printed onsite. The slip-form printing process is preferably carried out from within the inside of the proposed structure.

When casting supporting and operating pedestals onsite and the like, it is often necessary to drill a hole into the ground onsite and then fill the hole with concrete mix which is allowed to sufficiently cure to form a concrete column or pile. It is commonly known, within the prior art, that during the curing phase, the concrete mix may be washed out, dissolved or damaged by certain types of ground water, particularly salt (sea) water or if the water contains acids and the like.

To overcome these and other limitations is an object of the invention when constructing reinforced concrete columns and piles for casting supporting and operating pedestals onsite and the like, the column or footing is formed by a containment sleeve and concrete mixture; it is often necessary to drill a hole into the ground and then fill the hole with a containment sleeve and filling with a concrete mix to engage adjacent hole's surfaces which is allowed to cure to form reinforced concrete columns and piles onsite.

Figure 50:
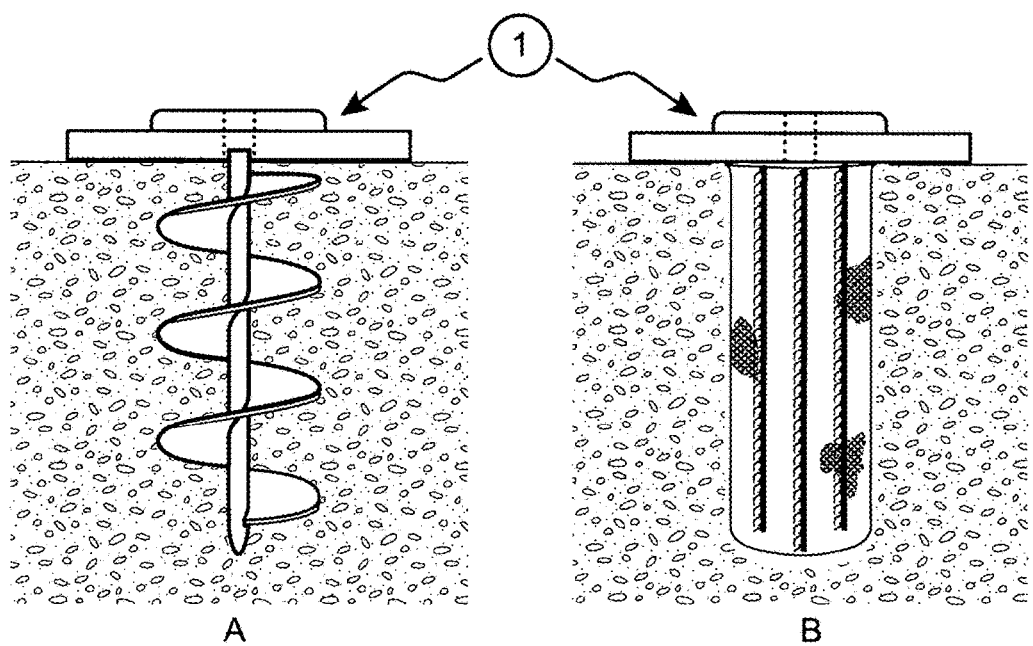
FIGS. 50 A and B depicts in an illustrative embodiment two of many possible supporting platforms that are removably attached using universal mounts onsite and are simplified and exaggerated for illustrative purposes and are not to scale.

The current invention relates to an external containment reinforcement and protective sleeve that reduces prior art construction time and steps, which remains in place around a cementitious cast-in-place operating and supporting pedestal after the concrete has cured, reference FIG. 50 B.

It is apparent that the pedestal's protective reinforced containment sleeve permanently remaining around the cast in place concrete column or operating and supporting pedestal(s) will effectively protect the operating and supporting column or pedestal against a wide variety of short and long term detrimental effects such as acid containing water, particularly salt water, acid-containing soils, and the like.

The current invention further encompasses a fabric reinforced external containment sleeve preferably having a danier ranging between about 1,100 to 4,000 danier, more preferably ranging between about 1,200 to 2,500 danier, most preferably ranging between about 1,500 to 2,000 danier for onsite constructing structurally supporting columns containment sleeve having sizes larger than about 15 to about 40 inches in diameter, reference FIG. 50 B, or as needed depending upon the application, and depth is as needed depending upon application. Flexible reinforced polypropylene and basalt reinforcing materials are most preferred.

In the beginning of the onsite construction process, the robotic construction platform and or supporting pedestal(s) may be positioned, and operated from, and permanently or quickly removably positioned and installed into the ground onsite.

The current invention encompasses said automated slip-form brick encasing machine having a rotatable support means such as but not limited to one of the many supporting pedestal base configurations disclosed herein, reference FIGS. 38, 47, 48, 49, 50.

In several specified embodiments encompasses that the automated construction system employs removably mounting on to a wide variety of movable or fixed mounting pedestals preferably having a fixed center that rotates and makes adjustments having tunable dynamic response characteristics and determines the printing directions and angle(s) in fractions of a second.

As an example of one of the automated construction system models having mechanical arm(s) of the current invention has the capability of rotating about a first axis perpendicular to the plane of the automated reinforced concrete construction apparatus base(s) due to the connection existing between the supporting structure pedestal(s) and said base(s). It has the actions of effecting elevational movements by rotating about a second axis perpendicular to the first axis due to the connection existing between the supporting (base) structure(s) and the guides. It is capable of causing the sweeping extension to be rotated about a third axis which is parallel to the second axis.

In other specified embodiments, the current invention encompasses a variety of supporting bases, Reference FIG. 50, provided having upward extending universal attachment removably attached thereto to impart linear movement into the preferred pivotal position or to pivot supporting members and hence to the link and, when actuated virtually simultaneously, impart complex curvilinear movements to the links, as needed.

One of the many inventive concrete construction systems of the current invention encompasses employing supporting and mounting means for the mechanized support member having retaining means movable or deformable to final position onto a wide variety of mobile or fixed supporting and operating platform(s) or pedestal(s), preferably having a fixed center that rotates and makes quick onsite adjustments and determines the printing angle(s) in fractions of a second and may be removably mounted for onsite (in situ) repositioning and having adjustable supporting apparatus; e.g., having re-arrangeable or rotatable slip-form printing characteristics and movements as disclosed herein.

The current invention encompasses rotating on a removably mounted shaft or swivel mounted yoke having adjustable pedestal mounting systems that tilts relative to supporting base and may be mounted for onsite movement having adjustable supporting systems such as having elongated pedestals extending vertically into the ground and having a variety of shapes, uses, and casting materials onsite within a wide variety of suitable variations. Although the particular case of casting supporting pedestals and columns, especially plinths on which a pedestal, column, or concrete construction supporting pedestal may be positioned and operated for constructing reinforced concrete structures onsite and the like as disclosed herein.

The automated construction systems and pedestals of the current invention encompass a universal attachment having quick installation and removal and operation.

Figure 49:
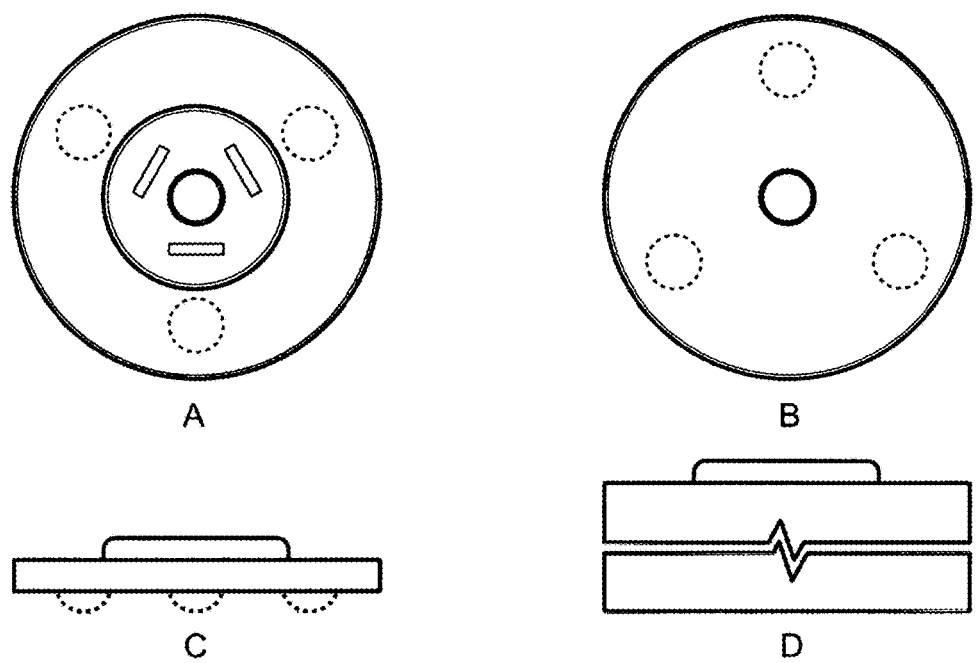
FIGS. 49 A, B, C, and D in an illustrative embodiment depicts a reusable transportable automated supporting pedestal for removably receiving and onsite mounting the automated construction system having a reservoir in the pedestal suitable for filling with water and/or sand that is easily moved and positioned in place onsite as needed or optionally cast in place onsite as needed that is simplified and exaggerated for illustrative purposes and is not to scale.

The quickly installed and removed automated construction system supporting pedestal diameter ranges between about 4 feet to 10 feet, Reference FIGS. 49 and 50-1; the preferred diameter ranges between about 4½ feet to 6 feet and may be scaled as needed.

The depth of the automated construction system supporting pedestal ranges between about 4 feet to about 20 feet; most preferred is between 6 to 10 feet deep.

The current invention encompasses a cast-in-place leave-in-place onsite supporting pedestal system providing internal reinforcement mesh or nets in permanent pedestals, reference FIG. 50 B.

The current invention encompasses a cast-in-place leave-in-place onsite supporting pedestal system having about 3 to 10 reinforcement bars, more preferably about 5 to 10 reinforcement bars, most preferably about 5 reinforcing bars generally vertically extending, optionally having a multi-turn coil reinforcement (not shown).

The current invention encompasses providing sufficient stability during operation for supporting an automated construction system installable onsite having removable attachment to receiving pedestal system(s) designed for quick securement and attachment and removal providing support for a variety of automated construction attachments.

The automated construction system's attachment base to the pedestal is compatible with a wide a variety of attachment configurations; note can be quickly removed and reused.

FIG. 50 B in an illustrative embodiment depicts a cast-in-place leave-in-place light weight supporting pedestal as an operating platform apparatus, a flexible reinforced containment sleeve, preferably having reinforcement position adjusting means e.g. leveling, compass, bubble levels, QR codes, bar codes, dates, location, model number, I.D. plate/serial nos., optionally having a cast in place interlocking keyway edge for receiving the pre-engineered externally reinforced containment sleeve for the supporting pedestal, laser base, laser reflectors, having optional supporting feet (not shown).

The current invention encompasses a protective self-conforming cast in place leave in place reinforced containment sleeve casting mold system for keeping the casting mix together for constructing supporting pedestals, supported from the ground and extending vertically comprises a flexible elongated containment sleeve, preferably being slightly elastic and having an opening at one end thereof for supplying cementitious casting mixes therein. The containment sleeve is arranged to be substantially vertical while being filled from a wide variety of cementitious casting mixes introduced through said opening so as to construct onsite a castable containment form having a generally circular cross-section (tube), reference FIG. 50 B, pre-engineered to conform to the wall and floor of the excavated hole extending vertically and supporting and containing the cast cementitious compounds together.

An object of the present invention is to provide a previously unavailable reinforced cementitious mix self-adjusting casting onsite containment mold of the type defined herein, which provides a variety of previously unavailable advantages to the limitations mentioned herein and associated with prior cementitious casting molds for accurately casting permanent supporting mountable pedestals and columns of the types mentioned and illustrated in this disclosure. Reference FIG. 50 B.

This object is, in accordance with the current invention, obtained by providing a supporting pedestal casting mold comprising a leave in place cast in place external reinforced flexible elongated containment sleeve having a wide variety of reinforcement characteristics further including mix regulating venting apertures and other mix controlling characteristics as disclosed herein, which are slightly elastic and having an opening at one end thereof for supplying a wide variety of reinforcements and cementitious casting materials and mixes, e.g. concretes, said reinforced containment "sleeve" being arranged to be suitably positioned and held in place substantially vertically during the filling process through said opening (Reference FIG. 50 B) so as to construct a cast in place leave in place reinforced adaptable containment "mould" having a generally circular cross-section (tubular), extending vertically thus keeping the casting compound (mix) together for optimally regulating the mix curing environment.

Thus, the current invention is based on the understanding that a light weight, flexible external elongated reinforcement containment sleeve preferably being slightly elastic which may be filled with a variety of reinforcements and mixes to conform to the excavated hole shape of a generally circular cross-section to protect and contain and regulate the mix curing environment of the casting mix compounds within and at the same time give the support required for assuming and maintaining a vertical extension during the mix pouring and curing phase or process of the cementitious mix compounds. The use of such an inventive external containment sleeve or self-adjusting mold as a cast-in-place leave-in-place flexible protective pre-engineered mold functions onsite quickly, easily, and efficiently. Thus, the mutual co-operation between the cementitious casting compounds, reinforcements, and the external containment sleeve takes place by using the gravitational force of the casting mix compounds having reinforcements for containing the casting sleeve (mold) perpendicular, so that the latter assumes a shape and an extension for keeping the casting mix compound(s) in a pre-engineered or determined self-conforming configuration during the optimized pre-engineered onsite mix curing process or solidification thereof.

In the example shown in FIG. 50 B the supporting pedestal containment sleeve preferably having pre-engineered venting apertures and corresponding fabric external surfaces as needed.

It is apparent that the generally tubular external containment sleeve(s) may have other configurations of various other shapes and sizes, the purpose of which is to facilitate the slight expansion function thus further increasing their conformational tolerances (accuracy) of the external containment sleeve further having a variety of advantages in casting reinforced concrete pedestals, since the friction of the concrete with respect to the fabric reinforced containment sleeve increases and the rigidity of the casting mould is increased, so that higher and larger supporting pedestals can be cast onsite.

The pedestal's reinforcing sleeves are preferably made out of high strength materials such as but not limited to basalt, polypropylene, and may be color coded as necessary or desired.

It is illustrated in FIG. 50 B how a cast in place leave in place reinforced cementitious containment "form" according to a preferred embodiment of the invention may be provided as a long material web, which is preferably wound on a storage and or dispensing roll. The material web may be made of a wide variety of suitable basalt and or plastic mesh, net, webs, and other configurations, and optionally may include films or reflective foils, which may have a thickness of for example some tenths of a millimeter. The thickness of the web is sufficient to provide the desired pre-engineered concrete mix pre-engineered venting apertures having mix controlling and curing regulating characteristics as needed with sufficient strength to provide by itself the required support for assuming and maintaining the supporting pedestal(s) vertical extension, i.e. without requiring any additional exterior supporting apparatus. The external reinforcement sleeve has surrounding walls enclosing as needed to specifically suit a particular casting mix, as needed, extending in the longitudinal direction of the material web, which the walls of the reinforcing material web are pressed flat towards each other. An amount of pedestal/column casting flexible containment sleeves (moulds) may be provided while requiring a minimum amount of space.

In the accomplishment of the objectives and advantages of the current invention it is desirable to quickly provide a protective external reinforced containment sleeve preferably consisting of light weight reinforcing material(s) as disclosed herein, preferably a plastic woven material, including a plastic textile material(s) as stated in this disclosure. Furthermore, preferably the outer surface of the reinforcing containment sleeve is made in a generally tubular configuration so that it can expand and conform easily into the sides of the generally cylindrical pre-excavated hole having a slightly larger cross-sectional area.

As an option or optionally the external reinforcing containment sleeves of plastic material are preferred since their edges can be easily cut as needed or secured together on site (location), so that the size and length of the external reinforcing containment sleeves may be easily adapted to be just slightly larger than the diameter (size) and depth of the pre-drilled e excavated hole. These external reinforcing containment sleeves can be inserted quickly and easily into the excavated (drilled) holes. Thereupon the reinforced cement mix quickly settles against the slightly larger or expandable surface of the external protective reinforcing containment sleeve so that a reliable, high friction engagement value between the cast concrete supporting pedestal or column and the enclosing soil or ground is produced.

According to an optional feature of the present invention as an option the lower end of the external protective and reinforcing containment sleeve has the shape of a tapering tube with greater expanding capacity than the rest of the containment sleeve (not shown), being made, for example, of a wide variety of plastic mesh/net materials. When it is filled with a semi-liquid cementitious (concrete) mixture, the sleeve will expand when filled with concrete and when concrete solidifies, the pressure of the pile will produce a shaped column or pedestal, which will significantly contribute to the stability of the automated supporting column. Polypropylene and basalt sleeves are preferred.

The lower end of each external protective reinforced containment sleeve is closed by a tube consisting preferably of a pre-engineered textile reinforcing material(s) preferably having pre-engineered spacing (venting apertures) such as woven plastic filaments or threads as disclosed herein.

As an option the concrete mixture may be inserted into the external flexible protective reinforced containment sleeve being slightly larger or expandable than the receiving hole. The process at the moment when the concrete is being pumped or poured into the external reinforcing containment sleeve and before the protective containment sleeve or tube has begun to expand and filling up, primarily to illustrate the initial shape of the inventive external flexible reinforced containment sleeves. Obviously, the external reinforcing sleeve (tubes) will begin to expand and conform to the hole's interior surface irregularities as soon as concrete mix has been pumped or poured into the external flexible reinforced sleeve. Woven reinforced tubular flexible containment sleeves are preferred.

When the supporting pedestal casting is to take place, the inventive external elongated reinforcing containment sleeve still unfilled is properly positioned onsite preferably "held" hanging by one end onto which the cast-in-place support pedestal is intended to be positioned, and the cementitious casting mix compound, here the concrete mix, may be pumped or poured into the containment sleeve through the above opening at the upper end of the containment sleeve. Optionally the sleeve may be properly positioned and suitably supported either by a person manually holding the upper end thereof or by fastening the upper end thereof to a supporting stand (not shown) or the like, Reference FIG. 50 B. The pumped concrete mix will through gravitation fall downwardly towards the lower end of the external containment sleeve and fill the space in thus defining the containment sleeve while expanding (filling) the walls thereof into a generally circular cross-section to accurately engage and conform to the walls of the excavated "hole" as needed. Preferably a hose or tube may also be introduced through the top opening for pumping concrete mix(es) directly downwardly to the lower end of said external containment sleeve.

Figure 36:
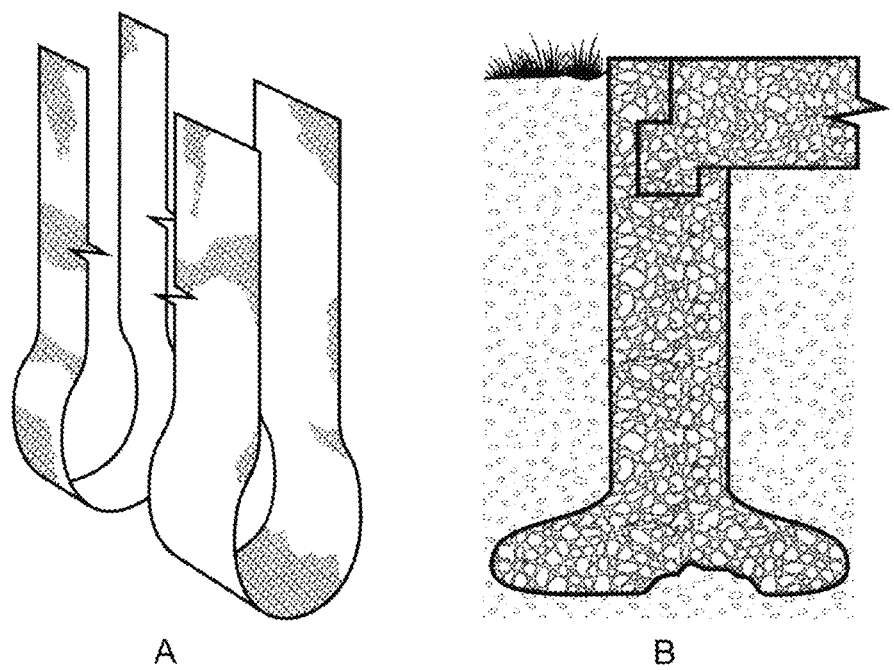
FIG. 36A illustrates a side view of a cut away fabric reinforced sleeve suitable for onsite slip forming foundations having a self-ground conforming containment sleeve.
FIG. 36B illustrates a cutaway side view of an onsite slip form printed seismic resistant foundation, having a mushroom shaped ground conforming base and a self-leveling surface top face. Further illustrating it having a keyway interlocking abudding floor.
Figure 37:
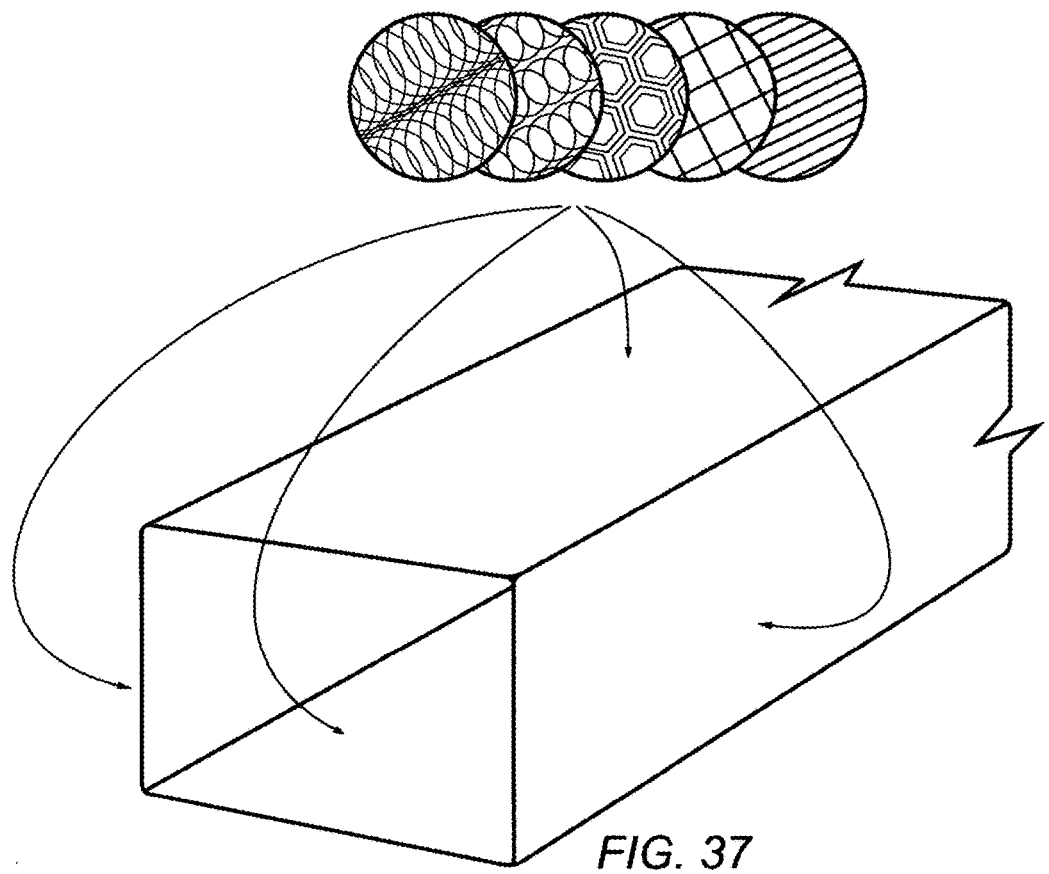
FIG. 37 illustrates a simplified version of a slip form printed brick, illustrating five of the many possible external reinforcement configurations as disclosed herein.

After completing filling the lower part of the sleeve to the desired or required height as needed, with the preferred casting mix compounds, so that the lower filled part of the external containment sleeve may completely conform to the various irregularities of the excavated "hole", as illustrated in FIGS. 36 B and 50 B, as well as the floor and walls and an initial vertical orientation of the external containment sleeve optionally a partial fill may be obtained. When this has taken place the filling of the external containment sleeve with a cementitious "concrete" mix or other suitable materials as needed according is continued in this manner until the external containment sleeve is filled to the desired level as needed with cementitious "concrete" mix to the desired pre-engineered height of the cast in place leave in place column or supporting pedestal is completed. Thus the concrete mix by gravitational forces will press the reinforcing "sleeve" outwardly. This will sufficiently open the sleeve into a generally circular cross-section and apply forces radially directed and uniformly distributed along the circumference of the external containment sleeve against the walls of the excavated "hole", such that these forces neutralize each other and the concrete mix will in this way fill the sleeve vertically oriented, while simultaneously keeping the concrete mix contained in exactly the preferred orientation. A reinforcing containment "sleeve" being apparently lacking stiffness may, in an innovative way, be utilized as a cast in place leave in place reinforcing containment form for improving the casting of vertically standing generally elongated supporting pedestals, and columns etc.

In several specified embodiment the current invention's apparatus having mechanized arm(s) employs an adjustable and fixed positioned removably attached automated construction system and removable supporting pedestal (or attachment and removable supporting pedestal) base or column that is quickly installed and removed preferably having position adjusting means e.g. leveling, rotates and makes adjustments and determines the desired slip-form printing movements, position(s) and angle(s) by employing novel techniques, particularly when constructing on worksites. The inventive construction apparatus may incorporate locating and quick leveling devices such as a compass(es) and/or bubble levels and may be scaled as needed As an option or optionally any suitable internal reinforcement bars, rods, cables, mesh/net may be inserted into the containment "sleeve" before, during, or immediately after the filling (pumping) of the external containment sleeve with concrete preferably inserted (pushed down) into the wet concrete mix when this is necessary or desired (Reference as illustrated in FIG. 50B), or the like during the onsite casting process so as to keep the sleeve (casting mold) in its pre-engineered location. However, this does not exclude the possibility to carry out the casting in connection with bearing of any wall, foundation, footing, box beam, or the like from any side against the reinforcing sleeve onsite casting mold, as desired or needed.

The external reinforcing containment sleeve is preferably made of any suitable synthetic or natural materials, such as but not limited to basalt, polypropylene, cloths, burlap, fabric and the like, under the condition that the material is generally slightly elastic and the sleeve may be filled by any suitable hardenable casting mix compound introduced therein while suitably conforming a generally circular cross-section. Basalt and polypropylene are most preferred.

In other specified embodiments encompasses that the invention does also comprise casting into "holes" onsite having for example a variety of self-adjusting characteristics and a wide variety of configurations in an un-filled, partially filled, and a filled state, since the cross-sections of a tube are circular, although the diameter thereof changes in the vertical direction of the tube. As an option the external containment sleeve may then be flexible in all direction(s) or select the directions as needed, for example plastic mesh, net configurations, but it would also be possible that the inventive containment sleeve has any suitable stiffness as needed into said generally circular cross-section and enables a circumferential even distribution on the reinforcement containment sleeve, reference FIG. 50 B, of the radial forces emanating from the gravitational effect of the encapsulated cementitious mix (casting compounds) with at the most minor influence of forces counteracting shape changes and resulting from the inherent stiffness thereon.

As an option or optionally the reinforcing external containment sleeves may be coated on its outside surfaces with synthetic and or plastic materials and is constructed by weaving the reinforcing containment fabric or fabrics in a sheet(s) in to a generally tubular configuration or other shapes and configurations as needed with basic threads having a given tensile strength with the layers of the sleeve being joined together by auxiliary threads which have a substantially lower tensile strength than the basic threads so that, when the containment sleeve is filled with cementitious materials or other settable/curable materials, the auxiliary threads may be stretched or broken to permit a controlled expansion of the external containment sleeve to its pre-engineered full volume capacity as needed.

In the final condition shown in FIGS. 36 B and 50 B the protective reinforcing containment sleeve presses and conforms to all of the excavated hole inner surfaces irregularities against the ground or soil. However, the initial curved shape of the outer surfaces of the external containment sleeve increases the friction engagement characteristics as far as the surrounding ground or soil is concerned. As an option the lower portion of the tubular containment sleeve may be pre-engineered to predictably enlarge slightly under the weight of the concrete pedestal or column, so that when the cementitious concrete, is solidified; it will accurately conform to the hole.

Figure 40:
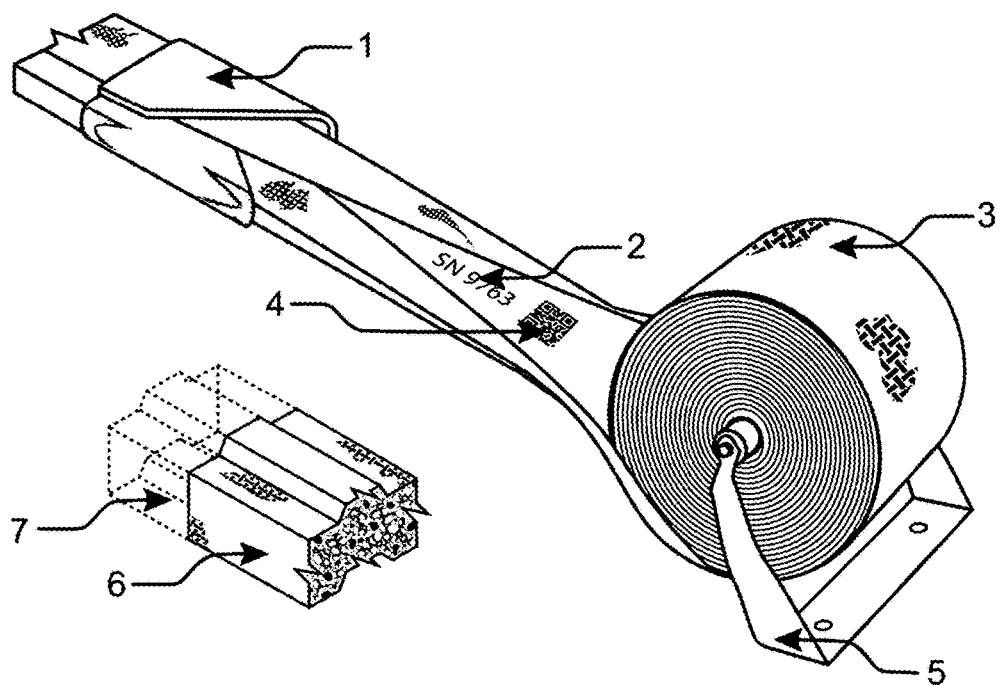
FIG. 40 illustrates another embodiment of the automated reinforced brick slip-forming assembly.
Figure 41:
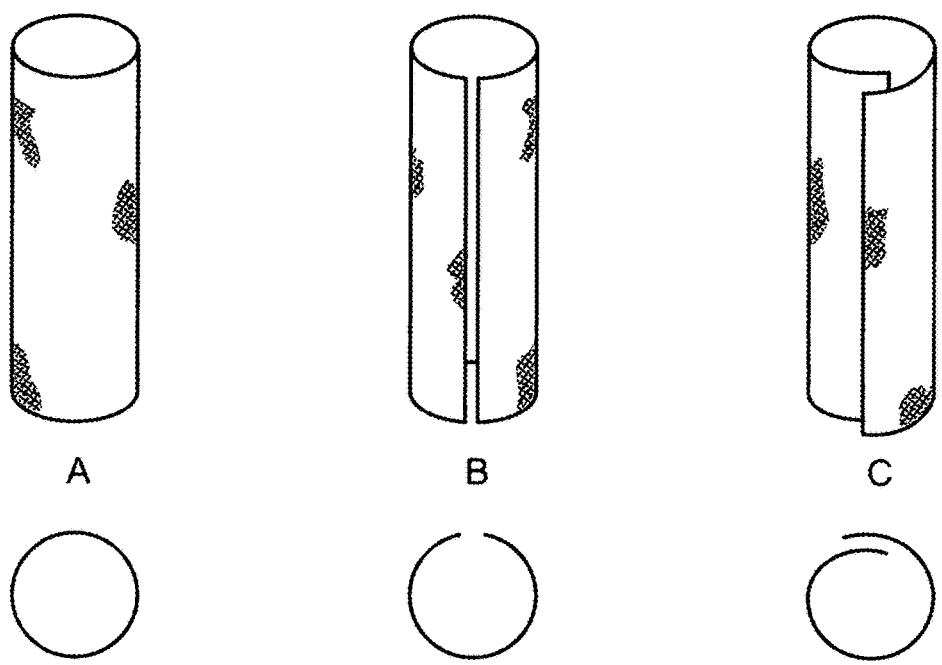
FIG. 41A illustrates a sealed tubular expanded external reinforcing mesh.
FIG. 41B illustrates a non-overlapping external reinforced containment sleeve.
FIG. 41C illustrates a folded overlapping external reinforcing containment sleeve of the current invention.

The current invention provides cast in place leave in place onsite (casting moulds) requiring a neglectable space with respect to what previously was the case in storage and transport, since they may be transported (reference FIG. 46), stored, and quickly and easily dispensed on the construction site being folded and or spooled flat (Reference FIG. 40) so as to assume the excavated shape thereof while optionally being slightly expanded at the desired location of the supporting pedestal/column casting. The reinforcing containment tubes, from which casting molds of the required diameters as an option the desired lengths may be separated, may advantageously be provided, so that little or no waste materials are produced. Accordingly, for instance an onsite construction worker in this way may transport and quickly construct a wide variety of supporting pedestals/columns as stated in this disclosure accurately casting molds of a significant total diameter and length on site, for example supporting pedestals/columns, plinth molds, and the diameter and length may be adjusted (scaled) as needed to meet the pre-engineered requirements of the above supported and removably attached novel construction apparatus having a range of supporting and operating "base" or pedestal casting molds at the construction site as needed. It would of course also be possible that considerable lengths of reinforcing containment sleeves for casting the supporting pedestal molds could be stored in reserve, which would have been unavailable previously, as it doesn't require large amounts of space. As an option one could also custom cut the length of the reinforcing containment sleeve mold from a dispensing spool as needed. The cast in place leave in place novel reinforced concrete supporting pedestal construction apparatus casting sleeves of the type according to the current invention may also be manufactured at a lower time and cost with respect to prior art casting molds, for corresponding casting polypropylene meshes is preferred. Reference the description in this disclosure for casting molds according to the invention, but other subgrade containment materials such as for example, cloths, basalt, plastics, burlap, or fabrics may also be optionally employed. Basalt and polypropylene are preferred.

FIG. 50 B in an illustrative embodiment encompasses a transportable reinforced concrete construction apparatus employing supporting removably mounting of the above automated construction system on the receiving pedestal that simplifies previously complex cementitious casting environments such as casting in mud/water/sand/etc. that eliminates requiring a flat trench or hole as the current invention's casting system conforms to any desired contour that optimizes their casting times and optimizing casting characteristics.

Reusable Pedestals

The current invention encompasses a wide variety of configurations of a moveable reusable, transportable operating and supporting pedestals or variations that is easily moved and positioned onsite in place as needed or optionally cast in place onsite as needed.

FIGS. 49 A, B, C, and D in an illustrative embodiment depicts one of many possible reusable transportable supporting pedestals for removably receiving and onsite mounting the automated construction system having a reservoir in the pedestal suitable for filling with water and/or sand that is easily moved and positioned onsite in place as needed or optionally cast in place onsite as needed that is simplified and exaggerated for illustrative purposes and is not to scale. FIG. 49 A depicts a top view. FIG. 49 B depicts a bottom view. FIG. 49 C depicts a side view. FIG. 49 D depicts a cutaway side view. Inlet and drain (not shown). The water/sand pedestal reservoir may optionally be in a collapsible accordion type configuration (not shown).

The current invention encompasses a reusable transportable multi-purpose robotic construction system supporting and operating pedestal for removably receiving and onsite mounting the automated construction system having a receiving inlet in the pedestal suitable for filling with water and/or sand for ease of quick onsite filling and draining. Note Inlet and drain (not shown).

The current invention encompasses employing a reusable water and or sand filled reservoir as a pedestal and operating base for supporting the automated construction apparatus preferably being removably mounted with quick connect and disconnects.

Figure 51:
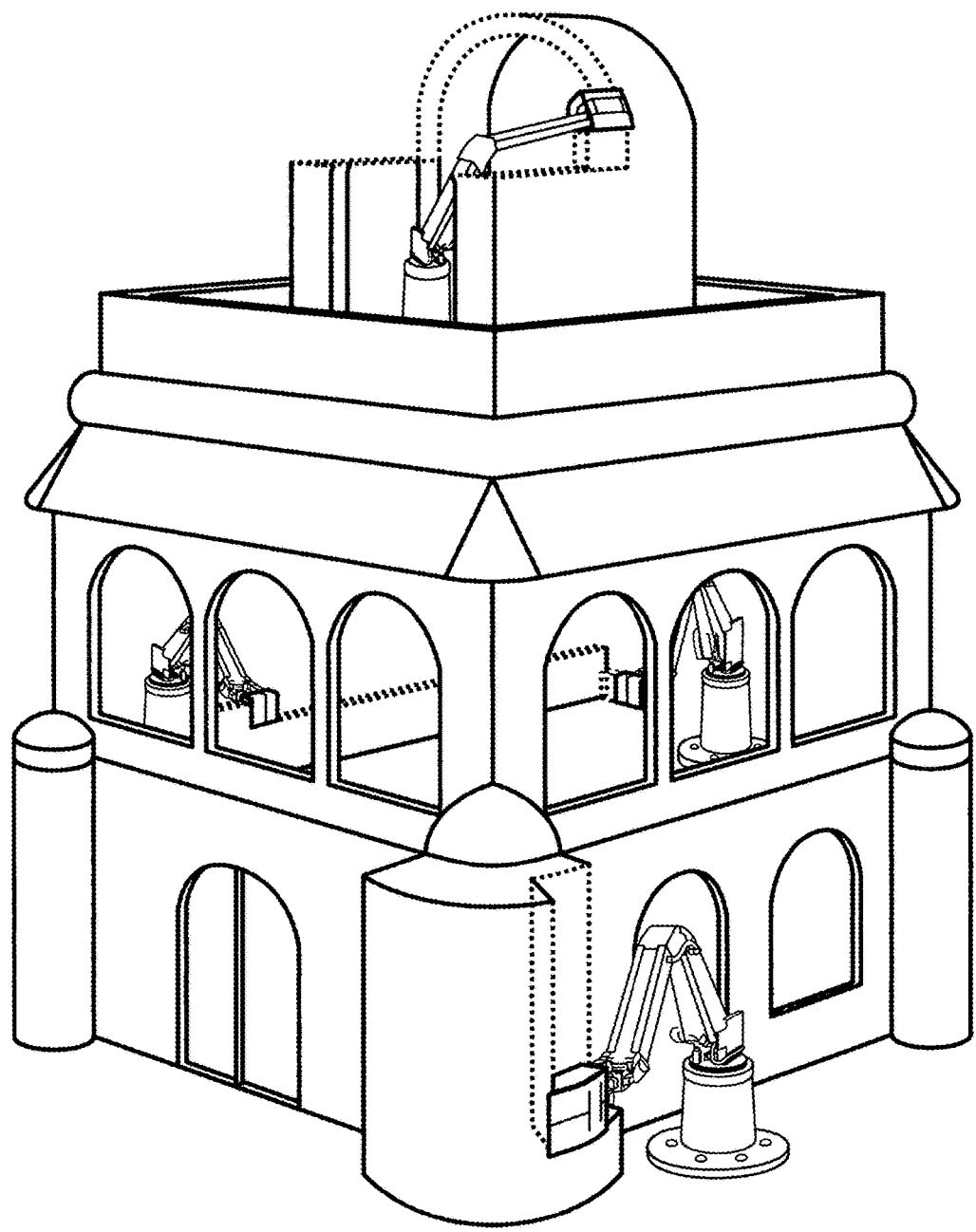
Figure 52:
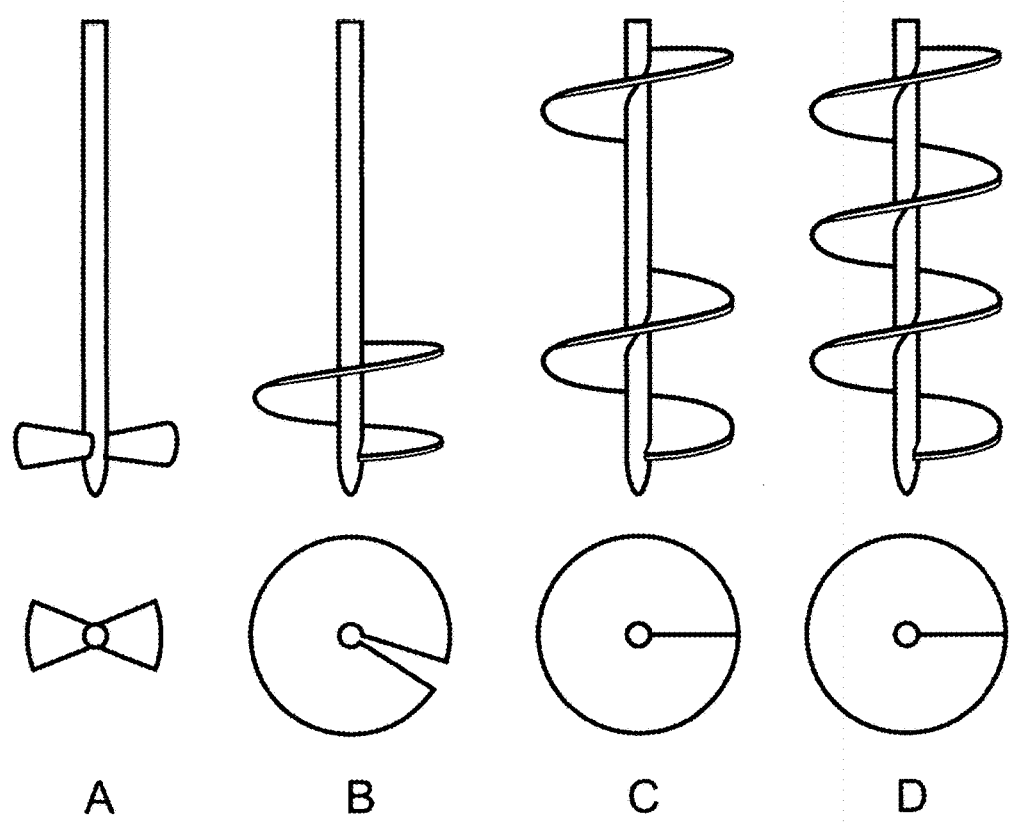
FIGS. 52 A, B, C, and D illustrates four of many possible auger configurations.

The mobile automated construction system supporting pedestal can be easily moved from place to place during the construction of reinforced concrete structures having 'medium to high' numbers of stories as an option or a variation of the invention you can cast in a supporting pedestal on the structures roof to provide the supporting and operating platform to slip-form print the next story, reference FIG. 51, preferably employing a supporting arm as disclosed herein.

The supporting and operating pedestal apparatus having several configurations encompassed herein preferably encompasses locating and quick leveling devices such as a bubble level(s) and or compass(es).

FIGS. 49 A, B, C, and D in an illustrative embodiment depicts a light weight reusable/removable sand and or water filled supporting and operating pedestal as a supporting platform apparatus, preferably having a compass, bubble levels, QR codes, bar codes, dates, location, model number(s), I.D. plate/serial nos., laser base, laser reflectors (not illustrated), and stabilizing feet (not shown).

Augers

As shown in the drawings FIGS. 50 A and 52, a auger is drilled into the soil or ground at a predetermined location. The drilled into position auger is then attached to a multi-purpose robotic construction system having a universal mounting attachment and providing a supporting and operating system. After the robotic construction system completes the construction of the proposed structure, the robotic system is removed and the auger is removed and reused as needed.

As shown in the drawings FIGS. 50 A and 52, initially a auger is drilled into the soil or ground by drilling (excavating) a hole of the desired size/diameter and depth. Then inserting an external leave-in-place cast-in-place containment sleeve, reference FIG. 50 B, as disclosed herein, having suitable pre-engineered material(s), is introduced within the interior of the drilled (excavated) hole. In the example shown in FIG. 50 B, the external containment sleeve has pre-engineered outer woven surface, creating pre-engineered venting apertures, as disclosed herein providing a smaller size (envelope) (footprint).

The diameter of the drilling augers will range from about 18 inches to about 6 feet; preferably ranging between about 2 feet to about 5 feet; most preferred ranges between about 4½ to 5 feet.

FIG. 50 in an illustrative embodiment includes a cast-in-place leave-in-place supporting pedestal as an automated construction supporting platform apparatus employing a directional auger is more preferred and may further encompass a compass, bubble levels, QR codes, bar codes, dates, location, model number, I.D. plate/serial nos., optionally having keyway edge receiving pre-engineered reinforced containment sleeve for the supporting column, laser base laser reflectors (not illustrated).

A receiving and containment hole has been excavated or preferably drilled onsite as by an auger or other suitable system in the ground (soil), but it would be conceivable to use the leave in place external casting containment mold according to the invention when casting below grade supporting pedestal(s) and columns, etc.

An object of the present invention is to improve the prior art construction systems by eliminating the necessity of using a casting mass, by providing a higher friction engagement value between the concrete mix and the surrounding soil encompassing ground irregularities, and in general by simplifying the methods and apparatuses of producing a cast in place reinforced concrete column or supporting pedestal.

Definitions

The term nickel titanium, also known as nitinol (part of shape memory alloy), is a metal alloy of nickel and titanium, where the two elements are present in roughly equal atomic percentages e.g. Nitinol 55, Nitinol 60.

The term "venting aperture" as used herein is a series of pre-engineered gaps or openings that regulates the desired cementitious mix quantity or rate of water evaporation, thermal transmission to accurately control the cementitious mix curing pre-engineered quality or rate of the cementitious mix and is defined by filament spacings, diameters, shapes, and configurations and encompasses pre-engineered venting apertures such as but not limited to square, rectangular or any combination therein.

The term "fabric" as used herein is defined in polymeric terms as a manufactured assembly of long fibres of carbons, aramid or glass, plastics, basalts or any combination of these, to produce a flat sheet of one or more layers of woven fibres such as filament windings. The woven fibres are arranged into some form of sheet, known as a fabric, to provide ease of onsite handling. Different ways for assembling woven fibres into sheets and the variety of fibre orientations possible lead to there being many different types of woven fabrics, each of which has its own mechanical characteristics.

The term "mesh" as used herein is defined as mesh is an open mesh, netting, web, webbing, used for reinforced containment sleeves and internal reinforcement to improve concrete stress transfer and displacement.

The term "sleeve", "sleeves", "external sleeve", "containment sleeves", or "sleeve containment form" as used herein is an apparatus defined as a flexible leave-in-place cast-in-place external reinforcement and moldable containment form(s) tailored to specifically regulate the cementitious materials curing environment. The inventive external fabric reinforced containment sleeve of the current invention serves as having pre-engineered venting apertures that functions as a highly selective transport membrane for a predictably controlling and regulating the encapsulated cementitious mixes evaporation rate and thermal exchange transmissions to the external environment etc. as needed.

The term "concrete" as used herein is a composite material composed of coarse granular material (the aggregate or filler such as sand, conglomerate gravel, pebbles, broken stone, or slag) embedded in a hard matrix of material (the cement or binder) that fills the space among the aggregate particles and glues them together.

The term "versatility" and "multi-purpose" as used herein are interchangeable and means that the automated construction system's robot should have a mechanical structure that it can carry out different tasks onsite or perhaps the same task in different ways.

The terms "guide rail" as used herein may be referred to as "guide", "guiding rail", "guide rail apparatus", "guide rail system" since it can be designed and produced as a sliding mechanism that travels in a fixed path.

The term "slump" as used herein is a measurement of concrete's workability, or fluidity, and is an indirect measurement of concrete consistency or stiffness.

For the purposes of this specification it will clearly understood that the word(s) "optional" or "optionally" mean the subsequently described event of circumstances may or may not occur, and that the description includes instances where said event or circumstance occurs and instances which it does not.

Multi-Story Structures

In several specified embodiments encompasses that the current invention method and apparatus encompasses the fast, accurate, cost effective onsite construction of multi-storied reinforced concrete structures up to virtually any height and number of stories, only limited by structural engineering, reference FIG. 51.

The current invention automated construction system encompasses onsite three-dimensional reinforced concrete printing is able to extrude concrete in a single pass or multi-pass on a large scale capable of creating massive multi-story structures. In other specified embodiments encompasses a concrete construction apparatus having a lifting and positioning mechanism to slip-form print multi-story reinforced concrete structures from printing long interlocking "bricks" onsite.

As a variation, a multistory automated construction system's lifting mechanism may be configured to controllably lift the supporting pedestal platform to a height sufficient for the automated slip-form printing assembly to extrude a "Brick" layer or layers of reinforced cementitious and non-cementitious material(s) layer-wise on top of the previously extruded or cast foundation or brick layer.

In other embodiments of the onsite reinforced concrete construction systems, to construct multi-story reinforced concrete structures, the robotic construction systems (Reference FIGS. 29, 30, 45, 47, and 51) may use a lifting mechanism that controllably lifts a supporting pedestal (platform(s)) to a desired height and specific location as needed. Note the mobile supporting pedestals can be easily moved from place to place in the construction of reinforced concrete structures having 'medium to high' numbers of stories.

Optionally you can cast in place an onsite supporting pedestal on the roof to provide the operating platform to slip-form print the next story, preferably employing a removably attached supporting wheel as disclosed herein, providing large printing zone with virtually no multi-story height limitation.

The automated apparatus may be removably mounted and operated from a variety of supporting, operating pedestals and or guide rail tracking systems and may have a plurality of (multiple) mechanized arms and yokes as needed.

Figure 12A:
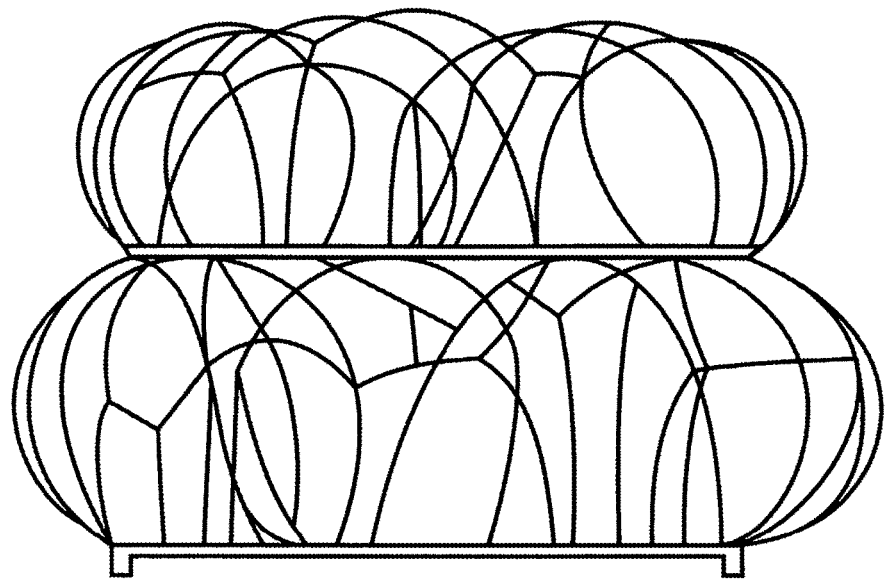
FIG. 12A illustrates a cutaway side view example of bubble architecture encompassed by the current invention.
Figure 12B:
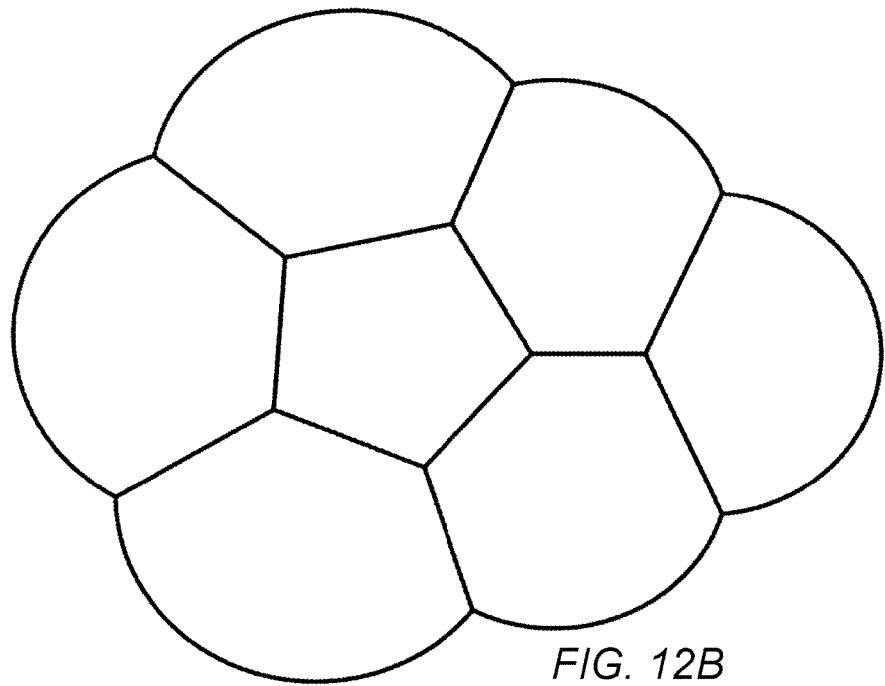
FIG. 12B illustrates an overhead view of the same structure having bubble geometries with an open courtyard.
Figure 13:
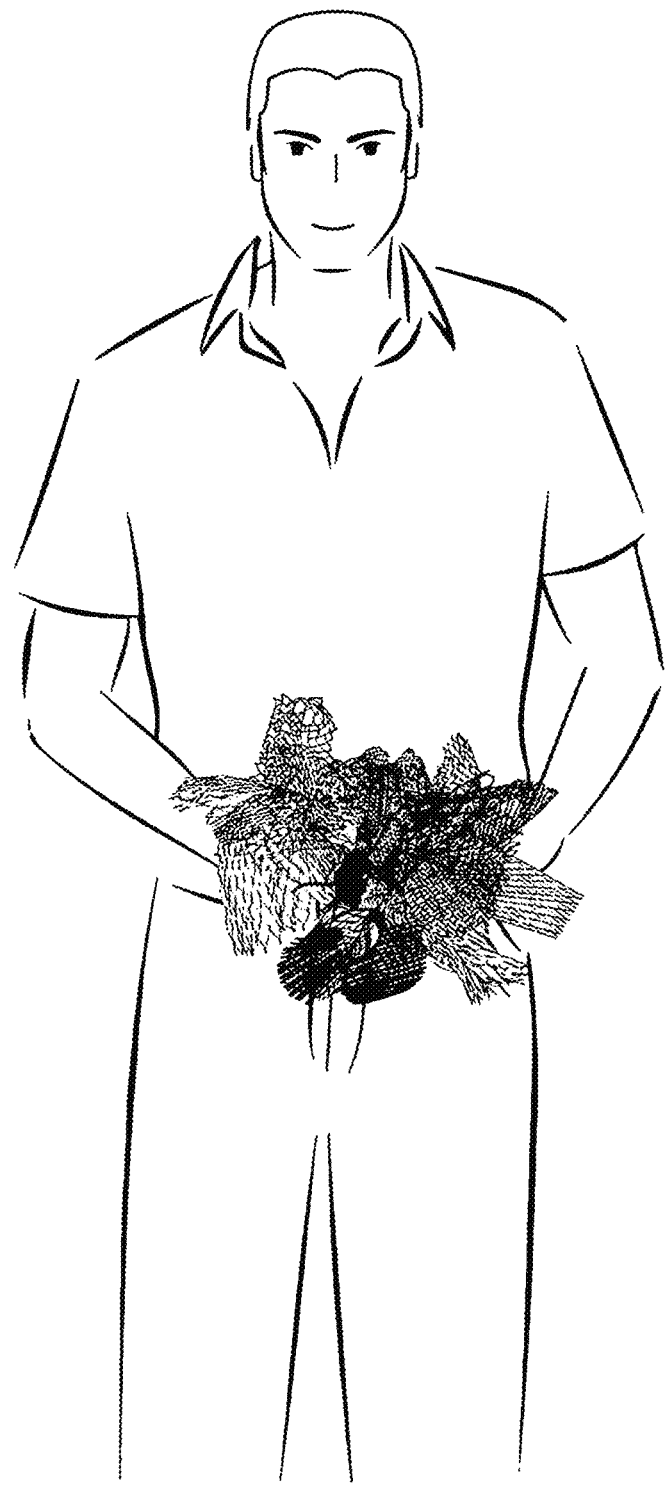
FIG. 13 illustrates a side view of a worker holding the waste products post construction completion from the current invention.
Figure 14:
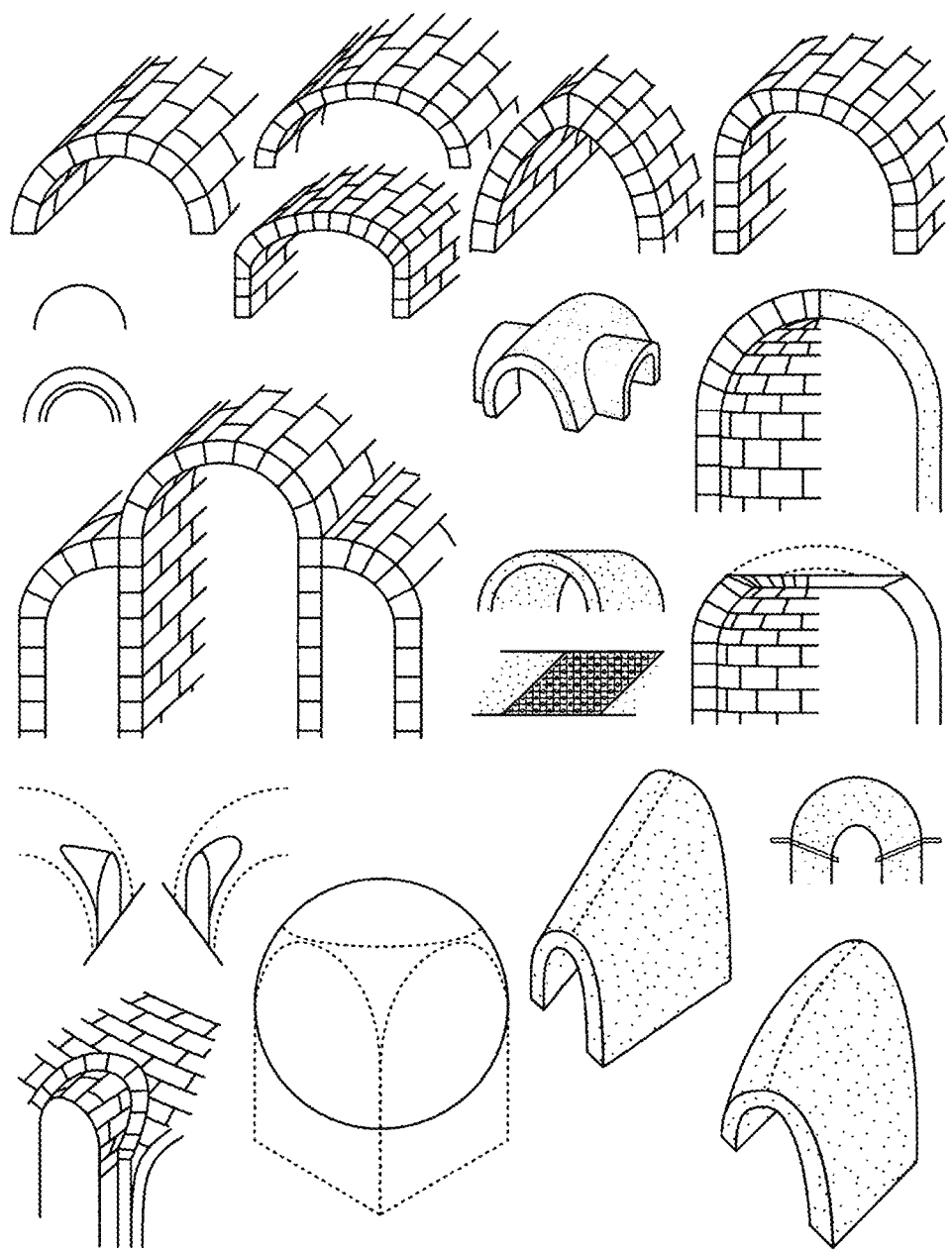
FIG. 14 depicts 20 of the many possible onsite brick slip-form printing configurations mimicking or replicating squinching (mud brick) formed structures.
Figure 15:
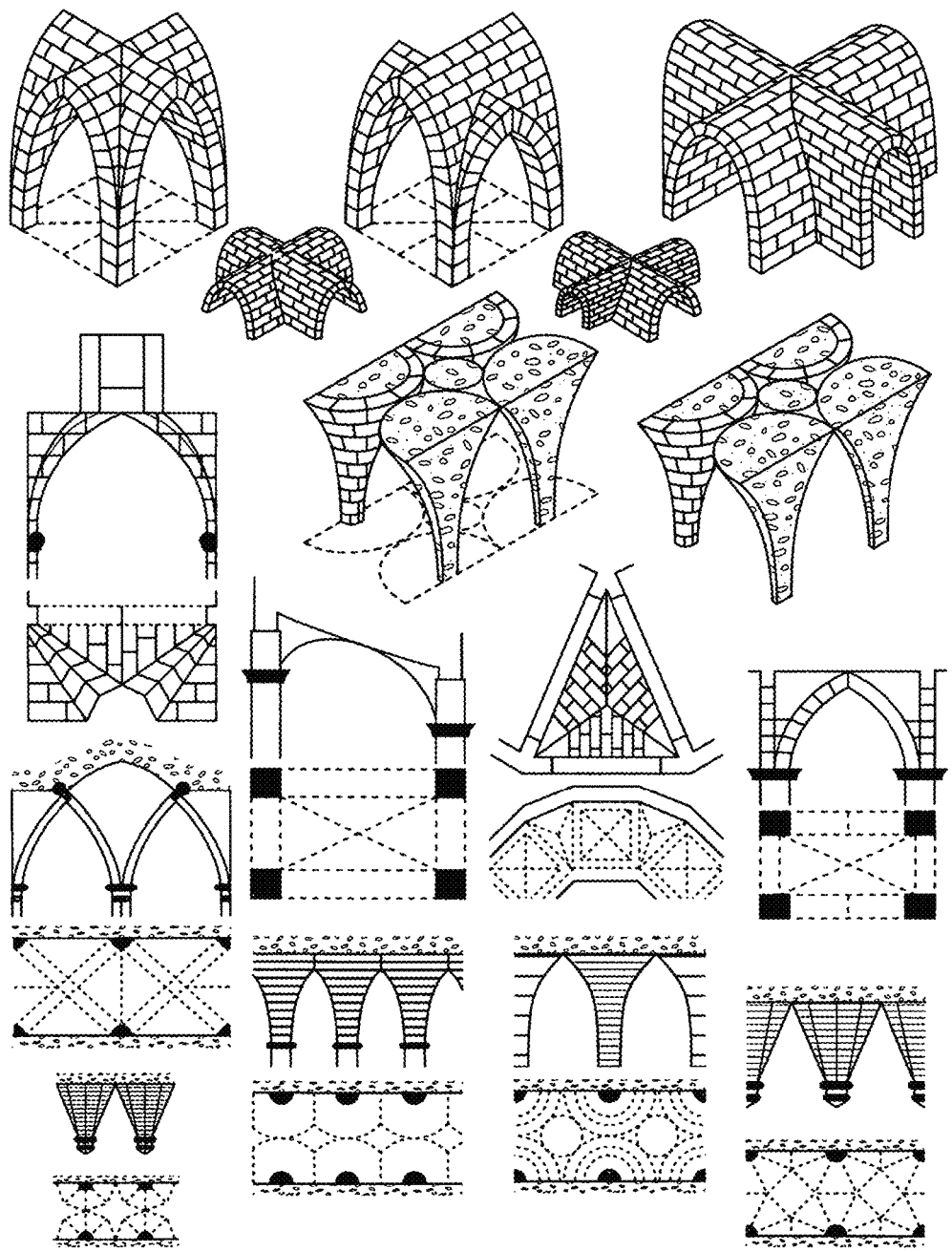
FIG. 15 depicts 25 of the many possible combinations of arches and vaults onsite brick slip-form printing design configurations mimicking or such as one replicating squinching (mud brick) formed structures.
Figure 16:
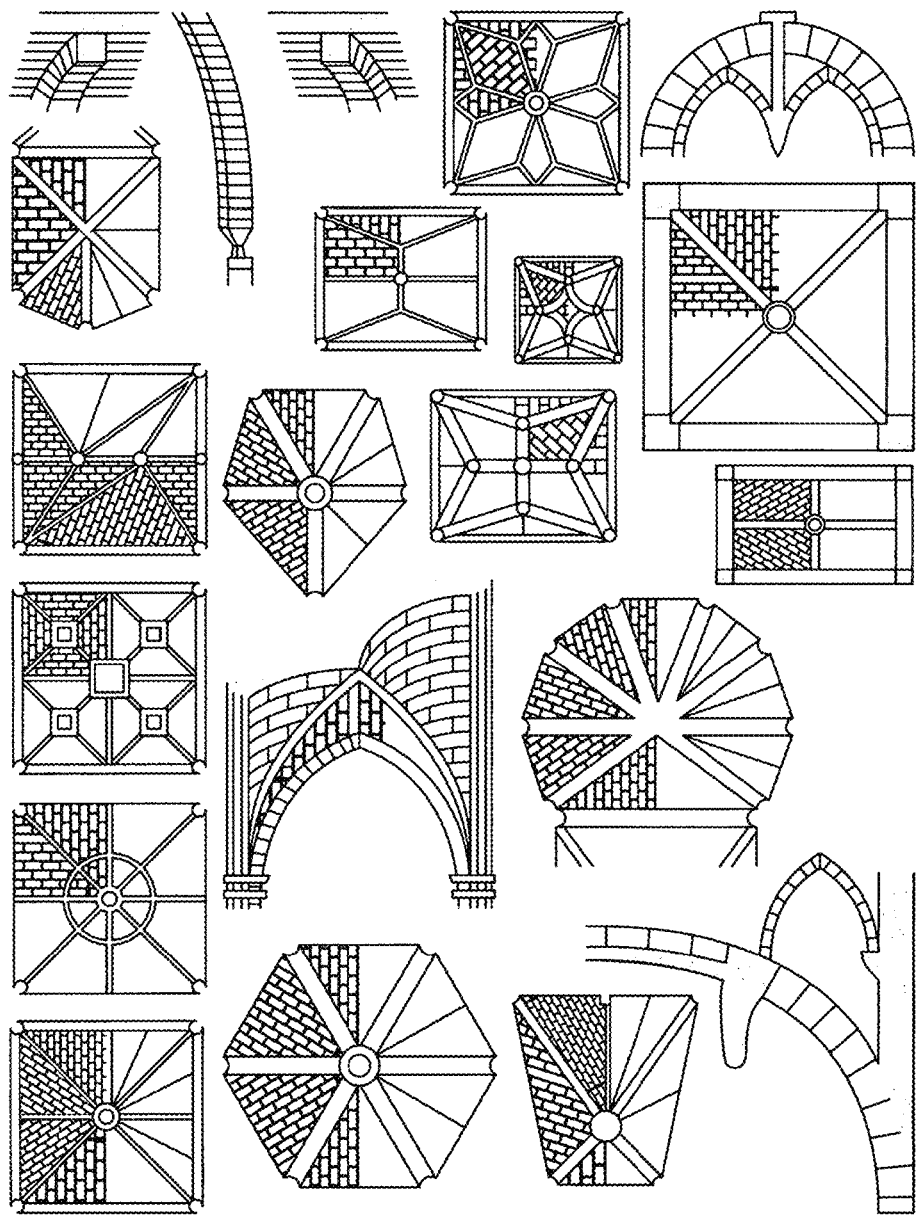
FIG. 16 depicts 21 of the many possible onsite brick slip-form printing design configurations such as mimicking or replicating a wide variety of squinching (mud brick) and chipped stone structures.
Figure 17:
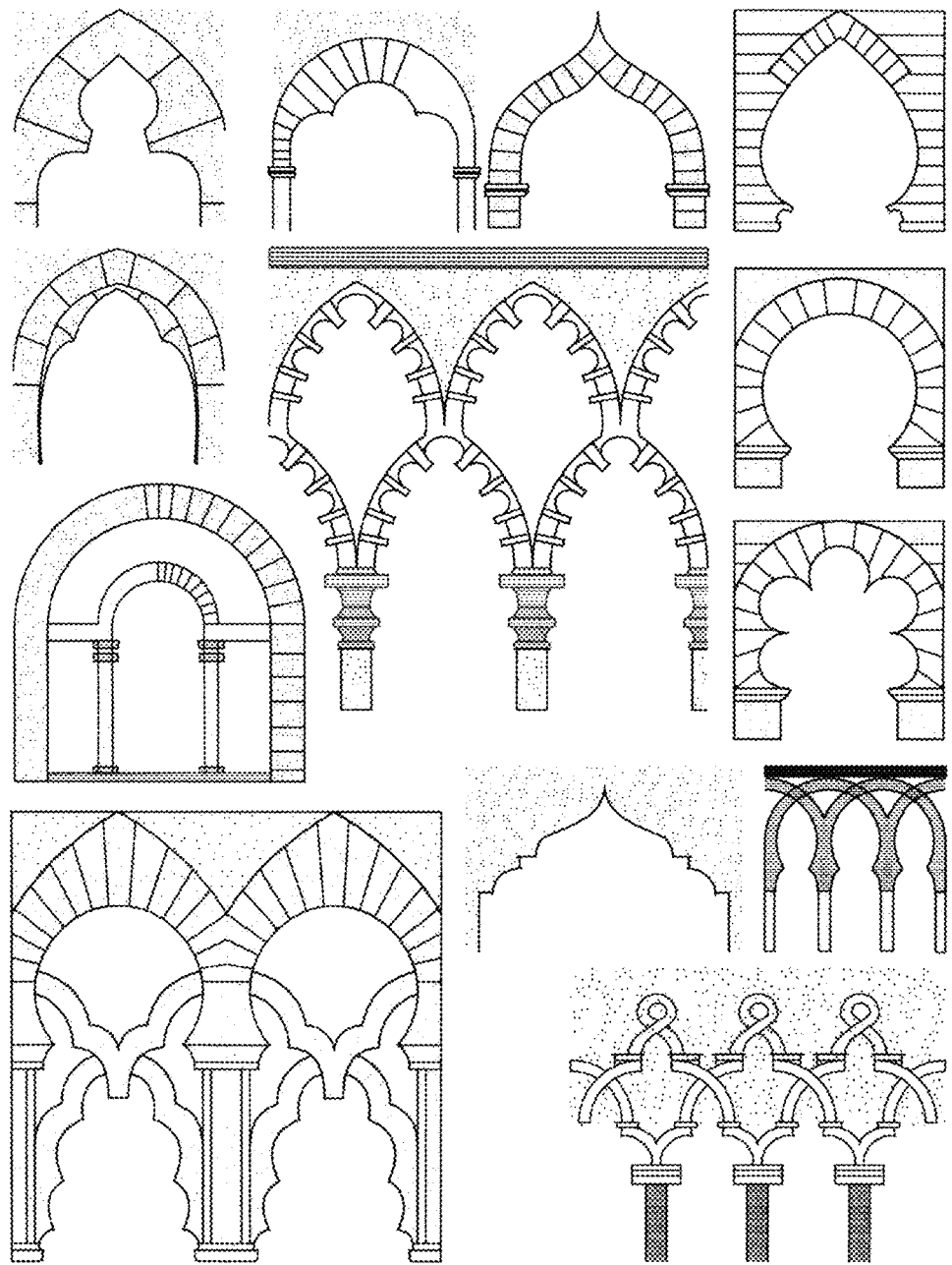
FIG. 17 depicts 12 of the many possible combinations of arches and vaults onsite brick slip-form printing design configurations such as mimicking or replicating a wide variety of squinching (mud brick) and chipped stone structures.
Figure 18:
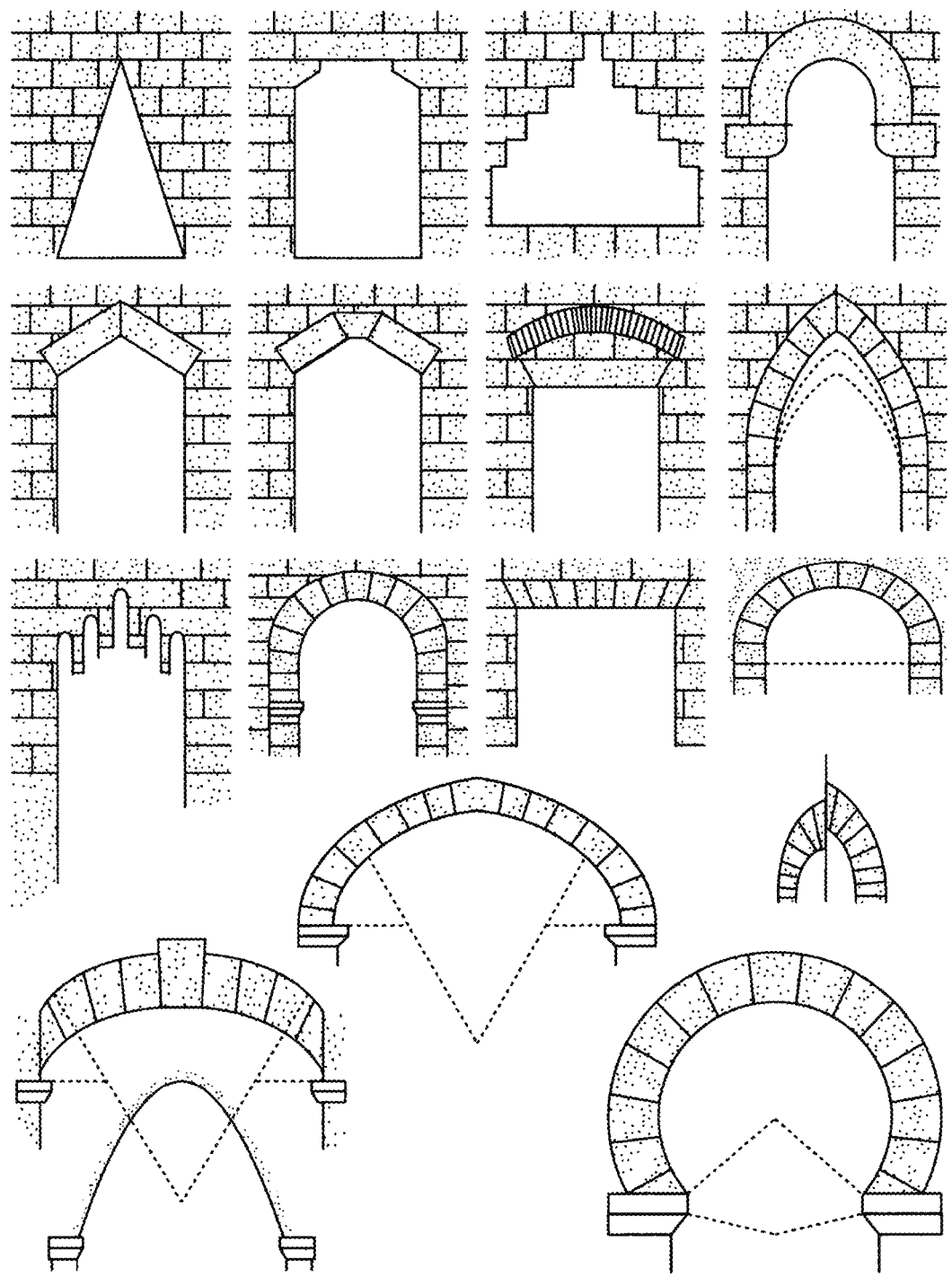
FIG. 18 depicts 16 of the many onsite brick slip-form printing possible combinations of doorways and window openings design configurations such as mimicking or replicating a wide variety of squinching (mud brick) and chipped stone structures.
Figure 19:
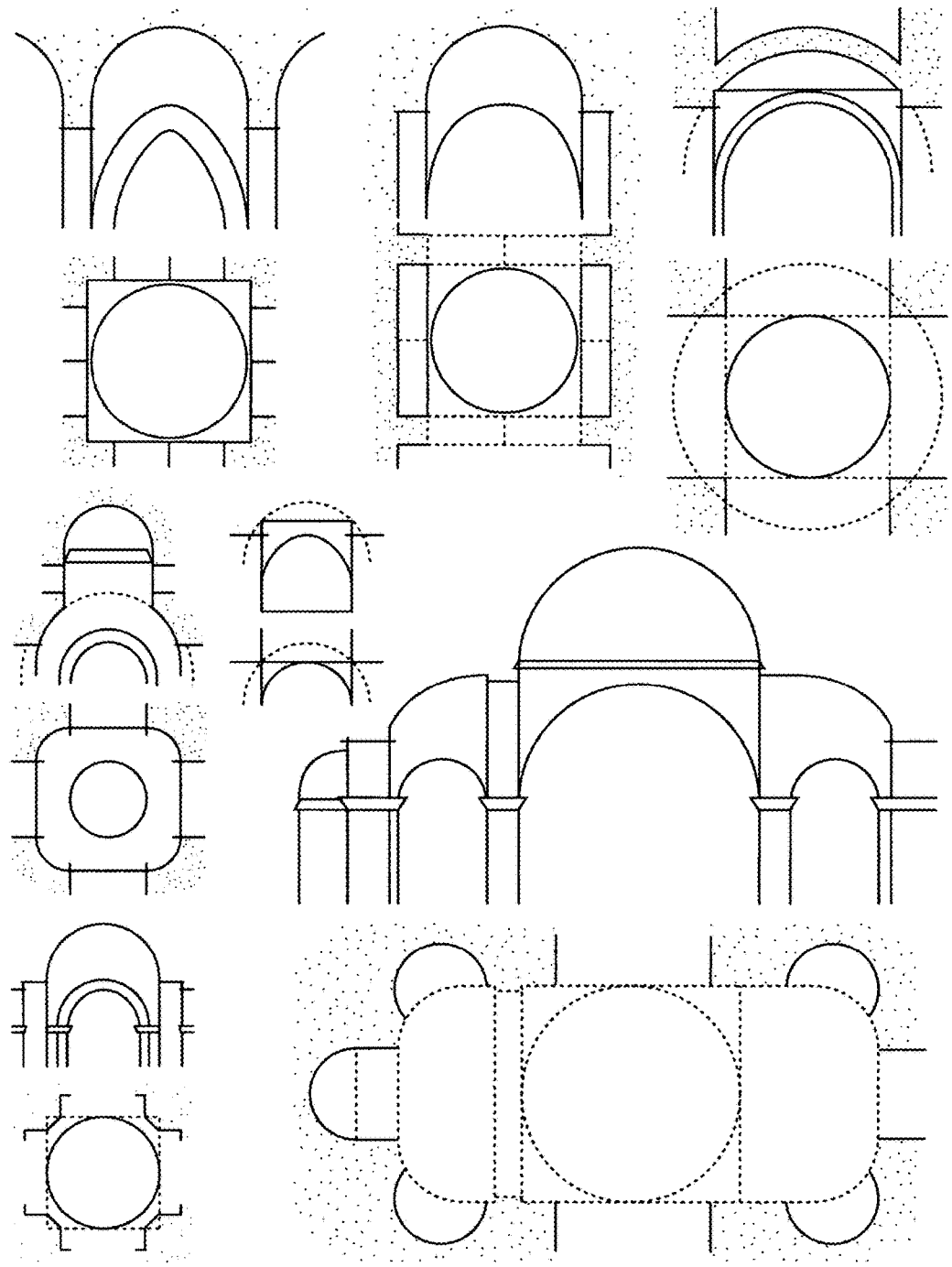
FIG. 19 depicts 12 of the many possible onsite brick slip-form printing having dome configurations mimicking or replicating a wide variety of squinching (mud brick) and chipped stone structures.
Figure 20:
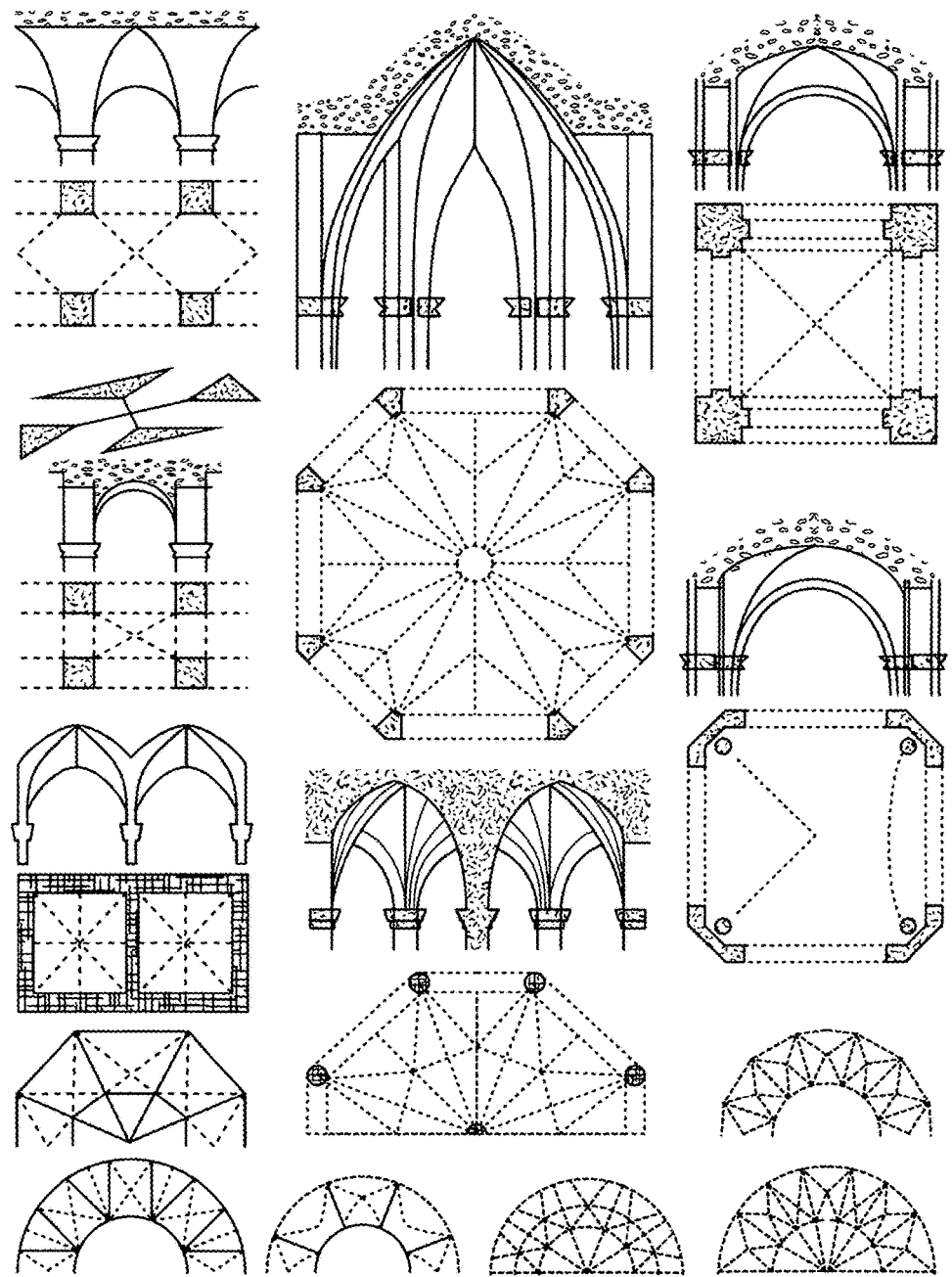
FIG. 20 depicts 21 of the many possible constructed onsite slip-form printed brick configurations having ceiling and roof configurations mimicking or replicating a wide variety of squinching (mud brick) and chipped stone structures.
Figure 21:
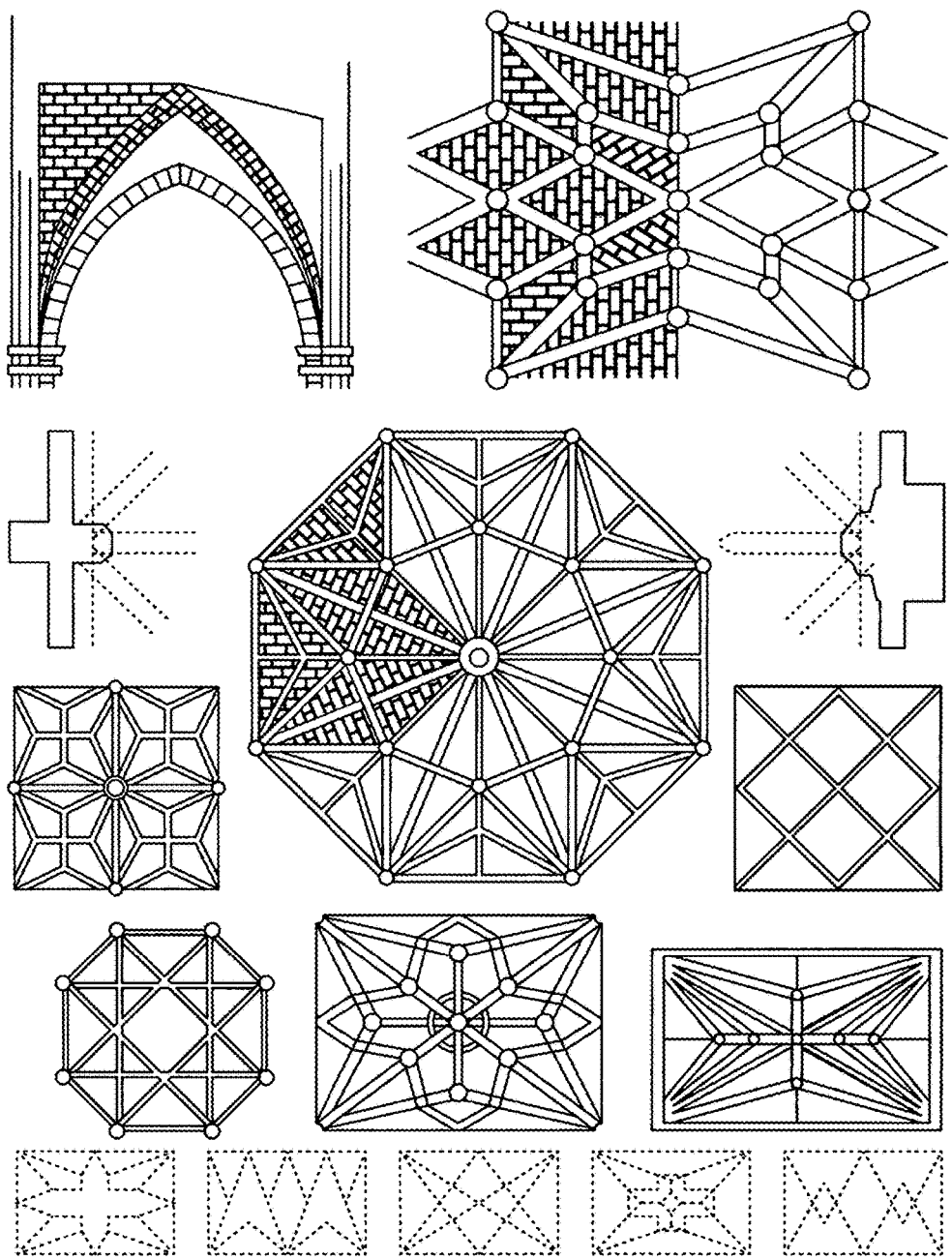
FIG. 21 depicts 15 of the many possible constructed onsite slip-form printed brick configurations having ceiling and roof configurations mimicking or replicating a wide variety of squinching (mud brick) and chipped stone ceiling structures.

In several embodiments encompasses having apparatuses and methods for filling the containment "sleeves" and their corresponding mix extrusion volumes or rates that simplifies the prior art's previously complex mix measurement processes, particularly when constructing multi-story structures having complex geometries, (Reference FIGS. 8, 12, and 51), such as having complex curved, flowing structures, particularly when incorporating or having small radiuses.

The inventive apparatus tools and machine may be continuously or intermittently operated by a single operator or operated in tandem with a pair of workers. Tandem operation is preferred.

The method and apparatus of the current invention encompasses constructing a wide variety of, above grade and below grade, reinforced cementitious and non-cementitious structures such as but not limited to houses, apartments, culverts, well liners, buttresses, window and door frames, columns, balconies, water and wine tanks, sewers, retaining walls, reservoirs, fire places, arches, vaults, domes, columns, bridges, silos, walls, dams, ceilings, stairs, amphitheaters, and spiral structures.

The methods and apparatus of the current invention further encompasses constructing reinforced concrete structures that were previously time and cost prohibitive and or unbuildable structures in the prior art cost effectively such as but not limited to constructing on difficult or conventionally unbuildable lots in remote areas.

FIG. 51 illustrates a plurality of mobile automated robotic construction systems, operated concurrently in cooperative groups for onsite construction. The position and actions of this workforce of mobile automated robots may be directed remotely by a central command station (not shown), each one of these automated construction robots may include on-board material containers or tanks that contain the necessary mix and other materials that are encapsulated, reinforced, molded, printed, and extruded, as disclosed herein. These small mobile automated cooperative robotic construction systems may return to a centralized filling station to refill their tanks when needed. In constructing a multi-story structure an elevator may be used to transport the automated construction apparatuses to various floors. The fixed and or mobile automated robotic systems may be assigned to perform different jobs, e.g. onsite construction of walls, roofs, windows, plumbing, or tiling, etc.

FIGS. 8 and 51 illustrates the inventive reinforced concrete construction methods and apparatuses of several levels of a multi-story structure.

In several specified embodiments encompasses the robotic reinforced concrete construction system employing a plurality of automated robotic construction systems having mechanized slip-form printing assemblies may simultaneously or sequentially be employed onsite, instead of one large automated slip-form printing system, such as a prior art gantry system.

For constructing large multi-story reinforced concrete structures such as apartment buildings, hospitals and schools, etc., the supporting and operating platform system(s) may employ onsite slip-form printing from guide rails to be positioned within and or alongside the structure to be constructed, further including other supporting and operating platform system(s) disclosed herein, or working in tandem in any combination, Reference FIG. 51. As an example, the supporting and operating platform(s) may be equipped with multiple cross members each holding the slip-form printing nozzle assembly and or an automated robotic manipulator coupled to the slip-form printing assembly. Each guide rail cross member may be slidably mounted across a pair of opposite side-members.

Plumbing

Figure 27:
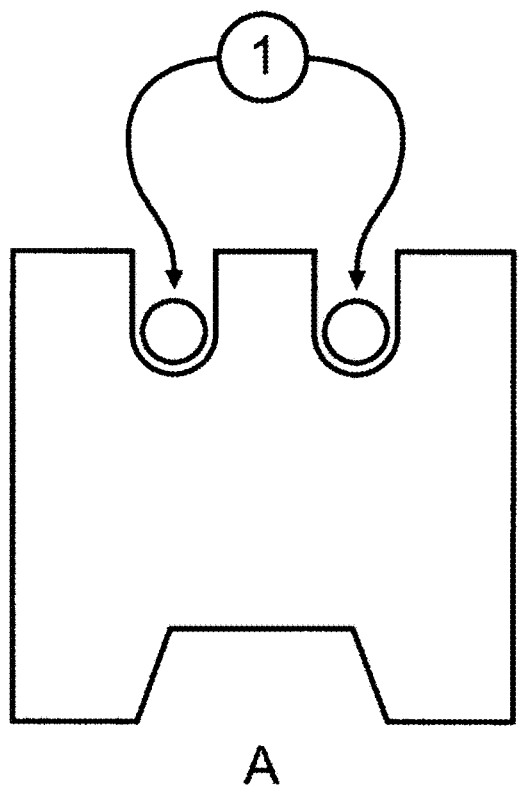
FIGS. 27 A and B illustrates installation of horizontal embedded pipes, plumbing, electrical, fiber optics, etc.
Figure 27:
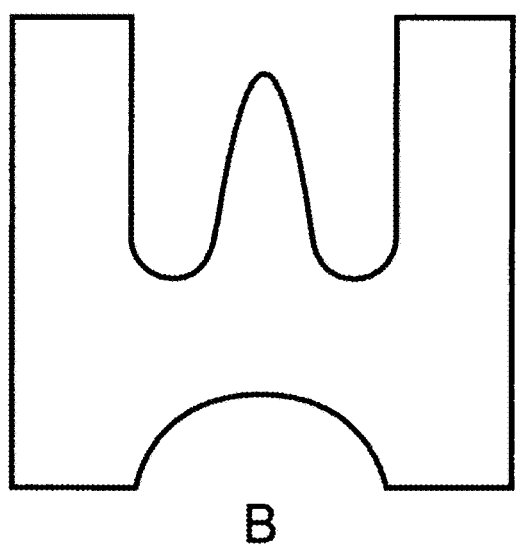
Figure 28:
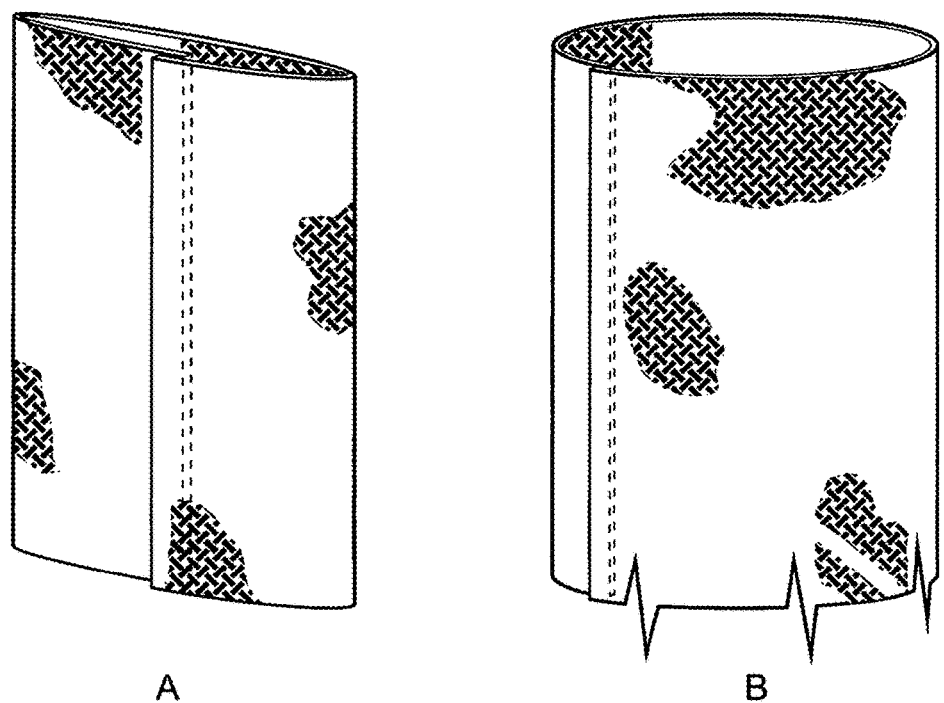
FIG. 28A illustrates a folded flat external reinforcing apparatus of the current invention.
FIG. 28B illustrates a slip form external reinforcing moldable containment sleeve in an open position.
Figure 29:
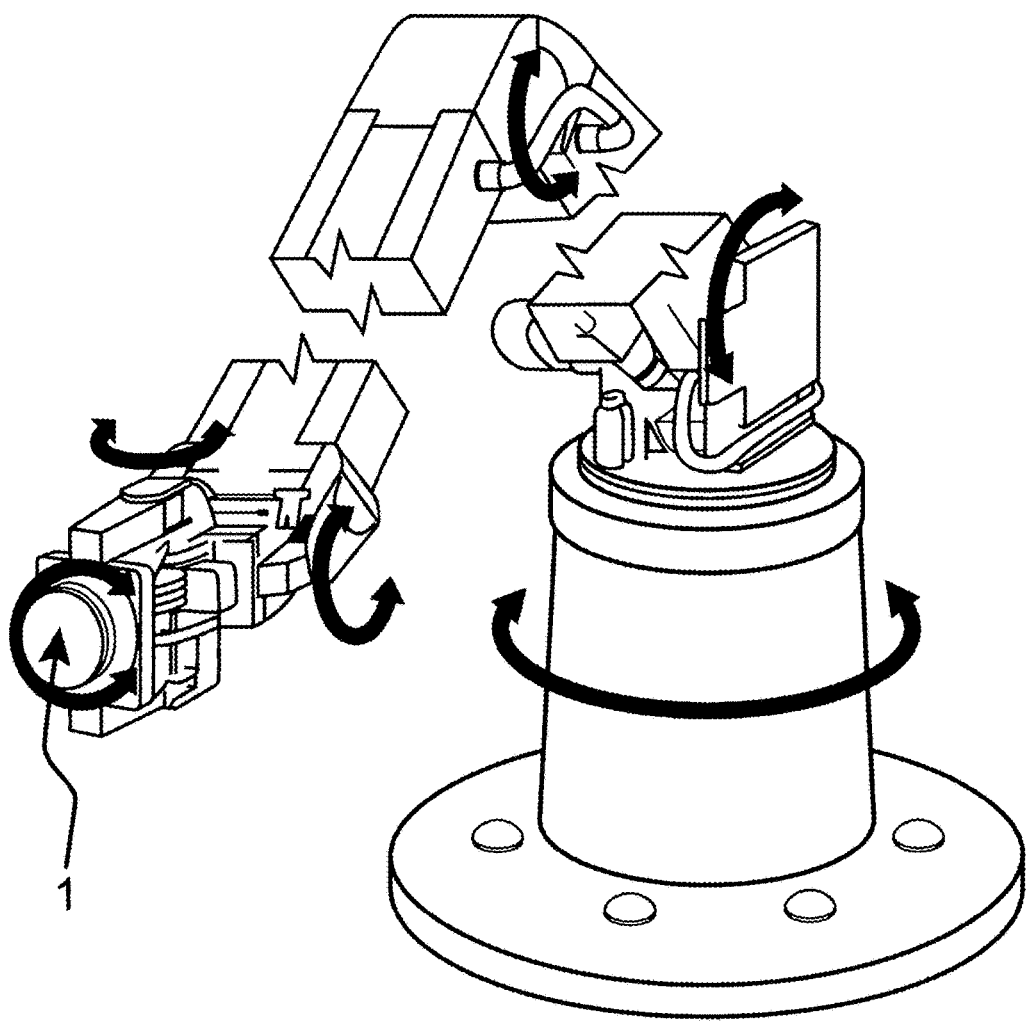
FIG. 29 depicts a cutaway view of an illustrative embodiment of an onsite (inventive) automated robotic reinforced concrete construction system, according to an embodiment of the present disclosure.
Figure 30:
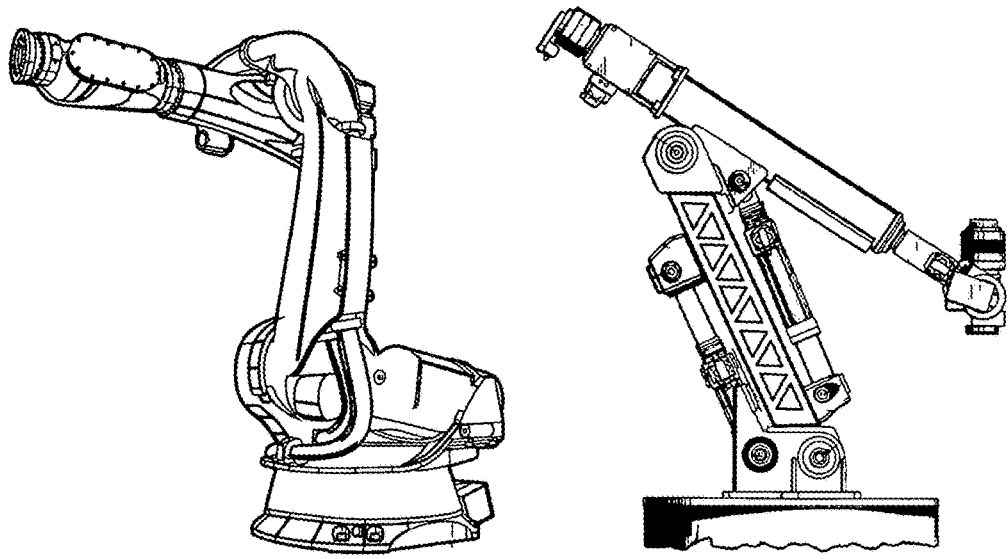
Figure 30:
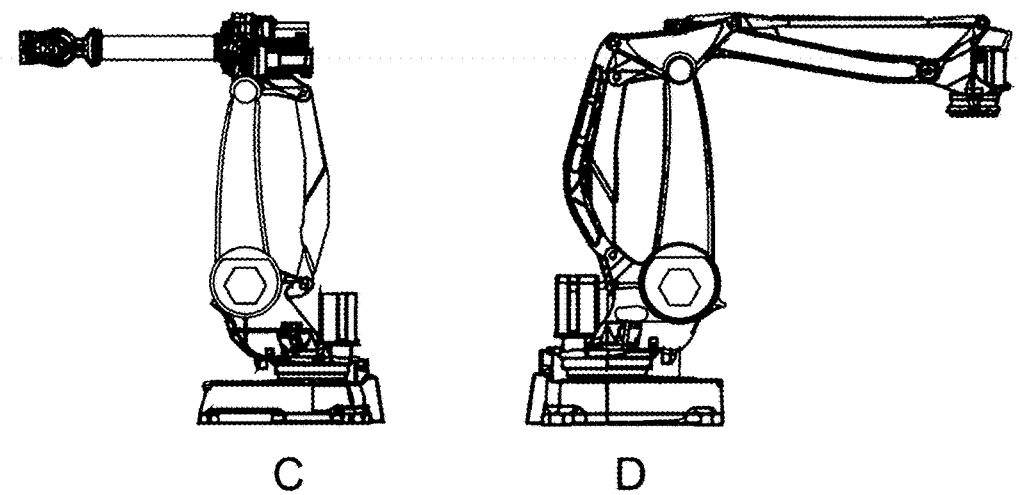
Figure 31:
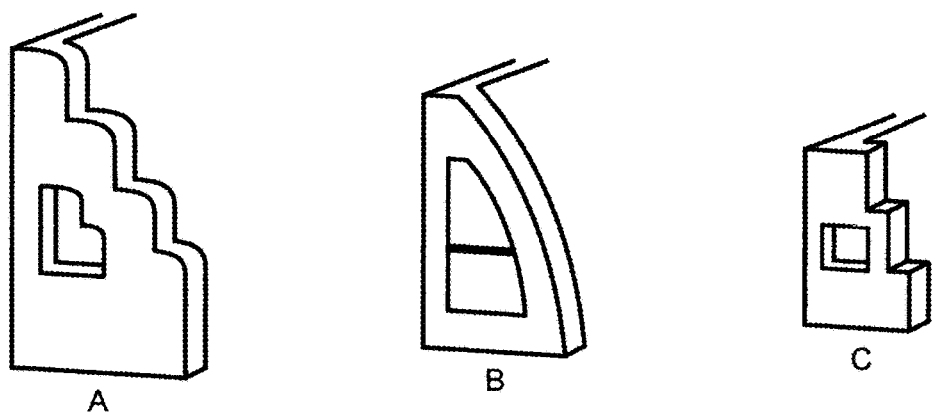
FIGS. 31 A, B, C, D, E, F, and G illustrates 7 of many possible wall configurations able to be slipformed and molded onsite in real time and is simplified and exaggerated for illustrative purposes and is not to scale.
Figure 31:
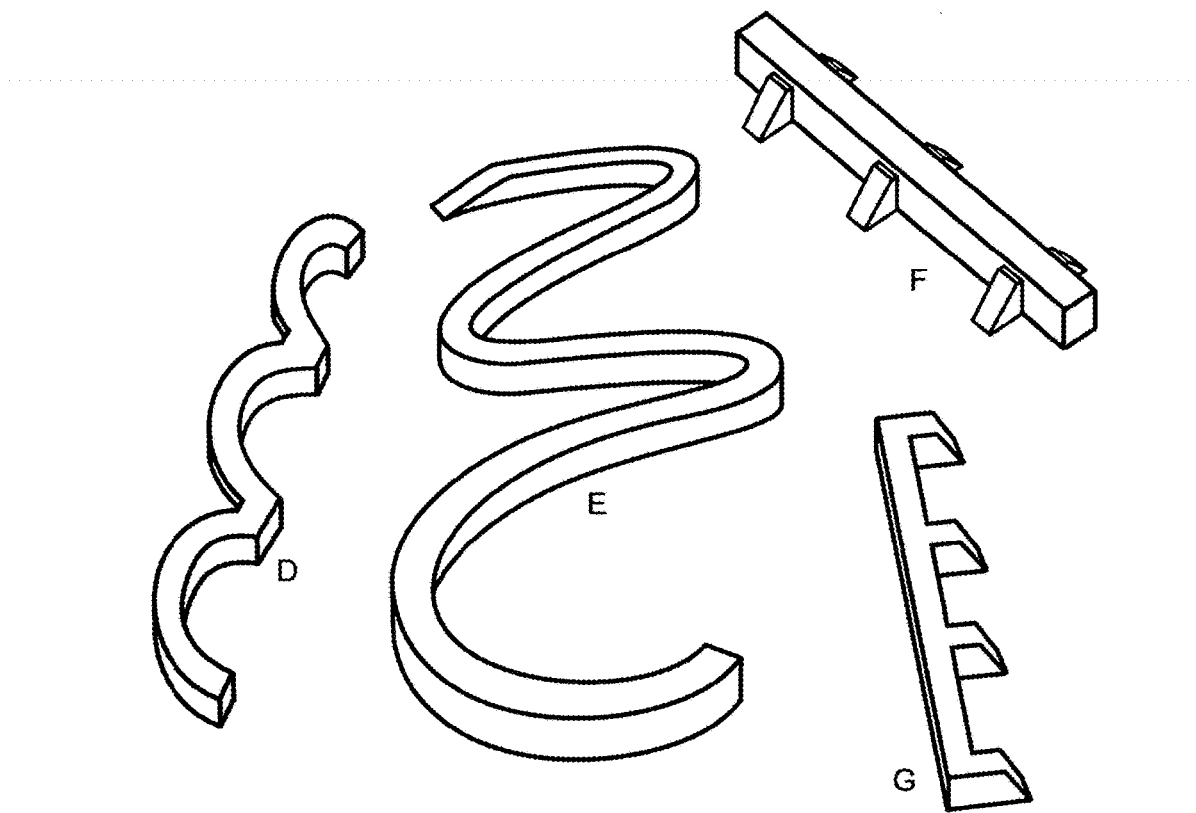
Figure 32:
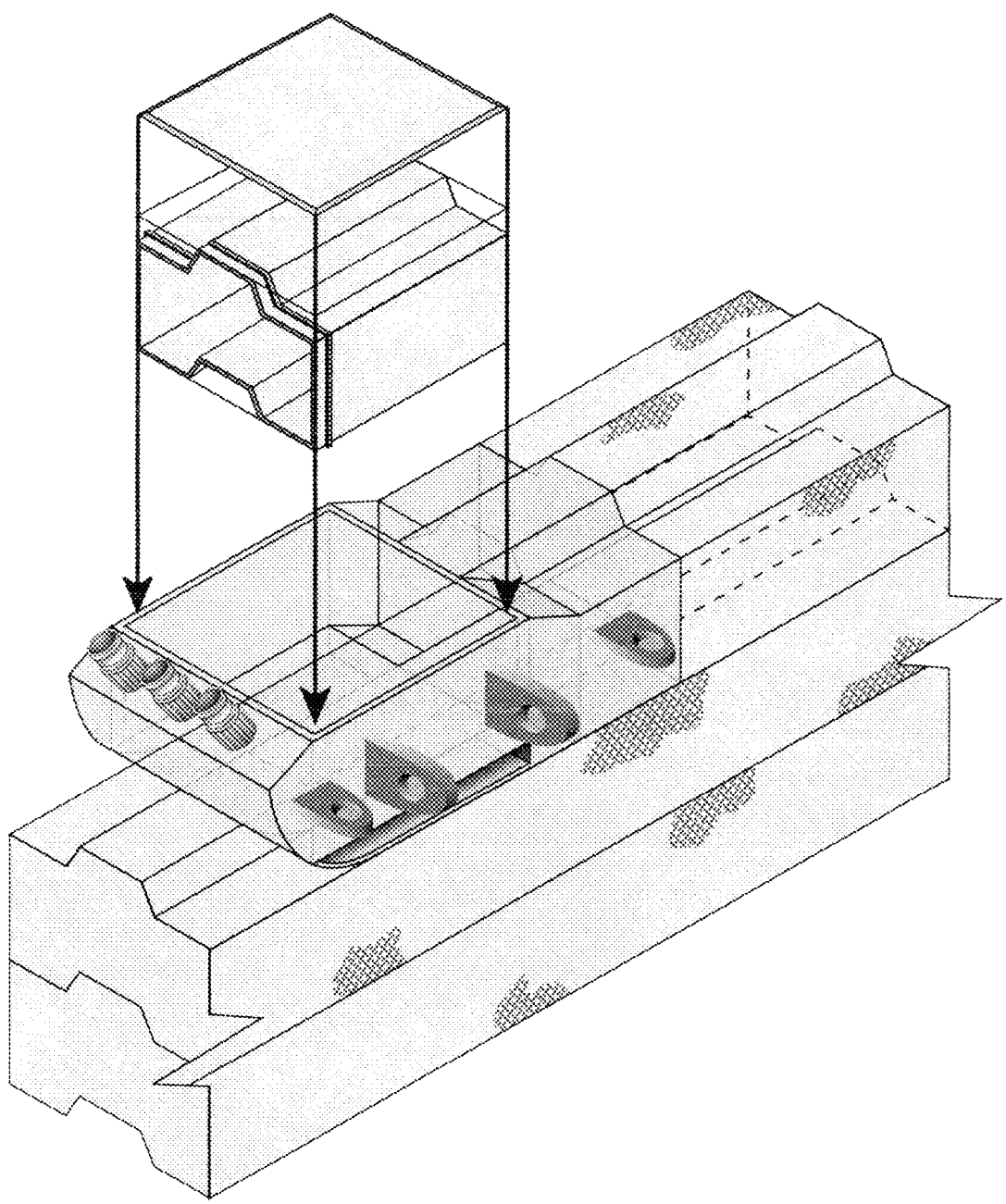
FIG. 32 depicts a perspective view of the invention's automated slip-forming assembly in accordance with a further embodiment of the present disclosure.
Figure 33:
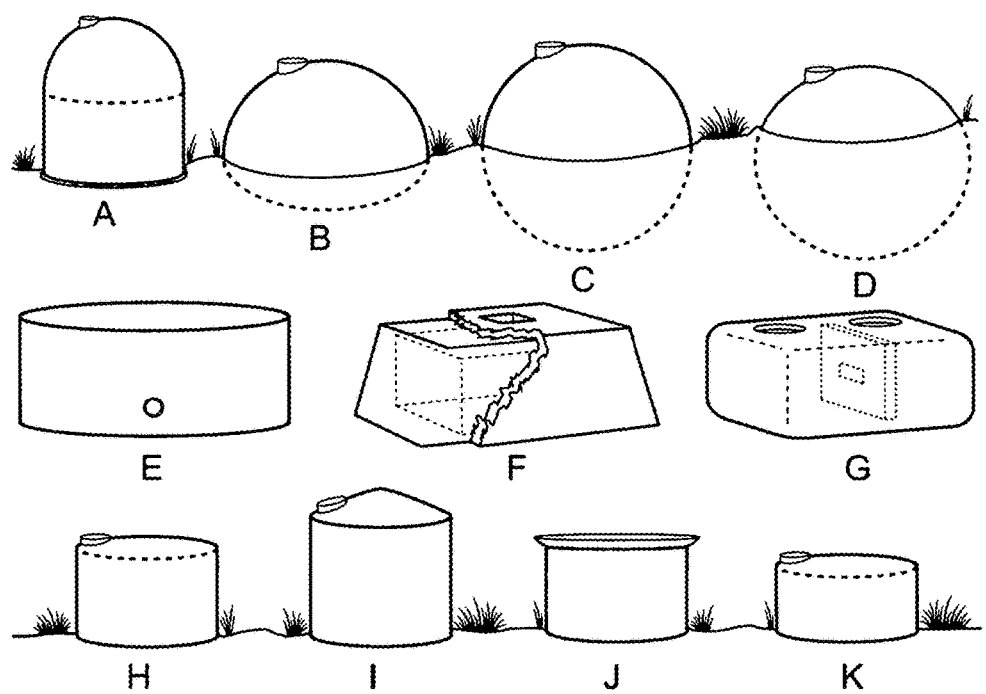
FIGS. 33 A, B, C, D, E, F, G, H, I, J, and K illustrate 11 of many possible water tank configurations able to be slipformed and molded onsite in real time that are simplified and exaggerated for illustrative purposes and are not to scale.
Figure 34:
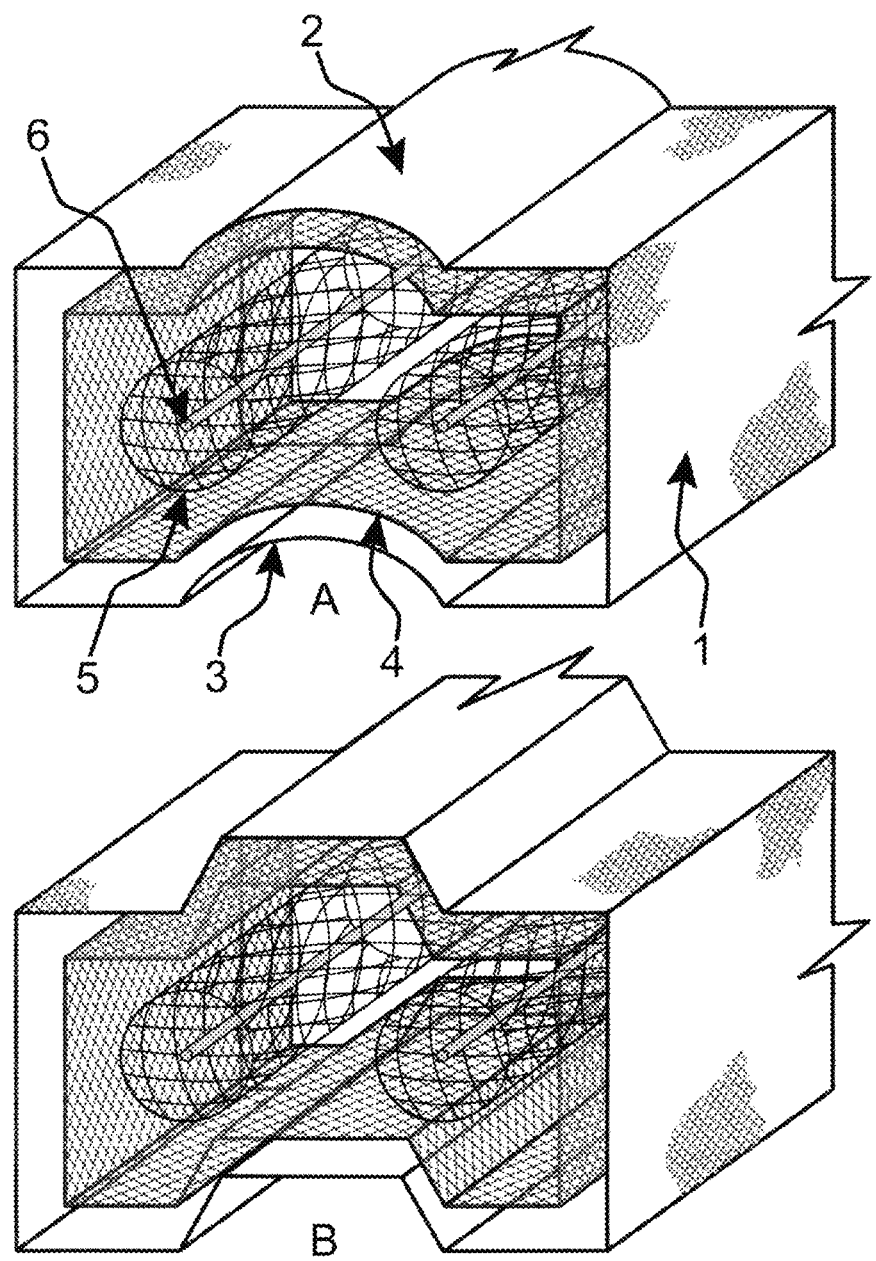
FIGS. 34 A and B illustrate 2 of many possible externally and internally reinforced brick configurations able to be slipformed and molded onsite in real time that are simplified and exaggerated for illustrative purposes and are not to scale.
Figure 35:
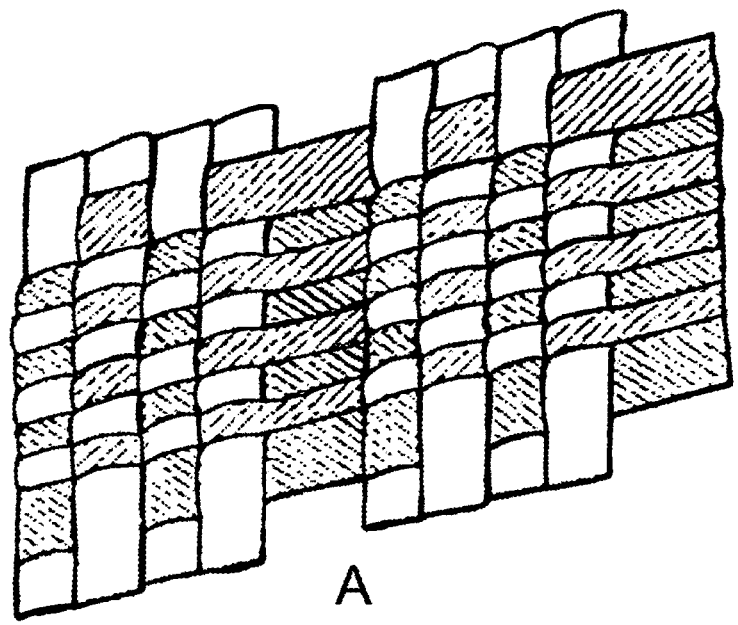
FIG. 35A illustrates a side view of a rectangular fabric reinforced reinforcement containment mesh having an elongated pre-engineered (as needed) flexible venting aperture (centered for illustrative purposes).
FIG. 35B illustrates an external reinforced containment mesh of the current invention having generally preferred pre-engineered, generally square spaced apart venting aperture configurations, having equally spaced filaments.
Figure 35:
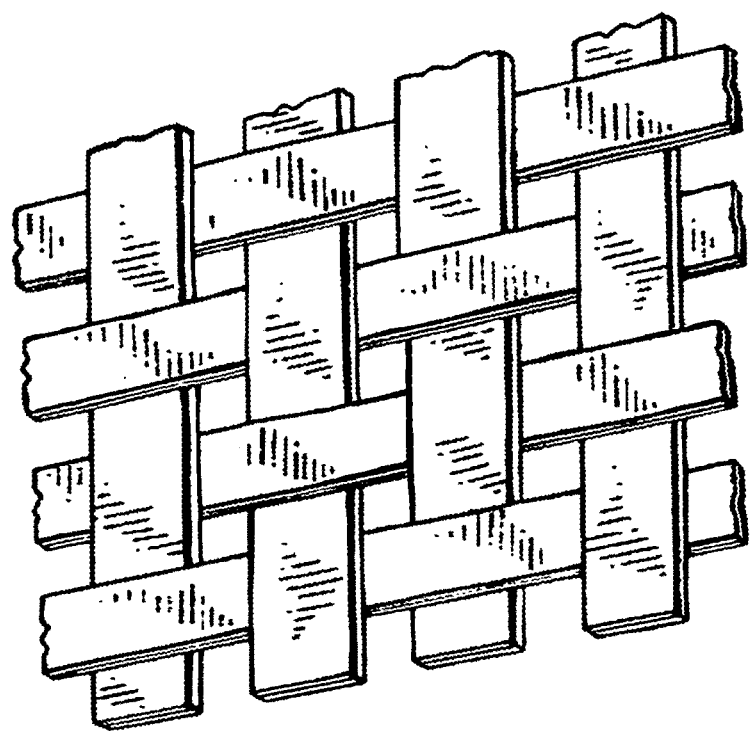

The current invention encompasses providing a faster, more accurate (continuous) onsite installation and placement of piping, conduits, plumbing, fiber optics, electrical, reinforcement etc., reference FIG. 27-1, that provides additional protection from the environment, reference FIGS. 27 A and B, and further encompasses onsite installing the plumbing and electrical for installing fiber optics etc. positioned inside the extruded printed bricks wall or layers.

A three-dimensional structure may include a set of automated slip-form printed encapsulated "bricks", spaced at intervals, each comprised of a layer-wise stacked set of extruded "brick"; then filling in the space between the edges with a suitable cementitious mix as an option may be comprised of a stacked set of separately extruded "bricks" or layers; optionally a plurality of conduits defined at least in part by the spaced apart "bricks" (Reference FIGS. 27 A and B) and the filler; and one or more elements positioned and installed within at least some of the conduits. The elements may include but not limited to reinforcement members; segments of a plumbing pipe, vent pipes, thermal exchange pipes, earth tube pipes; and electric network components etc.

In other specified embodiments encompasses installing the plumbing and electrical, fiber optics components, etc. optionally positioned within the extruded wall "bricks" or deposited layers. (Reference FIGS. 27 A and B).

Plumbing may also be positioned and installed as part of the manual, semi-automated or automated construction system. Segments of plumbing pipe may be secured to other segments using semi-automated or automated installation such as threading, gluing or welding techniques.

The installation of horizontal plumbing pipe segments, under manual and or automated robotic installation control. The automated robotic systems and associated slip-form printing assemblies, described herein, can slip-form print utility conduits within the "brick" walls. Reference FIGS. 27 A and B).

Semi-automated plumbing installation is thus made possible from the automated construction system configuration for installation of pipe sections having generally horizontal configurations. As an option, the automated construction system robotic arm(s) may have a hollow tubular shape, and may include an inner pipe, tube, or sleeve. The removably secured pipe sections may be fed through the piping system of the robotic construction arm(s) from a feeding magazine (not shown).

FIG. 27 A illustrates the installation of horizontal plumbing pipe segments, for example positioned and installed in walls. For horizontal plumbing in onsite slip-form printed "brick" walls preferably having keyway receiving channel(s) or grooves may be used. Pipe sections may then be inserted within the brick's slip-form printed keyway receiving grooves or channels for fast, accurate, and secure positioning. Connections and assemblies may then be performed, as explained herein. A network of piping systems may be assembled at various elevations by the onsite slip-form printed "bricks" keyway receiving grooves or channels of various dimensions and heights as needed. If required, over each exposed pipe section a conduit may be constructed, and a pipe section may be periodically added to the plumbing network, after a predetermined number of onsite slip-form printed "brick" wall layers have been extruded and positioned.

FIG. 27 illustrates alignment of pipe sections, when assembling onsite construction of a plumbing network. The alignment task may be simplified to align pipe segments when installing a plumbing or other piping system network(s), a number of methods may be used, for example injection of cement(s), glues, foams, etc., and positioning and attachment of wire or other receiving and supporting stands, etc.

After placing each pipe segment within the "brick" keyway receiving channels or conduit, a variety of cementitious mixes and/or foam(s) that quickly cure may be injected into the remaining keyway space or as needed.

As an option, once cured, the mix or cements or foam(s) may be covered with cement mix(es) that secures the piping system(s) in position, and provides long-term environmental protection and shielding of plumbing and other networks and facilitates accurate alignment when adding successive piping system(s).

As a variation, electrical wiring may be quickly and easily installed during construction as part of the manual, semi-automated or automated reinforced concrete construction system as disclosed herein. Communication network's electrical wires may be housed in modules or conduits that are connected together and positioned within the printed "brick" receiving channels positioned and cast in the slip-form printed walls, foundations, and roofs, etc., again under manual and or robotic or mechanized control as needed.

This approach may be similar to the modular approach used in building plumbing system networks as described herein. The electric modules (not shown) contain segments of wires or other conductive elements, such as power and communication lines. Optionally these conductive segments may be encapsulated in nonconductive slip-form printed "brick" blocks, which may be partially or completely composed of nonconductive materials including but not limited to ceramic(s), plastics. The ends of the conductive segments have other forms conventionally employed in electrical and electronics outlets, jacks, etc. Modules of many different types of electrical components may be made and used, allowing for the creation of any desired electric network as needed.

The only manual part of the electrical work may be the task of simply inserting fixtures into the semi-automatically constructed electronic network (not shown). Plastering, tiling and painting may be similarly done under manual, mechanized or automated robotic control, or any combination therein.

The process for tiling and or cladding of roofs and of walls is similar to the process for tiling of floors (not shown). Both the mix feeding tube(s) (not shown) and the mechanized and or robotic arm(s) that pick up the tile, may tilt to conform to both floor and wall and roof tiling and or cladding applications as needed. In case of vertical, or near vertical, tile placement, if a distance is desired between the tiles, a plurality of conventional small spacers may be placed on the sides of each tile which faces upward or downward. The spacers may help accurately space apart and stop the movement (drift) of tiles. One of the major time saving aspects of the tiling methods may be the elimination of the task of aligning the tiles, which takes up significant time during a conventional manual tiling installation process.

Fiber Reinforced Concrete

The inventive containment "sleeve" apparatuses and methods are compatible with, and improves the potential casting outcomes from, a wide variety of micro-reinforcements having a variety of significant structural implications for onsite slip-form printing of fiber-reinforced concrete (F.R.C.) such as enhancing the concrete mix behavior including improving stiffness and reducing deflection, further including realizing more of the mix's performance potential as disclosed herein, for "brick" walls and members including with and without conventional reinforcement. The (F.R.C.) can decrease complex stress in the reinforcement component or structure. This is particularly important when slip-form printing thin brick sections and cement-based mixes requiring internal reinforcement where the geometry and profile play an important role in controlling deflection. As an option in the method and apparatus described for when slip-form printing of fiber-reinforced concrete materials on site by extruder printing techniques. In this reinforced concrete slip-form printing construction system, one or more compartments of the feed hopper may contain standard-grade concrete mix, while the other compartment is filled with fiber-reinforced mix. In this manner, the slip-form printing control gate of the feed hopper discharge openings can be controlled to adjust the feeding ratios of the different slip-form printing concrete mixes so as to obtain a specifically designed slip-form printed "brick" product. The primary function of this apparatus is to provide construction versatility for homogenous and/or nonhomogeneous distribution of micro-fiber reinforcement throughout the entire cross section of the slip-form printed brick product as needed.

Such use of higher-strength concrete mix(es) including having micro-fiber-reinforcement at the brick wall end portion in some applications reduces or eliminates the need for conventional iron reinforcing bars, rods, cables or fibers at the support-load-bearing area of the printed brick wall, a possibility that in the slip-form printing prior art has been almost impossible to implement without essentially degrading the cost-efficiency of mass production slip-form printing. Now the disclosed inventive automated system slip-form printing technology according to the current invention increases the range of printed brick wall applications and thus improves the competitive advantages of the concrete construction branch of reinforced concrete brick products.

Hence, the concrete mix grade may be quickly and easily varied as necessary or desired, e.g., so that printing a long slip-form printed brick wall may be of the same or different cementitious (concrete) mix or grades than that of the other slip-form printed walls. Also different portions of a given slip-form printed wall or walls, as for example, may be made from same or different cementitious (concrete) mixes or grades, such as but not limited to memory return concrete, smog absorbing concrete, humidity regulating concrete, etc. e.g., so that the ends of a given brick wall may be constructed from a different grade mix than that used for the middle portion of the slip-form printed brick wall. Generally, the most commonly used cementitious (concrete) mix grades that are different from the basic concrete mix grade can be a higher-strength or lower-strength grade, as for example fiber-reinforced and or colored or dyed concrete mixes or any suitable combination. Among others, the current invention offers the following significant benefits: Use of optimized-grade concrete gives savings in the consumption of extra amounts of cement and admixtures. This is an object of the invention.

In several embodiments encompasses inventive apparatuses and methods for the use of a higher-grade or such as but not limited to fiber-reinforced type(s) of concrete mixes allows additional reinforcing bars, cables, rods, etc. otherwise required for a given individual section of a "brick" wall or layer to be reduced or omitted from the entire length of a slip-form printed wall being slip-form printed on the casting layer. As an example thus the walls to be provided with a large number of openings can be constructed onsite from a special high performance grade concrete mix to increase durability and sustainability and to significantly reduce micro-cracking.

Micro-Filament Reinforced Concrete

The current invention further encompasses employing reinforcement from micro-filaments improving the Generalized Quality Control and performance Specifications of the inventive onsite slip-form printed "bricks", provides improved strengthening, proportions, production, and delivery, having placement and protection of a variety of embedded item as needed.

The symbiotic combination of the inventive methods and apparatus of the current invention improves the specifications for Tolerances for both hot and Cold Weather onsite reinforced concrete Construction applications.

High Performance Concretes

Some printing material's specifications may not be realized or obtained onsite without employing the inventive slip-form printed containment sleeves of the current invention having pre-engineered characteristics manufactured to optimize onsite printing such as but not limited to successfully slip-form printing on the construction site sustainable cementitious materials lasting for hundreds of years, or, theoretically, thousands of years. Note, most reinforced concrete structures are engineered to last about 50 years, some about 100 years. Thus, employing the current invention enables the concrete industry to be more sustainable.

The current invention enables the reinforced concrete industry to be more sustainable and more cost effective and more environmentally friendly at equivalent cost or potentially at reduced costs.

The prior limitation for casting of high performance concrete mixes in a factory environment is conventionally limited to about 20 inches; the current invention methods and apparatuses is theorized to be able to slip-form print about (25) inches or more on the construction site.

The current invention provides previously unavailable advantages for slip-form printing, particularly for printing high performance concretes mixes onsite to predictably cast within a wider range of temperatures and humidity ranges, thus expanding the field of engineering of high performance concrete mixes such as but not limited to air filtering concrete, smog absorbing concrete mixes, memory return concrete, humidity regulating, ultra-high performance, further containing potash and/or fly ash having advantages for casting highly insulating concrete mixes and or ultra-high insulating concrete mixes on the construction site.

In some applications, the current invention eliminates factory environment autoclaving steps (air entrainment), thus providing previously unavailable onsite printing, that has previously required casting in a factory environment that requires a controlled humidity and temperature range.

In several embodiments encompasses inventive methods and apparatus for controlling the mechanisms of a wide variety of cementitious mixes curing environments to enhance the onsite casting components and mechanisms and optimizes the cementitious materials mix proportions whose properties and characteristics have been designed to meet specific engineering needs, such as required for high performance concretes such as fiber reinforced concrete, memory return concrete, humidity regulating concrete, smog absorbing concrete, air and or gas entrained concrete, EMF shielding concrete, etc.

In several embodiments the invention encompasses methods and apparatuses such that the containment "sleeves" apparatus may be composed of singular or multi-layered materials, from a wide variety of compositions and materials, such as but not limited to a wide variety of fabrics, filaments, foils, plastics, fiber weaves, binding agents, mesh sizes, weaving patterns, venting apertures (spacing), crossing angles, including hybrid materials, multiple laminated and non-laminated layering such as optionally having two or more reflective and sealing materials, etc. to contain and regulate the mix casting environment for a wide variety of cementitious and non-cementitious mixes to suit a wide variety of onsite automated slip-form printing applications specifically for optimizing a variety of curing characteristics to obtain the complex potentials of generic to high performance concrete mixtures by accurately controlling (regulating) the necessary and required mechanisms of the curing environment to enhance the mix components mechanisms and optimize the materials and mix proportions whose properties have been designed to meet specific engineering needs i.e. such as high performance concrete (HPC) or blended cementitious materials such as fly ash (ground granulate slag from blast furnaces) (iron), providing high workability onsite having an initial high strength, high toughness, optionally employing High Volume Fly Ash (HVFA) concrete mixes' slip-form printed in place on the construction site for increasing the significant component of "sustainable durability" and or high durability to exposure conditions.

The wide variety of containment sleeves of the current invention that regulates water tightness and improves durability such as to exposure conditions such as encapsulating (containing) blended high performing cementitious materials such as fly ash, to obtain high degree of onsite printing predictability, having very high initial strength, high toughness, optionally employing High Volume Fly Ash (H.V.F.A), for increasing the significant brick component "sustainable durability" to predictably minimize onsite autogenous shrinkage and thermal cracking, more specifically the interfacial transition zone in H.V.F.A. concrete printing, enabling the onsite development of crack-resistance, reducing thermal cracking from alkali-silica expansion and to obtain a more durable onsite printed "bricks" with higher insulation per mass volumes and provides resistance from sulfate attack and is compatible with a variety of minerals or synthetic admixtures.

In other specified embodiments, the current invention encompasses that employing the inventive pre-engineered "sleeve" having previously unavailable onsite performance characteristics that reduces or eliminates the interfacial transition zone, such as when slip-form printing HVFA concrete, enabling the development of a more crack-resistant and more durable print having improved dimensional stability, i.e. less drying shrinkage and promotes a higher ultimate strength. This is an object of the invention.

Note: due to the volumes of the fines and a low water content, fresh concrete mixes of the HVFA mixes are often very cohesive and do not exhibit bleeding or segregation Note that HVFA is a non-bleeding, low-water cement concrete mixe(s) that are prone to plastic shrinkage and cracking, including autogenous cracking from shrinkage.

In several specified embodiments, the current invention encompasses that methods and apparatuses employing the current invention fabric reinforced sleeve(s) eliminates the prior art steps such as covering the surface with a heavy sheet immediately after placement as the concrete surfaces must be protected from rapid and uneven water loss or by the prior art use of a water fogger around the just printed structure during the moist curing period for a minimum of 67 days. Overcoming these and other limitations is an object of the invention.

In most applications, the current invention's methods and apparatus may eliminate the prior art steps of vibrating concrete.

In other specified embodiments encompasses that the fabric reinforced containment "sleeves" improves air entrainment methods and or a variety of gases' (i.e. nitrogen, argon) entrainment. This is an object of the invention.

The "sleeve" is compatible with a variety of air entrainment, up to about 2%, and or a variety of optimized gas entrainment methods and apparatuses such as argon, nitrogen, etc. (not shown).

Note that these H.P.C. non-bleeding, low-water cement concrete mixes are highly prone to plastic shrinkage and cracking, particularly autogenously cracking from shrinkage. Thus, employing the current invention containment "sleeve" having pre-engineered curing and venting apertures reduces or eliminates these prior limitations that optimizes and or eliminates the prior art steps of wetting and shading the cast concrete. This is an object of the invention.

Air Purifying Concrete

Conventional technology is currently unable to cast smog absorbing/air purifying concrete on site in a reliable and cost-effective manner, thus the current invention provides a previously unavailable method and apparatus for slip-form printing air purifying concrete on the construction site as needed within the art.

In a specified embodiment encompasses cost effectively constructing/slip-form printing walls or sections of walls etc. may be slip-form printed (cast) on the construction site with a cementitious mix that is specifically designed and formulated to control and regulate the structure's internal air purity, such as trapping carbon chains having suitable molecular chelating characteristics or adjusted as needed depending upon the application.

For example, the slip-form printing apparatus that shapes/molds external slip-form printed (extruded) interlocking, encapsulated, molded "bricks" contained in flexible reinforced containment "sleeves" may be deposited in succeeding "brick" layers, one slip-form printed "brick", positioned layer-wise on to the receiving interlocking "face" of the other, in single or multiple passes, or any combination as needed. These onsite molded and printed "bricks" could be of the same or different material(s). For example, optionally humidity regulating cementitious brick materials may be printed onto the previous "brick" surface during a first pass and memory return concrete or smog (pollution) capturing cementitious materials may be printed onsite and positioned on top of the humidity regulating "brick" material during a second pass in a layer wise interlocking manner.

Memory Return Concrete

Conventional technology is currently unable to cast memory return concrete on a construction site in a reliable and cost-effective manner, thus the current invention provides a previously unavailable method and apparatus for slip-form printing memory return concrete mixes onsite as needed within the art.

Humidity Regulating Concrete

Conventional cementitious technology is currently unable to cast humidity regulating concrete on site in a reliable and cost-effective manner, thus the current invention provides previously unavailable methods and apparatus for slip-form printing internal humidity regulating concrete mixes onsite as needed within the art for automatic adjusting and self-regulating within the pre-engineered and preferred internal humidity range.

In a specified embodiment encompasses that the slip-form printed "brick" walls or sections of walls may be slip-form printed with a pre-engineered cementitious mix that is specifically designed and formulated to control and automatically self-regulate a structure's internal humidity range for automatic adjusting and self-regulating within the pre-engineered and preferred humidity range ranging between about 30% to 60%, preferably self-regulating between 45% to 55% or adjusted as needed depending upon the design characteristics and application.

The current invention encompasses method and components to optimize thermal storage and obtain a self-regulating humidity/balancing effect.

The current invention further encompasses casting a variety of cementitious materials having pre-engineered wicking characteristics as needed. The current invention encompasses improving onsite slip-form printing such as but not limited to optimizing the slipform printed cementitious mixes grain boundary, wall effects, aggregation, permeability, porosity resistance, sheer strength, alkali resistance, oxidation resistance, erosion resistance, weight or mass, compressive strength, tension resistance, memory return, ductility, freeze thaw resistance, durability, stress displacement, etc.

The current invention further encompasses slip-form printing insect-repelling walls onsite.

In several specified embodiments, the current invention encompasses onsite slip-form printing autonomous shielding against radiation, i.e. EMP shielding concrete and EMF shielding concrete mixes.

Temporary and Emergency Structures

Another advantage of the current invention is that emergency structures are easily constructed more rapidly onsite, which is particularly important in natural and man-made disaster ravaged areas.

The current invention's methods and apparatuses encompasses quickly and cost effectively printing a variety of durable emergency and temporary structures onsite (in one to four hours) that may incorporate multiple simplified slip-form printers per mechanized arm(s) optionally having multiple adjustable simplified light-weight arms working simultaneously and or sequentially operating multiple construction tools simultaneously such as per room, or rooms, and or constructing near monolithic multi-room structures.

The inventive construction methods and apparatus offers previously unavailable simplicity, speed, and versatility that enables constructing a wide variety of slip-form printed structural configurations onsite, including temporary and or emergency structures in a wide variety of sizes and shapes from the same basic components using the same basic construction techniques and as an option may include constructing temporary unsupported arches and temporary wall sections in permanent structures e.g. doorways, walls, etc. further including slip-form printing temporary unsupported concrete arches up to about a 4 ft. span and slip-form printing temporary wall sections, and structures.

As an option the bricks may be slip-form printing on top of temporary and or removable supports including constructing removable temporary cast in place temporary structural supports or bracing or imitation beam supporting structures compatible with a variety of structural component(s).

As an option the current invention encompasses constructing temporary portions of a structure, e.g. doorways that look permanent, wall(s), arches and buttress, flying arch, flying buttress.

The current invention optionally provides the ability to 3D print homes using native (indigenous) clays, which could contribute to affordable housing. As an option homes could be printed out of local clays which are abundant in many locales, and often the areas most in need of emergency or affordable shelters.

The method and apparatus of the current invention further increases the compression and tension strength of bricks over the prior art, and quickly and cost-effectively constructs temporary structures that are weatherproofed and resistant to natural disasters such as fire, hurricane-force winds, snow loads, flooding, tornadoes, earthquakes, and atmospheric radiation. Some slip-form printed structures may be flooded and dug out with minimum or no structural damage such as in tsunamis and flooding.

The current invention encompasses methods and apparatuses to slip-form print wind and sand fixation walls, and vertical green walls onsite for the desertification control of sand and wind.

Earth Sheltering

The current invention's method and apparatus encompasses cost effectively printing onsite earth bermed (sheltered) and underground structures (not shown). Earth sheltering provides thermally stabilized environments with superior energy efficiency and lower life cycle costs for reliable protection against seasonal temperature extremes with substantially reduced or potentially near zero-point energy usage.

The current invention encompasses quickly and easily constructing earth bermed and underground structures onsite having the following benefits: Easily constructs structures on sites not suitable for conventional construction, provides quieter living environment, easily incorporates and improves earth tube performance characteristics, and the current invention is compatible with air formed domes (berms, etc.).

Retrofitting and Refurbishing

The method and apparatus of the current invention encompasses innovative versatile onsite reinforced concrete construction methods and apparatuses such as employed for cost effective and energy efficient retrofitting and refurbishing such as brown fields projects and or significantly structurally upgrading a wide variety of structures such as but not limited to repairing, remodeling, and or adding to sustainability, providing additional structural reinforcement, insulation, seismic and wind resistance, etc. as needed.

The method and apparatus provides a previously unavailable onsite seismic rehabilitation technique by the rehabilitation of reinforced concrete members such as footings, walls, slabs on grade or subgrade, forms, reinforcement, placement, consolidation, finishing, and having improved onsite curing characteristics and speeds as disclosed herein.

The structures' construction methods are easily expanded (added on to) with minimal disturbance to the original structure.

Specialty Structures

The current invention quickly and cost effectively constructs a wide variety of specialty concrete structures including fortified structures having cladding.

In one specified embodiment encompasses that methods and apparatuses of the current invention are suitable for onsite construction in remote locations such as slip-form printing extraterrestrial structures such as on the moon.

In one specified embodiment, the method and apparatus of the current invention is suitable for underwater reinforced concrete construction.

In other specified embodiments encompasses inventive methods and apparatuses such that upon the inventive structure's collapse or rupturing such as from structural stressing, the reinforced external containment sleeve(s) and/or the internal reinforcement mesh, reduce the quantity and severity from shrapnelizing effects particularly in combination with different sizes and types of reinforcing loops/coils when compared to conventional reinforced concrete structures. This is an object of the invention.

As an option or optionally, the current invention may employ carbon fiber containment sleeves and internal reinforcement that resists projectile penetration.

The current invention encompasses quickly and cost effectively constructs bunkers, silos, and disaster shelter, as well as a variety of other fortified structures including cost effective construction of structures for long term encapsulating of toxic substances.

Such innovatively reinforced structures preferably employing said synergistic reinforced containment sleeves having attached reinforcing "ring"/"coil" system having significant S-wave canceling characteristics constructed with the method and apparatuses of the current invention may withstand seismic forces (Earthquake resistance) three times higher than the most stringent code requirements or more if necessary or required. As further examples, such as but not limited to wellheads, infrastructures, stadiums, and additionally may provide a wide variety of encountered explosions and ground accelerations (earth quakes) mitigation solutions for protection of above and below grade facilities, and other reinforced structures. Memory return metals are preferred.

Figure 42:
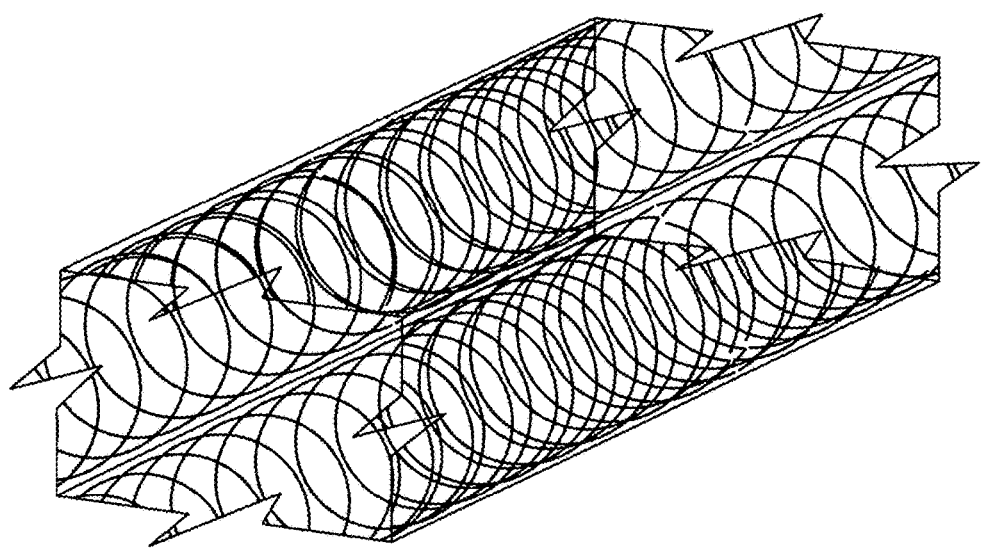
FIG. 42 illustrates one of many possible configurations of the leave-in-place cast-in-place external reinforced earthquake shockwave-cancelling containment form.
Figure 43:
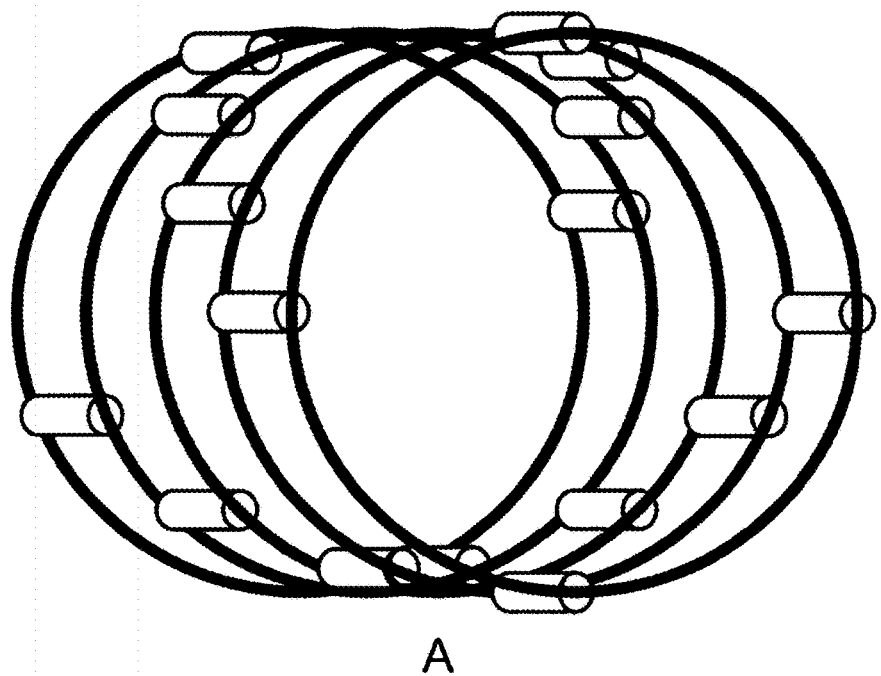
FIG. 43A illustrates an example of the coiled overlapping and non-touching loop seismic resistant apparatus.
FIG. 43B illustrates a side view of the overlapping ring coil seismic wave cancelling reinforcing apparatus, illustrating the spacers preventing the overlapping coils from touching each other. Overlapping but non-touching coils.
Figure 43:
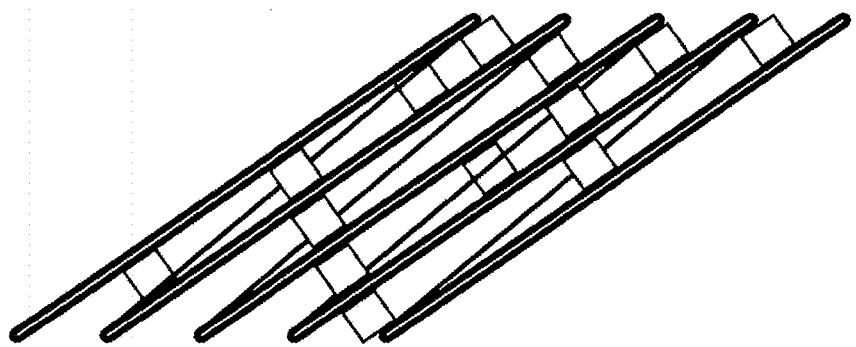
Figure 44:
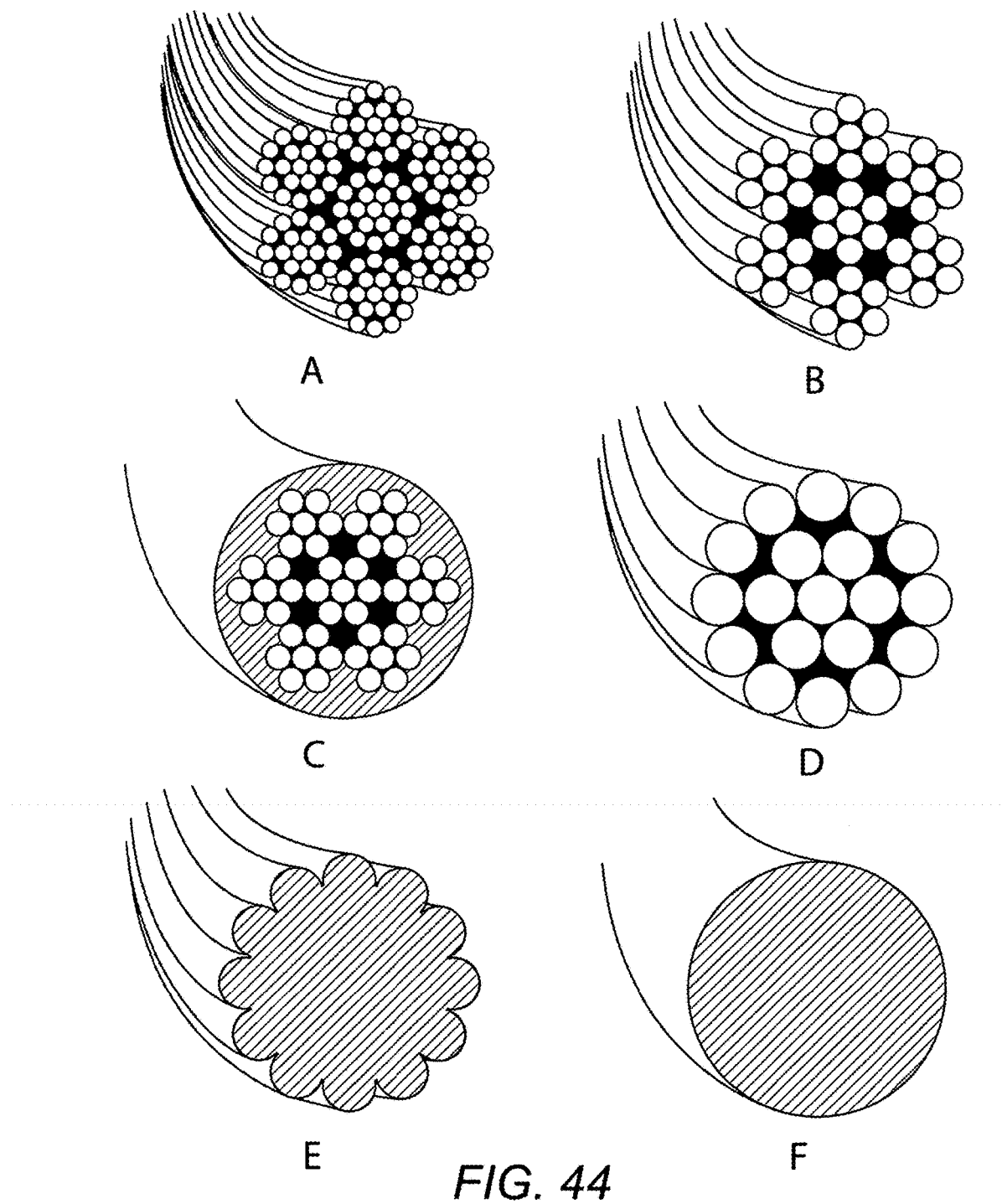
FIGS. 44 A, B, C, D, E, and F depicts in an illustrative exemplary embodiment 6 of many possible cable and or wire internal reinforcement(s) apparatuses that are simplified and exaggerated for illustrative purposes and not to scale.
Figure 45:
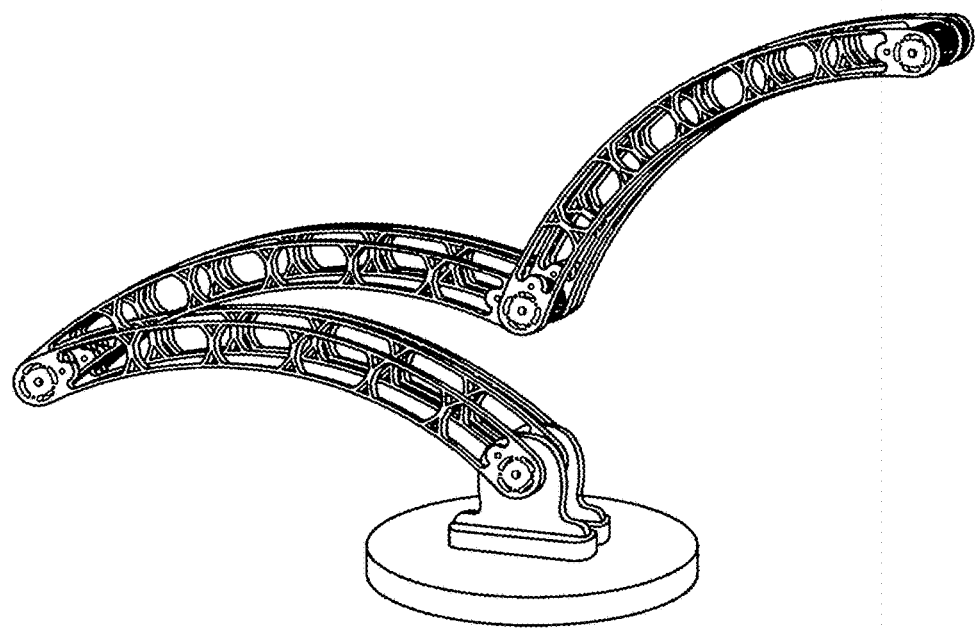
FIG. 45 illustrates one of many possible versions of the multi-purpose robotic construction systems of the current invention, removably attached to one of many possible supporting and operating platforms. Simplified for illustrative purposes.

Additional examples encompassed by the current invention further includes armoring and reinforced concrete impact (earthquake) cancellation characteristics such as but not limited to print in place, leave in place memory return reinforcement, as in an exemplary illustration of FIGS. 42, 43, and 44, for the improved protection of a wide variety of buildings, stadiums, bridges, and other infrastructures to protect oil and water pipelines, water, wine, and oil tanks; furthermore to provide and to protect housing, bunkers, wells, culverts, silos that are subject to risk of earthquakes, further providing extreme water and flood resistance that may be dug out and subsequently reused.

The overlapping continuous non-touching reinforced memory return such as wire and or cable "coils" "rings" may significantly improve encountered S-wave impact force attenuation characteristics in new and highly complex ways, as disclosed herein, reference FIGS. 44 A, B, C, and D depicting four of many possible memory return "coils" "rings" cable configurations and FIGS. 44 E and F depicting two of many possible coiled memory return wire configurations.

FIG. 43 A and FIG. 43 B illustrates an example of continuous overlapping non-touching reinforced memory return wire and or cable "coils". A structural reinforcing bond may be configured by overlapped said continuous non-touching reinforcing memory return "coils" "ring" which are positioned and embedded/molded within a wide variety of cementitious materials as disclosed herein providing seismic resistant apparatuses or components as needed, reference FIG. 42, 43, 44.

Additionally, having versatile seismic resistant structural reinforcement characteristics in a variety of arrays of configurations of the current invention such as reinforcement modules (to be embedded in a wide variety of compatible cementitious materials) as disclosed herein. As for example, cubical geometric forms having non-touching overlaps can be achieved by a suitable draft angle, which interlocks and nests the cubical and or curvilinear reinforced seismic resistant memory return "brick" wall system or units together (not shown). These non-touching reinforced memory return units "cubes" may overlap more densely than as illustrated, reference FIG. 42, FIG. 43 A, and FIG. 43 B, to obtain very dense reinforced seismic resistant memory return S-wave frequency capturing and nullifying characteristics as necessary or required such as but not limited to high performance seismic resistant S-wave protected structures. They are a basic building block for a wide variety of reinforced memory return materials and attenuating dimensionalities not previously known in the concrete construction art, such as but not limited to a variety of reinforced memory return "coils", "rings", "nets", and "weaves" and other reinforcing memory return configurations as needed.

Most preferably composed of alloys of nitinol reinforcement wire and or cables and its variants etc., as described and disclosed herein, such as incorporating into the inventive seismic resistant continuous reinforcing external containment sleeves, preferably embedded with a compatible cementitious mix or other bonding composites or other materials as needed depending upon the specific application.

Several specified embodiments encompass that the inventive memory return seismic resistant reinforcing apparatuses may be accurately positioned and secured and slipform printed together onsite for reinforcing the lesser composites. The "coil" surfaces comprising one memory return reinforcing modules (cubes) may be pre-engineered and manufactured, such as but not limited to continuous bar, rod, cable, wire, or filament(s) etc., as needed reference FIG. 44. As an option, having consecutive cables and or wire "coils" that are twisted at orthogonal junctures for positioning adjoining, preferably overlapping, continuous non-touching memory return "coils" "rings" at intersections, and may vary for different applications as needed. A specified embodiment encompasses that the termination (ends) of the memory return seismic resistant reinforcement printed members having overlapping, continuous non-touching memory return "coils" "rings" may extend their "coils", preferably they have hooked and or coiled ends (not shown) as needed.

Other specified embodiments encompass having economic advantages. The lesser seismic resistant memory return reinforcement material can be used for terminal anchoring, contained within each memory return reinforcing "brick" unit(s) as needed. A specified embodiment encompasses in a method aspect for computer controlled bending and twisting of a wide variety of seismic resistant memory return characteristics as needed.

Configurations as disclosed herein preferably allow accurate cubic scaling for ease of manufacture of a wide variety of seismic resistant memory return reinforcements as needed, preferably having overlapping, non-touching memory return "coils" "rings" printed (cast) within a variety of protective seismic resistant configurations.

FIG. 42 illustrates one of many possible seismic resistant configurations exaggerated for illustrative purposes having overlapping, continuous non-touching "coils" "loops" "rings" memory return reinforcement having a wide variety of geometric cages (all sides) that are scaled as needed. The state of diminished memory return "coils" "ring" densities along the seismic resistant printed "brick" structure edges. As an option, said seismic resistant attenuation compensating characteristics may be designed and manufactured such as to increase the brick's edge structural reinforcement preferably at or near surface strengths. FIG. 42 illustrates as an option, diminished seismic resistant ring density that optionally may be incorporated having smaller memory return reinforced "coils" "rings" positioned at or near the surfaces of the slip-form printed "brick". As a further example, the reinforcing cubes are preferably in the form of "rings" such as in long chains. Memory return seismic resistant reinforced structures are preferably constructed with extremely durable and high strength materials, preferably composed of alloys of nitinol or various memory return alloys as disclosed herein or as needed.

As a further example, preferably a series of overlapping enhanced continuous non-touching cable and or wire "coils" or "rings", reference FIG. 42, such as circling the outer portion of overlapping continuous non-touching wire and or cable "coils" "rings" having the previously unavailable seismic resistant advantage that the inner-circumference of each "coils" "ring" requires less seismic resistant reinforcement having 3-dimensional encountered S-wave impact frequency attenuating characteristics and other previously unavailable protective and safety characteristics including compressive function(s) of this inner void or zone. Therefore, the memory return seismic resistant reinforcement(s) is preferably, centered on the inside edge of the printed "brick's" surface where it is most efficient.

In several exemplary embodiments, the current invention encompasses methods and apparatuses having an innovative seismic resistant advantage of memory return reinforcing 3-dimensional overlapping continuous non-touching "coils" "loops" "cubes" or "rings" to leverage the memory return high tensile strength having advantages upon a compressive space.

As an option, additional application of smaller cable and or wire continuous overlapping non-touching reinforced memory return "coils" "rings" are preferably orthogonally positioned and may be advantageously positioned to further reinforce and simultaneously attenuate the shared shell "zones" as needed. These smaller overlapping continuous seismic resistant non-touching (non-frequency transferring) wire and or cable "coils" "rings" (not shown) preferably, sufficiently pervade the seismic resistant "zone" to help sufficiently resist shearing and other highly complex seismic resistance from encountered impact frequency generated forces.

The more attenuating of the highly complex encountered S-wave impact force will therefore have the inventive advantage of not presenting compounded stresses at a single point along a reinforcement member or members.

Memory return reinforcement(s) is illustrated herein, Reference FIG. 42, to compare one of many possible reinforcement(s) geometries for memory return alloy selection(s) as required for specific applications and having tunable dynamic response characteristics in real time as needed in the art.

A specified embodiment encompasses the specific said memory return reinforcement(s) (annular reinforcement apparatus) and components specifications may vary as needed depending on the specific seismic resistant application. In some specific reinforcement applications, the reinforcing and seismic resistant systems of the current invention may fit within a seismic resistant near "monolithic" structures.

It is contemplated and intended to be within the scope of the current invention that any type of seismic resistant overlapping continuous non-touching memory return reinforced wire and or cable "coils" "rings" disclosed herein may be used as needed. In addition, any type of memory return seismic resistant reinforcement preferably in synergistic combination with the external containment sleeve having a variety of weaves, mesh, or net are encompassed, as disclosed herein.

Such said reinforcing seismic resistant overlapping continuous non-touching memory return "coils" "loops" rings, reinforcements, preferably employed in combination with weave, mesh, or net reinforcements as disclosed herein may optionally comprise continuous, fixed linkage between reinforcement elements as disclosed herein, providing additional reinforcing section(s) and or brick layer(s) that is positioned adjacent or proximate the interlocking brick inside edges. Overlapping continuous non-touching reinforced memory return wire and or cable "coils" or "rings" may be a series of "rings" or "coils", and the series of seismic resistant reinforced overlapping continuous non-touching memory return "coils" "rings" may be positioned in seismic resistant non-touching overlapping rows as needed.

The external reinforcing "brick" apparatus incorporation with the memory return reinforcement "rings" "coils", may be combined to form a seismic resistant printed structure. Alternatively, adjustments may be made as to the amount of cementitious filler or bonding material(s) that is used on either side of the overlapping reinforced continuous non-touching memory return "coils" "loops" or "rings" that may be closer to, or farther from, the middle portion of the cementitious filler layer. Weave, mesh, or net reinforced materials also may be used in place of, or in conjunction with, overlapping memory return continuous non-touching "coils" "loops" or "rings", including but not limited to those patterns and arrangements shown in FIG. 42 and FIG. 43. The optional reinforcing materials used to form the overlapping continuous non-touching memory return "coils" "loops", "rings", encompassed herein, including but not limited to metal, steel, micro tubes, basalt, carbon steel, steel alloys, stainless steel, Kevlar®, polypropylene, nitinol, or graphene. Basalt and alloys of nitinol are most preferred. Basalt and alloys of nitinol wire, cable may be hollow or solid core, hollow core is generally preferred.

Seismic resistant reinforced memory return wire and or cable "coils" "loops" "rings" may also comprise "untied" "rings" configurations as an option or as an alternative. The overlapping reinforced continuous seismic resistant non-touching memory return "coils" "rings" apparatus may employ, and preferably is specifically tailored to, a much wider selection of cementitious mixes that economically improves the ultimate seismic resistant encountered impact strength and having enhanced encountered seismic resistant impact attenuation control characteristics for the entire seismic resistant printed structure allowing for this inventive synergy provided from previously unavailable seismic resistant methods and apparatus and materials.

This innovative seismic resistant reinforced memory return apparatus and system produces and obtains an extension of the tensile range and strength over the entire seismic resistant memory return reinforcement(s) surface(s) or near surface of the printed brick(s). This is an object of the invention.

Having significant advantages over the prior art are: 1) ease of placement of annular memory return reinforcement; 2) less aggregates or bonding plastic or resin including reduction of micro-shrinkage during curing phase; 3) unrestricted curvilinear structural shapes and sizes; 4) lighter and stronger printed brick placement practicalities; 5) provides for a wider range of printed brick thicknesses; 6) combined near monolithic reinforced seismic resistant printed structures and finishing processes in onsite and offsite continuous single-pass and or multi-pass printing step(s); 7) addresses and reduces the critical S-wave frequency ranges from encountered impacts over the prior art; 8) lighter weight to strength ratio and 9) ease of onsite slip-form printing having memory return micro-fibers and continuous overlapping non-touching wire and or cable "coils" "rings".

The advantage of the preferably combined "mesh" "net" configurations with "coil" "ring" seismic resistant reinforcements includes: 1) ease in reinforced memory return encapsulation through filler or bonding resins (cement) encapsulating overlapping continuous non-touching memory return "coils" "rings" reinforcement surfaces. By contrast, generally the penetration of cementitious mixes further including plastics and resins through overlapping meshes is more difficult. 2) Seismic resistant "meshes" and "nets" costs more industrial effort (time) to manufacture. Overlapping continuous non-touching wire/cable seismic resistant "coils" configurations may be cost-effectively mass-produced, or as an option or alternatively in contiguous flat wire and or cable coiled spirals. 3) Transport and handling is simpler than restrictively sized mesh products. 4) Reduces and cancels the specific S-wave frequency range from encountered impacts having previously unavailable S-wave frequency controlling and canceling characteristics over the prior art.

Other specified embodiments encompass methods and apparatuses that operate on different dimensions and principles. In another embodiment, the current invention encompasses a wide variety of O.D. sizes (outside diameters) of reinforced seismic resistant memory return non-touching spaced apart overlapping continuous wire and or cable "coils" "loops" "rings" apparatuses, reference FIG. 42. Denser reinforced memory return overlapping continuous non-touching "coils" coverage (or more coil per unit of area) may require reinforced seismic resistant memory return reinforcement "coils" having thicker or thinner gauges as needed.

The use of seismic resistant reinforcement materials, such as plastic(s), carbon fibers, fiberglass, or other high tensile strength materials is encompassed by the current invention, including other composite materials that are suitable for reinforcing a wide variety of seismic resistant structures.

In an exemplary embodiment encompasses that the inventive seismic resistant methods and apparatus is that: high tensile reinforced memory return overlapping continuous non-touching "coils" "rings" reinforcements may be combined with the low cost compressive cementitious "filler" material(s), such as additives such as plastics and or resins; as an example, the reinforced memory return overlapping non-touching "coils" "rings" may be "chained" by compressive linking instead of by prior art tensile continuum. Therefore, a new inventive seismic resistant apparatus and methods of reinforcing memory return "compressive transferring and chaining" is encompassed in this disclosure herein and having the further advantage of having less weight/mass.

As a non-limiting example, the reinforcement overlapping continuous non-touching memory return wire and or cable "coils" "loops" "rings" may be configured to having overlaps ranging between one to ten overlaps per each "coil" "loop" "ring" or as needed, reference FIG. 42., two or three overlapping continuous non-touching "coils" "rings" being most preferred, that further encompasses a wide range of wire and or cable diameters (gauges) as needed. The prior art does not employ any seismic resistant memory return reinforcement configurations (that does not employ recoiling patterns) or other efficient tunable seismic resistant attenuating geometric patterns, particularly having S-wave frequency capturing and canceling characteristics as needed in the art.

In other exemplary embodiments encompasses that the overlapping seismic resistant continuous non-touching "coils" "loops" "rings" provides previously unavailable or unknown in the prior art seismic resistant characteristics providing a higher percentage of compression characteristics from encountered S-wave (earthquake) impact attenuation transfer when compared to the prior art's simple tension transfer characteristics.

Furthermore, as the prior art does not consider or ignores that, these and other highly complex colliding (collapsing) earthquake generated frequencies producing shockwaves and other encountered impact forces or waveform "frequencies" that need to be captured and simultaneously attenuated and dampened to provide previously unavailable seismic safety protection from encountered impacts and provides protection from a wider range of encountered earthquake impact(s) having previously unavailable seismic capturing and attenuation characteristics as disclosed herein.

The amplitude and magnitude of encountered seismic impact(s) is relatively critical due to its effect on printed structures, and the prior art's existing mechanisms that fail to provide satisfactory or significant reduction characteristics of encountered seismic impacts. The direction of the encountered impact forces generally coincides with the longitudinal axis of the structure's encountered impacts. For these and other reasons, improvements in the design and operation of seismic safety are desired in the art.

The innovative approaches of the current invention taken herein make a more effective reinforced memory return seismic cancellation system from encountered seismic energy and, in particular, recycle (and return), as much encountered seismic vector forces as possible, the encountered impact energy and generated frequency forces by departing from the conventional prior art models. Additionally, the present invention addresses the limitations associated with conventional seismic safety systems, and having improved safety methods and apparatuses for nullifying a wider range of encountered impact(s) as disclosed herein. One aspect of the invention is to reduce and cancel out the amplitude and or consequences of encountered highly complex impacts in general. This results in many new safety design possibilities and safety improvements.

One of the fundamental principles of the present invention seismic safety is the transfer of encountered S-wave frequency impact vector generated forces to a direction outside of the longitudinal axis of the encountered impact source or sources.

The mechanism(s) that captures and transfers these highly complex encountered S-wave forces are preferably configured and accurately oriented (positioned) along the longitudinal axis of the memory return reinforcement seismic safety "coils", "rings", preferably combined with printed "mesh", or "netting", etc. to effectively attenuate or nullify the highly complex S-wave frequency collisions, particularly the S-wave frequency collisions (collapsing) producing train waves as needed in the art. This is an object of the invention.

A specified embodiment encompasses that the memory return reinforcement apparatus as stated herein is useful where the reinforcement(s) is to be positioned and contained within the external reinforcing containment sleeve. As for example certain cements or bonding resins. Also, the preferred alloys of nitinol ratios material(s) may be selected so that the memory return reinforcement(s) has a desirable amount of tensile range(s) and having sufficient S-wave frequency capturing and canceling characteristics further including elasticity, encountered energy absorption, canceling, and dissipation that is required within the art.

Other specified embodiments encompass the memory return reinforcement apparatus preferably having nitinol alloy material(s) and methods and apparatuses, which may be coated on their outside surfaces with synthetic and or plastic materials and are optionally constructed by weaving nitinol threads in a variety of laminate(s) or sheet(s) or any configurations, preferably having nitinol threads having a given tensile strength of about 180,000 to 200,000 PSI with the two or more layers of the threads being joined together such as but limited to by overlapping reinforced continuous non-touching seismic resistant annular "coils" "loops" "rings", or having a similar or greater tensile range or strength than the basic mixes' fillers.

The printed brick(s) may incorporate multiple layers of the same or different memory return S-wave frequency capturing and canceling configurations and materials pre-engineered to a variety of cementitious mixes having custom aggregates, admixtures, resins or plastic mixes to obtain predictable S-wave capturing and canceling characteristics as needed.

As described in several of the exemplary embodiments disclosed herein, the capturing and transfer of encountered forces, particularly S-wave forces, such as encountered from earth quakes, explosions, wind forces, snow loads, etc. are captured by the reinforcing "ring" "coil" canceling apparatus that reverse (reflect) and thus disperse and dissipate and cancel highly complex encountered impact forces, particularly S-waves, including reversing the impact characteristics and thereby reduces the impact moment of said structures.

The current invention provides previously unavailable capturing and guiding of such encountered waves (impact forces) and directs those forces in the form of attenuated waves in a direction of the longitudinal axis of the reinforced "brick". Throughout this disclosure, the use of the term "impact apparatus" or "impact controlling apparatus" can refer either to a single or to multiple parts or masses. The component masses of the impact controlling apparatus of the invention may optionally serve additional functions, such as providing reinforcement and armoring protection to or for a wide variety of structures and their components for emplacements equipped with the present invention and may also further include pre-engineered printed armor plating.

An aspect of the present invention is the use of the inventive encountered impact absorbing and guiding controlling system as force and wave "guides" to the movement(s) such that the impact canceling components or apparatus dissipates and or follows, depending upon the application, as an example, re-directing such encountered forces to a direction along the longitudinal axis of the reinforced printed brick, thereby transferring the encountered impact forces and other detrimental effects described herein.

The current invention may also print a wide variety of specialty reinforced concrete structures quickly and accurately constructed onsite such as but not limited to cooling towers, ice houses, wind tunnels, ice towers, windcatchers (qanats), sand fixating walls, etc.

Concrete Testing

This new technology incorporates previously unavailable pre-engineered cementitious external reinforced containment "sleeves", preferably having pre-engineered venting apertures ensuring that test specimens are optimally printed in a containment sleeve and preferably cured onsite (preferably printing the mix inside a tubular sleeve). These innovations better adapt their construction methods and tools to the realities of actual field construction. As an example, low concrete strength test results are primarily due to casting in hot weather and are often caused by poor mix curing protection and the initial curing rate of mixes test specimens.

Although now having described certain embodiments of the invention's slip-form printing assemblies having multi-purpose mechanized and or robotic systems, and having automated and or semi-automated reinforced concrete construction printing of the invention as disclosed herein, it is to be understood that the concepts implicit in these embodiments may be used in other embodiments as well. In short, the protection of this application is limited strictly by the claims.

As noted previously the current invention(s) by the scope of the embodiments listed, the figures or the examples, rather, one of skill in the art can employ the principles and examples to design/make, and use a number of embodiments not specifically disclosed herein that are fully within the scope of the current invention.

The components, steps, features, objects, benefits, and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits, and advantages. The components and steps may also be arranged and ordered differently.

In these claims, reference to an element in the singular is not intended to mean "one and only one" unless specifically so stated, but rather 'one or more.' All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims.

The invention claimed is:

1. A full architectural-scale, automated, 3-dimensional slipform molding apparatus, including
    a vertically stowable, modular, automated construction system,
    a transporting and operating trailer platform comprising an upper platform, and
    a slip-form printing reinforced concrete construction system,
    a support frame,
    a mounting operating pedestal assembly apparatus having a level indicating systems;
    wherein the slip-form printing reinforced concrete construction system comprises:
        a cementitious material pump nozzle that dispenses cementitious material;
        an external reinforcing containment sleeve that is configured around said cementitious material that is dispensed from the pump nozzle wherein the containment sleeve is a flexible sheet of material;
        a brick mold coupled to the pump nozzle that moves with the pump nozzle, wherein the brick mold is configured for receiving the dispensed cementitious material from the pump nozzle to form a slip-form printed brick having a slip-form printed brick shape;
        wherein the external reinforcing containment sleeve moves through the brick mold as the cementitious material is dispensed from the pump nozzle.

2. The apparatus according to claim 1, further comprising a dispensing spool for the external reinforcing containment sleeve, wherein the external reinforcing containment sleeve is dispensed from said dispensing spool and configured around said cementitious material, forming said slip-form printed brick.

3. The apparatus according to claim 2, wherein the external reinforcing containment sleeve comprises a woven material.

4. The apparatus according to claim 2, wherein the external reinforcing containment sleeve is a fabric.

5. The apparatus according to claim 1, wherein the apparatus further comprises a sleeve folding apparatus that folds the external reinforcing containment sleeve to form a folded external reinforcing containment sleeve having an overlap to contain the concrete pumped therein.

6. The apparatus according to claim 5, wherein the sleeve folding apparatus is detachably attached to the brick mold having an internal perimeter shape that defines the slip-form minted brick shape for the slip-form printed brick and wherein the folded external reinforcing containment sleeve moves through the internal perimeter shape.

7. The apparatus according to claim 1, wherein the slip-form printed brick shape of the brick mold is interlocking having a female keyway extending along a length of a surface of the slip-form printed brick.

8. The apparatus according to claim 7, wherein the slip-form printed brick shape defined by the brick mold is interlocking having a male key extending along a length of a surface of the slip-form printed brick.

9. The apparatus according to claim 1, wherein the apparatus further comprises a ground-engaging and supporting operating base to which robotic arms are coupled to.

10. The apparatus according to claim 1, further comprising an apparatus controller that controls the positions of the robotic arms on the basis of control data.

11. The apparatus according to claim 1, wherein the brick mold is interchangeable.

12. The apparatus according to claim 1, wherein the slip-form printed brick shape, defined by the brick mold, is interlocking having a female keyway extending along a length of the brick mold and a male keyway extending along a length of an opposing surface of the brick mold, whereby the slip-form printed brick is interlocking having a female keyway extending along a length of a first surface and a male keyway extending along a length of an opposing surface, whereby successive brick layers are interlocking having the male keyway that extends into the female keyway of an adjacent brick, and wherein the brick mold is interchangeable.

13. The apparatus according to claim 1, wherein when the slip form printing reinforced concrete construction system is configured in a deployed mode, said slip-form printing reinforced concrete construction system has 360 degree rotation operation.

14. The apparatus according to claim 1, wherein the external reinforcing containment sleeve has a plurality of external venting apertures to regulate curing of the cementitious material.

15. The apparatus according to claim 14, wherein the external venting apertures have a size of between 1 micron and 5 mm.

16. The apparatus according to claim 1 wherein the slipform printed brick has an internal perimeter shape comprising a height and a width of between 1 inch and 30 inches.

17. The apparatus according of claim 1, wherein the slip-form printed brick is formed at a rate of at least 5.0 cubic ft. per second.

* * * * *